(12) United States Patent
Totani et al.

(10) Patent No.: US 6,217,793 B1
(45) Date of Patent: Apr. 17, 2001

(54) ACETYLENE COMPOUND, LIQUID CRYSTAL COMPOSITION AND LIQUID CRYSTAL ELEMENT

(75) Inventors: Yoshiyuki Totani, Yokohama; Hiroe Kayashima, Yamato-gun; Tsutomu Ishida; Masakatsu Nakatsuka, both of Yokohama, all of (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/312,698

(22) Filed: May 17, 1999

(30) Foreign Application Priority Data

Jun. 5, 1998 (JP) .................................... 10-157766

(51) Int. Cl.$^7$ .......................... C09K 19/32; C09K 19/20; C07C 69/76; C07C 25/24
(52) U.S. Cl. .............................. 252/299.62; 252/299.64; 252/299.65; 252/299.66; 560/56; 560/80; 560/95; 560/100; 560/119; 570/129; 570/183
(58) Field of Search ........................ 252/299.62, 299.64, 252/299.65, 299.66, 299.67; 428/1.1; 560/56, 80, 95, 100, 119; 570/129, 183

(56) References Cited

U.S. PATENT DOCUMENTS

| | | | |
|---|---|---|---|
| 4,528,114 | * | 7/1985 | Petrzilka et al. ................... 252/299.6 |
| 5,820,781 | * | 10/1998 | Toyne et al. ..................... 252/299.61 |
| 5,820,785 | * | 10/1998 | Schlosser et al. ............... 252/299.63 |

FOREIGN PATENT DOCUMENTS

| | | |
|---|---|---|
| 59-219251 | 12/1984 | (JP) . |
| 60-32748 | 2/1985 | (JP) . |
| 3-83951 | 4/1991 | (JP) . |
| 4-103560 | 4/1992 | (JP) . |
| 8-81417 | 3/1996 | (JP) . |
| 8-92137 | 4/1996 | (JP) . |

OTHER PUBLICATIONS

Noel A. Clark and Sven T. Lagerwall, "Submicrosecond Bistable Electro–optic Switching in Liquid Crystal", *Appl. Phys. Lett.* 36(11), pp. 899–901 (Jun. 1, 1980).

A.D.L. Chandani et al., "Tristable Switching in Surface Stabilized Ferroelectric Liquid Crystals with a Large Spontaneous Polarization", *Japanese Journal of Applied Physics*, vol. 27, No. 5, pp. L729–L732, (May 1988).

Shiroh Inui et al., "Thresholdless Antiferroelectricity in Liquid Crystals and its Application to Displays", *J. Mater. Chem.*, 1996, 6(4), pp. 671–673.

Chemical Abstracts, vol. 125, nos. 6, Aug. 5, 1996, abstract No. 72055, JP 08 081417 (Sumitomo Chemical Co.), Yukari Fujimoto et al., "Ester derivatives as liquid crystal compound and their manufacture".

Chemical Abstracts, vol. 119, No. 17, Oct. 25 1993, abstract No. 180536, JP 05 070392 (Showa Shell Sekiyu), Nobuhiro Okabe et al, "Preparation of optically active fluoroalkyl arylcarboxylates as liquid crystals with tristable states".

Chemical Abstracts, vol. 125, No. 10, Sep. 2, 1996, abstract No. 127905, JP 08 109145 (Canon KK), Takao Takiguchi et al.; "Ethynylene compound for liquid–crystal composition and liquid display element using same".

* cited by examiner

Primary Examiner—Shean C. Wu
(74) Attorney, Agent, or Firm—Burns, Doane, Swecker, & Mathis, L.L.P.

(57) ABSTRACT

Provided are novel acetylene compounds which are useful as a component for a liquid crystal composition used for a liquid crystal element, a liquid crystal composition containing said compounds and a liquid crystal element using said liquid crystal composition. The acetylene compound is represented by Formula (1):

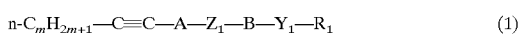

$$n\text{-}C_mH_{2m+1}-C\equiv C-A-Z_1-B-Y_1-R_1 \qquad (1)$$

wherein m represents an integer of 2 to 24; $R_1$ represents a linear or branched alkyl group, a linear or branched alkoxyalkyl group, a linear or branched alkenyl group, or a linear or branched alkenyloxyalkyl group each of which may be substituted with a halogen atom; $R_1$ may have an asymmetric carbon atom, and the asymmetric carbon atom may be optically active; A and B represents a cyclic group such as a phenylene group, a biphenylene group, a naphthylene group and the like each of which may be substituted with a halogen atom.

13 Claims, 1 Drawing Sheet

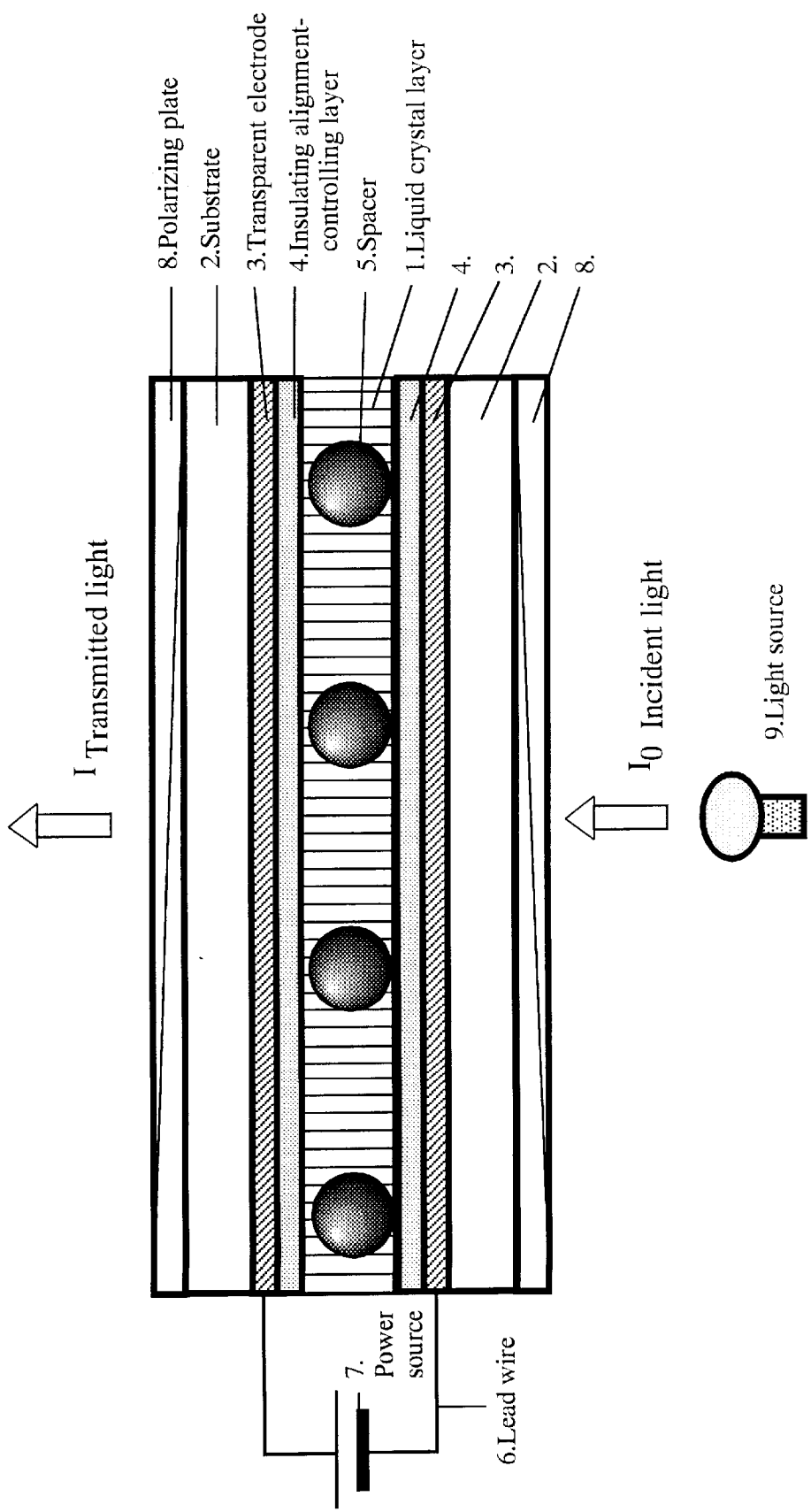

ACETYLENE COMPOUND, LIQUID CRYSTAL COMPOSITION AND LIQUID CRYSTAL ELEMENT

BACKGROUND OF THE INVENTION

1. Field of the Invention

The present invention relates to a novel acetylene compound, more specifically to a novel acetylene compound which is useful as a component for a liquid crystal composition used for a liquid crystal element, a liquid crystal composition containing said compound and a liquid crystal element using said liquid crystal composition.

2. Description of the Related Art

A liquid crystal display device is thin and light and is low in power consumption and therefore is used as a display in various uses.

A TN (twisted nematic) type display system is most widely used for a liquid crystal display element at present. However, this TN type display system has a response time as slow as 10 to 50 m second and therefore is inferior in terms of a response time as compared with a light-emitting type element (cathode tube, electroluminescence, plasma display and the like). Further, an STN (super twisted nematic) type display element in which an angle of twist is controlled to 180 to 270° has been developed, but the response time is still inferior. Thus, while various efforts for the improvement have been made, a TN type liquid crystal display element having a shorter response time has not yet been achieved.

However, a novel display system using a smectic liquid crystal (ferroelectric liquid crystal) which is actively researched in recent years has a possibility of a marked improvement in a response time [N. A. Clark et al.; Applied Phys. Lett., 36, 899 (1980)].

This system is a method making use of a chiral smectic phase such as a chiral smectic C phase exhibiting ferroelectricity. It is known that not only the chiral smectic C phase but also chiral smectic F, G, H and I phases exhibit ferroelectricity. These smectic liquid crystal phases belong to tilted chiral smectic phases. Among them, a chiral smectic C phase which has a low viscosity and is expected to have a high speed response is studied to be used in terms of practical use.

Further, a display system making use of a chiral smectic CA phase (anti-ferroelectric phase) which is a higher-order phase of a chiral smectic C phase is actively researched in recent years [L. Chandani et al.; Jpn. J. Appl. Phys., 27L729 (1988)].

Further, in an anti-ferroelectric liquid crystal compound or liquid crystal composition, a smectic liquid crystal (TLAFLC) exhibiting a response of a V characteristic having no threshold value is found, and a display system making use of this is actively researched [S. Inui et al.; J. Mater. Chem., 6.71 (1996)].

Various liquid crystal compounds exhibiting these tilted chiral smectic phases have so far been studied, and a lot of compounds have already been found and produced. However, in order to actually use them as a high speed-response liquid crystal element, the following conditions have to be satisfied:

(a) a tilted chiral smectic phase is exhibited in a wide temperature range including room temperature, (b) the viscosity is low, (c) a suitable tilt angle is found (d) the spontaneous polarization is large to some extent, and (e) the aligning property is good.

However, no single compound which can satisfy these conditions has ever been obtained.

Accordingly, a liquid crystal compound exhibiting a tilted chiral smectic phase is used as a liquid crystal composition exhibiting a tilted chiral smectic phase by mixing with other several liquid crystal compounds exhibiting a tilted chiral smectic phase or a tilt base smectic phase. In any event, however, the liquid crystal compound exhibiting a tilted chiral smectic phase has to have a wide mesomorphic temperature range, a small viscosity and a spontaneous polarization which is large to some extent.

For example, the following compound is known as a liquid crystal compound exhibiting a tilted chiral smectic phase [Japanese Patent Application Laid-Open No. Sho 59-219251 (U.S. Pat. Nos. 4,596,667 and 4,820,444)]:

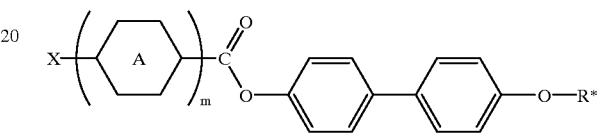

wherein m is 0, 1 or 2; R* represents an optically active alkyl group; Ring A represents a 1,4-phenylene group or a 1,4-trans-cyclohexylene group; and X represents a linear or branched alkyl group or alkoxy group each of which has 1 to 18 carbon atoms.

However, the present inventors investigated the above compound to find the problems that while a compound in which X was an alkoxy group had a high upper limit temperature of the chiral smectic phase (the chiral smectic C phase), it had a high viscosity and that a compound in which X was an alkyl group had a low viscosity but had a low upper limit temperature of the chiral smectic phase.

Further, the following compound [Japanese Patent Application Laid-Open No. Sho 60-32748 (U.S. Pat. No. 4,576,732) and Japanese Patent Application Laid-Open No. Hei 3-83951 (U.S. Pat. No. 5,116,531)] had the problem that when the long chain portion (R in the following formula) at the reverse side to the optically active group was an alkoxy group, the upper limit temperature was high and the viscosity was high as well, and that when it was an alkyl group, the viscosity was low and the upper limit temperature was low as well:

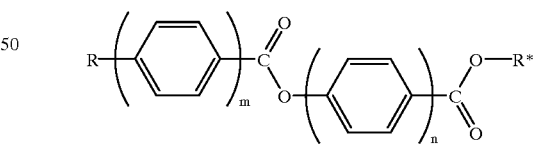

wherein R represents an alkyl group or alkoxy group each of which has 20 or less carbon atoms; R* represents an optically active alkyl group and contains an asymmetric carbon atom; and m and n are natural numbers, provided that when m and n are 1, R has 7 or more carbon atoms.

Further, in the case of a compound having the following skeleton (for example, Japanese Patent Application Laid-Open No. Hei 4-103560), the present inventors compared a compound in which a terminal group represented by R shown below was an alkyl group with a compound in which it was an alkoxy group to find that there was the problem that the compound having the alkoxy group had a high upper limit temperature but had a high viscosity, and the compound having the alkyl group had a low viscosity but had a low upper limit temperature:

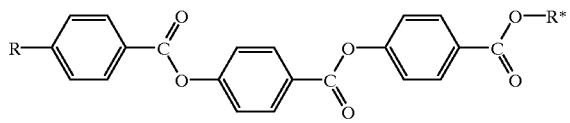

As described above, in the compounds which have so far been known, the terminal groups which are not optically active are bonded through an —O— bond (alkoxy) or a single bond (alkyl) in many cases, and in the case of these compounds, it has been impossible that they have both of a high upper limit temperature and a low viscosity.

Further, a compound into which an acetylene bond is introduced as a bonding group is known (Japanese Patent Application Laid-Open No. Hei 8-81417). However, referred to in the specification of the above compound is nothing about compounds in which a linear terminal group is linked through an acetylene bond, and only the compounds in which a group having an asymmetric carbon atom is bonded through an acetylene bond are described. Further, in the case of the compound into which an optically active group is introduced via an acetylene bond, the acetylene bond is present between the optically active portion and the central skeleton of the molecule of the liquid crystal compound, and therefore there has been the problem that it is impossible to introduce a large dipole between them, so that the compound exhibiting a large spontaneous polarization can not be obtained.

As described above, conventional liquid crystal compounds and liquid crystal compositions exhibiting a tilt base chiral smectic phase are still unsatisfactory in terms of physical properties such as a mesomorphic temperature range, a viscosity and a spontaneous polarization and are expected to be improved therein.

SUMMARY OF THE INVENTION

An object of the present invention is to provide a compound which is suited for improving various characteristics such as a high-speed response, a wide temperature range of smectic liquid crystal and a high contrast ratio when blended with a smectic liquid crystal composition in order to put a smectic liquid crystal element to practical use, a liquid crystal composition containing the same compound and a liquid crystal element using the same liquid crystal composition.

Intensive research continued by the present inventors in order to achieve the object described above have resulted in finding a defined acetylene compound to attain the present invention. That is, the present invention relates to an acetylene compound represented by Formula (1). Further, the present invention relates to a liquid crystal composition containing at least one acetylene compound represented by Formula (1) and a liquid crystal element comprising the above composition disposed between a pair of electrode substrates:

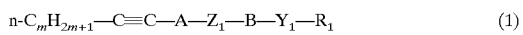

wherein m represents an integer of 2 to 24; $R_1$ represents a linear or branched alkyl group having 2 to 24 carbon atoms which may be substituted with a halogen atom, a linear or branched alkoxyalkyl group having 2 to 24 carbon atoms which may be substituted with a halogen atom, a linear or branched alkenyl group having 3 to 24 carbon atoms which may be substituted with a halogen atom, or a linear or branched alkenyloxyalkyl group having 4 to 24 carbon atoms which may be substituted with a halogen atom; $R_1$ may have an asymmetric carbon atom, and the asymmetric carbon atom may be optically active; A represents a group selected from:

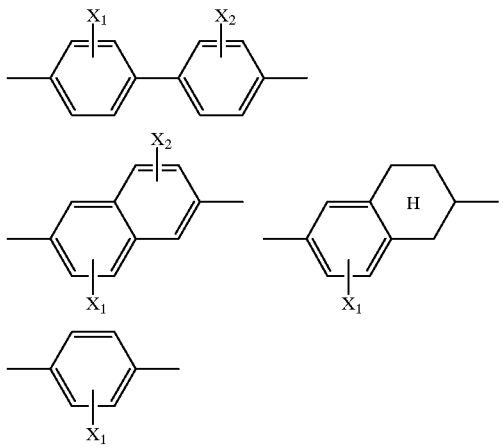

B represents a group selected from:

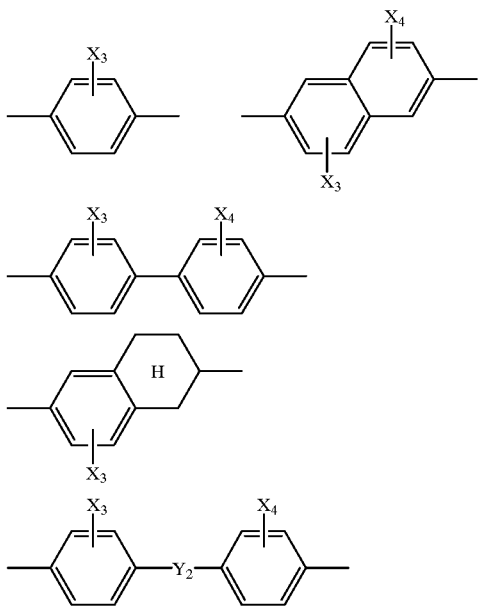

$X_1$, $X_2$, $X_3$ and $X_4$ each represent independently a hydrogen atom or a halogen atom; $Z_1$ represents a —COO— group or a —CH$_2$O— group; $Y_1$ represents a —O— group, a —COO— group or a —OCO— group; and $Y_2$ represents a —CH$_2$O— group, a —OCH$_2$— group, a —COO— group or a —OCO— group.

The present invention has made it possible to provide an acetylene compound which is useful as a constitutional component for a liquid crystal composition, particularly the compound which reduces the viscosity (accelerates the response time) while elevating the upper limit temperature of the liquid crystal composition.

BRIEF DESCRIPTION OF THE DRAWINGS

FIG. 1 is a cross-sectional schematic drawing of one example of a liquid crystal element using liquid crystal exhibiting a chiral smectic phase.

DETAILED DESCRIPTION OF THE PREFERRED EMBODIMENT

The present invention shall be explained below in detail.

The acetylene compound of the present invention represented by Formula (1) is divided roughly into the following three structures of (1-A), (1-B) and (1-C) according to the structure of $Y_1$:

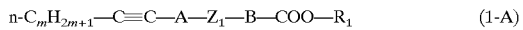(1-A)

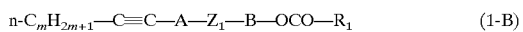(1-B)

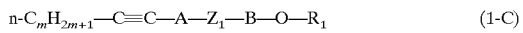(1-C)

Further, the acetylene compound is divided roughly into the following six structures of (1-A1), (1-A2), (1-B1), (1-B2), (1-C1) and (1-C2) according to the structure of $Z_1$:

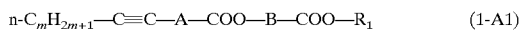(1-A1)

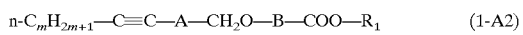(1-A2)

$$n\text{-}C_mH_{2m+1}\text{---}C\equiv C\text{---}A\text{---}COO\text{---}B\text{---}OCO\text{---}R_1 \quad (1\text{-}B1)$$

$$n\text{-}C_mH_{2m+1}\text{---}C\equiv C\text{---}A\text{---}CH_2O\text{---}B\text{---}OCO\text{---}R_1 \quad (1\text{-}B2)$$

$$n\text{-}C_mH_{2m+1}\text{---}C\equiv C\text{---}A\text{---}COO\text{---}B\text{---}O\text{-}R_1 \quad (1\text{-}C1)$$

$$n\text{-}C_mH_{2m+1}\text{---}C\equiv C\text{---}A\text{---}CH_2O\text{---}B\text{---}O\text{---}R_1 \quad (1\text{-}C2)$$

All of these compounds are useful as a constitutional component for the liquid crystal composition. In the acetylene compound of the present invention represented by Formula (1), combinations of $Y_1$ with $Z_1$ include preferably a combination shown in Formula (1-A1) or (1-A2) in which $Y_1$ is a —COO— group and $Z_1$ is a —COO— group or a —CH$_2$O— group and a combination shown in Formula (1-C1) or (1-C2) in which $Y_1$ is a —O— group and $Z_1$ is a —COO— group or a —CH$_2$O— group. When the liquid crystal composition is intended for a liquid crystal composition exhibiting an anti-ferroelectricity, the compounds represented by Formula (1-A1) and (1-A2) described above are more preferred.

Further, in the acetylene compound of the present invention represented by Formula (1), the combinations of the groups represented by A and B include 20 combinations in which:

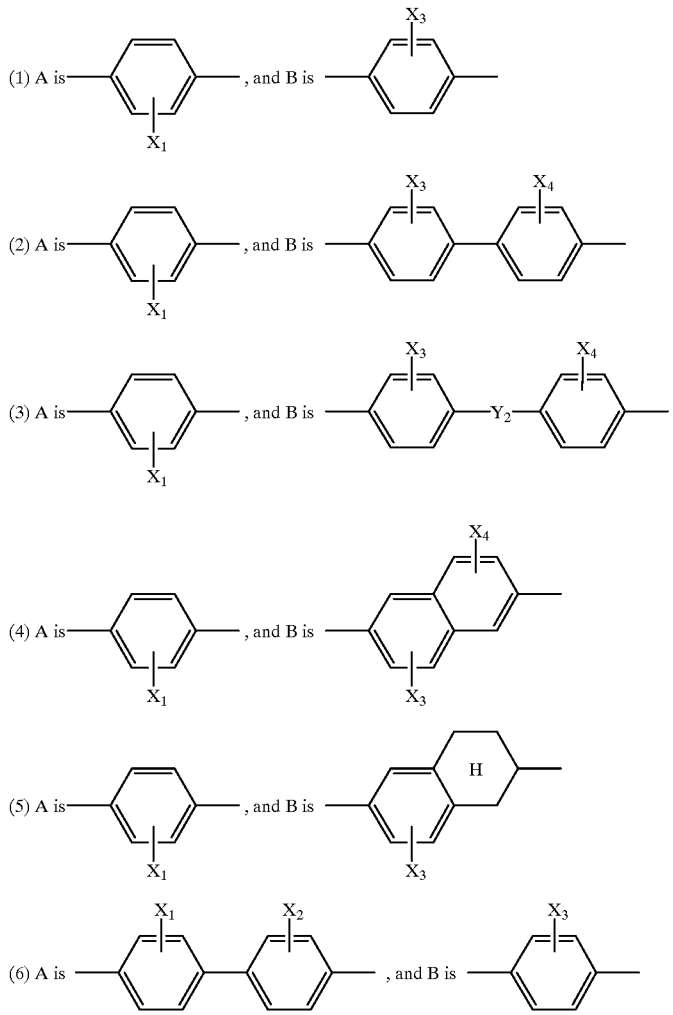

-continued
(7) A is 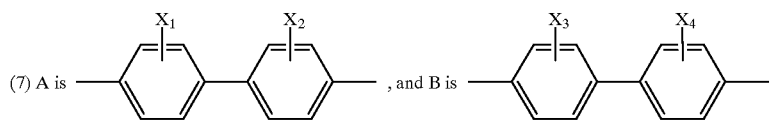, and B is
(8) A is 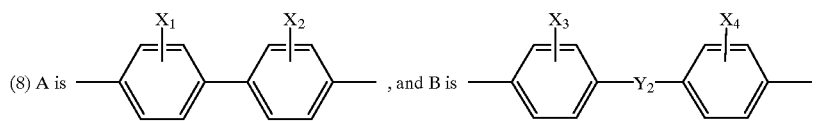, and B is
(9) A is 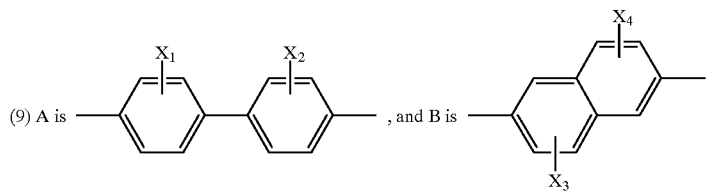, and B is
(10) A is 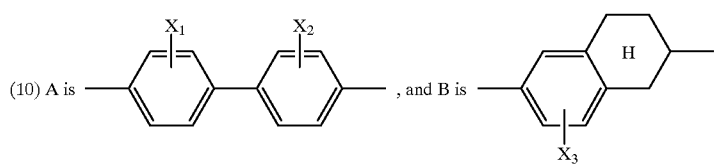, and B is
(11) A is 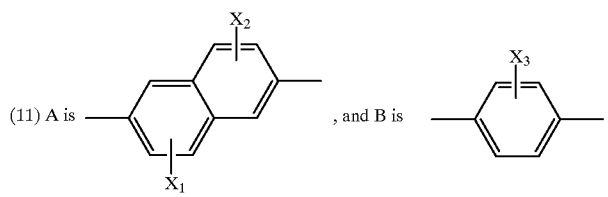, and B is
(12) A is 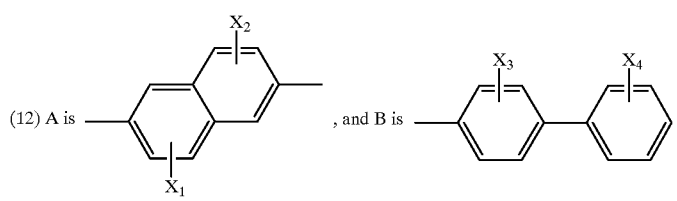, and B is
(13) A is 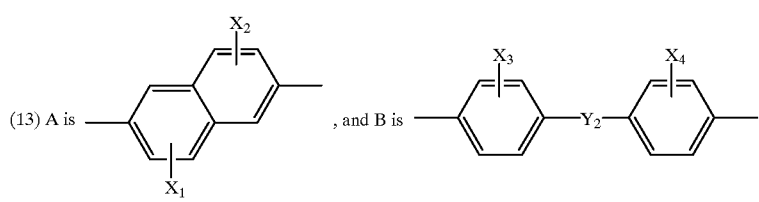, and B is
(14) A is 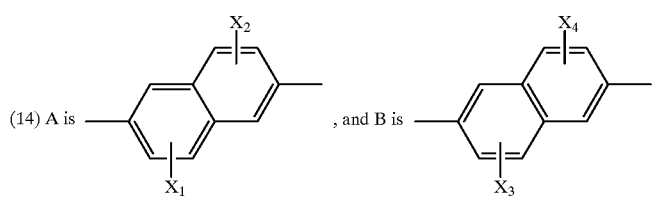, and B is
(15) A is 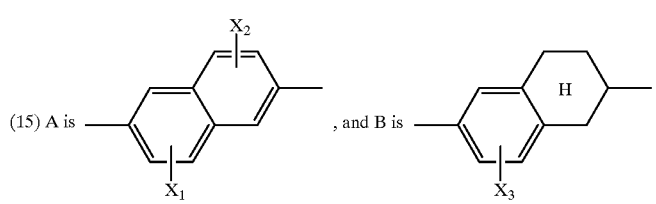, and B is -continued

(16) A is 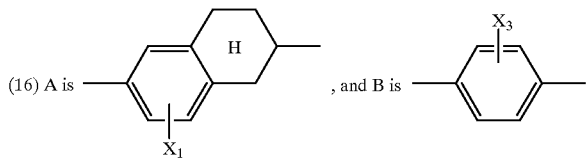, and B is

(17) A is 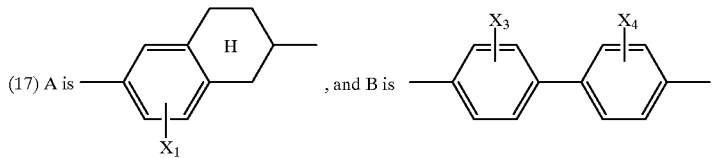, and B is

(18) A is 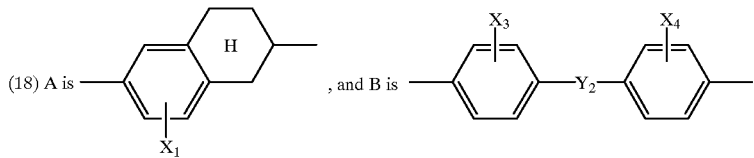, and B is

(19) A is 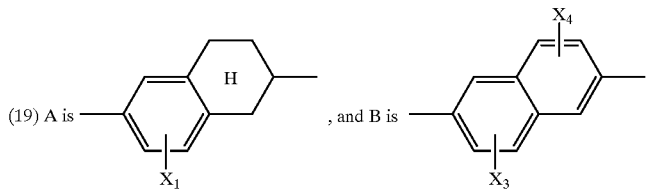, and B is

(20) A is 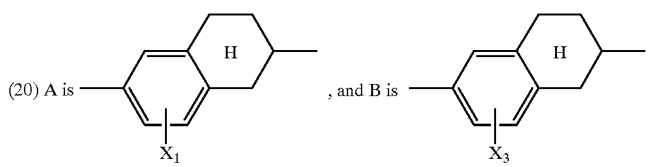, and B is

In the combinations of A with B, preferred are the combinations represented by (1) to (6) and (9) to (20) in which the number of aromatic rings falls within 3 in total (a naphthalene ring and a tetrahydronaphthalene ring each are counted as one aromatic ring), and more preferred are the combinations represented by (1) to (6) in which A is

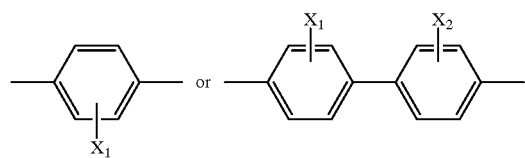

In the acetylene compound of the present invention represented by Formula (1), m represents an integer of 2 to 24. It is preferably 2 to 20, more preferably 4 to 15 and further preferably 4 to 12.

Further, in the acetylene compound of the present invention represented by Formula (1), $R_1$ represents a linear or branched alkyl group having 2 to 24 carbon atoms which may be substituted with a halogen atom, a linear or branched alkoxyalkyl group having 2 to 24 carbon atoms which may be substituted with a halogen atom, a linear or branched, alkenyl group having 3 to 24 carbon atoms which may be substituted with a halogen atom, or a linear or branched, alkenyloxyalkyl group having 4 to 24 carbon atoms which may be substituted with a halogen atom. $R_1$ may have an asymmetric carbon atom, and the asymmetric carbon atom may be optically active.

$R_1$ has preferably 3 to 20 carbon atoms, more preferably 4 to 15 carbon atoms and further preferably 4 to 12 carbon atoms.

$R_1$ represents preferably a linear or branched alkyl group which may be substituted with a halogen atom or a linear or branched alkoxyalkyl group which may be substituted with a halogen atom, more preferably a branched alkyl group which may be substituted with a halogen atom or a linear or branched alkoxyalkyl group and further preferably a branched alkyl group having an asymmetric carbon atom which may be substituted with a halogen atom, a linear alkoxyalkyl group or a branched alkoxyalkyl group having an asymmetric carbon atom. When $R_1$ is a group having an asymmetric carbon atom, $R_1$ preferably is a group having an optically active asymmetric carbon atom.

Specific examples of the groups represented by $R_1$ include linear alkyl groups such as ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, n-tricosyl and n-tetracosyl;

branched alkyl groups such as 1-methylethyl, 1-methylpropyl, 1-ethylpropyl, 1-n-propylpropyl, 1-methylbutyl, 1-ethylbutyl, 1-n-propylbutyl, 1-n-butylbutyl, 1-methylpentyl, 1-ethylpentyl, 1-n-propylpentyl, 1-n-butylpentyl, 1-n-pentylpentyl, 1-methylhexyl, 1-ethylhexyl, 1-n-propylhexyl, 1-n-butylhexyl, 1-n-pentylhexyl, 1-n-hexylhexyl, 1-methylheptyl, 1-ethylheptyl, 1-n-propylheptyl, 1-n-butylheptyl, 1-n-pentylheptyl, 1-n-hexylheptyl, 1-n-heptylheptyl, 1-methyloctyl, 1-ethyloctyl, 1-n-propyloctyl, 1-n-butyloctyl, 1-n-pentyloctyl, 1-n-hexyloctyl, 1-n-heptyloctyl, 1-n-octyloctyl, 1-methylnonyl, 1-ethylnonyl, 1-n-propylnonyl, 1-n-butylnonyl, 1-n-pentylnonyl, 1-n-hexylnonyl, 1-n-heptylnonyl, 1-n-octylnonyl, 1-n-nonylnonyl, 1-methyldecyl, 2-methylpropyl, 2-methylbutyl, 2-ethylbutyl, 2-methylpentyl, 2-ethylpentyl, 2-n-propylpentyl, 2-methylhexyl, 2-ethylhexyl, 2-n-propylhexyl, 2-n-butylhexyl, 2-methylheptyl, 2-ethylheptyl, 2-n-propylheptyl, 2-n-butylheptyl, 2-n-pentylheptyl, 2-methyloctyl, 2-ethyloctyl, 2-n-propyloctyl, 2-n-butyloctyl, 2-n-pentyloctyl, 2-n-hexyloctyl, 2-methylnonyl, 2-ethylnonyl, 2-n-propylnonyl, 2-n-butylnonyl, 2-n-pentylnonyl, 2-n-hexylnonyl, 2-n-heptylnonyl, 2-methyldecyl, 2,3-dimethylbutyl, 2,3,3-trimethylbutyl, 3-methylbutyl, 3-methylpentyl, 3-ethylpentyl, 4-methylpentyl, 2,3-dimethylpentyl, 2,4-dimethylpentyl, 2,4,4-trimethylpentyl, 2,3,3,4-tetramethylpentyl, 3-methylhexyl, 2,5-dimethylhexyl, 3-ethylhexyl, 3,5,5-trimethylhexyl, 4-methylhexyl, 4-ethylhexyl, 6-methylheptyl, 3,7-dimethyloctyl and 6-methyloctyl; alkyl groups substituted with halogen atoms such as 2-fluoro-n-pentyl, 3-fluoro-n-pentyl, 5-fluoro-n-pentyl, 2,4-difluoro-n-pentyl, 2,5-difluoro-n-pentyl, 2-fluoro-3-methylbutyl, 2-fluoro-n-hexyl, 3-fluoro-n-hexyl, 4-fluoro-n-hexyl, 5-fluoro-n-hexyl, 6-fluoro-n-hexyl, 2-fluoro-n-heptyl, 4-fluoro-n-heptyl, 5-fluoro-n-heptyl, 2-fluoro-n-octyl, 3-fluoro-n-octyl, 6-fluoro-n-octyl, 4-fluoro-n-nonyl, 7-fluoro-n-nonyl, 3-fluoro-n-decyl, 6-fluoro-n-decyl, 4-fluoro-n-dodecyl, 8-fluoro-n-dodecyl, 5-fluoro-n-tetradecyl, 9-fluoro-n-tetradecyl, 2-chloro-n-pentyl, 5-chloro-n-pentyl, 5-chloro-n-hexyl, 4-chloro-n-heptyl, 6-chloro-n-octyl, 7-chloro-n-nonyl, 3-chloro-n-decyl, 8-chloro-n-dodecyl, n-perfluoropentyl, n-perfluorohexyl, n-perfluoroheptyl, n-perfluorooctyl, n-perfluorononyl, n-perfluorodecyl, n-perfluoroundecyl, n-perfluorododecyl, n-perfluorotetradecyl, 1-hydro-n-perfluoropentyl, 1-hydro-n-perfluorohexyl, 1-hydro-n-perfluoroheptyl, 1-hydro-n-perfluorooctyl, 1-hydro-n-perfluorononyl, 1-hydro-n-perfluorodecyl, 1-hydro-n-perfluoroundecyl, 1-hydro-n-perfluorododecyl, 1-hydro-n-perfluorotetradecyl, 1,1-dihydro-n-perfluoropentyl, 1,1-dihydro-3-pentafluoroethylperfluoropentyl, 1,1-dihydro-n-perfluorohexyl, 1,1-dihydro-n-perfluoroheptyl, 1,1-dihydro-n-perfluorooctyl, 1,1-dihydro-n-perfluorononyl, 1,1-dihydro-n-perfluorodecyl, 1,1-dihydro-n-perfluoroundecyl, 1,1-dihydro-n-perfluorododecyl, 1,1-dihydro-n-perfluorotetradecyl, 1,1-dihydro-n-perfluoropentadecyl, 1,1-dihydro-n-perfluorohexadecyl, 1,1,4-trihydro-n-perfluorobutyl, 1,1,4-trihydro-n-perfluoropentyl, 1,1,5-trihydro-n-perfluoropentyl, 1,1,3-trihydro-n-perfluorohexyl, 1,1,6-trihydro-n-perfluorohexyl, 1,1,5-trihydro-n-perfluoroheptyl, 1,1,7-trihydro-n-perfluoroheptyl, 1,1,8-trihydro-n-perfluorooctyl, 1,1,9-trihydro-n-perfluorononyl, 1,1,11-trihydro-n-perfluoroundecyl, 2-(n-perfluoropropyl)ethyl, 2-(n-perfluorobutyl)ethyl, 2-(n-perfluoropentyl)ethyl, 2-(n-perfluorohexyl)ethyl, 2-(n-perfluoroheptyl)ethyl, 2-(n-perfluorooctyl)ethyl, 2-(n-perfluorodecyl)ethyl, 2-(n-perfluorononyl)ethyl, 2-(n-perfluorododecyl)ethyl, 2-(perfluoro-9'-methyldecyl)ethyl, 3-(perfluoroethyl)propyl, 3-(n-perfluoropropyl)propyl, 3-(n-perfluorobutyl)propyl, 3-(n-perfluorohexyl)propyl, 3-(n-perfluoroheptyl)propyl, 3-(n-perfluorooctyl)propyl, 3-(n-perfluorodecyl)propyl, 3-(n-perfluorododecyl)propyl, 4-(perfluoroethyl)butyl, 4-(n-perfluoropropyl)butyl, 4-(n-perfluorobutyl)butyl, 4-(n-perfluoropentyl)butyl, 4-(n-perfluorohexyl)butyl, 4-(n-perfluoroheptyl)butyl, 4-(n-perfluorooctyl)butyl, 4-(n-perfluorodecyl)butyl, 4-(perfluoroisopropyl)butyl, 5-(n-perfluoropropyl)pentyl, 5-(n-perfluorobutyl)pentyl, 5-(n-perfluoropentyl)pentyl, 5-(n-perfluorohexyl)pentyl, 5-(n-perfluoroheptyl)pentyl, 5-(n-perfluorooctyl)pentyl, 6-(perfluoroethyl)hexyl, 6-(n-perfluoropropyl)hexyl, 6-(n-perfluorobutyl)hexyl, 6-(n-perfluorohexyl)hexyl, 6-(n-perfluoroheptyl)hexyl, 6-(n-perfluorooctyl)hexyl, 6-(perfluoroisopropyl)hexyl, 6-(perfluoro-7'-methyloctyl)hexyl, 7-(perfluoroethyl)heptyl, 7-(n-perfluoropropyl)heptyl, 7-(n-perfluorobutyl)heptyl, 7-(n-perfluoropentyl)heptyl, 1-(trifluoromethyl)ethyl, 1-(trifluoromethyl)propyl, 1-(trifluoromethyl)butyl, 1-(trifluoromethyl)pentyl, 1-(trifluoromethyl)hexyl, 1-(trifluoromethyl)heptyl, 1-(trifluoromethyl)octyl, 1-(trifluoromethyl)nonyl, and 1-(trifluoromethyl)decyl; alkoxyalkyl groups such as methoxymethyl, 2-methoxyethyl, 3-methoxypropyl, 4-methoxybutyl, 5-methoxypentyl, 6-methoxyhexyl, 7-methoxyheptyl, 8-methoxyoctyl, 9-methoxynonyl, 10-methoxydecyl, ethoxymethyl, 2-ethoxyethyl, 3-ethoxypropyl, 4-ethoxybutyl, 5-ethoxypentyl, 6-ethoxyhexyl, 7-ethoxyheptyl, 8-ethoxyoctyl, 9-ethoxynonyl, 10-ethoxydecyl, n-propyloxymethyl, 2-n-propyloxyethyl, 3-n-propyloxypropyl, 4-n-propyloxybutyl, 5-n-propyloxypentyl, 6-n-propyloxyhexyl, 7-n-propyloxyheptyl, 8-n-propyloxyoctyl, 9-n-propyloxynonyl, 10-n-propyloxydecyl, n-butyloxymethyl, 2-n-butyloxyethyl, 3-n-butyloxypropyl, 4-n-butyloxybutyl, 5-n-butyloxypentyl, 6-n-butyloxyhexyl, 7-n-butyloxyheptyl, 8-n-butyloxyoctyl, 9-n-butyloxynonyl, 10-n-butyloxydecyl, n-pentyloxymethyl, 2-n-pentyloxyethyl, 3-n-pentyloxypropyl, 4-n-pentyloxybutyl, 5-n-pentyloxypentyl, 6-n-pentyloxyhexyl, 7-n-pentyloxyheptyl, 8-n-pentyloxyoctyl, 9-n-pentyloxynonyl, 10-n-pentyloxydecyl, n-hexyloxymethyl, 2-n-hexyloxyethyl, 3-n-hexyloxypropyl, 4-n-hexyloxybutyl, 5-n-hexyloxypentyl, 6-n-hexyloxyhexyl, 7-n-hexyloxyheptyl, 8-n-hexyloxyoctyl, 9-n-hexyloxynonyl, 10-n-hexyloxydecyl, n-heptyloxymethyl, 2-n-heptyloxyethyl, 3-n-heptyloxypropyl, 4-n-heptyloxybutyl, 5-n-heptyloxypentyl, 6-n-heptyloxyhexyl, 7-n-heptyloxyheptyl, 8-n-heptyloxyoctyl, 9-n-heptyloxynonyl, 10-n-heptyloxydecyl, n-octyloxymethyl, 2-n-octyloxyethyl, 3-n-octyloxypropyl, 4-n-octyloxybutyl, 5-n-octyloxypentyl, 6-n-octyloxyhexyl, 7-n-octyloxyheptyl, 8-n-octyloxyoctyl, 9-n-octyloxynonyl, 10-n-octyloxydecyl, n-nonyloxymethyl, 2-n-nonyloxyethyl, 3-n-nonyloxypropyl, 4-n-nonyloxybutyl, 5-n-nonyloxypentyl, 6-n-nonyloxyhexyl, 7-n-nonyloxyheptyl, 8-n-nonyloxyoctyl, 9-n-nonyloxynonyl, 10-n-nonyloxydecyl, n-decyloxymethyl, 2-n-decyloxyethyl, 3-n-decyloxypropyl, 4-n-decyloxybutyl, 5-n-decyloxypentyl, 6-n-decyloxyhexyl, 7-n-decyloxyheptyl, 8-n-decyloxyoctyl, 9-n-decyloxynonyl, 10-n-decyloxydecyl, 2-n-undecyloxyethyl, 4-n-undecyloxybutyl, 6-n-undecyloxyhexyl, 8-n-undecyloxyoctyl, 10-n-undecyloxydecyl, 2-n-dodecyloxyethyl, 4-n- dodecyloxybutyl, 6-n-dodecyloxyhexyl, 8-n-dodecyloxyoctyl, 10-n-dodecyloxydecyl, 1-methyl-2-ethoxyethyl, 1-methyl-2-n-propyloxyethyl, 1-methyl-2-n-butyloxyethyl, 1-methyl-2-n-pentyloxyethyl, 1-methyl-2-n-hexyloxyethyl, 1-methyl-2-n-heptyloxyethyl, 1-methyl-2-n-octyloxyethyl, 1-methyl-2-n-nonyloxyethyl, 1-methyl-2-n-decyloxyethyl, 1-methyl-2-n-undecyloxyethyl, 1-methyl-2-n-dodecyloxyethyl, 2-ethoxypropyl, 2-n-propyloxypropyl, 2-n-butyloxypropyl, 2-n-pentyloxypropyl, 2-n-hexyloxypropyl, 2-n-heptyloxypropyl, 2-n-octyloxypropyl, 2-n-nonyloxypropyl, 2-n-decyloxypropyl, 2-n-undecyloxypropyl, 2-n-dodecyloxypropyl, 1-methyl-3-methoxypropyl, 1-methyl-3-ethoxypropyl, 1-methyl-3-n-propyloxypropyl, 1-methyl-3-n-butyloxypropyl, 1-methyl-3-n-pentyloxypropyl, 1-methyl-3-n-hexyloxypropyl, 1-methyl-3-n-heptyloxypropyl, 1-methyl-3-n-octyloxypropyl, 1-methyl-3-n-nonyloxypropyl, 1-methyl-3-n-decyloxypropyl, 1-methyl-3-n-undecyloxypropyl, 1-methyl-3-n-dodecyloxypropyl, 3-methoxybutyl, 3-ethoxybutyl, 3-n-propyloxybutyl, 3-n-butyloxybutyl, 3-n-pentyloxybutyl, 3-n-hexyloxybutyl, 3-n-heptyloxybutyl, 3-n-octyloxybutyl, 3-n-nonyloxybutyl, 3-n-decyloxybutyl, 3-n-undecyloxybutyl, 3-n-dodecyloxybutyl, 2-isopropyloxyethyl, 3-isopropyloxypropyl, 4-isopropyloxybutyl, 5-isopropyloxypentyl, 6-isopropyloxyhexyl, 7-isopropyloxyheptyl, 8-isopropyloxyoctyl, 9-isopropyloxynonyl, 10-isopropyloxydecyl, isobutyloxymethyl, 2-isobutyloxyethyl, 3-isobutyloxypropyl, 4-isobutyloxybutyl, 5-isobutyloxypentyl, 6-isobutyloxyhexyl, 7-isobutyloxyheptyl, 8-isobutyloxyoctyl, 9-isobutyloxynonyl, 10-isobutyloxydecyl, tert-butyloxymethyl, 2-tert-butyloxyethyl, 3-tert-butyloxypropyl, 4-tert-butyloxybutyl, 5-tert-butyloxypentyl, 6-tert-butyloxyhexyl, 7-tert-butyloxyheptyl, 8-tert-butyloxyoctyl, 9-tert-butyloxynonyl, 10-tert-butyloxydecyl, (2-ethylbutyloxy)methyl, 2-(2'-ethylbutyloxy)ethyl, 3-(2'-ethylbutyloxy)propyl, 4-(2'-ethylbutyloxy)butyl, 5-(2'-ethylbutyloxy)pentyl, 6-(2'-ethylbutyloxy)hexyl, 7-(2'-ethylbutyloxy)heptyl, 8-(2'-ethylbutyloxy)octyl, 9-(2'-ethylbutyloxy)nonyl, 10-(2'-ethylbutyloxy)decyl, (3-ethylpentyloxy)methyl, 2-(3'-ethylpentyloxy)ethyl, 3-(3'-ethylpentyloxy)propyl, 4-(3'-ethylpentyloxy)butyl, 5-(3'-ethylpentyloxy)pentyl, 6-(3'-ethylpentyloxy)hexyl, 7-(3'-ethylpentyloxy)heptyl, 8-(3'-ethylpentyloxy)octyl, 9-(3'-ethylpentyloxy)nonyl, 10-(3'-ethylpentyloxy)decyl, 6-(1'-methyl-n-heptyloxy)hexyl, 4-(1'-methyl-n-heptyloxy)butyl, 2-(2'-methoxyethoxy)ethyl, 2-(2'-ethoxyethoxy)ethyl, 2-(2'-n-propyloxyethoxy)ethyl, 2-(2'-isopropyloxyethoxy)ethyl, 2-(2'-n-butyloxyethoxy)ethyl, 2-(2'-isobutyloxyethoxy)ethyl, 2-(2'-tert-butyloxyethoxy)ethyl, 2-(2'-n-pentyloxyethoxy)ethyl, 2-[2'-(2''-ethylbutyloxy)ethoxy]ethyl, 2-(2'-n-hexyloxyethoxy)ethyl, 2-[2'-(3''-ethylpentyloxy)ethoxy]ethyl, 2-(2'-n-heptyloxyethoxy)ethyl, 2-(2'-n-octyloxyethoxy)ethyl, 2-(2'-n-nonyloxyethoxy)ethyl, 2-(2'-n-decyloxyethoxy)ethyl, 2-(2'-n-undecyloxyethoxy)ethyl, 2-(2'-n-dodecyloxyethoxy)ethyl, 2-[2'-(2''-methoxyethoxy)ethoxy]ethyl, 2-[2'-(2''-ethoxyethoxy)ethoxy]ethyl, 2-[2'-(2''-n-propyloxyethoxy)ethoxy]ethyl, 2-[2'-(2''-isopropyloxyethoxy)ethoxy]ethyl, 2-[2'-(2''-n-butyloxyethoxy)ethoxy]ethyl, 2-[2'-(2''-isobutyloxyethoxy)ethoxy]ethyl, 2-[2'-(2''-tert-butyloxyethoxy)ethoxy]ethyl, 2-{2'-[2''-(2'''-ethylbutyloxy)ethoxy]ethoxy}ethyl, 2-[2'-(2''-n-pentyloxyethoxy)ethoxy]ethyl, 2-[2'-(2''-n-hexyloxyethoxy)ethoxy]ethyl, 2-{2'-[2''-(3'''-ethylpentyloxy)ethoxy]ethoxy}ethyl, 2-[2'-(2''-n-heptyloxyethoxy)ethoxy]ethyl, 2-[2'-(2''-n-octyloxyethoxy)ethoxy]ethyl, 2-[2'-(2''-n-nonyloxyethoxy)ethoxy]ethyl, 2-[2'-(2''-n-decyloxyethoxy)ethoxy]ethyl, 2-[2'-(2''-n-undecyloxyethoxy)ethoxy]ethyl, 2-[2'-(2''-n-dodecyloxyethoxy)ethoxy]ethyl, 2-{2'-[2''-(2'''-methoxyethoxy)ethoxy]ethoxy}ethyl, 2-{2'-[2''-(2'''-n-dodecyloxyethoxy)ethoxy]ethoxy}ethyl, 2-{2'-{2''-[2'''-(2-methoxyethoxy)ethoxy]ethoxy}ethoxy}ethyl, 2-{2'-{2''-{2'''-[2-(2-methoxyethoxy)ethoxy]ethoxy}ethoxy}ethoxy}ethyl, 1-methyl-2-(1'-methyl-2'-methoxyethoxy)ethyl, 1-methyl-2-(1'-methyl-2'-ethoxyethoxy)ethyl, 1-methyl-2-(1'-methyl-2'-n-propyloxyethoxy)ethyl, 1-methyl-2-(1'-methyl-2'-isopropyloxyethoxy)ethyl, 1-methyl-2-(1'-methyl-2'-n-butyloxyethoxy)ethyl, 1-methyl-2-(1'-methyl-2'-isobutyloxyethoxy)ethyl, 1-methyl-2-(1'-methyl-2'-tert-butyloxyethoxy)ethyl, 1-methyl-2-(1'-methyl-2'-n-pentyloxyethoxy)ethyl, 1-methyl-2-(1'-methyl-2'-n-hexyloxyethoxy)ethyl, 1-methyl-2-(1'-methyl-2'-n-heptyloxyethoxy)ethyl, 1-methyl-2-(1'-methyl-2'-n-octyloxyethoxy)ethyl, 1-methyl-2-(1'-methyl-2'-n-nonyloxyethoxy)ethyl, 1-methyl-2-(1'-methyl-2'-n-decyloxyethoxy)ethyl, 1-methyl-2-(1'-methyl-2'-n-undecyloxyethoxy)ethyl, 1-methyl-2-(1'-methyl-2'-n-dodecyloxyethoxy)ethyl, 1-methyl-2-[1'-methyl-2'-(1''-methyl-2''-methoxyethoxy)ethoxy]ethyl, 1-methyl-2-[1'-methyl-2'-(1''-methyl-2''-ethoxyethoxy)ethoxy]ethyl, 1-methyl-2-[1'-methyl-2'-(1''-methyl-2''-n-propyloxyethoxy)ethoxyl ethyl, 1-methyl-2-[1'-methyl-2'-(1''-methyl-2''-isopropyloxyethoxy)ethoxy]ethyl, 1-methyl-2-[1'-methyl-2'-(1''-methyl-2''-n-butyloxyethoxy)ethoxy]ethyl, 1-methyl-2-[1'-methyl-2'-(1''-methyl-2''-isobutyloxyethoxy)ethoxy]ethyl, 1-methyl-2-[1'-methyl-2'-(1''-methyl-2''-tert-butyloxyethoxy)ethoxy]ethyl, 1-methyl-2-[1'-methyl-2'-(1''-methyl-2''-n-pentyloxyethoxy)ethoxy]ethyl, 1-methyl-2-[1'-methyl-2'-(1''-methyl-2''-n-hexyloxyethoxy)ethoxy]ethyl, 1-methyl-2-[1'-methyl-2'-(1''-methyl-2''-n-heptyloxyethoxy)ethoxy]ethyl, 1-methyl-2-[1'-methyl-2'-(1''-methyl-2''-n-octyloxyethoxy)ethoxy]ethyl, 1-methyl-2-[1'-methyl-2'-(1''-methyl-2''-n-nonyloxyethoxy)ethoxy]ethyl, 1-methyl-2-[1'-methyl-2'-(1''-methyl-2''-n-decyloxyethoxy)ethoxy]ethyl, 1-methyl-2-[1'-methyl-2'-(1''-methyl-2''-n-undecyloxyethoxy)ethoxy]ethyl, 1-methyl-2-[1'-methyl-2'-(1''-methyl-2''-n-dodecyloxyethoxy)ethoxy]ethyl, 2-ethoxyethoxymethyl, 2-n-butyloxyethoxymethyl, 2-n-hexyloxyethoxymethyl, 3-ethoxypropyloxymethyl, 3-n-propyloxypropyloxymethyl, 3-n-pentyloxypropyloxymethyl, 3-n-hexyloxypropyloxymethyl, 2-methoxy-1-methylethoxymethyl, 2-ethoxy-1-methylethoxymethyl, 2-n-butyloxy-1-methylethoxymethyl, 4-methoxybutyloxymethyl, 4-ethoxybutyloxymethyl, 4-n-butyloxybutyloxymethyl, 2-(3'-methoxypropyloxy)ethyl, 2-(3'-ethoxypropyloxy)ethyl, 2-(1'-methyl-2'-methoxyethoxy)ethyl, 2-(1'-methyl-2'-ethoxyethoxy)ethyl, 2-(1'-methyl-2'-n-butyloxyethoxy)ethyl, 2-(4'-methoxybutyloxy)ethyl, 2-(4'-ethoxybutyloxy)ethyl, 2-[4'-(2"-ethylbutyloxy)butyloxy]ethyl, 2-[4'-(3"-ethylpentyloxy)butyloxy]ethyl, 3-(2'-methoxyethoxy)propyl, 3-(2'-ethoxyethoxy)propyl, 3-(2'-n-pentyloxyethoxy)propyl, 3-(2'-n-hexyloxyethoxy)propyl, 3-(3'-ethoxypropyloxy)propyl, 3-(3'-n-propyloxypropyloxy)propyl, 3-(3'-n-butyloxypropyloxy)propyl, 3-(4'-ethoxybutyloxy)propyl, 3-(5'-ethoxypentyloxy)propyl, 4-(2'-methoxyethoxy)butyl, 4-(2'-ethoxyethoxy)butyl, 4-(2'-isopropyloxyethoxy)butyl, 4-(2'-isobutyloxyethoxy)butyl, 4-(2'-n-butyloxyethoxy)butyl, 4-(2'-n-hexyloxyethoxy)butyl, 4-(3'-n-propyloxypropyloxy)butyl, 4-(2'-n-propyloxy-1'-methylethoxy)butyl, 4-[2'-(2"-methoxyethoxy)ethoxy]butyl, 4-[2'-(2"-n-hexyloxyethoxy)ethoxy]butyl, 4-[2'-(2"-n-butyloxyethoxy)ethoxy]butyl, 5-(2'-n-hexyloxyethoxy)pentyl, 2-[2'-(2"-n-butyloxyethoxy)ethoxy]ethyl, (2-ethylhexyloxy)methyl, (3,5,5-trimethylhexyloxy)methyl, (3,7-dimethyloctyloxy)methyl, 2-(2'-ethylhexyloxy)ethyl, 2-(3',5',5'-trimethylhexyloxy)ethyl, 2-(3',7'-dimethyloctyloxy)ethyl, 3-(2'-ethylhexyloxy)propyl, 3-(3',5',5'-trimethylhexyloxy)propyl, 3-(3',7'-dimethyloctyloxy)propyl, 4-(2'-ethylhexyloxy)butyl, 4-(3',5',5'-trimethylhexyloxy)butyl, 4-(3',7'-dimethyloctyloxy)butyl, 5-(2'-ethylhexyloxy)pentyl, 5-(3',5',5'-trimethylhexyloxy)pentyl, 5-(3',7'-dimethyloctyloxy)pentyl, 6-(2'-ethylhexyloxy)hexyl, 6-(3',5',5'-trimethylhexyloxy)hexyl, and 6-(3',7'-dimethyloctyloxy)hexyl;

alkoxyalkyl groups substituted with halogen atoms such as 2-(2'-trifluoromethylpropyloxy)ethyl, 4-(2'-trifluoromethylpropyloxy)butyl, 6-(2'-trifluoromethylpropyloxy)hexyl, 8-(2'-trifluoromethylpropyloxy)octyl, 2-(2'-trifluoromethylbutyloxy)ethyl, 4-(2'-trifluoromethylbutyloxy)butyl, 6-(2'-trifluoromethylbutyloxy)hexyl, 8-(2'-trifluoromethylbutyloxy)octyl, 2-(2'-trifluoromethylheptyloxy)ethyl, 4-(2'-trifluoromethylheptyloxy)butyl, 6-(2'-trifluoromethylheptyloxy)hexyl, 8-(2'-trifluoromethylheptyloxy)octyl, 4-(2'-fluoroethoxy)butyl, 6-(2'-fluoroethoxy)hexyl, 8-(2'-fluoroethoxy)octyl, 2-(2'-fluoro-n-propyloxy)ethyl, 4-(2'-fluoro-n-propyloxy)butyl, 6-(2'-fluoro-n-propyloxy)hexyl, 8-(2'-fluoro-n-propyloxy)octyl, 2-(3'-fluoro-n-propyloxy)ethyl, 4-(3'-fluoro-n-propyloxy)butyl, 6-(3'-fluoro-n-propyloxy)hexyl, 8-(3'-fluoro-n-propyloxy)octyl, 2-(3'-fluoro-2'-methylpropyloxy)ethyl, 4-(3'-fluoro-2'-methylpropyloxy)butyl, 6-(3'-fluoro-2'-methylpropyloxy)hexyl, 8-(3'-fluoro-2'-methylpropyloxy)octyl, 2-(2',3'-difluoro-n-propyloxy)ethyl, 4-(2',3'-difluoro-n-propyloxy)butyl, 6-(2',3'-difluoro-n-propyloxy)hexyl, 8-(2',3'-difluoro-n-propyloxy)octyl, 2-(2'-fluoro-n-butyloxy)ethyl, 4-(2'-fluoro-n-butyloxy)butyl, 6-(2'-fluoro-n-butyloxy)hexyl, 8-(2'-fluoro-n-butyloxy)octyl, 2-(3'-fluoro-n-butyloxy)ethyl, 4-(3'-fluoro-n-butyloxy)butyl, 6-(3'-fluoro-n-butyloxy)hexyl, 8-(3'-fluoro-n-butyloxy)octyl, 2-(4'-fluoro-n-butyloxy)ethyl, 4-(4'-fluoro-n-butyloxy)butyl, 6-(4'-fluoro-n-butyloxy)hexyl, 8-(4'-fluoro-n-butyloxy)octyl, 2-(2',3'-difluoro-n-butyloxy)ethyl, 4-(2',3'-difluoro-n-butyloxy)butyl, 6-(2',3'-difluoro-n-butyloxy)hexyl, 8-(2',3'-difluoro-n-butyloxy)octyl, 2-n-hexyloxyperfluoroethyl, 3-n-propyloxy-1,1-dihydro-perfluoropropyl, 2-n-pentyloxy-1,1-dihydro-perfluoroethyl, 2-(2'-n-perfluorobutyloxyethoxy)ethyl, 3-(n-perfluorobutyloxy)-3,3-difluoropropyl, 4-(1',1',7'-trihydro-n-perfluoroheptyloxy)butyl, 2-(n-perfluoropropyloxy)-2-trifluoromethyl-2-fluoroethyl, 2-(2'-trichloromethylpropyloxy)ethyl, 4-(2'-trichloromethylpropyloxy)butyl, 6-(2'-trichloromethylpropyloxy)hexyl, 8-(2'-trichloromethylpropyloxy)octyl, 2-(2'-trichloromethylbutyloxy)ethyl, 4-(2'-trichloromethylbutyloxy)butyl, 6-(2'-trichloromethylbutyloxy)hexyl, 8-(2'-trichloromethylbutyloxy)octyl, 2-(2'-trichloromethylheptyloxy)ethyl, 4-(2'-trichloromethylheptyloxy)butyl, 6-(2'-trichloromethylheptyloxy)hexyl, 8-(2'-trichloromethylheptyloxy)octyl, 4-(2'-chloroethoxy)butyl, 6-(2'-chloroethoxy)hexyl, 8-(2'-chloroethoxy)octyl, 2-(2'-chloro-n-propyloxy)ethyl, 4-(2'-chloro-n-propyloxy)butyl, 6-(2'-chloro-n-propyloxy)hexyl, 8-(2'-chloro-n-propyloxy)octyl, 2-(3'-chloro-n-propyloxy)ethyl, 4-(3'-chloro-n-propyloxy)butyl, 6-(3'-chloro-n-propyloxy)hexyl, 8-(3'-chloro-n-propyloxy)octyl, 2-(3'-chloro-2'-methylpropyloxy)ethyl, 4-(3'-chloro-2'-methylpropyloxy)butyl, 6-(3'-chloro-2'-methylpropyloxy)hexyl, 8-(3'-chloro-2'-methylpropyloxy)octyl, 2-(2',3'-dichloro-n-propyloxy)ethyl, 4-(2',3'-dichloro-n-propyloxy)butyl, 6-(2',3'-dichloro-n-propyloxy)hexyl, 8-(2',3'-dichloro-n-propyloxy)octyl, 2-(2'-chloro-n-butyloxy)ethyl, 4-(2'-chloro-n-butyloxy)butyl, 6-(2'-chloro-n-butyloxy)hexyl, 8-(2'-chloro-n-butyloxy)octyl, 2-(3'-chloro-n-butyloxy)ethyl, 4-(3'-chloro-n-butyloxy)butyl, 6-(3'-chloro-n-butyloxy)hexyl, 8-(3'-chloro-n-butyloxy)octyl, 2-(4'-chloro-n-butyloxy)ethyl, 4-(4'-chloro-n-butyloxy)butyl, 6-(4'-chloro-n-butyloxy)hexyl, 8-(4'-chloro-n-butyloxy)octyl, 2-(2',3'-dichloro-n-butyloxy)ethyl, 4-(2',3'-dichloro-n-butyloxy)butyl, 6-(2',3'-dichloro-n-butyloxy)hexyl, 8-(2',3'-dichloro-n-butyloxy)octyl, 1-(trifluoromethyl)-2-methoxyethyl, 1-(trifluoromethyl)-2-ethoxyethyl, 1-(trifluoromethyl)-2-n-propyloxyethyl, 1-(trifluoromethyl)-2-n-butyloxyethyl, 1-(trifluoromethyl)-2-n-pentyloxyethyl, 1-(trifluoromethyl)-2-n-hexyloxyethyl, 1-(trifluoromethyl)-2-n-heptyloxyethyl, 1-(trifluoromethyl)-2-n-octyloxyethyl, 1-(trifluoromethyl)-2-n-nonyloxyethyl, 1-(trifluoromethyl)-2-n-decyloxyethyl, 1-(trifluoromethyl)-3-methoxypropyl, 1-(trifluoromethyl)- 3-ethoxypropyl, 1-(trifluoromethyl)-3-n-propyloxypropyl, 1-(trifluoromethyl)-3-n-butyloxypropyl, 1-(trifluoromethyl)-3-n-pentyloxypropyl, 1-(trifluoromethyl)-3-n-hexyloxypropyl, 1-(trifluoromethyl)-3-n-heptyloxypropyl, 1-(trifluoromethyl)-3-n-octyloxypropyl, 1-(trifluoromethyl)-3-n-nonyloxypropyl, 1-(trifluoromethyl)-3-n-decyloxypropyl, 1-(trifluoromethyl)-4-methoxybutyl, 1-(trifluoromethyl)-4-ethoxybutyl, 1-(trifluoromethyl)-4-n-propyloxybutyl, 1-(trifluoromethyl)-4-n-butyloxybutyl, 1-(trifluoromethyl)-4-n-pentyloxybutyl, 1-(trifluoromethyl)-4-n-hexyloxybutyl, 1-(trifluoromethyl)-4-n-heptyloxybutyl, 1-(trifluoromethyl)-4-n-octyloxybutyl, 1-(trifluoromethyl)-4-n-nonyloxybutyl, and 1-(trifluoromethyl)-4-n-decyloxybutyl;

alkenyl groups such as 2-propenyl, 2-butenyl, 3-butenyl, 2-pentenyl, 3-pentenyl, 4-pentenyl, 2-hexenyl, 3-hexenyl, 4-hexenyl, 5-hexenyl, 2-heptenyl, 3-heptenyl, 4-heptenyl, 5-heptenyl, 6-heptenyl, 2-octenyl, 3-octenyl, 4-octenyl, 5-octenyl, 6-octenyl, 7-octenyl, 2-nonenyl, 3-nonenyl, 4-nonenyl, 5-nonenyl, 6-nonenyl, 7-nonenyl, 8-nonenyl, 2-decenyl, 3-decenyl, 4-decenyl, 5-decenyl, 6-decenyl, 7-decenyl, 8-decenyl, 9-decenyl and 3,7-dimethyl-6-octenyl;

alkenyl groups substituted with halogen atoms such as 3-n-perfluoropropyl-2-propenyl, 3-n-perfluorobutyl-2-propenyl, 3-n-perfluoropentyl-2-propenyl, 3-n-perfluorohexyl-2-propenyl, 3-n-perfluoroheptyl-2-propenyl, and 3-n-perfluorooctyl-2-propenyl;

alkenyloxyalkyl groups such as 2-(2'-propenyloxy)ethyl, 2-[2'-(2"-propenyloxy)ethoxy]ethyl, 3-(2'-propenyloxy)propyl, 4-(2'-propenyloxy)butyl, 5-(2'-propenyloxy)pentyl, 6-(2'-propenyloxy)hexyl, 7-(2'-propenyloxy)heptyl, 8-(2'-propenyloxy)octyl, 9-(2'-propenyloxy)nonyl, and 10-(2'-propenyloxy)decyl; and alkenyloxyalkyl groups substituted with halogen atoms such as 2-(2'-propenyloxy)-perfluoroethyl, 3-(2'-propenyloxy)-perfluoropropyl, 4-(2'-propenyloxy)-perfluorobutyl, 5-(2'-propenyloxy)-perfluoropentyl, 6-(2'-propenyloxy)-perfluorohexyl, 7-(2'-propenyloxy)-perfluoroheptyl, and 8-(2'-propenyloxy)-perfluorooctyl.

When $R_1$ of the acetylene compound represented by Formula (1) of the present invention has an optically active asymmetric carbon atom, the absolute configuration of the above optically active asymmetric carbon atom shall not specifically be restricted and may be either (R)-configuration or (S)-configuration. The optically active asymmetric carbon atom which can effectively be used has an optical purity of up to 0:100 (100% ee) to 45:55 (10% ee) or 55:45 (10% ee) to 100;0 (100% ee) in terms of a ratio of a (R) compound to a (S) compound. When $R_1$ is a group having an optically active asymmetric carbon atom, a structure of the following Formula (3) can preferably be given as the structure of $R_1$:

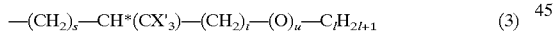

—(CH$_2$)$_s$—CH*(CX'$_3$)—(CH$_2$)$_t$—(O)$_u$—C$_l$H$_{2l+1}$  (3)

wherein s and t each represent an integer of 0 to 10; l represents an integer of 1 to 10; u represents 0 or 1; and X' represents a hydrogen atom or a halogen atom. Preferably, s represents an integer of 0 to 8, more preferably 0 to 6. Preferably, t represents an integer of 0 to 6, more preferably 0 to 4. Preferably, l represents an integer of 1 to 8, more preferably 1 to 6. When u is 0, t+l represents preferably an integer of 1 to 14, more preferably 2 to 10.

In the acetylene compound of the present invention represented by Formula (1), $Y_1$ represents a —O— group, a —COO— group or a —OCO— group.

$Y_1$ is preferably a —O— group or a —COO— group, and when $Y_1$ is a —O— group and the liquid crystal compound has to have a lower melting point, $R_1$ is preferably a branched alkyl group or a linear or branched alkoxyalkyl group. $R_1$ is more preferably an optically active alkyl group or alkoxyalkyl group.

In the acetylene compound represented by Formula (1) of the present invention, $Z_1$ represents a —COO— group or a —CH$_2$O— group.

In the acetylene compound represented by Formula (1) of the present invention, A represents a cyclic group selected from the groups shown below:

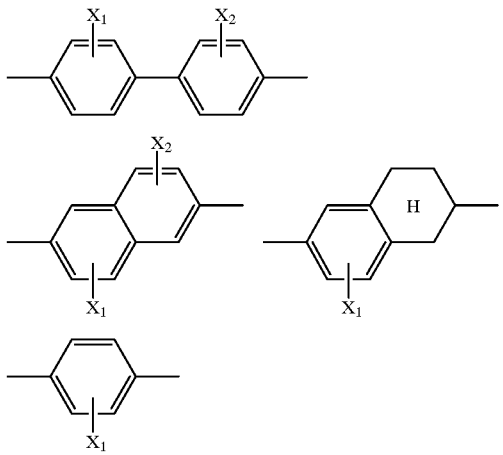

wherein $X_1$ and $X_2$ each represent independently a hydrogen atom or a halogen atom, and the halogen atom includes a fluorine atom, a chlorine atom and a bromine atom. They are preferably a hydrogen atom or a fluorine atom.

When $X_1$ and $X_2$ are halogen atoms, A takes, for example, the following structures:

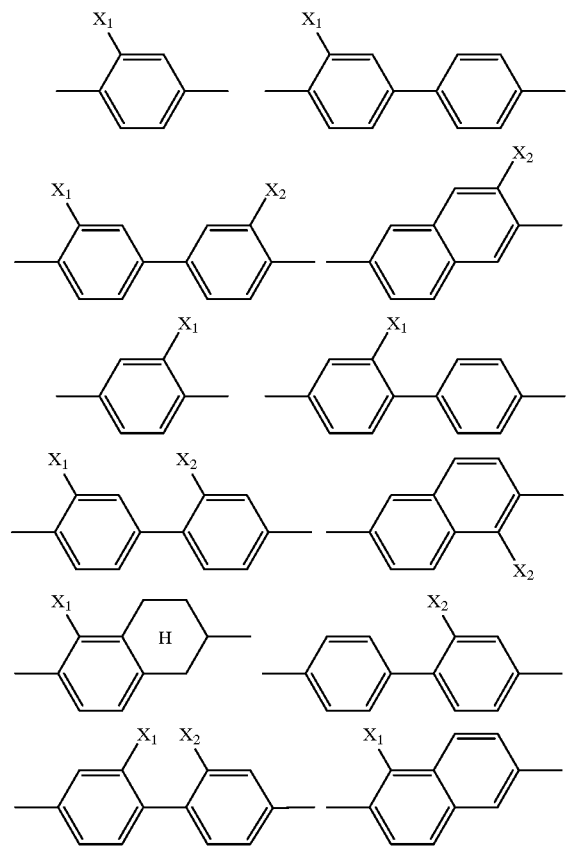

-continued

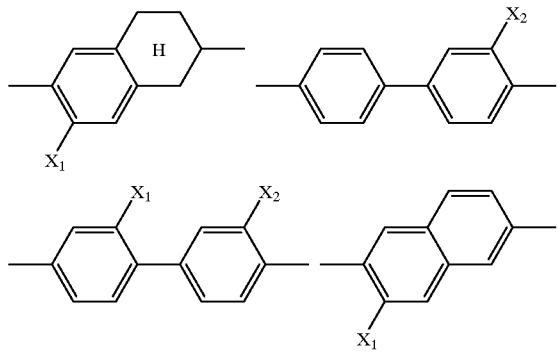

A is preferably:

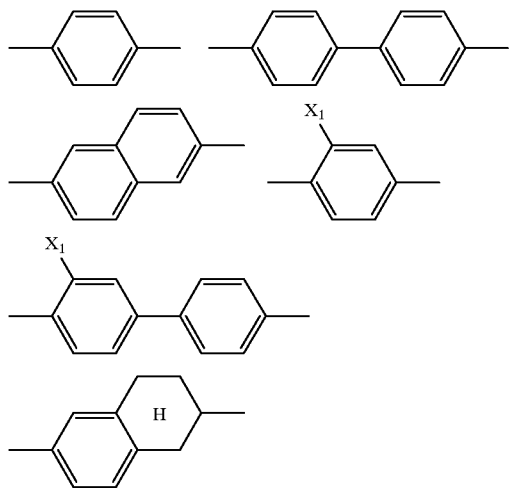

wherein $X_1$ represents a halogen atom.

In the acetylene compound represented by Formula (1) of the present invention, B represents a cyclic group selected from the groups shown below:

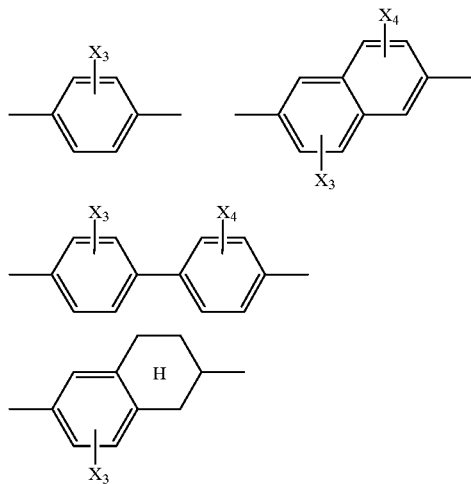

-continued

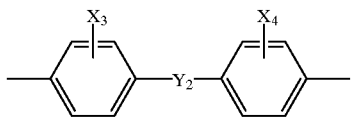

wherein $X_3$ and $X_4$ each represent independently a hydrogen atom or a halogen atom, and the halogen atom includes a fluorine atom, a chlorine atom and a bromine atom. They are preferably a hydrogen atom or a fluorine atom.

$Y_2$ represents a —$CH_2O$— group, a —$OCH_2$— group, a —COO— group or a —OCO— group and represents preferably a —$CH_2O$— group, a —COO— group or a —OCO— group.

When B is a group represented by Formula (2),

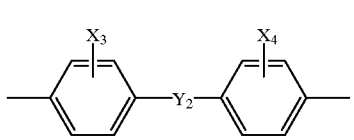

(2)

B takes the following four structures according to $Y_2$:

$Y_2$:

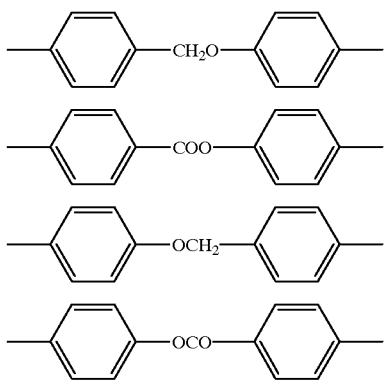

Further, when $X_3$ and $X_4$ are halogen atoms, B takes, for example, the following structures:

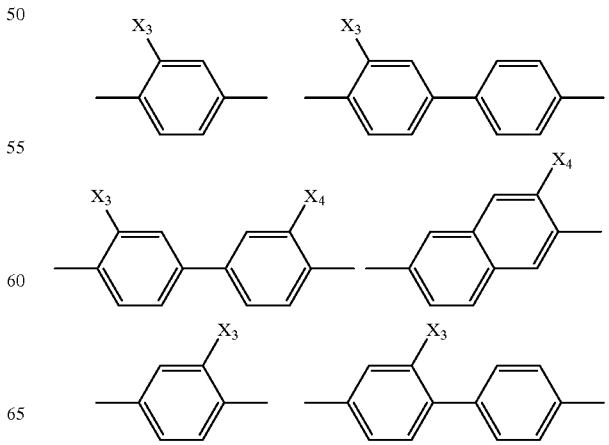

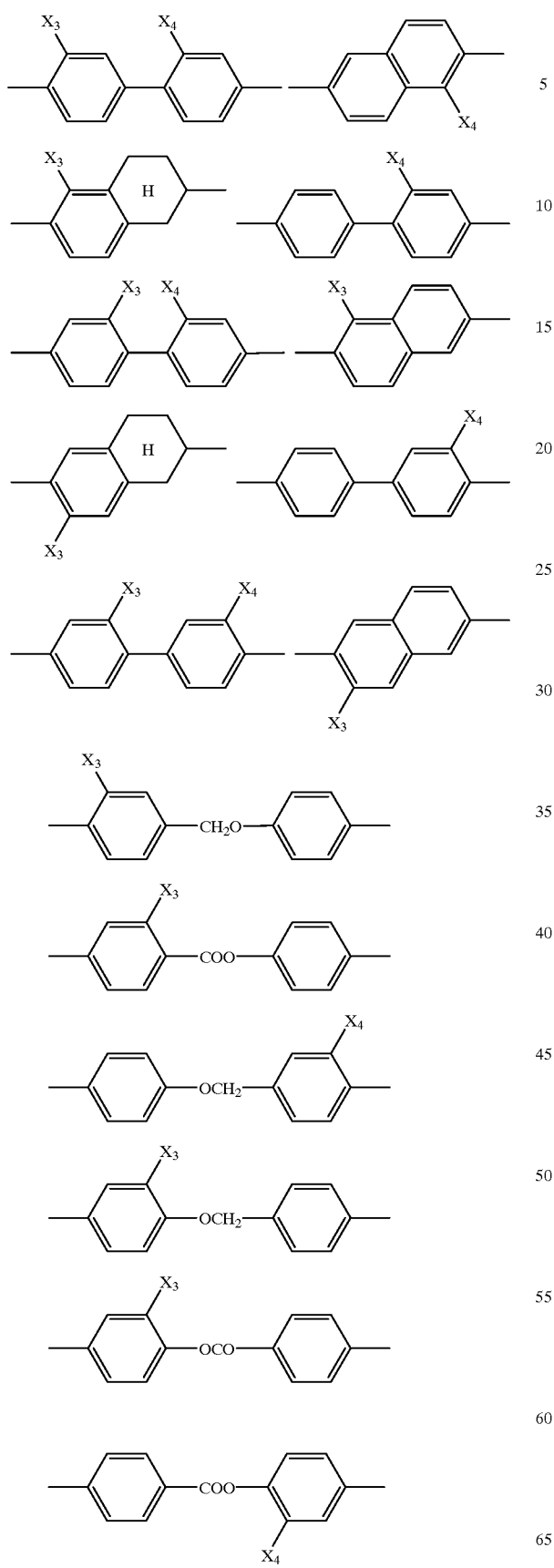
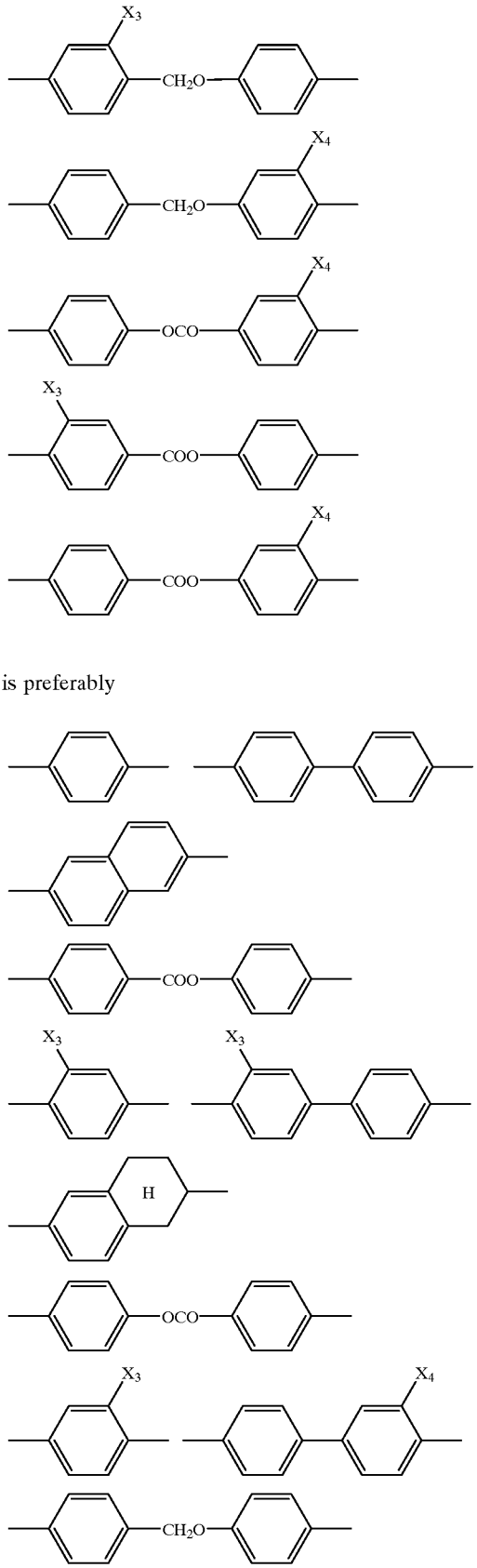
B is preferably wherein $X_3$ and $X_4$ represent halogen atoms.

The compounds shown in the following Table 1 to Table 12 can be given as specific examples of the acetylene compound represented by Formula (1) of the present invention. Ph, (F)Ph, Ph(F), (Cl)Ph, Ph(Cl), BiPh, (F)BiPh, BiPh (F), Ph(F)—Ph, Ph—(F)Ph, Ph—COO—Ph, Ph—OCO—Ph, Ph—CH$_2$O—Ph, Ph—OCH$_2$—Ph, Ph—CH$_2$O—Ph(F), Nap and Tetra each shown in the tables represent the following groups:

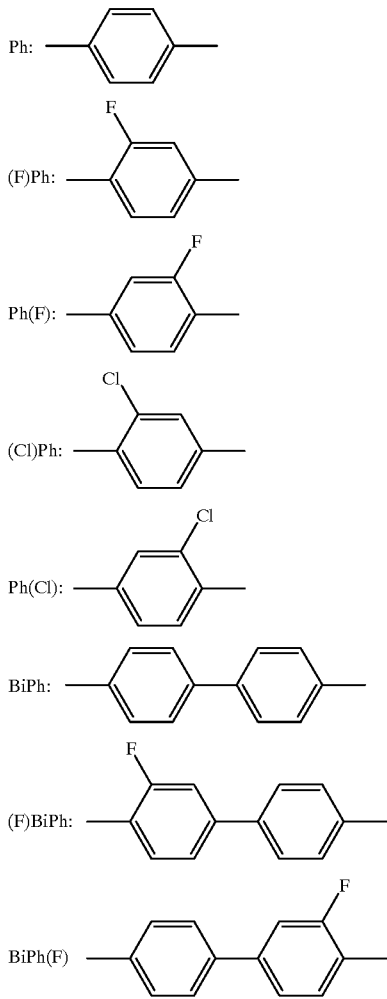

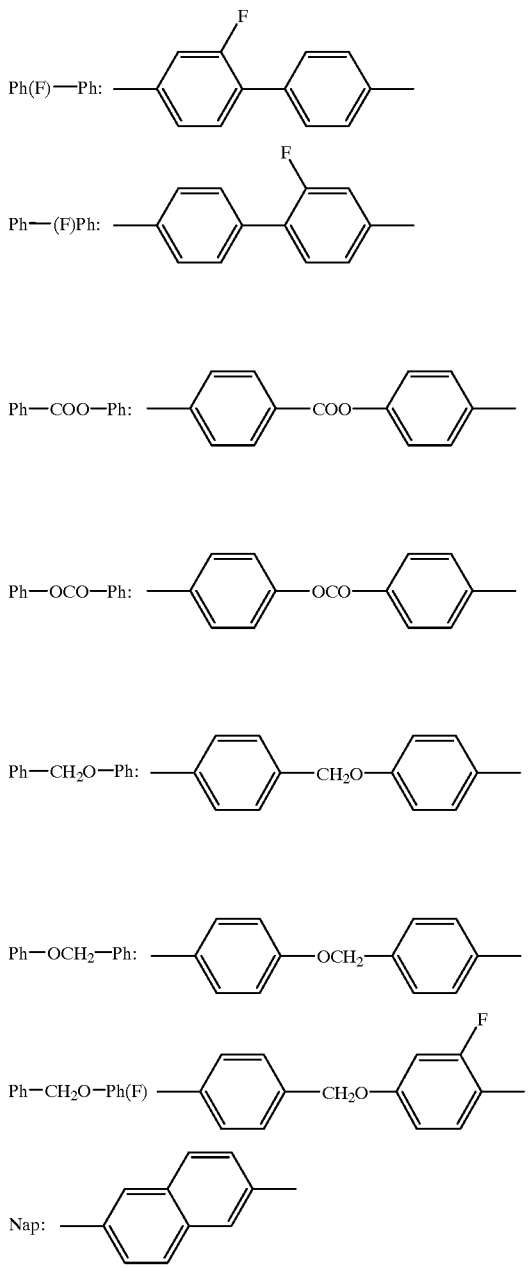

TABLE 1

In Formula (1), A is 1,4-phenylene group; $Y_1$ is —COO— group

| EX. C. | m  | A      | Z1      | B          | R1                                                |
|--------|----|--------|---------|------------|---------------------------------------------------|
| 1      | 10 | (Cl)Ph | —COO—   | Ph(F)      | —CH$_2$CH$_2$OC$_6$H$_{13}$-n                     |
| 2      | 5  | (F)Ph  | —CH$_2$O— | Ph—COO—Ph | —CH$_2$CH$_2$OC$_6$H$_{13}$-n                     |
| 3      | 10 | Ph(F)  | —CH$_2$O— | Nap       | —CH$_2$CH$_2$OC$_4$H$_9$-n                        |
| 4      | 5  | (F)Ph  | —COO—   | Ph—COO—Ph  | —CH$_2$CH(CH$_3$)C$_2$H$_5$                       |
| 5      | 10 | Ph     | —COO—   | Ph(F)      | —CH(CF$_3$)(CH$_2$)$_5$OC$_2$H$_5$                |
| 6      | 10 | Ph     | —COO—   | (F)BiPh    | —(CH$_2$)$_3$CH(CH$_3$)C$_2$H$_5$                 |
| 7      | 3  | Ph(F)  | —COO—   | (F)BiPh    | —CH(CF$_3$)CH$_2$CH$_2$OC$_2$H$_5$                |
| 8      | 16 | Ph     | —CH$_2$O— | BiPh     | —CH(CF$_3$)(CH$_2$)$_3$OC$_2$H$_5$                |
| 9      | 6  | (Cl)Ph | —CH$_2$O— | Ph(F)    | —CH(CH$_3$)CH$_2$OC$_4$H$_9$-n                    |
| 10     | 8  | Ph     | —COO—   | Ph—COO—Ph  | —CH(CH$_3$)C$_2$H$_5$                             |
| 11     | 18 | (Cl)Ph | —COO—   | BiPh       | —CH(CH$_3$)C$_6$H$_{13}$-n                        |
| 12     | 6  | Ph     | —COO—   | Nap        | —CH$_2$CH(CH$_3$)C$_2$H$_5$                       |

TABLE 1-continued

In Formula (1), A is 1,4-phenylene group; $Y_1$ is —COO— group

| EX. C. | m | A | Z1 | B | R1 |
|---|---|---|---|---|---|
| 13 | 3 | Ph | —CH$_2$O— | Ph—OCH$_2$—Ph | —CH$_2$CH$_2$C$_8$F$_{17}$-n |
| 14 | 4 | Ph | —COO— | (F)BiPh | —CH$_2$CH(CH$_3$)C$_2$H$_5$ |
| 15 | 4 | Ph | —CH$_2$O— | Nap | —(CH$_2$)$_3$CH(CH$_3$)C$_2$H$_5$ |
| 16 | 4 | Ph | —CH$_2$O— | Ph | —CH(CH$_3$)CH$_2$OC$_4$H$_9$-n |
| 17 | 6 | Ph | —COO— | Ph—CH$_2$O—Ph | —CH$_2$CH$_2$C$_4$F$_9$-n |
| 18 | 2 | Ph(F) | —CH$_2$O— | Ph—CH$_2$O—Ph | —CH$_2$(CF$_2$)$_6$H |
| 19 | 12 | (F)Ph | —CH$_2$O— | Ph(F) | —CH$_2$CH$_2$OC$_6$H$_{13}$-n |
| 20 | 8 | Ph | —CH$_2$O— | BiPh | —CH(CH$_3$)C$_4$H$_9$-n |
| 21 | 10 | Ph | —CH$_2$O— | BiPh | —CH(CF$_3$)C$_2$H$_5$ |
| 22 | 20 | (Cl)Ph | —COO— | BiPh | —(CH$_2$)$_3$CH(CH$_3$)C$_2$H$_5$ |
| 23 | 4 | Ph | —COO— | Tetra | —CH(CH$_3$)C$_6$H$_{13}$-n |
| 24 | 6 | Ph | —COO— | Ph—CH$_2$O—Ph | —CH(CH$_3$)C$_6$H$_{13}$-n |
| 25 | 8 | (F)Ph | —CH$_2$O— | BiPh | —CH$_2$CH(CH$_3$)C$_2$H$_5$ |
| 26 | 14 | Ph | —COO— | Ph | —CH(CH$_3$)CH$_2$CH$_2$OC$_2$H$_5$ |
| 27 | 8 | Ph | —COO— | Ph | —CH(CH$_3$)C$_2$H$_5$ |
| 28 | 5 | Ph | —COO— | (F)Ph | —CH(CH$_3$)C$_6$H$_{13}$-n |
| 29 | 8 | Ph | —COO— | BiPh | —CH(CF$_3$)C$_6$H$_{13}$-n |
| 30 | 13 | Ph | —CH$_2$O— | Ph—OCO—Ph | —CH(CH$_3$)C$_4$H$_9$-n |
| 31 | 8 | Ph | —COO— | BiPh | —CH(CH$_3$)C$_6$H$_{13}$-n |
| 32 | 10 | Ph | —COO— | Nap | —CH(CH$_3$)CH$_2$OC$_4$H$_9$-n |
| 33 | 8 | Ph(F) | —CH$_2$O— | Ph—COO—Ph | —CH(CF$_3$)(CH$_2$)$_3$OC$_2$H$_5$ |
| 34 | 12 | Ph | —CH$_2$O— | Ph | —CH(CH$_3$)C$_2$H$_5$ |
| 35 | 5 | Ph | —CH$_2$O— | BiPh(F) | —CH$_2$CH(CH$_3$)C$_2$H$_5$ |
| 36 | 19 | Ph | —CH$_2$O— | Ph—CH$_2$O—Ph | —CH(CH$_3$)C$_4$H$_9$-n |
| 37 | 11 | Ph | —COO— | Ph—COO—Ph | —CH$_2$CH$_2$C$_4$F$_9$-n |
| 38 | 19 | Ph(F) | —COO— | BiPh(F) | —CH$_2$CH(CH$_3$)C$_2$H$_5$ |
| 39 | 16 | Ph | —COO— | Ph | —CH(CH$_3$)C$_6$H$_{13}$-n |
| 40 | 6 | Ph | —COO— | Ph—CH$_2$O—Ph | —(CH$_2$)$_3$CH(CH$_3$)C$_2$H$_5$ |
| 41 | 10 | (Cl)Ph | —COO— | BiPh | —CH$_2$CF$_2$CHFCF$_3$ |
| 42 | 6 | Ph(F) | —COO— | Ph—OCO—Ph | —CH(CF$_3$)CH$_2$CH$_2$OC$_2$H$_5$ |
| 43 | 4 | Ph | —COO— | Ph—CH$_2$—Ph | —CH(CF$_3$)CH$_2$CH$_2$OC$_2$H$_5$ |
| 44 | 4 | Ph | —COO— | Nap | —CH(CH$_3$)C$_6$H$_{13}$-n |
| 45 | 8 | Ph | —COO— | BiPh | —CH$_2$CH$_2$OC$_4$H$_9$-n |
| 46 | 8 | Ph | —COO— | Nap | —CH(CH$_3$)C$_4$H$_9$-n |
| 47 | 3 | Ph(F) | —CH$_2$O— | Nap | —CH$_2$CH(CH$_3$)C$_2$H$_5$ |
| 48 | 21 | Ph(F) | —CH$_2$O— | Ph—OCO—Ph | —CH$_2$CH$_2$OC$_6$H$_{13}$-n |
| 49 | 8 | Ph | —COO— | Ph—COO—Ph | —CH(CH$_3$)C$_4$H$_9$-n |
| 50 | 16 | Ph(F) | —COO— | Ph—CH$_2$—Ph | —CH(CF$_3$)(CH$_2$)$_3$OC$_2$H$_5$ |
| 51 | 8 | Ph | —COO— | Ph | —CH(CH$_3$)C$_6$H$_{13}$-n |
| 52 | 6 | Ph | —COO— | BiPh | —CH(CF$_3$)C$_5$H$_{11}$-n |
| 53 | 9 | Ph | —CH$_2$O— | Ph(F) | —CH(CH$_3$)C$_2$H$_5$ |
| 54 | 6 | Ph | —COO— | Ph | —CH(CH$_3$)C$_6$H$_{13}$-n |
| 55 | 5 | (Cl)Ph | —CH$_2$O— | (F)Ph | —CH(CF$_3$)(CH$_2$)$_3$OC$_2$H$_5$ |
| 56 | 6 | Ph | —COO— | Nap | —CH(CH$_3$)C$_6$H$_{13}$-n |
| 57 | 6 | Ph | —CH$_2$O— | (F)BiPh | —CH$_2$(CF$_2$)$_6$H |
| 58 | 3 | (Cl)Ph | —CH$_2$O— | Tetra | —(CH$_2$)$_3$CH(CH$_3$)C$_2$H$_5$ |
| 59 | 6 | Ph | —COO— | Nap | —CH$_2$CF$_2$CHFCF$_3$ |
| 60 | 8 | (Cl)Ph | —COO— | Nap | —CH(CF$_3$)(CH$_2$)$_3$OC$_2$H$_5$ |
| 61 | 8 | (Cl)Ph | —CH$_2$O— | Nap | —CH(CF$_3$)C$_6$H$_{13}$-n |
| 62 | 6 | Ph | —COO— | BiPh(F) | —CH(CH$_3$)C$_2$H$_5$ |
| 63 | 4 | Ph | —COO— | Ph—COO—Ph | —CH$_2$CF$_2$CHFCF$_3$ |
| 64 | 5 | Ph | —CH$_2$O— | BiPh | —CH(CF$_3$)C$_2$H$_5$ |
| 65 | 6 | Ph | —CH$_2$O— | BiPh | —CH(CF$_3$)CH$_2$CH$_2$OC$_2$H$_5$ |
| 66 | 18 | (Cl)Ph | —COO— | Ph(F) | —CH(CF$_3$)C$_6$H$_{13}$-n |
| 67 | 5 | (Cl)Ph | —CH$_2$O— | Ph—COO—Ph | —CH(CF$_3$)(CH$_2$)$_5$OC$_2$H$_5$ |
| 68 | 6 | Ph | —COO— | Ph | —CH$_2$CH(CH$_3$)C$_2$H$_5$ |
| 69 | 6 | (Cl)Ph | —CH$_2$O— | (F)BiPh | —CH$_2$CH(CH$_3$)C$_2$H$_5$ |
| 70 | 12 | Ph | —CH$_2$O— | (F)BiPh | —CH(CH$_3$)C$_6$H$_{13}$-n |
| 71 | 8 | Ph(F) | —CH$_2$O | Ph—COO—Ph | —CH(CH$_3$)CH$_2$CH$_2$OC$_2$H$_5$ |
| 72 | 11 | Ph | —CH$_2$O | Nap | —CH$_2$(CF$_2$)$_6$H |
| 73 | 13 | Ph | —COO— | Ph—CH$_2$O—Ph | —CH(CH$_3$)C$_6$H$_{13}$-n |
| 74 | 8 | (Cl)Ph | —CH$_2$O— | Ph—OCO—Ph | —CH(CF$_3$)(CH$_2$)$_5$OC$_2$H$_5$ |
| 75 | 8 | Ph | —CH$_2$O— | (F)BiPh | —CH(CH$_3$)C$_2$H$_5$ |
| 76 | 5 | Ph | —COO— | Ph—COO—Ph | —CH$_2$CH(CH$_3$)C$_2$H$_5$ |
| 77 | 7 | Ph | —CH$_2$O— | BiPh | —CH(CH$_3$)C$_6$H$_{13}$-n |
| 78 | 5 | Ph | —COO— | Tetra | —CH(CF$_3$)(CH$_2$)$_5$OC$_2$H$_5$ |
| 79 | 19 | (Cl)Ph | —CH$_2$O | BiPh | —CH$_2$CH$_2$C$_4$F$_9$-n |
| 80 | 4 | Ph | —COO— | (F)Ph | —CH$_2$CF$_2$CHFCF$_3$ |
| 81 | 8 | (F)Ph | —COO— | BiPh(F) | —CH(CH$_3$)C$_2$H$_5$ |
| 82 | 20 | (Cl)Ph | —COO— | Ph(F) | —CH(CF$_3$)C$_6$H$_{13}$-n |
| 83 | 6 | Ph(F) | —COO— | Ph | —CH(CH$_3$)C$_6$H$_{13}$-n |
| 84 | 13 | (Cl)Ph | —CH$_2$O | Tetra | —CH(CH$_3$)CH$_2$OC$_4$H$_9$-n |
| 85 | 9 | Ph(F) | —COO— | Nap | —CH$_2$CH(CH$_3$)C$_2$H$_5$ |
| 86 | 8 | Ph | —COO— | Ph(F) | —CH$_2$CH$_2$OC$_6$H$_{13}$-n |
| 87 | 6 | Ph | —COO— | Ph—COO—Ph | —CH(CH$_3$)C$_6$H$_{13}$-n |

TABLE 1-continued

In Formula (1), A is 1,4-phenylene group; $Y_1$ is —COO— group

| EX. C. | m | A | Z1 | B | R1 |
|---|---|---|---|---|---|
| 88 | 13 | Ph | —CH$_2$O— | Ph | —CH(CH$_3$)CH$_2$OC$_4$H$_9$-n |
| 89 | 6 | Ph | —COO— | BiPh | —CH(CF$_3$)(CH$_2$)$_5$OC$_2$H$_5$ |
| 90 | 6 | Ph | —CH$_2$O— | Tetra | —CH(CH$_3$)C$_4$H$_9$-n |
| 91 | 6 | Ph(F) | —COO— | Ph—OCO—Ph | —CH(CH$_3$)C$_6$H$_{13}$-n |
| 92 | 10 | Ph | —COO— | BiPh | —CH$_2$(CF$_2$)$_6$H |
| 93 | 8 | (F)Ph | —COO— | BiPh | —CH(CH$_3$)C$_6$H$_{13}$-n |
| 94 | 11 | Ph | —COO— | Ph(F) | —CH(CF$_3$)(CH$_2$)$_5$OC$_2$H$_5$ |
| 95 | 8 | (Cl)Ph | —CH$_2$O— | Tetra | —(CH$_2$)$_3$CH(CH$_3$)C$_2$H$_5$ |
| 96 | 4 | Ph | —CH$_2$O— | Ph—CH$_2$—Ph | —CH$_2$CH$_2$C$_4$F$_9$-n |
| 97 | 6 | (F)Ph | —COO— | BiPh(F) | —CH$_2$CH$_2$OC$_6$H$_{13}$-n |
| 98 | 6 | Ph | —COO— | Ph | —CH(CF$_3$)CH$_2$CH$_2$OC$_2$H$_5$ |
| 99 | 3 | Ph | —CH$_2$O— | BiPh(F) | —CH$_2$CH$_2$OC$_6$H$_{13}$-n |
| 100 | 5 | Ph | —COO— | Ph—COO—Ph | —CH$_2$CF$_2$CHFCF$_3$ |
| 101 | 4 | Ph | —COO— | Ph | —CH(CH$_3$)C$_6$H$_{13}$-n |
| 102 | 10 | (F)Ph | —COO— | Ph | —CH(CH$_3$)C$_2$H$_5$ |
| 103 | 4 | Ph | —CH$_2$O— | Ph—CH$_2$—Ph | —CH(CH$_3$)CH$_2$CH$_2$OC$_2$H$_5$ |
| 104 | 13 | Ph(F) | —CH$_2$O— | Nap | —CH$_2$CH(CH$_3$)C$_2$H$_5$ |
| 105 | 10 | Ph | —CH$_2$O— | BiPh(F) | —CH(CF$_3$)C$_2$H$_5$ |
| 106 | 5 | Ph | —CH$_2$O— | Nap | —CH(CH$_3$)C$_2$H$_5$ |
| 107 | 6 | Ph | —COO— | BiPh | —CH(CH$_3$)C$_6$H$_{13}$-n |
| 108 | 6 | Ph | —COO— | Ph(F) | —CH(CF$_3$)(CH$_2$)$_3$OC$_2$H$_5$ |
| 109 | 4 | (F)Ph | —COO— | Ph—CH$_2$O—Ph | —CH(CH$_3$)CH$_2$OC$_4$H$_9$-n |
| 110 | 7 | (Cl)Ph | —COO— | Ph—OCO—Ph | —CH(CH$_3$)C$_6$H$_{13}$-n |
| 111 | 8 | (F)Ph | —COO— | BiPh | —CH$_2$CH(CH$_3$)C$_2$H$_5$ |
| 112 | 6 | Ph | —CH$_2$O— | Ph—COO—Ph | —CH(CF$_3$)(CH$_2$)$_3$OC$_2$H$_5$ |
| 113 | 9 | Ph(F) | —CH$_2$O— | Ph—COO—Ph | —CH$_2$CH(CH$_3$)C$_2$H$_5$ |
| 114 | 8 | Ph | —COO— | Ph—CH$_2$O—Ph | —CH$_2$(CF$_2$)$_6$H |
| 115 | 5 | Ph | —CH$_2$O— | Ph—CH$_2$O—Ph | —CH(CF$_3$)(CH$_2$)$_3$OC$_2$H$_5$ |
| 116 | 12 | Ph(F) | —CH$_2$O— | Ph—COO—Ph | —CH$_2$(CF$_2$)$_6$H |
| 117 | 5 | Ph(F) | —CH$_2$O— | Ph—OCO—Ph | —CH(CH$_3$)C$_6$H$_{13}$-n |
| 118 | 3 | Ph | —COO— | Ph(F) | —CH(CH$_3$)C$_6$H$_{13}$-n |
| 119 | 5 | Ph | —CH$_2$O— | Ph—COO—Ph | —CH$_2$CH$_2$OC$_4$H$_9$-n |
| 120 | 8 | Ph | —COO— | BiPh(F) | —CH$_2$CH$_2$C$_4$F$_9$-n |
| 121 | 4 | Ph | —CH$_2$O— | Ph | —CH(CH$_3$)C$_6$H$_{13}$-n |
| 122 | 6 | Ph | —CH$_2$O— | BiPh | —CH(CH$_3$)C$_6$H$_{13}$-n |
| 123 | 6 | Ph | —COO— | BiPh | —CH$_2$CF$_2$CHFCF$_3$ |
| 124 | 4 | Ph(F) | —CH$_2$O— | Ph—COO—Ph | —CH(CH$_3$)C$_6$H$_{13}$-n |
| 125 | 8 | (Cl)Ph | —COO— | BiPh | —CH$_2$CH$_2$C$_8$F$_{17}$-n |
| 126 | 6 | Ph | —COO— | Ph | —CH$_2$CH$_2$C$_4$F$_9$-n |
| 127 | 6 | Ph | —COO— | Ph | —(CH$_2$)$_3$CH(CH$_3$)C$_2$H$_5$ |
| 128 | 10 | (F)Ph | —CH$_2$O— | Ph—CH$_2$O—Ph | —CH(CH$_3$)C$_2$H$_5$ |
| 129 | 16 | Ph | —COO— | Ph—COO—Ph | —(CH$_2$)$_3$CH(CH$_3$)C$_2$H$_5$ |
| 130 | 11 | Ph | —COO— | BiPh | —CH$_2$CH$_2$OC$_6$H$_{13}$-n |
| 131 | 6 | Ph | —CH$_2$O— | Nap | —CH(CH$_3$)C$_6$H$_{13}$-n |
| 132 | 8 | (F)Ph | —CH$_2$O— | Nap | —CH(CH$_3$)C$_2$H$_5$ |
| 133 | 6 | Ph | —CH$_2$O— | Ph—OCO—Ph | —CH$_2$CH(CH$_3$)C$_2$H$_5$ |
| 134 | 5 | Ph(F) | —CH$_2$O— | BiPh | —CH$_2$CH$_2$OC$_6$H$_{13}$-n |
| 135 | 6 | Ph | —CH$_2$O— | Ph—COO—Ph | —CH(CH$_3$)CH$_2$CH$_2$OC$_2$H$_5$ |
| 136 | 5 | Ph | —CH$_2$O— | BiPh | —CH(CH$_3$)C$_2$H$_5$ |
| 137 | 4 | Ph | —COO— | Nap | —CH$_2$(CF$_2$)$_6$H |
| 138 | 8 | (F)Ph | —CH$_2$O— | BiPh(F) | —CH(CH$_3$)C$_6$H$_{13}$-n |
| 139 | 10 | Ph | —COO— | (F)Ph | —CH$_2$CF$_2$CHFCF$_3$ |
| 140 | 6 | Ph | —COO— | Ph—CH$_2$O—Ph | —CH(CH$_3$)CH$_2$CH$_2$OC$_2$H$_5$ |
| 141 | 6 | Ph | —CH$_2$O— | BiPh | —CH(CH$_3$)CH$_2$CH$_2$OC$_2$H$_5$ |
| 142 | 8 | Ph | —COO— | Ph—OCO—Ph | —CH$_2$CH$_2$C$_4$F$_9$-n |
| 143 | 8 | Ph(F) | —COO— | BiPh(F) | —CH(CH$_3$)C$_6$H$_{13}$-n |
| 144 | 6 | Ph | —COO— | BiPh | —CH$_2$CH(CH$_3$)C$_2$H$_5$ |
| 145 | 8 | (F)Ph | —COO— | (F)BiPh | —CH(CH$_3$)CH$_2$OC$_4$H$_9$-n |
| 146 | 15 | Ph | —COO— | Ph—OCO—Ph | —CH(CH$_3$)C$_4$H$_9$-n |
| 147 | 6 | (Cl)Ph | —CH$_2$O— | Ph | —CH(CH$_3$)C$_4$H$_9$-n |
| 148 | 18 | Ph | —CH$_2$O— | Ph | —CH$_2$CH$_2$C$_8$F$_{17}$-n |
| 149 | 14 | Ph(F) | —CH$_2$O— | BiPh | —CH(CH$_3$)C$_6$H$_{13}$-n |
| 150 | 10 | Ph | —CH$_2$O— | BiPh | —CH$_2$CH$_2$OC$_4$H$_9$-n |
| 151 | 12 | Ph | —COO— | (F)Ph | —CH(CF$_3$)C$_6$H$_{13}$-n |
| 152 | 2 | Ph | —CH$_2$O— | BiPh(F) | —CH(CH$_3$)CH$_2$CH$_2$OC$_2$H$_5$ |
| 153 | 5 | (F)Ph | —CH$_2$O— | BiPh | —CH(CH$_3$)C$_2$H$_5$ |
| 154 | 8 | Ph | —COO— | (F)Ph | —CH(CF$_3$)C$_6$H$_{13}$-n |
| 155 | 6 | Ph | —COO— | BiPh(F) | —CH(CF$_3$)C$_2$H$_5$ |
| 156 | 5 | (Cl)Ph | —CH$_2$O— | (F)Ph | —CH(CF$_3$)C$_5$H$_{11}$-n |
| 157 | 6 | Ph(F) | —COO— | Ph(F) | —CH$_2$CF$_2$CHFCF$_3$ |
| 158 | 4 | Ph | —CH$_2$O— | Nap | —CH(CH$_3$)C$_4$H$_9$-n |
| 159 | 11 | Ph | —COO— | BiPh(F) | —(CH$_2$)$_3$CH(CH$_3$)C$_2$H$_5$ |
| 160 | 6 | Ph | —CH$_2$O— | Nap | —CH(CF$_3$)CH$_2$CH$_2$OC$_2$H$_5$ |
| 161 | 6 | Ph(F) | —CH$_2$O— | (F)BiPh | —CH(CH$_3$)C$_2$H$_5$ |
| 162 | 15 | (F)Ph | —COO— | Ph—CH$_2$—Ph | —CH(CF$_3$)(CH$_2$)$_5$OC$_2$H$_5$ |

TABLE 1-continued

In Formula (1), A is 1,4-phenylene group; $Y_1$ is —COO— group

| EX. C. | m | A | Z1 | B | R1 |
|---|---|---|---|---|---|
| 163 | 6 | Ph | —COO— | Nap | —CH(CH$_3$)C$_4$H$_9$-n |
| 164 | 3 | Ph | —CH$_2$O— | Tetra | —CH(CF$_3$)(CH$_2$)$_3$OC$_2$H$_5$ |
| 165 | 10 | (Cl)Ph | —COO— | BiPh | —CH(CH$_3$)C$_2$H$_5$ |
| 166 | 13 | Ph | —COO— | BiPh | —CH$_2$(CF$_2$)$_6$H |
| 167 | 5 | Ph | —CH$_2$O— | Ph | —CH(CF$_3$)C$_2$H$_5$ |
| 168 | 13 | Ph | —COO— | Ph—COO—Ph | —CH(CH$_3$)C$_6$H$_{13}$-n |
| 169 | 4 | Ph | —COO— | Nap | —CH(CH$_3$)CH$_2$OC$_4$H$_9$-n |
| 170 | 8 | Ph | —CH$_2$O— | BiPh | —CH(CF$_3$)(CH$_2$)$_5$OC$_2$H$_5$ |
| 171 | 8 | Ph | —CH$_2$O— | (F)BiPh | —CH$_2$CH$_2$OC$_4$H$_9$-n |
| 172 | 14 | Ph(F) | —COO— | Nap | —CH$_2$CH(CH$_3$)C$_2$H$_5$ |
| 173 | 15 | Ph | —COO— | Ph—COO—Ph | —CH(CH$_3$)C$_6$H$_{13}$-n |
| 174 | 6 | Ph | —CH$_2$O— | Ph—CH$_2$O—Ph(F) | —CH(CF$_3$)(CH$_2$)$_5$OC$_2$H$_5$ |
| 175 | 5 | Ph | —COO— | Nap | —CH(CH$_3$)C$_6$H$_{13}$-n |
| 176 | 2 | Ph | —CH$_2$O— | Tetra | —CH$_2$CH$_2$OC$_6$H$_{13}$-n |
| 177 | 19 | (Cl)Ph | —COO— | Ph | —CH(CH$_3$)C$_6$H$_{13}$-n |
| 178 | 5 | (F)Ph | —CH$_2$O— | Ph—OCO—Ph | —CH(CH$_3$)CH$_2$OC$_4$H$_9$-n |
| 179 | 6 | (F)Ph | —COO— | Nap | —CH$_2$CH$_2$C$_4$F$_9$-n |
| 180 | 6 | (Cl)Ph | —COO— | Nap | —CH$_2$CH(CH$_3$)C$_2$H$_5$ |
| 181 | 6 | Ph(F) | —COO— | Nap | —CH(CF$_3$)CH$_2$CH$_2$OC$_2$H$_5$ |
| 182 | 5 | Ph | —COO— | BiPh(F) | —CH$_2$CH$_2$OC$_4$H$_9$-n |
| 183 | 6 | Ph | —CH$_2$O— | Ph—CH$_2$O—Ph | —CH$_2$CH(CH$_3$)C$_2$H$_5$ |
| 184 | 17 | Ph | —COO— | Nap | —CH(CH$_3$)C$_6$H$_{13}$-n |
| 185 | 20 | Ph | —CH$_2$O— | Ph(F) | —CH(CF$_3$)CH$_2$CH$_2$OC$_2$H$_5$ |
| 186 | 8 | (Cl)Ph | —COO— | Ph—OCO—Ph | —CH(CH$_3$)C$_6$H$_{13}$-n |
| 187 | 7 | Ph | —COO— | BiPh | —CH(CH$_3$)C$_4$H$_9$-n |
| 188 | 4 | (F)Ph | —CH$_2$O— | BiPh | —CH$_2$CH(CH$_3$)C$_2$H$_5$ |
| 189 | 6 | Ph(F) | —COO— | Ph | —CH$_2$CH$_2$OC$_6$H$_{13}$-n |
| 190 | 6 | Ph | —CH$_2$O— | Ph—COO—Ph | —CH(CH$_3$)C$_6$H$_{13}$-n |
| 191 | 8 | Ph | —CH$_2$O— | Ph(F) | —CH$_2$CH$_2$OC$_6$H$_{13}$-n |
| 192 | 4 | (F)Ph | —CH$_2$O— | (F)BiPh | —CH(CH$_3$)C$_6$H$_{13}$-n |
| 193 | 13 | Ph | —COO— | Ph—COO—Ph | —CH$_2$CH(CH$_3$)C$_2$H$_5$ |
| 194 | 5 | Ph | —CH$_2$O— | BiPh(F) | —CH(CF$_3$)(CH$_2$)$_5$OC$_2$H$_5$ |
| 195 | 4 | Ph(F) | —CH$_2$O— | (F)BiPh | —CH$_2$CH$_2$C$_4$F$_9$-n |
| 196 | 6 | Ph | —CH$_2$O— | Ph | —CH$_2$CH$_2$C$_4$F$_9$-n |
| 197 | 8 | Ph | —CH$_2$O— | BiPh | —CH$_2$CH$_2$OC$_4$H$_9$-n |

EX. C.: Exemplified Compounds

TABLE 2

In Formula (1) A is 1,4-phenylene group; $Y_1$ is —OCO— group

| EX. C. | m | A | Z1 | B | R1 |
|---|---|---|---|---|---|
| 198 | 5 | (Cl)Ph | —COO— | Ph—COO—Ph | —CH(CH$_3$)C$_7$H$_{15}$-n |
| 199 | 3 | Ph | —COO— | Ph—COO—Ph | —CH$_2$OC$_6$H$_{13}$-n |
| 200 | 8 | Ph | —CH$_2$O— | Nap | —CH$_2$CH$_2$C$_4$F$_9$-n |
| 201 | 8 | Ph | —CH$_2$O— | BiPh | —C$_{12}$H$_{25}$-n |
| 202 | 14 | Ph(F) | —COO— | Ph—COO—Ph | —CH$_2$CH$_2$C$_4$F$_9$-n |
| 203 | 4 | Ph | —COO— | Ph—CH$_2$O—Ph(F) | —CH(CH$_3$)OC$_4$H$_9$-n |
| 204 | 11 | Ph | —COO— | (F)BiPh | —CH$_2$CH$_2$OC$_4$H$_9$-n |
| 205 | 5 | Ph | —COO— | Ph | —CH$_2$CH$_2$OC$_2$H$_5$ |
| 206 | 5 | Ph | —COO— | Ph—COO—Ph | —CH$_2$CH(CH$_3$)C$_2$H$_5$ |
| 207 | 14 | Ph | —CH$_2$O— | Nap | —CH(CH$_3$)OC$_6$H$_{13}$-n |
| 208 | 19 | (F)Ph | —CH$_2$O— | (F)Ph | —(CH$_2$)$_6$OC$_2$H$_5$ |
| 209 | 19 | Ph | —COO— | Ph—OCO—Ph | —(CH$_2$)$_6$OC$_2$H$_5$ |
| 210 | 10 | Ph | —COO— | Nap | —C$_{12}$H$_{25}$-n |
| 211 | 10 | Ph | —COO— | Ph—CH$_2$O—Ph | —CH$_2$CH$_2$C$_4$F$_9$-n |
| 212 | 10 | Ph(F) | —COO— | Ph—CH$_2$—Ph | —C$_4$H$_9$-n |
| 213 | 6 | Ph | —COO— | Ph—OCO—Ph | —CH(CH$_3$)C$_8$H$_{17}$-n |
| 214 | 8 | Ph | —CH$_2$O— | Tetra | —C$_{10}$H$_{21}$-n |
| 215 | 8 | (Cl)Ph | —CH$_2$O— | Ph—CH$_2$—Ph | —CH$_2$CH$_2$C$_4$F$_9$-n |
| 216 | 3 | Ph | —COO— | Nap | —CH$_2$OC$_6$H$_{13}$-n |
| 217 | 6 | Ph | —COO— | BiPh | —C$_6$H$_{13}$-n |
| 218 | 6 | (Cl)Ph | —CH$_2$O— | Nap | —(CH$_2$)$_6$OC$_2$H$_5$ |
| 219 | 8 | Ph | —CH$_2$O— | Ph—COO—Ph | —C$_{12}$H$_{25}$-n |
| 220 | 5 | Ph(F) | —COO— | Ph | —CH(CH$_3$)C$_4$H$_9$-n |
| 221 | 4 | Ph | —CH$_2$O— | BiPh | —CH(CH$_3$)C$_8$H$_{17}$-n |
| 222 | 8 | Ph | —COO— | Ph—OCO—Ph | —C$_4$H$_9$-n |
| 223 | 9 | Ph | —CH$_2$O— | Ph—CH$_2$O—Ph | —CH(CH$_3$)C$_6$H$_{13}$-n |
| 224 | 5 | Ph | —COO— | BiPh | —CH$_2$CH$_2$CH(CH$_3$)C$_2$H$_5$ |
| 225 | 19 | (Cl)Ph | —CH$_2$O— | Ph(F) | —CH(CH$_3$)C$_7$H$_{15}$-n |
| 226 | 5 | Ph(F) | —CH$_2$O— | Nap | —C$_4$H$_9$-n |

TABLE 2-continued

In Formula (1) A is 1,4-phenylene group; $Y_1$ is —OCO— group

| EX. C. | m | A | Z1 | B | R1 |
|---|---|---|---|---|---|
| 227 | 20 | (F)Ph | —COO— | Ph(F) | —CH$_2$CH$_2$C$_4$F$_9$-n |
| 228 | 6 | Ph | —CH$_2$O— | Ph | —CH(CH$_3$)C$_7$H$_{15}$-n |
| 229 | 4 | (F)Ph | —CH$_2$O— | Ph | —(CH$_2$)$_3$CH(CH$_3$)C$_2$H$_5$ |
| 230 | 16 | Ph | —CH$_2$O— | Ph(F) | —CH(Cl)CH$_2$CH(CH$_3$)$_2$ |
| 231 | 5 | Ph | —COO— | Ph—OCO—Ph | —C$_{12}$H$_{25}$-n |
| 232 | 4 | Ph(F) | —CH$_2$O— | Ph—CH$_2$O—Ph(F) | —C$_6$H$_{13}$-n |
| 233 | 10 | Ph(F) | —CH$_2$O— | (F)Ph | —C$_{12}$H$_{25}$-n |
| 234 | 10 | Ph | —CH$_2$O— | Ph | —CH$_2$CH$_2$C$_4$F$_9$-n |
| 235 | 8 | Ph | —COO— | Ph—CH$_2$—Ph | —CH(CH$_3$)C$_2$H$_5$ |
| 236 | 4 | Ph | —COO— | Ph—CH$_2$O—Ph(F) | —CH$_2$CH$_2$C$_4$F$_9$-n |
| 237 | 8 | Ph | —COO— | Ph(F) | —CH$_2$CH$_2$OC$_4$H$_9$-n |
| 238 | 8 | Ph | —COO— | Ph—CH$_2$—Ph | —C$_{10}$H$_{21}$-n |
| 239 | 11 | Ph(F) | —CH$_2$O— | Tetra | —CH(Cl)CH$_2$CH(CH$_3$)$_2$ |
| 240 | 17 | (F)Ph | —CH$_2$O— | (F)Ph | —CH$_2$CH$_2$OC$_4$H$_9$-n |
| 241 | 11 | Ph(F) | —CH$_2$O— | BiPh | —C$_{12}$H$_{25}$-n |
| 242 | 9 | Ph | —COO— | Nap | —C$_9$H$_{19}$-n |
| 243 | 8 | Ph | —CH$_2$C— | Ph—CH$_2$O—Ph(F) | —CH$_2$CH(CH$_3$)C$_2$H$_5$ |
| 244 | 3 | Ph | —CH$_2$O— | BiPh(F) | —C$_6$H$_{13}$-n |
| 245 | 6 | Ph | —CH$_2$O— | Ph(F) | —CH$_2$CH$_2$CH(CH$_3$)C$_2$H$_5$ |
| 246 | 18 | Ph | —COO— | BiPh | —(CH$_2$)$_6$OC$_2$H$_5$ |
| 247 | 5 | Ph | —CH$_2$O— | Ph—CH$_2$—Ph | —CH$_2$CH$_2$C$_4$F$_9$-n |
| 248 | 5 | Ph | —COO— | Ph—CH$_2$—Ph | —CH$_2$CH(CH$_3$)C$_2$H$_5$ |
| 249 | 13 | (F)Ph | —CH$_2$O— | Nap | —C$_6$H$_{13}$-n |
| 250 | 6 | (F)Ph | —CH$_2$O— | Ph(F) | —C$_4$H$_9$-n |
| 251 | 20 | Ph | —COO— | Ph | —CH(CH$_3$)OC$_6$H$_{13}$-n |
| 252 | 10 | Ph | —CH$_2$O— | Ph—COO—Ph | —C$_{10}$H$_{21}$-n |
| 253 | 7 | (Cl)Ph | —COO— | Ph | —CH(CH$_3$)OC$_4$H$_9$-n |
| 254 | 6 | Ph | —COO— | Nap | —CH$_2$CH$_2$CH(CH$_3$)C$_2$H$_5$ |
| 255 | 5 | (Cl)Ph | —CH$_2$O— | (F)BiPh | —CH(CH$_3$)C$_7$H$_{15}$-n |
| 256 | 4 | Ph | —COO— | Ph(F) | —C$_9$H$_{19}$-n |
| 257 | 15 | Ph | —COO— | Tetra | —CH(CH$_3$)OC$_4$H$_9$-n |
| 258 | 10 | Ph | —CH$_2$O— | Nap | —C$_9$H$_{19}$-n |
| 259 | 5 | Ph | —CH$_2$O— | (F)Ph | —CH(CH$_3$)C$_6$H$_{13}$-n |
| 260 | 8 | Ph | —CH$_2$O— | Ph—COO—Ph | —(CH$_2$)$_6$OC$_2$H$_5$ |
| 261 | 4 | (Cl)Ph | —CH$_2$O— | BiPh | —CH$_2$OC$_6$H$_{13}$-n |
| 262 | 15 | Ph | —CH$_2$O— | BiPh(F) | —(CH$_2$)$_3$CH(CH$_3$)C$_2$H$_5$ |
| 263 | 10 | Ph(F) | —CH$_2$O— | Ph—CH$_2$O—Ph | —CH(Cl)CH$_2$CH(CH$_3$)$_2$ |
| 264 | 6 | Ph | —COO— | Ph—OCO—Ph | —CH(Cl)CH$_2$CH(CH$_3$)$_2$ |
| 265 | 12 | Ph | —CH$_2$O— | Ph—OCO—Ph | —CH(CH$_3$)C$_8$H$_{17}$-n |
| 266 | 5 | Ph | —CH$_2$O— | BiPh | —CH$_2$OC$_6$H$_{13}$-n |
| 267 | 4 | Ph | —CH$_2$O— | Nap | —CH$_2$CH$_2$OC$_4$H$_9$-n |
| 268 | 16 | Ph | —CH$_2$O— | Ph—COO—Ph | —CH(CH$_3$)C$_6$H$_{13}$-n |
| 269 | 6 | Ph | —CH$_2$O— | Nap | —C$_6$H$_{13}$-n |
| 270 | 5 | Ph(F) | —COO— | BiPh | —CH$_2$CH$_2$OC$_2$H$_5$ |
| 271 | 12 | Ph | —CH$_2$O— | BiPh(F) | —CH$_2$CH$_2$CH(CH$_3$)C$_2$H$_5$ |
| 272 | 12 | Ph | —CH$_2$O— | Ph | —CH$_2$CH$_2$C$_4$F$_9$-n |
| 273 | 6 | Ph | —CH$_2$O— | BiPh | —C$_6$H$_{13}$-n |
| 274 | 6 | Ph | —CH$_2$O— | Nap | —CH(CH$_3$)C$_2$H$_5$ |
| 275 | 20 | (Cl)Ph | —COO— | Ph—OCO—Ph | —CH$_2$OC$_6$H$_{13}$-n |
| 276 | 9 | (F)Ph | —CH$_2$O— | (F)Ph | —C$_5$H$_{11}$-n |
| 277 | 5 | Ph | —COO— | Ph | —CH(CH$_3$)C$_6$H$_{13}$-n |
| 278 | 5 | (Cl)Ph | —CH$_2$O— | Ph—CH$_2$—Ph | —CH$_2$CH$_2$C$_4$F$_9$-n |
| 279 | 5 | Ph | —COO— | Ph(F) | —C$_4$H$_9$-n |
| 280 | 21 | Ph | —CH$_2$O— | Ph(F) | —CH(CH$_3$)OC$_6$H$_{13}$-n |
| 281 | 10 | Ph(F) | —COO— | (F)Ph | —(CH$_2$)$_3$CH(CH$_3$)C$_2$H$_5$ |
| 282 | 2 | Ph | —COO— | Ph—COO—Ph | —CH(CH$_3$)C$_7$H$_{15}$-n |
| 283 | 8 | Ph(F) | —COO— | Ph | —CH(CH$_3$)C$_4$H$_9$-n |
| 284 | 10 | Ph | —COO— | Ph—OCO—Ph | —CH$_2$CH$_2$OC$_4$H$_9$-n |
| 285 | 20 | Ph(F) | —CH$_2$O— | Ph | —CH(CH$_3$)C$_4$H$_9$-n |
| 286 | 8 | Ph | —COO— | Ph—OCO—Ph | —CH$_2$CH$_2$OC$_4$H$_9$-n |
| 287 | 6 | Ph | —COO— | Ph—COO—Ph | —CH(CH$_3$)C$_8$H$_{17}$-n |
| 288 | 21 | (F)Ph | —COO— | BiPh | —C$_4$H$_9$-n |
| 289 | 14 | Ph | —COO— | Ph—OCO—Ph | —CH$_2$CH$_2$C$_4$F$_9$-n |
| 290 | 4 | (F)Ph | —CH$_2$O— | Ph—CH$_2$—Ph | —CH(CH$_3$)C$_2$H$_5$ |
| 291 | 19 | Ph | —COO— | Ph—CH$_2$—Ph | —CH$_2$CH(CH$_3$)OC$_3$H$_7$-n |
| 292 | 6 | (Cl)Ph | —CH$_2$O— | BiPh | —CH$_2$CH(CH$_3$)C$_2$H$_5$ |
| 293 | 8 | Ph | —CH$_2$O— | Tetra | —CH(CH$_3$)OC$_4$H$_9$-n |
| 294 | 13 | Ph | —CH$_2$O— | Ph—COO—Ph | —CH(CH$_3$)OC$_6$H$_{13}$-n |
| 295 | 5 | Ph(F) | —COO— | Ph—COO—Ph | —C$_{10}$H$_{21}$-n |
| 296 | 4 | Ph | —CH$_2$O— | Ph | —CH$_2$CH$_2$OC$_4$H$_9$-n |
| 297 | 4 | Ph | —COO— | Ph | —CH$_2$OC$_6$H$_{13}$-n |
| 298 | 6 | Ph | —COO— | Ph | —C$_5$H$_{11}$-n |
| 299 | 5 | Ph | —CH$_2$O— | Ph | —CH(CH$_3$)C$_6$H$_{13}$-n |
| 300 | 8 | Ph | —COO— | BiPh | —CH$_2$CH(CH$_3$)C$_2$H$_5$ |
| 301 | 19 | Ph | —CH$_2$O— | BiPh | —C$_{10}$H$_{21}$-n |

TABLE 2-continued

In Formula (1) A is 1,4-phenylene group; $Y_1$ is —OCO— group

| EX. C. | m | A | Z1 | B | R1 |
|---|---|---|---|---|---|
| 302 | 6 | (F)Ph | —COO— | Ph(F) | —CH$_2$CH$_2$OC$_2$H$_5$ |
| 303 | 20 | Ph | —CH$_2$O— | Nap | —(CH$_2$)$_3$CH(CH$_3$)C$_2$H$_5$ |
| 304 | 5 | Ph | —CH$_2$O— | Tetra | —C$_9$H$_{19}$-n |
| 305 | 2 | Ph | —CH$_2$O— | Ph(F) | —C$_5$H$_{11}$-n |
| 306 | 10 | Ph | —COO— | Ph | —(CH$_2$)$_6$OC$_2$H$_5$ |
| 307 | 8 | Ph | —COO— | Nap | —CH$_2$CH$_2$C$_4$F$_9$-n |
| 308 | 6 | Ph | —CH$_2$O— | Nap | —CH$_2$CH$_2$OC$_2$H$_5$ |
| 309 | 15 | Ph | —COO— | BiPh | —C$_{12}$H$_{25}$-n |
| 310 | 15 | Ph | —CH$_2$O— | BiPh | —CH$_2$CH$_2$CH(CH$_3$)C$_2$H$_5$ |
| 311 | 6 | Ph | —COO— | Ph—CH$_2$—Ph | —C$_9$H$_{19}$-n |
| 312 | 5 | Ph | —COO— | Ph(F) | —CH$_2$CH$_2$CH(CH$_3$)C$_2$H$_5$ |
| 313 | 4 | Ph | —COO— | Ph—COO—Ph | —CH(CH$_3$)C$_4$H$_9$-n |
| 314 | 9 | Ph | —COO— | (F)BiPh | —(CH$_2$)$_3$CH(CH$_3$)C$_2$H$_5$ |
| 315 | 5 | Ph | —COO— | Ph(F) | —CH(CH$_3$)C$_7$H$_{15}$-n |
| 316 | 4 | Ph | —COO— | (F)BiPh | —CH$_2$CH$_2$C$_4$F$_9$-n |
| 317 | 8 | (F)Ph | —CH$_2$O— | BiPh | —(CH$_2$)$_6$OC$_2$H$_5$ |
| 318 | 7 | Ph | —COO— | Ph—OCO—Ph | —(CH$_2$)$_6$OC$_2$H$_5$ |
| 319 | 20 | Ph | —CH$_2$O— | Ph—CH$_2$O—Ph(F) | —CH$_2$CH$_2$CH(CH$_3$)C$_2$H$_5$ |
| 320 | 18 | (Cl)Ph | —COO— | Tetra | —CH$_2$CH(CH$_3$)C$_2$H$_5$ |
| 321 | 6 | Ph | —CH$_2$O— | BiPh | —CH$_2$CH$_2$OC$_4$H$_9$-n |
| 322 | 5 | (F)Ph | —CH$_2$O— | Ph(F) | —CH$_2$CH$_2$OC$_4$H$_9$-n |
| 323 | 5 | (Cl)Ph | —CH$_2$O— | Ph—COO—Ph | —C$_4$H$_9$-n |
| 324 | 5 | (F)Ph | —COO— | Ph—COO—Ph | —CH(Cl)CH$_2$CH(CH$_3$)$_2$ |
| 325 | 15 | Ph | —CH$_2$O— | Ph—COO—Ph | —CH$_2$CH(CH$_3$)C$_2$H$_5$ |
| 326 | 8 | Ph | —COO— | Ph | —CH(CH$_3$)C$_7$H$_{15}$-n |
| 327 | 7 | (F)Ph | —COO— | Nap | —CH(CH$_3$)OC$_6$H$_{13}$-n |
| 328 | 4 | Ph(F) | —COO— | Ph(F) | —CH(CH$_3$)OC$_4$H$_9$-n |
| 329 | 15 | Ph(F) | —COO— | Ph(F) | —CH$_2$CH(CH$_3$)C$_2$H$_5$ |
| 330 | 6 | Ph | —CH$_2$O— | Ph | —C$_{10}$H$_{21}$-n |
| 331 | 6 | (F)Ph | —CH$_2$O— | Ph—CH$_2$O—Ph | —CH(CH$_3$)OC$_6$H$_{13}$-n |
| 332 | 8 | Ph(F) | —CH$_2$O— | Ph | —CH$_2$OC$_6$H$_{13}$-n |
| 333 | 7 | Ph | —CH$_2$O— | Ph(F) | —CH$_2$OC$_6$H$_{13}$-n |
| 334 | 5 | Ph(F) | —COO— | BiPh(F) | —CH$_2$CH$_2$OC$_4$H$_9$-n |
| 335 | 16 | Ph | —CH$_2$O— | Nap | —CH(Cl)CH$_2$CH(CH$_3$)$_2$ |
| 336 | 2 | (Cl)Ph | —COO— | Ph(F) | —CH(CH$_3$)C$_2$H$_5$ |
| 337 | 10 | (Cl)Ph | —COO— | Ph—OCO—Ph | —CH$_2$CH$_2$OC$_4$H$_9$-n |
| 338 | 8 | (F)Ph | —CH$_2$O— | Ph—COO—Ph | —CH$_2$CH$_2$OC$_4$H$_9$-n |
| 339 | 8 | Ph(F) | —CH$_2$O— | BiPh | —(CH$_2$)$_3$CH(CH$_3$)C$_2$H$_5$ |
| 340 | 3 | (F)Ph | —COO— | Ph—OCO—Ph | —(CH$_2$)$_6$OC$_2$H$_5$ |
| 341 | 17 | Ph | —CH$_2$O— | Ph(F) | —CH(CH$_3$)C$_4$H$_9$-n |
| 342 | 20 | Ph(F) | —CH$_2$O— | Tetra | —CH$_2$CH$_2$OC$_2$H$_5$ |
| 343 | 6 | Ph | —CH$_2$O— | (F)Ph | —(CH$_2$)$_3$CH(CH$_3$)C$_2$H$_5$ |
| 344 | 18 | Ph(F) | —CH$_2$O— | Ph—COO—Ph | —CH(CH$_3$)OC$_4$H$_9$-n |
| 345 | 8 | Ph | —CH$_2$O— | (F)BiPh | —CH(CH$_3$)C$_6$H$_{13}$-n |
| 346 | 6 | Ph | —CH$_2$O— | (F)BiPh | —CH(Cl)CH$_2$CH(CH$_3$)$_2$ |
| 347 | 6 | Ph(F) | —COO— | Nap | —CH(CH$_3$)C$_8$H$_{17}$-n |
| 348 | 4 | Ph | —CH$_2$O— | Ph—COO—Ph | —CH$_2$CH$_2$C$_4$F$_9$-n |
| 349 | 6 | Ph | —COO— | Ph—CH$_2$—Ph | —CH(CH$_3$)C$_2$H$_5$ |
| 350 | 10 | Ph | —COO— | (F)BiPh | —CH(CH$_3$)OC$_6$H$_{13}$-n |
| 351 | 8 | Ph | —COO— | Nap | —C$_{12}$H$_{25}$-n |
| 352 | 8 | Ph | —COO— | Ph—OCO—Ph | —CH$_2$CH$_2$C$_4$F$_9$-n |
| 353 | 3 | (Cl)Ph | —CH$_2$O— | Ph—CH$_2$O—Ph | —C$_{12}$H$_{25}$-n |
| 354 | 14 | Ph | —CH$_2$O— | Nap | —C$_5$H$_{11}$-n |
| 355 | 8 | Ph | —COO— | Ph—COO—Ph | —CH(CH$_3$)OC$_6$H$_{13}$-n |
| 356 | 14 | Ph | —CH$_2$O— | Ph—CH$_2$O—Ph | —(CH$_2$)$_3$CH(CH$_3$)C$_2$H$_5$ |
| 357 | 6 | Ph | —CH$_2$O— | BiPh | —CH$_2$CH$_2$OC$_2$H$_5$ |
| 358 | 5 | Ph | —CH$_2$O— | Ph—COO—Ph | —CH$_2$CH$_2$CH(CH$_3$)C$_2$H$_5$ |
| 359 | 19 | Ph(F) | —CH$_2$O— | Ph | —C$_6$H$_{13}$-n |
| 360 | 8 | Ph | —COO— | Tetra | —C$_4$H$_9$-n |
| 361 | 6 | Ph | —COO— | Ph—CH$_2$—Ph | —C$_4$H$_9$-n |
| 362 | 8 | Ph(F) | —CH$_2$O— | Ph—CH$_2$—Ph | —C$_6$H$_{13}$-n |
| 363 | 7 | (F)Ph | —COO— | BiPh | —CH$_2$CH$_2$C$_4$F$_9$-n |
| 364 | 19 | (Cl)Ph | —CH$_2$O— | BiPh(F) | —CH$_2$CH$_2$OC$_4$H$_9$-n |
| 365 | 6 | (F)Ph | —CH$_2$O— | Ph | —CH$_2$CH$_2$C$_4$F$_9$-n |
| 366 | 8 | Ph | —CH$_2$O— | Nap | —(CH$_2$)$_6$OC$_2$H$_5$ |
| 367 | 17 | Ph(F) | —COO— | Ph—CH$_2$—Ph | —C$_5$H$_{11}$-n |
| 368 | 18 | Ph | —CH$_2$O— | (F)Ph | —C$_6$H$_{13}$-n |
| 369 | 5 | Ph | —CH$_2$O— | Ph | —CH(CH$_3$)C$_8$H$_{17}$-n |
| 370 | 4 | (Cl)Ph | —COO— | Ph—CH$_2$O—Ph(F) | —CH$_2$CH$_2$OC$_4$H$_9$-n |
| 371 | 4 | Ph(F) | —CH$_2$O— | Ph—COO—Ph | —CH(CH$_3$)C$_8$H$_{17}$-n |
| 372 | 19 | Ph | —CH$_2$O— | BiPh | —CH(CH$_3$)C$_6$H$_{13}$-n |
| 373 | 19 | Ph(F) | —COO— | BiPh | —C$_6$H$_{13}$-n |

EX. C.: Exemplified Compounds

TABLE 3

In Formula (1), A is 1,4-phenylene group; $Y_1$ is —O— group

| EX. C. | m | A | Z1 | B | R1 |
|---|---|---|---|---|---|
| 374 | 8 | Ph | —CH$_2$O— | Nap | —CH(CH$_3$)CH$_2$OC$_6$H$_{13}$-n |
| 375 | 10 | Ph | —CH$_2$O— | Ph—CH$_2$O—Ph | —CH(CH$_3$)CH$_2$OC$_4$H$_9$-n |
| 376 | 3 | Ph | —CH$_2$O— | BiPh | —CH(CH$_3$)C$_8$H$_{17}$-n |
| 377 | 3 | Ph | —COO— | Ph(F) | —(CH$_2$)$_3$CH(CH$_3$)C$_2$H$_5$ |
| 378 | 8 | (Cl)Ph | —COO— | BiPh | —CH(CH$_3$)CH$_2$OC$_4$H$_9$-n |
| 379 | 6 | Ph | —COO— | Ph | —CH(CH$_3$)C$_2$H$_5$ |
| 380 | 10 | Ph(F) | —CH$_2$O— | (F)BiPh | —CH(CH$_3$)CH$_2$OC$_6$H$_{13}$-n |
| 381 | 13 | Ph | —CH$_2$O— | BiPh | —CH$_2$CH(CH$_3$)C$_4$H$_9$-n |
| 382 | 6 | Ph | —COO— | BiPh | —CH(CH$_3$)C$_6$H$_{13}$-n |
| 383 | 13 | Ph | —CH$_2$O— | Ph(F) | —CH$_2$CH(CH$_3$)C$_2$H$_5$ |
| 384 | 5 | Ph | —COO— | Nap | —CH$_2$CH$_2$CH(CH$_3$)C$_2$H$_5$ |
| 385 | 3 | Ph | —COO— | Nap | —CH(CH$_3$)C$_6$H$_{13}$-n |
| 386 | 5 | Ph | —CH$_2$O— | Ph—COO—Ph | —CH$_2$CH(CH$_3$)C$_2$H$_5$ |
| 387 | 8 | Ph | —COO— | BiPh(F) | —CH$_2$CH$_2$OC$_6$H$_{13}$-n |
| 388 | 20 | Ph | —CH$_2$O— | Nap | —CH(CH$_3$)CH$_2$C$_2$OC$_3$H$_7$-n |
| 389 | 11 | Ph | —CH$_2$O— | BiPh(F) | —CH(CH$_3$)C$_4$H$_9$-n |
| 390 | 6 | Ph | —COO— | BiPh(F) | —CH$_2$CH$_2$OC$_6$H$_{13}$-n |
| 391 | 6 | (Cl)Ph | —COO— | Ph—COO—Ph | —CH$_2$CH(CH$_3$)C$_2$H$_5$ |
| 392 | 8 | Ph | —COO— | Ph—OCO—Ph | —CH(CH$_3$)C$_6$H$_{13}$-n |
| 393 | 10 | Ph | —CH$_2$O— | (F)Ph | —CH$_2$CH(CH$_3$)C$_2$H$_5$ |
| 394 | 6 | Ph | —COO— | Ph—CH$_2$O—Ph(F) | —CH$_2$CH$_2$OC$_4$H$_9$-n |
| 395 | 8 | Ph | —CH$_2$O— | Ph—CH$_2$—Ph | —CH$_2$CH$_2$C$_4$F$_9$-n |
| 396 | 2 | Ph | —COO— | Ph | —CH(CH$_3$)C$_4$H$_9$-n |
| 397 | 2 | Ph | —COO— | Ph—OCO—Ph | —CH(CH$_3$)CH$_2$OC$_6$H$_{13}$-n |
| 398 | 5 | Ph | —COO— | Ph(F) | —CH$_2$CH(CH$_3$)C$_4$H$_9$-n |
| 399 | 8 | Ph | —COO— | Ph—OCO—Ph | —(CH$_2$)$_6$OC$_2$H$_5$ |
| 400 | 6 | (F)Ph | —COO— | Ph(F) | —CH$_2$CH$_2$C$_4$F$_9$-n |
| 401 | 4 | Ph | —CH$_2$O | (F)BiPh | —CH$_2$CH(CH$_3$)C$_4$H$_9$-n |
| 402 | 17 | Ph | —CH$_2$O— | (F)BiPh | —CH(CH$_3$)CH$_2$OC$_6$H$_{13}$-n |
| 403 | 5 | (F)Ph | —COO— | Nap | —CH(CH$_3$)C$_2$H$_5$ |
| 404 | 13 | Ph | —CH$_2$O— | (F)BiPh | —CH(CH$_3$)C$_6$H$_{13}$-n |
| 405 | 16 | Ph | —COO— | Nap | —(CH$_2$)$_6$OC$_2$H$_5$ |
| 406 | 5 | (F)Ph | —CH$_2$O— | Ph—CH$_2$O—Ph(F) | —CH$_2$CH$_2$OC$_4$H$_9$-n |
| 407 | 14 | Ph | —CH$_2$O— | Ph—COO—Ph | —(CH$_2$)$_3$CH(CH$_3$)C$_2$H$_5$ |
| 408 | 5 | (F)Ph | —COO— | BiPh | —CH(CH$_3$)C$_6$H$_{13}$-n |
| 409 | 18 | (Cl)Ph | —COO— | (F)BiPh | —CH(CH$_3$)CH$_2$OC$_4$H$_9$-n |
| 410 | 4 | Ph | —COO— | Ph—OCO—Ph | —CH$_2$CH$_2$OC$_4$H$_9$-n |
| 411 | 8 | Ph | —COO— | BiPh | —CH(CH$_3$)C$_8$H$_{17}$-n |
| 412 | 8 | Ph | —COO— | Ph | —CH(CH$_3$)C$_8$H$_{17}$-n |
| 413 | 10 | Ph | —COO— | BiPh | —CH$_2$CH(Cl)CH$_2$CH(CH$_3$)$_2$ |
| 414 | 4 | Ph | —CH$_2$O— | (F)BiPh | —CH$_2$CH(CH$_3$)C$_2$H$_5$ |
| 415 | 6 | Ph | —CH$_2$O— | (F)BiPh | —CH(CH$_3$)C$_6$H$_{13}$-n |
| 416 | 6 | Ph | —COO— | Ph—COO—Ph | —CH(CH$_3$)C$_7$H$_{15}$-n |
| 417 | 8 | Ph | —COO— | (F)Ph | —CH$_2$CH(CH$_3$)C$_2$H$_5$ |
| 418 | 6 | (Cl)Ph | —COO— | Ph—CH$_2$—Ph | —CH$_2$CH(Cl)CH$_2$CH(CH$_3$)$_2$ |
| 419 | 6 | Ph | —COO— | BiPh | —(CH$_2$)$_6$OC$_2$H$_5$ |
| 420 | 10 | Ph | —CH$_2$O— | BiPh(F) | —CH(CH$_3$)CH$_2$OC$_4$H$_9$-n |
| 421 | 10 | Ph | —COO— | Ph(F) | —CH$_2$CH$_2$C$_4$F$_9$-n |
| 422 | 5 | Ph | —COO— | (F)Ph | —CH(CH$_3$)CH$_2$C$_2$OC$_3$H$_7$-n |
| 423 | 9 | Ph | —COO— | BiPh | —CH$_2$CH(Cl)CH$_2$CH(CH$_3$)$_2$ |
| 424 | 5 | Ph | —CH$_2$O— | Nap | —CH(CH$_3$)C$_4$H$_9$-n |
| 425 | 8 | Ph | —COO— | BiPh | —CH$_2$CH$_2$OC$_4$H$_6$-n |
| 426 | 6 | Ph | —COO— | BiPh | —CH$_2$CH$_2$OC$_4$H$_9$-n |
| 427 | 10 | (Cl)Ph | —COO— | Ph(F) | —(CH$_2$)$_3$CH(CH$_3$)C$_2$H$_5$ |
| 428 | 8 | (Cl)Ph | —COO— | BiPh(F) | —CH$_2$CH(CH$_3$)C$_4$H$_9$-n |
| 429 | 15 | Ph | —CH$_2$O— | Ph—CH$_2$O—Ph(F) | —CH(CH$_3$)C$_7$H$_{15}$-n |
| 430 | 10 | Ph | —CH$_2$O— | Nap | —(CH$_2$)$_3$CH(CH$_3$)C$_2$H$_5$ |
| 431 | 8 | Ph | —CH$_2$O— | Ph(F) | —CH$_2$CH(CH$_3$)C$_2$H$_5$ |
| 432 | 2 | Ph | —COO— | Ph | —CH$_2$CH$_2$C$_4$F$_9$-n |
| 433 | 6 | Ph | —COO— | BiPh | —CH$_2$CH$_2$OC$_6$H$_{13}$-n |
| 434 | 8 | Ph | —COO— | BiPh(F) | —CH(CH$_3$)C$_6$H$_{13}$-n |
| 435 | 6 | Ph | —COO— | Ph—COO—Ph | —CH(CH$_3$)C$_6$H$_{13}$-n |
| 436 | 6 | Ph | —COO— | Ph—OCO—Ph | —CH(CH$_3$)CH$_2$OC$_6$H$_{13}$-n |
| 437 | 17 | Ph | —CH$_2$O— | (F)BiPh | —CH(CH$_3$)C$_6$H$_{13}$-n |
| 438 | 8 | Ph | —COO— | Ph—OCO—Ph | —CH$_2$CH(Cl)CH$_2$CH(CH$_3$)$_2$ |
| 439 | 13 | Ph | —CH$_2$O— | BiPh | —CH(CH$_3$)CH$_2$OC$_4$H$_9$-n |
| 440 | 6 | Ph | —COO— | BiPh(F) | —CH(CH$_3$)C$_6$H$_{13}$-n |
| 441 | 8 | (Cl)Ph | —CH$_2$O— | BiPh | —CH(CH$_3$)C$_2$H$_5$ |
| 442 | 5 | Ph | —COO— | Ph | —CH$_2$CH(CH$_3$)C$_2$H$_5$ |
| 443 | 12 | Ph | —CH$_2$O— | (F)Ph | —CH$_2$CH(CH$_3$)C$_2$H$_5$ |
| 444 | 3 | (Cl)Ph | —COO— | Nap | —CH$_2$CH$_2$OC$_2$H$_5$ |
| 445 | 10 | Ph | —CH$_2$O— | Ph | —CH$_2$CH$_2$OC$_6$H$_{13}$-n |
| 446 | 16 | (F)Ph | —COO— | Ph | —CH(CH$_3$)C$_6$Hl 3-n |
| 447 | 4 | Ph(F) | —CH$_2$O— | (F)Ph | —CH$_2$CH$_2$CH(CH$_3$)C$_2$H$_5$ |
| 448 | 6 | Ph | —COO— | Ph(F) | —CH$_2$CH$_2$C$_4$F$_9$-n |

TABLE 3-continued

In Formula (1), A is 1,4-phenylene group; $Y_1$ is —O— group

| EX. C. | m | A | Z1 | B | R1 |
|---|---|---|---|---|---|
| 449 | 2 | Ph | —COO— | BiPh | —CH$_2$CH$_2$OC$_4$H$_9$-n |
| 450 | 5 | Ph | —COO— | Ph—CH$_2$O—Ph | —CH$_2$CH(CH$_3$)C$_2$H$_5$ |
| 451 | 5 | Ph | —CH$_2$O— | Ph | —CH$_2$CH$_2$OC$_6$H$_{13}$-n |
| 452 | 8 | Ph | —COO— | BiPh | —CH(CH$_3$)C$_6$H$_{13}$-n |
| 453 | 12 | Ph | —COO— | BiPh | —CH(CH$_3$)C$_4$H$_9$-n |
| 454 | 6 | Ph | —CH$_2$O— | Nap | —CH$_2$CH(Cl)CH$_2$CH(CH$_3$)$_2$ |
| 455 | 6 | Ph | —COO— | Ph—OCO—Ph | —CH(CH$_3$)C$_2$H$_5$ |
| 456 | 5 | Ph | —CH$_2$O— | Ph | —CH$_2$CH(CH$_3$)C$_2$H$_5$ |
| 457 | 8 | Ph | —COO— | BiPh | —CH$_2$CH$_2$OC$_6$H$_{13}$-n |
| 458 | 2 | Ph | —COO— | Ph—CH$_2$O—Ph(F) | —CH(CH$_3$)CH$_2$OC$_6$H$_{13}$-n |
| 459 | 12 | Ph(F) | —COO— | BiPh | —CH(CH$_3$)C$_7$H$_{15}$-n |
| 460 | 6 | Ph | —CH$_2$O— | BiPh | —CH$_2$CH$_2$OC$_6$H$_{13}$-n |
| 461 | 5 | Ph | —CH$_2$O— | BiPh | —CH$_2$CH(CH$_3$)C$_2$H$_5$ |
| 462 | 8 | Ph | —COO— | Ph—COO—Ph | —CH$_2$CH(Cl)CH$_2$CH(CH$_3$)$_2$ |
| 463 | 19 | Ph(F) | —CH$_2$O— | (F)Ph | —CH$_2$CH$_2$OC$_6$H$_{13}$-n |
| 464 | 10 | Ph | —CH$_2$O— | BiPh | —CH(CH$_3$)C$_8$H$_{17}$-n |
| 465 | 6 | Ph | —COO— | Ph—CH$_2$O—Ph(F) | —CH(CH$_3$)C$_2$H$_5$ |
| 466 | 5 | Ph | —CH$_2$O— | Nap | —CH$_2$CH(CH$_3$)C$_2$H$_5$ |
| 467 | 6 | Ph | —COO— | Nap | —CH$_2$CH$_2$OC$_4$H$_9$-n |
| 468 | 6 | Ph | —COO— | (F)BiPh | —CH(CH$_3$)C$_6$H$_{13}$-n |
| 469 | 6 | Ph | —COO— | Ph—COO—Ph | —CH$_2$CH$_2$CH(CH$_3$)C$_2$H$_5$ |
| 470 | 6 | Ph | —CH$_2$O— | BiPh(F) | —CH$_2$CH$_2$OC$_4$H$_9$-n |
| 471 | 6 | (Cl)Ph | —COO— | Ph—CH$_2$O—Ph | —CH(CH$_3$)CH$_2$OC$_4$H$_9$-n |
| 472 | 18 | Ph | —CH$_2$O— | Ph—CH$_2$—Ph | —CH$_2$CH$_2$OC$_6$H$_{13}$-n |
| 473 | 21 | Ph | —CH$_2$O— | Ph—COO—Ph | —CH$_2$CH$_2$OC$_6$H$_{13}$-n |
| 474 | 6 | Ph | —COO— | Ph | —CH$_2$CH(CH$_3$)C$_2$H$_5$ |
| 475 | 5 | Ph | —COO— | Ph—OCO—Ph | —CH(CH$_3$)C$_8$H$_{17}$-n |
| 476 | 10 | Ph | —COO— | BiPh | —CH(CH$_3$)CH$_2$OC$_4$H$_9$-n |
| 477 | 10 | Ph | —COO— | BiPh | —CH$_2$CH$_2$CH(CH$_3$)C$_2$H$_5$ |
| 478 | 6 | Ph | —CH$_2$O— | Ph—OCO—Ph | —CH$_2$CH(CH$_3$)C$_2$H$_5$ |
| 479 | 5 | Ph | —CH$_2$O— | Ph—OCO—Ph | —CH(CH$_3$)C$_6$H$_{13}$-n |
| 480 | 6 | Ph | —CH$_2$O— | Nap | —CH(CH$_3$)C$_8$H$_{17}$-n |
| 481 | 6 | Ph | —CH$_2$O— | BiPh | —CH(CH$_3$)C$_8$H$_{17}$-n |
| 482 | 10 | Ph(F) | —CH$_2$O— | BiPh | —CH$_2$CH$_2$OC$_4$H$_9$-n |
| 483 | 8 | Ph | —COO— | Ph | —(CH$_2$)$_3$CH(CH$_3$)C$_2$H$_5$ |
| 484 | 10 | (Cl)Ph | —CH$_2$O— | Ph—CH$_2$O—Ph | —CH(CH$_3$)CH$_2$C$_2$OC$_3$H$_7$-n |
| 485 | 21 | Ph | —COO— | BiPh | —CH(CH$_3$)C$_8$H$_{17}$-n |
| 486 | 17 | Ph | —COO— | Ph | —(CH$_2$)$_3$CH(CH$_3$)C$_2$H$_5$ |
| 487 | 6 | Ph | —COO— | Nap | —CH(CH$_3$)C$_4$H$_9$-n |
| 488 | 7 | (Cl)Ph | —COO— | Ph | —CH(CH$_3$)C$_2$H$_5$ |
| 489 | 3 | (F)Ph | —COO— | Ph | —CH$_2$CH$_2$C$_4$F$_9$-n |
| 490 | 5 | Ph | —COO— | BiPh | —CH(CH$_3$)C$_8$H$_{17}$-n |
| 491 | 6 | Ph | —COO— | Ph—COO—Ph | —CH$_2$CH(CH$_3$)C$_2$H$_5$ |
| 492 | 17 | Ph | —CH$_2$O— | BiPh | —CH$_2$CH(Cl)CH$_2$CH(CH$_3$)$_2$ |
| 493 | 8 | (F)Ph | —COO— | Nap | —CH$_2$CH$_2$OC$_4$H$_9$-n |
| 494 | 20 | Ph | —COO— | Ph(F) | —CH$_2$CH(CH$_3$)C$_2$H$_5$ |
| 495 | 5 | Ph | —CH$_2$O— | Ph(F) | —CH$_2$CH$_2$OC$_4$H$_9$-n |
| 496 | 3 | Ph | —COO— | BiPh | —(CH$_2$)$_6$OC$_2$H$_5$ |
| 497 | 6 | (F)Ph | —CH$_2$O— | Nap | —CH$_2$CH$_2$OC$_6$H$_{13}$-n |
| 498 | 8 | Ph | —COO— | Nap | —CH(CH$_3$)CH$_2$OC$_6$H$_{13}$-n |
| 499 | 8 | Ph(F) | —CH$_2$O— | Ph—OCO—Ph | —CH(CH$_3$)CH$_2$C$_2$OC$_3$H$_7$-n |
| 500 | 20 | (Cl)Ph | —CH$_2$O— | BiPh | —CH(CH$_3$)CH$_2$OC$_6$H$_{13}$-n |
| 501 | 6 | Ph | —CH$_2$O— | BiPh | —CH$_2$CH(CH$_3$)C$_2$H$_5$ |
| 502 | 16 | Ph | —CH$_2$O— | Nap | —CH$_2$CH(CH$_3$)C$_4$H$_9$-n |
| 503 | 5 | Ph | —CH$_2$O— | Ph—CH$_2$—Ph | —CH$_2$CH$_2$CH(CH$_3$)C$_2$H$_5$ |
| 504 | 16 | Ph(F) | —CH$_2$O— | Ph—COO—Ph | —CH$_2$CH$_2$C$_4$F$_9$-n |
| 505 | 3 | Ph | —CH$_2$O— | Ph | —CH$_2$CH$_2$C$_4$F$_9$-n |
| 506 | 6 | Ph | —CH$_2$O— | BiPh | —CH(CH$_3$)C$_6$H$_{13}$-n |
| 507 | 5 | Ph(F) | —CH$_2$O— | Nap | —CH$_2$CH$_2$OC$_6$H$_{13}$-n |
| 508 | 4 | Ph | —COO— | Ph—COO—Ph | —CH(CH$_3$)C$_7$H$_{15}$-n |
| 509 | 5 | Ph | —COO— | BiPh | —CH(CH$_3$)C$_6$H$_{13}$-n |
| 510 | 10 | Ph | —CH$_2$O— | (F)Ph | —CH$_2$CH$_2$OC$_4$H$_9$-n |
| 511 | 8 | Ph(F) | —COO— | Ph | —CH(CH$_3$)C$_8$H$_{17}$-n |
| 512 | 17 | Ph | —COO— | (F)BiPh | —CH$_2$CH(CH$_3$)C$_2$H$_5$ |
| 513 | 6 | Ph | —COO— | Ph—CH$_2$—Ph | —(CH$_2$)$_6$OC$_2$H$_5$ |
| 514 | 17 | (Cl)Ph | —COO— | BiPh | —CH$_2$CH(CH$_3$)C$_4$H$_9$-n |
| 515 | 4 | Ph | —COO— | Nap | —CH$_2$CH(Cl)CH$_2$CH(CH$_3$)$_2$ |
| 516 | 5 | Ph | —COO— | BiPh | —CH(CH$_3$)C$_7$H$_{15}$-n |
| 517 | 6 | Ph | —COO— | Ph—CH$_2$O—Ph(F) | —CH(CH$_3$)C$_6$H$_{13}$-n |
| 518 | 16 | (Cl)Ph | —CH$_2$O— | BiPh | —CH$_2$CH(CH$_3$)C$_2$H$_5$ |
| 519 | 6 | Ph | —COO— | Ph—OCO—Ph | —CH$_2$CH(CH$_3$)C$_2$H$_5$ |
| 520 | 4 | Ph | —COO— | Ph | —CH$_2$CH(CH$_3$)C$_4$H$_9$-n |
| 521 | 6 | Ph | —CH$_2$O— | Ph—OCO—Ph | —CH(CH$_3$)C$_6$H$_{13}$-n |
| 522 | 13 | Ph | —COO— | BiPh | —CH(CH$_3$)C$_6$H$_{13}$-n |
| 523 | 8 | Ph | —CH$_2$O— | BiPh | —CH$_2$CH(CH$_3$)C$_2$H$_5$ |

TABLE 3-continued

In Formula (1), A is 1,4-phenylene group; Y₁ is —O— group

| EX. C. | m | A | Z1 | B | R1 |
|---|---|---|---|---|---|
| 524 | 8 | Ph | —CH₂O— | Ph(F) | —CH(CH₃)C₆H₁₃-n |
| 525 | 3 | Ph | —CH₂O— | Ph | —CH₂CH(CH₃)C₂H₅ |
| 526 | 6 | Ph | —COO— | BiPh | —CH₂CH(CH₃)C₂H₅ |
| 527 | 8 | (Cl)Ph | —CH₂O— | Nap | —CH(CH₃)CH₂OC₄H₉-n |
| 528 | 10 | Ph | —COO— | Ph(F) | —CH(CH₃)C₈H₁₇-n |
| 529 | 10 | Ph(F) | —CH₂O | Ph—CH₂O—Ph | —CH₂CH₂OC₆H₁₃-n |
| 530 | 6 | Ph | —COO— | Ph—OCO—Ph | —CH(CH₃)C₆H₁₃-n |
| 531 | 6 | Ph | —COO— | BiPh | —CH(CH₃)C₈H₁₇-n |
| 532 | 4 | Ph | —COO— | (F)BiPh | —CH₂CH(CH₃)C₄H₉-n |
| 533 | 17 | Ph | —COO— | Ph—COO—Ph | —CH(CH₃)C₇H₁₅-n |
| 534 | 5 | Ph | —COO— | BiPh | —CH₂C₂C₄F₉-n |
| 535 | 17 | Ph | —CH₂O— | Ph—CH₂O—Ph | —CH(CH₃)C₇H₁₅-n |
| 536 | 6 | Ph | —CH₂O— | Ph | —CH₂CH(CH₃)C₂H₅ |
| 537 | 10 | (Cl)Ph | —CH₂O— | Ph—COO—Ph | —CH(CH₃)CH₂OC₆H₁₃-n |
| 538 | 8 | Ph | —CH₂O— | Nap | —CH₂CH₂OC₆H₁₃-n |
| 539 | 16 | Ph | —CH₂O— | BiPh | —CH₂CH₂OC₄H₉-n |
| 540 | 6 | (F)Ph | —CH₂O— | Ph | —CH(CH₃)C₆H₁₃-n |
| 541 | 6 | (F)Ph | —COO— | (F)BiPh | —(CH₂)₃CH(CH₃)C₂H₅ |
| 542 | 8 | (Cl)Ph | —CH₂O— | Ph—COO—Ph | —CH₂CH₂OC₂H₅ |
| 543 | 17 | Ph | —CH₂O— | (F)BiPh | —CH₂CH(CH₃)C₂H₅ |
| 544 | 5 | Ph | —CH₂O— | Ph—CH₂—Ph | —CH₂CH₂OC₄H₉-n |
| 545 | 21 | Ph | —CH₂O— | BiPh(F) | —CH₂CH(CH₃)C₂H₅ |
| 546 | 8 | Ph(F) | —COO— | Nap | —CH(CH₃)C₂H₅ |
| 547 | 6 | Ph | —CH₂O— | Ph(F) | —CH₂CH₂OC₄H₉-n |
| 548 | 16 | Ph | —CH₂O— | Ph | —CH(CH₃)C₈H₁₇-n |
| 549 | 6 | Ph | —CH₂O— | Ph—COO—Ph | —CH(CH₃)CH₂OC₆H₁₃-n |
| 550 | 4 | Ph | —CH₂O— | (F)Ph | —CH₂CH₂OC₄H₉-n |
| 551 | 17 | Ph | —CH₂O— | Ph—COO—Ph | —CH₂CH₂OC₄H₉-n |
| 552 | 8 | Ph | —CH₂O— | Ph(F) | —CH(CH₃)CH₂OC₄H₉-n |
| 553 | 5 | Ph | —CH₂O— | BiPh(F) | —CH(CH₃)C₆H₁₃-n |
| 554 | 6 | Ph | —CH₂O— | Nap | —CH₂CH(CH₃)C₂H₅ |
| 555 | 21 | Ph | —COO— | (F)BiPh | —CH(CH₃)CH₂OC₆H₁₃-n |
| 556 | 5 | Ph | —COO— | Ph(F) | —CH₂CH(CH₃)C₂H₅ |
| 557 | 7 | Ph | —CH₂O— | BiPh | —CH(CH₃)C₆H₁₃-n |
| 558 | 5 | Ph | —CH₂O— | Ph—OCO—Ph | —CH₂CH(CH₃)C₄H₉-n |
| 559 | 6 | Ph | —COO— | Ph—OCO—Ph | —CH₂C₂C₄F₉-n |
| 560 | 21 | Ph | —COO— | BiPh | —CH(CH₃)C₄H₉-n |
| 561 | 6 | Ph | —CH₂O— | Ph | —CH(CH₃)CH₂C₂OC₃H₇-n |
| 562 | 16 | Ph | —COO— | Ph | —CH(CH₃)C₈H₁₇-n |
| 563 | 6 | Ph | —COO— | Nap | —CH₂CH(CH₃)C₂H₅ |
| 564 | 10 | Ph | —CH₂O— | Ph—OCO—Ph | —CH(CH₃)CH₂OC₄H₉-n |
| 565 | 9 | Ph | —COO— | BiPh | —CH₂CH(CH₃)C₂H₅ |
| 566 | 17 | Ph | —CH₂O— | (F)Ph | —CH(CH₃)C₆H₁₃-n |
| 567 | 8 | Ph | —CH₂O— | Nap | —(CH₂)₆OC₂H₅ |
| 568 | 8 | Ph | —CH₂O— | (F)Ph | —CH(CH₃)C₆H₁₃-n |
| 569 | 7 | (Cl)Ph | —CH₂O— | Ph—COO—Ph | —CH(CH₃)C₄H₉-n |
| 570 | 6 | Ph | —CH₂O— | Ph—COO—Ph | —CH(CH₃)C₆H₁₃-n |
| 571 | 20 | Ph | —COO— | Ph—COO—Ph | —CH₂CH₂OC₄H₉-n |
| 572 | 16 | Ph | —CH₂O— | BiPh | —CH(CH₃)CH₂OC₆H₁₃-n |
| 573 | 9 | Ph | —CH₂O— | Nap | —CH₂CH₂OC₄H₉-n |
| 574 | 9 | Ph | —COO— | Ph | —CH₂CH(CH₃)C₂H₅ |
| 575 | 14 | Ph | —COO— | BiPh | —CH(CH₃)CH₂OC₆H₁₃-n |
| 576 | 6 | Ph | —CH₂O— | Ph—CH₂O—Ph | —CH(CH₃)C₆H₁₃-n |
| 577 | 10 | Ph | —CH₂O— | Ph—COO—Ph | —CH₂C₂C₄F₉-n |
| 578 | 4 | Ph | —CH₂O— | Ph—CH₂—Ph | —CH₂CH₂OC₄H₉-n |
| 579 | 2 | Ph | —CH₂O— | BiPh | —CH(CH₃)C₆H₁₃-n |
| 580 | 8 | Ph | —COO— | Ph—OCO—Ph | —CH₂CH(CH₃)C₂H₅ |
| 581 | 8 | (Cl)Ph | —CH₂O— | Ph | —(CH₂)₆OC₂H₅ |

EX. C.: Exemplified Compounds

TABLE 4

In Formula (1), A is 1,4'-phenylene group; Y₁ is —COO— group

| EX. C. | m | A | Z1 | B | R1 |
|---|---|---|---|---|---|
| 582 | 6 | BiPh(F) | —COO— | (F)BiPh | —CH(CH₃)C₆H₁₃-n |
| 583 | 14 | BiPh | —COO— | Ph—CH₂O—Ph | —CH(CH₃)C₈H₁₇-n |
| 584 | 4 | (Cl)BiPh | —CH₂O— | BiPh | —CH(CH₃)CH₂OC₄H₉-n |
| 585 | 10 | BiPh(F) | —COO— | Tetra | —CH(CH₃)C₆H₁₃-n |
| 586 | 5 | BiPh | —COO— | Ph | —CH(CH₃)C₂H₅ |
| 587 | 16 | (Cl)BiPh | —COO— | Ph | —CH(CF₃)C₆H₁₃-n |

TABLE 4-continued

In Formula (1), A is 1,4'-phenylene group; Y₁ is —COO— group

| EX. C. | m | A | Z1 | B | R1 |
|---|---|---|---|---|---|
| 588 | 5 | BiPh | —COO— | Ph | —CH(CH$_3$)C$_6$H$_{13}$-n |
| 589 | 14 | BiPh | —COO— | Ph—CH$_2$O—Ph | —CH(CH$_3$)C$_4$H$_9$-n |
| 590 | 6 | BiPh | —COO— | Ph | —CH(CF$_3$)CH$_2$CH$_2$OC$_2$H$_5$ |
| 591 | 5 | (F)BiPh | —CH$_2$O— | Ph—OCO—Ph | —CH(CF$_3$)C$_2$H$_5$ |
| 592 | 2 | BiPh | —COO— | Tetra | —CH(CH$_3$)C$_6$H$_{13}$-n |
| 593 | 12 | BiPh | —CH$_2$O— | Ph—COO—Ph | —CH$_2$CH(CH$_3$)C$_2$H$_5$ |
| 594 | 10 | BiPh | —CH$_2$O— | Ph | —CH(CF$_3$)CH$_2$CH$_2$OC$_2$H$_5$ |
| 595 | 6 | BiPh | —CH$_2$O— | Ph—CH$_2$O—Ph | —CH(CF$_3$)(CH$_2$)$_5$OC$_2$H$_5$ |
| 596 | 10 | BiPh(F) | —CH$_2$O— | Ph | —(CH$_2$)$_3$CH(CH$_3$)C$_2$H$_5$ |
| 597 | 5 | BiPh(F) | —CH$_2$O— | Ph—OCO—Ph | —CH(CH$_3$)C$_5$H$_{11}$-n |
| 598 | 3 | BiPh | —COO— | Ph(F)—Ph | —CH(CH$_3$)C$_4$H$_9$-n |
| 599 | 9 | (Cl)BiPh | —COO— | Ph | —CH(CH$_3$)C$_6$H$_{13}$-n |
| 600 | 7 | BiPh | —COO— | Ph | —CH(CF$_3$)C$_5$H$_{11}$-n |
| 601 | 8 | (F)BiPh | —COO— | Nap | —CH(CH$_3$)C$_6$H$_{13}$-n |
| 602 | 5 | BiPh | —CH$_2$O— | Nap | —CH(CH$_3$)C$_8$H$_{17}$-n |
| 603 | 6 | BiPh | —COO— | Ph | —CH(CH$_3$)C$_7$H$_{15}$-n |
| 604 | 6 | (F)BiPh | —COO— | Ph—COO—Ph | —CH(CH$_3$)CH$_2$OC$_4$H$_9$-n |
| 605 | 10 | BiPh | —COO— | Tetra | —CH(CF$_3$)(CH$_2$)$_5$OC$_2$H$_5$ |
| 606 | 8 | (F)BiPh | —COO— | Nap | —(CH$_2$)$_3$CH(CH$_3$)C$_2$H$_5$ |
| 607 | 5 | BiPh | —CH$_2$O— | BiPh | —CH(CH$_3$)C$_8$H$_{17}$-n |
| 608 | 6 | (F)BiPh | —COO— | Ph(F)Ph | —CH(CH$_3$)CH$_2$OC$_4$H$_9$-n |
| 609 | 8 | BiPh | —CH$_2$O— | Ph(F) | —CH(CH$_3$)CH$_2$OC$_6$H$_{13}$-n |
| 610 | 4 | BiPh | —COO— | Ph—CH$_2$—Ph | —CH$_2$CH(CH$_3$)C$_2$H$_5$ |
| 611 | 6 | BiPh | —COO— | Ph(F) | —CH(CF$_3$)CH$_2$OC$_4$H$_9$-n |
| 612 | 8 | BiPh | —COO— | Ph—(F)Ph | —CH(CH$_3$)C$_7$H$_{15}$-n |
| 613 | 3 | BiPh | —COO— | Tetra | —CH(CH$_3$)C$_8$H$_{17}$-n |
| 614 | 10 | BiPh | —CH$_2$O— | Ph—CH$_2$O—Ph | —CH(CF$_3$)(CH$_2$)$_5$OC$_2$H$_5$ |
| 615 | 8 | BiPh | —COO— | Ph | —CH(CH$_3$)CH$_2$OC$_4$H$_9$-n |
| 616 | 6 | BiPh | —COO— | Ph | —CH(CH$_3$)C$_6$H$_{13}$-n |
| 617 | 6 | BiPh | —CH$_2$O— | Nap | —CH$_2$CH$_2$C$_4$F$_9$-n |
| 618 | 6 | BiPh | —COO— | Tetra | —CH(CF$_3$)(CH$_2$)$_5$OC$_2$H$_5$ |
| 619 | 6 | BiPh | —CH$_2$O— | Nap | —CH(CH$_3$)CH$_2$OC$_4$H$_9$-n |
| 620 | 5 | BiPh | —CH$_2$O— | Tetra | —CH(CH$_3$)C$_2$H$_5$ |
| 621 | 12 | BiPh | —CH$_2$O— | Ph—OCO—Ph | —CH(CF$_3$)C$_2$H$_5$ |
| 622 | 8 | BiPh | —CH$_2$O— | Ph | —CH$_2$CH$_2$OC$_6$H$_{13}$-n |
| 623 | 4 | BiPh | —CH$_2$O— | Nap | —CH$_2$CH$_2$C$_4$F$_9$-n |
| 624 | 2 | BiPh(F) | —COO— | Ph—CH$_2$—Ph | —CH(CH$_3$)C$_8$H$_{17}$-n |
| 625 | 12 | BiPh | —CH$_2$O— | Ph(F) | —CH$_2$CH$_2$C$_4$F$_9$-n |
| 626 | 6 | (F)BiPh | —COO— | Nap | —CH$_2$CH(CH$_3$)C$_2$H$_5$ |
| 627 | 15 | BiPh | —CH$_2$O— | Ph | —CH(CF$_3$)C$_6$H$_{13}$-n |
| 628 | 8 | (F)BiPh | —COO— | Ph | —CH(CH$_3$)C$_6$H$_{13}$-n |
| 629 | 8 | BiPh | —COO— | Ph | —CH(CH$_3$)C$_6$H$_{13}$-n |
| 630 | 6 | BiPh | —CH$_2$O— | Ph(Cl) | —CH(CH$_3$)C$_8$H$_{17}$-n |
| 631 | 9 | BiPh | —COO— | Ph | —CH(CF$_3$)(CH$_2$)$_5$OC$_2$H$_5$ |
| 632 | 18 | BiPh | —COO— | Ph—CH$_2$O—Ph | —CH(CH$_3$)C$_2$H$_5$ |
| 633 | 8 | (F)BiPh | —CH$_2$O— | BiPh | —(CH$_2$)$_3$CH(CH$_3$)C$_2$H$_5$ |
| 634 | 5 | BiPh | —COO— | Ph | —CH(CF$_3$)C$_5$H$_{11}$-n |
| 635 | 8 | (F)BiPh | —COO— | Tetra | —CH(CF$_3$)C$_6$H$_{13}$-n |
| 636 | 8 | (F)BiPh | —CH$_2$O— | Ph | —CH(CH$_3$)C$_2$H$_5$ |
| 637 | 5 | BiPh | —CH$_2$O— | Ph | —CH$_2$CH$_2$OC$_6$H$_{13}$-n |
| 638 | 5 | BiPh | —COO— | BiPh | —CH(CF$_3$)(CH$_2$)$_5$OC$_2$H$_5$ |
| 639 | 6 | (F)BiPh | —COO— | Nap | —CH(CF$_3$)C$_2$H$_5$ |
| 640 | 8 | BiPh | —COO— | Ph | —CH$_2$CH$_2$OC$_6$H$_{13}$-n |
| 641 | 4 | BiPh | —COO— | Ph(F) | —CH(CH$_3$)C$_6$H$_{13}$-n |
| 642 | 8 | BiPh | —CH$_2$O— | Ph—CH$_2$O—Ph | —CH(CF$_3$)C$_2$H$_5$ |
| 643 | 16 | BiPh | —CH$_2$O | Ph(F)Ph | —CH(CF$_3$)C$_4$H$_9$-n |
| 644 | 6 | BiPh | —CH$_2$O— | Ph—CH$_2$—Ph | —CH(CH$_3$)C$_6$H$_{13}$-n |
| 645 | 10 | BiPh | —COO— | Ph—COO—Ph | —CH$_2$CH$_2$C$_4$F$_9$-n |
| 646 | 11 | BiPh | —COO— | Ph(F)—Ph | —CH(CH$_3$)C$_8$H$_{17}$-n |
| 647 | 6 | BiPh | —CH$_2$O— | Ph | —CH(CH$_3$)C$_6$H$_{13}$-n |
| 648 | 18 | BiPh | —COO— | Ph | —CH$_2$CH$_2$C$_4$F$_9$-n |
| 649 | 3 | BiPh(F) | —COO— | (F)BiPh | —CH(CH$_3$)CH$_2$CH$_2$OC$_3$H$_7$-n |
| 650 | 10 | BiPh | —CH$_2$O— | Ph(Cl) | —CH(CH$_3$)C$_7$H$_{15}$-n |
| 651 | 8 | BiPh | —COO— | Ph—COO—Ph | —CH(CH$_3$)CH$_2$OC$_4$H$_9$-n |
| 652 | 8 | BiPh | —CH$_2$O— | Ph—CH$_2$—Ph | —CH(CF$_3$)C$_4$H$_9$-n |
| 653 | 5 | BiPh | —COO— | Ph | —CH$_2$CH$_2$OC$_6$H$_{13}$-n |
| 654 | 8 | (Cl)BiPh | —CH$_2$O— | Ph—CH$_2$O—Ph | —CH(CH$_3$)CH$_2$OC$_4$H$_9$-n |
| 655 | 6 | (F)BiPh | —COO— | Ph | —CH(CH$_3$)C$_7$H$_{15}$-n |
| 656 | 6 | BiPh | —CH$_2$O— | Ph | —CH$_2$CH$_2$OC$_4$H$_9$-n |
| 657 | 8 | BiPh | —COO— | Ph | —CH(CF$_3$)C$_5$H$_{11}$-n |
| 658 | 6 | BiPh(F) | —COO— | Ph | —CH$_2$CH$_2$C$_4$F$_9$-n |
| 659 | 18 | (Cl)BiPh | —CH$_2$O— | Ph—OCO—Ph | —CH(CH$_3$)C$_6$H$_{13}$-n |
| 660 | 18 | BiPh | —CH$_2$O— | Ph | —CH(CH$_3$)CH$_2$OC$_6$H$_{13}$-n |
| 661 | 6 | BiPh | —CH$_2$O— | Tetra | —CH(CF$_3$)CH$_2$CH$_2$OC$_4$H$_9$-n |
| 662 | 16 | (Cl)BiPh | —CH$_2$O— | Nap | —CH(CH$_3$)C$_8$H$_{17}$-n |

TABLE 4-continued

In Formula (1), A is 1,4'-phenylene group; Y$_1$ is —COO— group

| EX. C. | m | A | Z1 | B | R1 |
|---|---|---|---|---|---|
| 663 | 9 | BiPh | —CH$_2$O— | Ph(Cl) | —CH(CF$_3$)C$_5$H$_{11}$-n |
| 664 | 8 | (Cl)BiPh | —COO— | Ph(F)—Ph | —CH$_2$CH$_2$OC$_6$H$_{13}$-n |
| 665 | 10 | BiPh | —COO— | Ph—OCO—Ph | —CH$_2$CH(CH$_3$)C$_2$H$_5$ |
| 666 | 10 | BiPh | —COO— | Ph | —CH(CH$_3$)C$_2$H$_5$ |
| 667 | 8 | (F)BiPh | —CH$_2$O— | Ph | —CH(CH$_3$)C$_8$H$_{17}$-n |
| 668 | 6 | BiPh | —COO— | Nap | —CH(CH$_3$)C$_6$H$_{13}$-n |
| 669 | 8 | BiPh | —CH$_2$O— | Tetra | —CH(CH$_3$)C$_8$H$_{17}$-n |
| 670 | 4 | (F)BiPh | —COO— | Ph—(F)Ph | —CH$_2$CH$_2$C$_4$F$_9$-n |
| 671 | 16 | BiPh | —COO— | Ph—CH$_2$O—Ph | —CH(CH$_3$)C$_8$H$_{17}$-n |
| 672 | 5 | BiPh | —COO— | Ph—OCO—Ph | —CH(CH$_3$)C$_6$H$_{13}$-n |
| 673 | 6 | BiPh | —CH$_2$O— | Nap | —CH(CF$_3$)C$_5$H$_{11}$-n |
| 674 | 12 | BiPh | —COO— | BiPh | —CH(CH$_3$)C$_4$H$_9$-n |
| 675 | 6 | BiPh | —CH$_2$O— | BiPh | —CH$_2$CH(CH$_3$)C$_2$H$_5$ |
| 676 | 8 | (F)BiPh | —CH$_2$O— | Nap | —CH$_2$CH$_2$OC$_4$H$_9$-n |
| 677 | 5 | (Cl)BiPh | —COO— | Ph(F) | —CH(CH$_3$)CH$_2$CH$_2$OC$_3$H$_7$-n |
| 678 | 8 | BiPh | —CH$_2$O— | Ph | —CH(CF$_3$)(CH$_2$)$_5$OC$_2$H$_5$ |
| 679 | 16 | BiPh | —CH$_2$O— | Ph | —(CH$_2$)$_3$CH(CH$_3$)C$_2$H$_5$ |
| 680 | 8 | BiPh | —CH$_2$O— | Ph | —CH(CH$_3$)C$_2$H$_5$ |
| 681 | 5 | (F)BiPh | —CH$_2$O— | Ph—(F)Ph | —CH$_2$CH(CH$_3$)C$_2$H$_5$ |
| 682 | 8 | BiPh | —COO— | Tetra | —CH(CH$_3$)CH$_2$CH$_2$OC$_3$H$_7$-n |
| 683 | 5 | BiPh | —CH$_2$O— | Ph | —CH(CH$_3$)C$_8$H$_{17}$-n |
| 684 | 8 | BiPh | —CH$_2$O— | Ph(F)Ph | —CH(CH$_3$)C$_2$H$_5$ |
| 685 | 8 | BiPh | —CH$_2$O— | Nap | —CH(CF$_3$)C$_4$H$_9$-n |
| 686 | 15 | BiPh | —CH$_2$O— | Ph—OCO—Ph | —CH(CF$_3$)CH$_2$CH$_2$OC$_2$H$_5$ |
| 687 | 4 | BiPh | —CH$_2$O— | Ph | —CH(CF$_3$)C$_6$H$_{13}$-n |
| 688 | 5 | BiPh | —COO— | Nap | —CH(CH$_3$)C$_4$H$_9$-n |
| 689 | 5 | BiPh | —CH$_2$O— | Ph—(F)Ph | —CH$_2$CH(CH$_3$)C$_2$H$_5$ |
| 690 | 8 | BiPh | —CH$_2$O— | BiPh | —CH(CH$_3$)C$_6$H$_{13}$-n |
| 691 | 8 | BiPh | —COO— | Ph | —CH(CH$_3$)C$_2$H$_5$ |
| 692 | 16 | (F)BiPh | —COO— | Nap | —CH$_2$CH(CH$_3$)C$_2$H$_5$ |
| 693 | 8 | BiPh | —CH$_2$O— | Ph—CH$_2$—Ph | —CH(CF$_3$)CH$_2$OC$_4$H$_9$-n |
| 694 | 6 | BiPh | —CH$_2$O— | (F)Ph | —CH(CF$_3$)C$_4$H$_9$-n |
| 695 | 12 | BiPh | —CH$_2$O— | Ph—OCO—Ph | —CH$_2$CH(CH$_3$)C$_2$H$_5$ |
| 696 | 11 | BiPh | —CH$_2$O— | Ph—OCO—Ph | —CH(CF$_3$)CH$_2$OC$_4$H$_9$-n |
| 697 | 5 | BiPh | —CH$_2$O— | (F)BiPh | —CH$_2$CH(CH$_3$)C$_2$H$_5$ |
| 698 | 5 | BiPh | —COO— | Nap | —CH$_2$CH(CH$_3$)C$_2$H$_5$ |
| 699 | 15 | BiPh | —COO— | Nap | —CH(CH$_3$)C$_6$H$_{13}$-n |
| 700 | 3 | BiPh | —CH$_2$O— | Ph—OCO—Ph | —CH(CF$_3$)C$_2$H$_5$ |
| 701 | 7 | BiPh | —COO— | (F)Ph | —CH(CH$_3$)CH$_2$OC$_4$H$_9$-n |
| 702 | 8 | BiPh | —COO— | BiPh | —CH$_2$CH(CH$_3$)C$_2$H$_5$ |
| 703 | 4 | BiPh | —CH$_2$O— | Ph | —CH(CH$_3$)CH$_2$CH$_2$OC$_3$H$_7$-n |
| 704 | 4 | BiPh | —CH$_2$O— | Ph | —CH(CF$_3$)CH$_2$CH$_2$OC$_2$H$_5$ |
| 705 | 6 | BiPh | —CH$_2$O— | Ph—CH$_2$—Ph | —CH(CH$_3$)C$_8$H$_{17}$-n |
| 706 | 6 | BiPh | —COO— | Ph | —CH(CH$_3$)CH$_2$OC$_4$H$_9$-n |
| 707 | 6 | BiPh | —COO— | Ph—COO—Ph | —CH(CH$_3$)C$_8$H$_{17}$-n |
| 708 | 14 | (F)BiPh | —COO— | BiPh | —CH$_2$CH(CH$_3$)C$_2$H$_5$ |
| 709 | 4 | BiPh | —COO— | Ph | —CH(CF$_3$)(CH$_2$)$_5$OC$_2$H$_5$ |
| 710 | 16 | BiPh | —COO— | Ph—CH$_2$O—Ph | —CH(CF$_3$)C$_6$H$_{13}$-n |
| 711 | 6 | BiPh | —COO— | Ph | —CH(CH$_3$)CH$_2$OC$_6$H$_{13}$-n |
| 712 | 15 | BiPh | —COO— | Ph | —CH(CF$_3$)C$_4$H$_9$-n |
| 713 | 5 | BiPh | —CH$_2$O— | Ph(F) | —CH(CF$_3$)C$_5$H$_{11}$-n |
| 714 | 8 | BiPh | —CH$_2$O— | Ph—(F)Ph | —CH(CF$_3$)C$_2$H$_5$ |
| 715 | 4 | BiPh | —COO— | Ph(F) | —CH(CH$_3$)C$_7$H$_{15}$-n |
| 716 | 6 | BiPh | —CH$_2$O— | Ph(F) | —CH(CH$_3$)C$_8$H$_{17}$-n |
| 717 | 6 | BiPh | —COO— | Ph | —CH$_2$CH$_2$OC$_4$H$_9$-n |
| 718 | 6 | BiPh | —COO— | Tetra | —CH(CH$_3$)C$_2$H$_5$ |
| 719 | 6 | BiPh | —COO— | Ph—OCO—Ph | —CH(CH$_3$)C$_7$H$_{15}$-n |
| 720 | 4 | BiPh | —COO— | Ph—CH$_2$O—Ph | —CH(CH$_3$)C$_6$H$_{13}$-n |
| 721 | 4 | BiPh | —CH$_2$O— | (F)Ph | —CH(CH$_3$)C$_2$H$_5$ |
| 722 | 5 | BiPh | —COO— | Ph(Cl) | —CH$_2$CH$_2$C$_4$F$_9$-n |
| 723 | 8 | (Cl)BiPh | —COO— | BiPh | —CH(CH$_3$)CH$_2$OC$_4$H$_9$-n |
| 724 | 6 | BiPh | —CH$_2$O— | Ph | —CH$_2$CH$_2$C$_4$F$_9$-n |
| 725 | 6 | BiPh | —CH$_2$O— | (F)BiPh | —(CH$_2$)$_3$CH(CH$_3$)C$_2$H$_5$ |
| 726 | 6 | BiPh | —COO— | Ph | —CH(CH$_3$)C$_4$H$_9$-n |
| 727 | 6 | BiPh | —CH$_2$O— | Ph(F)—Ph | —CH(CF$_3$)C$_2$H$_5$ |
| 728 | 10 | (F)BiPh | —COO— | Nap | —CH(CH$_3$)C$_7$H$_{15}$-n |
| 729 | 10 | BiPh | —CH$_2$O— | Ph | —CH$_2$CH(CH$_3$)C$_2$H$_5$ |
| 730 | 10 | BiPh | —CH$_2$O— | Ph(F) | —CH(CH$_3$)CH$_2$CH$_2$OC$_3$H$_7$-n |
| 731 | 6 | BiPh | —COO— | Ph | —CH(CH$_3$)C$_5$H$_{11}$-n |
| 732 | 5 | BiPh | —CH$_2$O— | Ph—CH$_2$O—Ph | —CH(CH$_3$)C$_7$H$_{15}$-n |
| 733 | 8 | (F)BiPh | —CH$_2$O— | Ph | —CH(CF$_3$)CH$_2$OC$_4$H$_9$-n |
| 734 | 10 | BiPh | —COO— | Tetra | —CH(CH$_3$)C$_4$H$_9$-n |
| 735 | 5 | BiPh(F) | —CH$_2$O— | Ph | —CH(CH$_3$)C$_6$H$_{13}$-n |
| 736 | 5 | BiPh | —CH$_2$O— | Ph(F) | —CH(CH$_3$)CH$_2$CH$_2$OC$_3$H$_7$-n |
| 737 | 8 | BiPh | —COO— | Ph—COO—Ph | —CH(CH$_3$)C$_6$H$_{13}$-n |

TABLE 4-continued

In Formula (1), A is 1,4'-phenylene group; Y₁ is —COO— group

| EX. C. | m | A | Z1 | B | R1 |
|---|---|---|---|---|---|
| 738 | 6 | BiPh | —CH₂O— | Ph | —CH(CH₃)CH₂OC₆H₁₃-n |
| 739 | 6 | (F)BiPh | —CH₂O— | Ph—CH₂O—Ph | —CH(CH₃)C₄H₉-n |
| 740 | 6 | BiPh | —CH₂O— | Nap | —CH(CF₃)C₆H₁₃-n |
| 741 | 8 | BiPh(F) | —CH₂O— | Tetra | —CH(CF₃)(CH₂)₅OC₂H₅ |
| 742 | 4 | BiPh | —CH₂O— | Ph | —CH(CH₃)C₈H₁₇-n |
| 743 | 8 | BiPh | —COO— | Ph—OCO—Ph | —CH(CH₃)C₈H₁₇-n |
| 744 | 10 | BiPh | —COO— | BiPh | —CH(CH₃)C₆H₁₃-n |
| 745 | 14 | BiPh | —CH₂O— | Ph—OCO—Ph | —CH(CF₃)C₅H₁₁-n |
| 746 | 4 | BiPh | —COO— | Ph | —CH₂CH(CH₃)C₂H₅ |
| 747 | 8 | BiPh | —COO— | Nap | —CH(CH₃)C₆H₁₃-n |
| 748 | 4 | BiPh | —COO— | Nap | —CH(CH₃)C₆H₁₃-n |
| 749 | 12 | BiPh | —COO— | Ph(F) | —CH(CF₃)C₅H₁₁-n |
| 750 | 4 | BiPh | —CH₂O— | Ph—(F)Ph | —CH(CH₃)CH₂CH₂OC₃H₇-n |
| 751 | 6 | BiPh | —COO— | Ph | —CH(CH₃)C₁₂H₂₅-n |
| 752 | 10 | BiPh | —COO— | BiPh | —CH(CF₃)C₂H₅ |
| 753 | 5 | BiPh(F) | —COO— | Ph | —CH(CH₃)C₄H₉-n |
| 754 | 7 | BiPh | —COO— | Ph | —CH(CF₃)CH₂CH₂OC₂H₅ |
| 755 | 6 | BiPh | —CH₂O— | Ph—CH₂—Ph | —CH₂CH(CH₃)C₂H₅ |
| 756 | 6 | BiPh | —CH₂O— | Ph(F)—Ph | —CH₂CH₂OC₄H₉-n |
| 757 | 6 | BiPh | —COO— | Nap | —CH₂CH(CH₃)C₂H₅ |
| 758 | 5 | BiPh | —CH₂O— | Ph | —CH₂CH(CH₃)C₂H₅ |
| 759 | 6 | BiPh | —CH₂O— | Ph(F) | —CH(CF₃)(CH₂)₅OC₂H₅ |
| 760 | 6 | BiPh | —COO— | Nap | —(CH₂)₃CH(CH₃)C₂H₅ |
| 761 | 5 | BiPh | —CH₂O— | Ph—CH₂O—Ph | —CH(CH₃)CH₂OC₄H₉-n |
| 762 | 8 | BiPh | —CH₂O— | Ph—CH₂O—Ph | —CH(CH₃)C₆H₁₃-n |
| 763 | 8 | BiPh | —CH₂O— | Ph—(F)Ph | —CH(CH₃)C₇H₁₅-n |
| 764 | 8 | BiPh(F) | —CH₂O— | Ph | —CH(CH₃)C₂H₅ |
| 765 | 8 | BiPh | —CH₂O— | Ph | —CH(CH₃)C₈H₁₇-n |
| 766 | 10 | BiPh | —COO— | Ph | —CH₂CH(CH₃)C₂H₅ |
| 767 | 8 | BiPh | —COO— | Ph | —CH₂CH(CH₃)C₂H₅ |
| 768 | 8 | BiPh(F) | —COO— | Ph | —CH(CH₃)C₆H₁₃-n |
| 769 | 9 | BiPh | —CH₂O— | Ph | —CH₂CH₂C₄F₉-n |
| 770 | 8 | (F)BiPh | —CH₂O— | Nap | —CH₂CH₂C₄F₉-n |
| 771 | 10 | BiPh | —COO— | Ph(F) | —CH(CH₃)CH₂CH₂OC₃H₇-n |
| 772 | 5 | BiPh | —COO— | Ph(F) | —CH(CH₃)CH₂OC₆H₁₃-n |
| 773 | 5 | BiPh(F) | —CH₂O— | Nap | —CH₂CH(CH₃)C₂H₅ |
| 774 | 5 | BiPh(F) | —CH₂O— | Ph | —CH(CF₃)CH₂OC₄H₉-n |
| 775 | 6 | BiPh | —COO— | Ph(F)—Ph | —CH(CF₃)CH₂CH₂OC₂H₅ |
| 776 | 6 | BiPh | —COO— | (F)Ph | —CH(CH₃)CH₂CH₂OC₃H₇-n |
| 777 | 9 | BiPh | —CH₂O— | Ph(F) | —CH(CH₃)CH₂OC₄H₉-n |
| 778 | 5 | BiPh | —COO— | (F)BiPh | —(CH₂)₃CH(CH₃)C₂H₅ |
| 779 | 8 | BiPh | —COO— | Nap | —CH(CH₃)C₂H₅ |
| 780 | 4 | BiPh | —CH₂O— | Tetra | —CH(CH₃)C₈H₁₇-n |
| 781 | 8 | BiPh | —COO— | Ph—CH₂—Ph | —CH₂CH₂C₄F₉-n |
| 782 | 6 | BiPh | —CH₂O | (F)Ph | —CH(CH₃)C₆H₁₃-n |
| 783 | 3 | BiPh | —COO— | Ph—(F)Ph | —CH(CH₃)C₂H₅ |
| 784 | 4 | BiPh | —CH₂O— | Nap | —CH(CH₃)C₂H₅ |
| 785 | 8 | (Cl)BiPh | —COO— | Ph | —(CH₂)₃CH(CH₃)C₂H₅ |
| 786 | 5 | BiPh | —CH₂O— | Ph—CH₂—Ph | —CH(CH₃)CH₂CH₂OC₃H₇-n |
| 787 | 10 | BiPh | —CH₂O— | (F)Ph | —CH(CH₃)C₆H₁₃-n |
| 788 | 6 | BiPh | —CH₂O— | Tetra | —CH(CF₃)CH₂CH₂OC₂H₅ |
| 789 | 12 | BiPh | —COO— | Ph(F) | —CH(CH₃)C₆H₁₃-n |
| 790 | 8 | BiPh | —CH₂O— | Ph—(F)Ph | —CH₂CH₂C₄F₉-n |

EX. C.: Exemplified Compounds

TABLE 5

In Formula (1), A is 1,4'—biphenylene group; Y₁ —OCO— group

| EX. C | m | A | Z1 | B | R1 |
|---|---|---|---|---|---|
| 791 | 14 | BiPh | —COO— | Ph | —CH₂CH(CH₃)C₂H₅ |
| 792 | 18 | BiPh | —COO— | Tetra | —CH(CH₃)C₇H₁₅-n |
| 793 | 12 | BiPh | —COO— | Nap | —CH₂CH₂C₄F₉-n |
| 794 | 6 | BiPh | —COO— | Ph(F) | —CH₂CH₂C₄F₉-n |
| 795 | 4 | BiPh | —CH₂O— | Ph(F)—Ph | —CH(CH₃)C₈H₁₇-n |
| 796 | 4 | BiPh | —CH₂O— | Ph(F) | —CH₂CH(CH₃)C₂H₅ |
| 797 | 6 | (Cl)BiPh | —CH₂O— | Ph | —C₁₀H₂₁-n |
| 798 | 6 | BiPh(F) | —COO— | Ph(F)—Ph | —C₄H₉-n |
| 799 | 2 | BiPh | —CH₂O— | Ph | —(CH₂)₃CH(CH₃)C₂H₅ |
| 800 | 6 | BiPh | —CH₂O— | Ph | —CH(CH₃)C₇H₁₅-n |
| 801 | 6 | (F)BiPh | —COO— | Ph | —CH(CH₃)C₈H₁₇-n |

TABLE 5-continued

In Formula (1), A is 1,4'—biphenylene group; $Y_1$ —OCO— group

| EX. C | m | A | Z1 | B | R1 |
|---|---|---|---|---|---|
| 802 | 10 | BiPh | —COO— | Ph | —CH(CH$_3$)OC$_3$H$_7$-n |
| 803 | 10 | BiPh | —COO— | Ph—OCO—Ph | —CH(CH$_3$)C$_8$H$_{17}$-n |
| 804 | 2 | BiPh(F) | —COO— | BiPh | —CH$_2$CH(CH$_3$)C$_2$H$_5$ |
| 805 | 18 | BiPh | —CH$_2$O— | Ph(F) | —CH$_2$CH$_2$OC$_4$H$_9$-n |
| 806 | 5 | BiPh | —CH$_2$O— | Ph—CH$_2$O—Ph | —CH(CH$_3$)C$_6$H$_{13}$-n |
| 807 | 4 | BiPh | —COO— | Ph—OCO—Ph | —CH$_2$CH$_2$OC$_6$H$_{13}$-n |
| 808 | 8 | BiPh | —CH$_2$O— | Ph—CH$_2$O—Ph | —CH(CH$_3$)C$_6$H$_{13}$-n |
| 809 | 10 | BiPh | —CH$_2$O— | Ph—COO—Ph | —CH(CH$_3$)OC$_4$H$_9$-n |
| 810 | 8 | (Cl)BiPh | —COO— | Ph | —CH(CH$_3$)OC$_4$H$_9$-n |
| 811 | 5 | BiPh | —CH$_2$O— | Ph—CH$_2$O—Ph | —CH(CH$_3$)OC$_6$H$_{13}$-n |
| 812 | 6 | BiPh | —CH$_2$O— | Ph | —(CH$_2$)$_3$CH(CH$_3$)C$_2$H$_5$ |
| 813 | 8 | (Cl)BiPh | —CH$_2$O— | Ph | —CH(CH$_3$)OC$_3$H$_7$-n |
| 814 | 6 | BiPh | —COO— | Ph | —CH$_2$CH$_2$C$_4$F$_9$-n |
| 815 | 4 | BiPh | —COO— | Ph—OCH$_2$—Ph | —CH(CH$_3$)OC$_4$H$_9$-n |
| 816 | 7 | BiPh | —COO— | Ph | —CH(CH$_3$)C$_8$H$_{17}$-n |
| 817 | 6 | BiPh | —COO— | BiPh | —CH$_2$CH$_2$OC$_4$H$_9$-n |
| 818 | 2 | BiPh | —COO— | Ph—OCO—Ph | —CH(CH$_3$)C$_6$H$_{13}$-n |
| 819 | 21 | BiPh | —COO— | Nap | —CH(CH$_3$)C$_4$H$_9$-n |
| 820 | 6 | BiPh | —COO— | Ph | —CH$_2$CH(CH$_3$)C$_2$H$_5$ |
| 821 | 4 | BiPh | —CH$_2$O— | Ph | —CH(CH$_3$)C$_6$H$_{13}$-n |
| 822 | 3 | BiPh | —COO— | Ph | —CH$_2$CH$_2$C$_4$F$_9$-n |
| 823 | 4 | BiPh | —CH$_2$O— | Ph(Cl) | —CH(CH$_3$)C$_5$H$_{11}$-n |
| 824 | 8 | BiPh | —CH$_2$O— | Ph—OCH$_2$—Ph | —C$_4$H$_9$-n |
| 825 | 5 | BiPh | —CH$_2$O— | Ph | —C$_4$H$_9$-n |
| 826 | 18 | (Cl)BiPh | —COO— | Ph(F)—Ph | —CH$_2$CH$_2$OC$_6$H$_{13}$-n |
| 827 | 16 | BiPh | —CH$_2$O— | BiPh | —C$_6$H$_{13}$-n |
| 828 | 4 | (F)BiPh | —COO— | Tetra | —CH(CH$_3$)C$_6$H$_{13}$-n |
| 829 | 4 | BiPh | —COO— | Ph(Cl) | —(CH$_2$)$_3$CH(CH$_3$)C$_2$H$_5$ |
| 830 | 8 | BiPh | —CH$_2$O— | Ph | —CH$_2$CH(CH$_3$)C$_2$H$_5$ |
| 831 | 8 | BiPh | —CH$_2$O— | Ph | —CH$_2$CH$_2$C$_4$F$_9$-n |
| 832 | 8 | BiPh | —COO— | Ph(F)Ph | —CH$_2$CH(CH$_3$)C$_2$H$_5$ |
| 833 | 6 | BiPh | —COO— | Ph—CH$_2$O—Ph | —CH(CH$_3$)C$_7$H$_{15}$-n |
| 834 | 4 | BiPh | —CH$_2$O— | Ph—CH$_2$O—Ph | —CH$_2$CH(CH$_3$)C$_2$H$_5$ |
| 835 | 8 | (Cl)BiPh | —COO— | Nap | —CH$_2$CH(CH$_3$)C$_2$H$_5$ |
| 836 | 6 | BiPh | —COO— | Ph—OCH$_2$—Ph | —CH(CH$_3$)C$_8$H$_{17}$-n |
| 837 | 10 | (Cl)BiPh | —CH$_2$O— | Ph—(F)Ph | —(CH$_2$)$_3$CH(CH$_3$)C$_2$H$_5$ |
| 838 | 4 | BiPh | —COO— | BiPh | —CH(CH$_3$)OC$_6$H$_{13}$-n |
| 839 | 10 | BiPh | —COO— | Nap | —CH$_2$CH$_2$OC$_6$H$_{13}$-n |
| 840 | 4 | BiPh | —CH$_2$O— | Tetra | —CH(CH$_3$)C$_4$H$_9$-n |
| 841 | 4 | BiPh | —COO— | Ph—OCO—Ph | —CH(CH$_3$)C$_6$H$_{13}$-n |
| 842 | 14 | BiPh | —COO— | Ph | —CH(CH$_3$)OC$_3$H$_7$-n |
| 843 | 8 | BiPh | —CH$_2$O— | Ph(Cl) | —CH$_2$CH$_2$OC$_6$H$_{13}$-n |
| 844 | 4 | BiPh | —COO— | Ph—OCH$_2$—Ph | —CH(CH$_3$)C$_6$H$_{13}$-n |
| 845 | 5 | BiPh | —CH$_2$O— | (F)Ph | —CH(CH$_3$)C$_4$H$_9$-n |
| 846 | 8 | BiPh | —CH$_2$O— | Ph | —CH(CH$_3$)C$_4$H$_9$-n |
| 847 | 6 | BiPh | —COO— | Ph | —CH(CH$_3$)C$_8$H$_{17}$-n |
| 848 | 5 | BiPh | —COO— | Tetra | —CH$_2$CH$_2$OC$_4$H$_9$-n |
| 849 | 8 | BiPh | —COO— | Ph | —C$_6$H$_{13}$-n |
| 850 | 2 | BiPh | —COO— | Ph | —CH(CH$_3$)C$_4$H$_9$-n |
| 851 | 21 | BiPh | —COO— | Nap | —CH(CH$_3$)OC$_3$H$_7$-n |
| 852 | 10 | BiPh | —COO— | Ph | —C$_8$H$_{17}$-n |
| 853 | 6 | BiPh | —COO— | BiPh | —CH$_2$CH(CH$_3$)C$_2$H$_5$ |
| 854 | 7 | BiPh | —COO— | Ph(Cl) | —CH$_2$CH$_2$OC$_4$H$_9$-n |
| 855 | 6 | BiPh | —CH$_2$O— | Ph—(F)Ph | —CH$_2$CH(CH$_3$)C$_2$H$_5$ |
| 856 | 6 | BiPh | —CH$_2$O— | Nap | —CH$_2$CH(CH$_3$)C$_2$H$_5$ |
| 857 | 12 | BiPh | —CH$_2$O— | Ph(F) | —CH$_2$CH$_2$OC$_6$H$_{13}$-n |
| 858 | 2 | (Cl)BiPh | —CH$_2$O— | Ph(F)Ph | —CH(CH$_3$)C$_6$H$_{13}$—n |
| 859 | 6 | BiPh | —COO— | Tetra | —CH(CH$_3$)OC$_4$H$_9$-n |
| 860 | 8 | BiPh | —COO— | Ph | —CH(CH$_3$)C$_4$H$_9$-n |
| 861 | 9 | BiPh | —CH$_2$O— | Ph(F) | —C$_4$H$_9$-n |
| 862 | 15 | BiPh | —CH$_2$O— | Ph(Cl) | —C$_4$H$_9$-n |
| 863 | 10 | BiPh | —CH$_2$O— | Ph—CH$_2$O—Ph | —CH(CH$_3$)C$_8$H$_{17}$-n |
| 864 | 6 | BiPh | —CH$_2$O— | Ph | —CH(CH$_3$)OC$_6$H$_{13}$-n |
| 865 | 6 | BiPh | —COO— | BiPh | —(CH$_2$)$_3$CH(CH$_3$)C$_2$H$_5$ |
| 866 | 5 | BiPh | —COO— | Ph—COO—Ph | —CH$_2$CH$_2$OC$_4$H$_9$-n |
| 867 | 8 | (Cl)BiPh | —COO— | Ph(Cl) | —CH(CH$_3$)C$_6$H$_{13}$-n |
| 868 | 3 | BiPh | —COO— | Ph—OCH$_2$—Ph | —CH(CH$_3$)C$_8$H$_{17}$-n |
| 869 | 10 | BiPh | —COO— | Ph(F) | —CH$_2$CH(CH$_3$)C$_2$H$_5$ |
| 870 | 10 | BiPh | —CH$_2$O— | Ph—COO—Ph | —(CH$_2$)$_3$CH(CH$_3$)C$_2$H$_5$ |
| 871 | 16 | BiPh | —CH$_2$O— | Ph | —CH(CH$_3$)C$_6$H$_{13}$-n |
| 872 | 4 | BiPh | —COO— | Ph—COO—Ph | —CH$_2$CH(CH$_3$)C$_2$H$_5$ |
| 873 | 4 | (F)BiPh | —CH$_2$O— | Nap | —CH$_2$CH(CH$_3$)C$_2$H$_5$ |
| 874 | 6 | BiPh(F) | —CH$_2$O— | Ph | —(CH$_2$)$_3$CH(CH$_3$)C$_2$H$_5$ |
| 875 | 14 | BiPh | —COO— | BiPh | —C$_6$H$_{13}$-n |
| 876 | 6 | BiPh | —CH$_2$O— | Ph | —CH$_2$CH$_2$OC$_6$H$_{13}$-n |

TABLE 5-continued

In Formula (1), A is 1,4'—biphenylene group; $Y_1$ —OCO— group

| EX. C | m | A | Z1 | B | R1 |
|---|---|---|---|---|---|
| 877 | 8 | (Cl)BiPh | —COO— | Ph | —$C_{10}H_{21}$-n |
| 878 | 5 | BiPh | —COO— | Ph | —$CH_2CH_2C_4F_9$-n |
| 879 | 16 | BiPh | —$CH_2O$— | Ph—$OCH_2$—Ph | —$CH(CH_3)C_4H_{9\text{-}n}$ |
| 880 | 8 | (F)BiPh | —$CH_2O$— | Ph | —$CH_2CH_2OC_6H_{13}$-n |

EX. C.: Exemplified Compounds

TABLE 6

In Formula (1), A is 1,4'-biphenylene group; $Y_1$ is —O— group

| EX. C | m | A | Z1 | B | R1 |
|---|---|---|---|---|---|
| 881 | 8 | BiPh(F) | —COO— | Ph | —$CH(CH_3)C_6H_{13}$-n |
| 882 | 5 | (F)BiPh | —COO— | (F)Ph | —$CH(CH_3)C_8H_{17}$-n |
| 883 | 8 | BiPh | —$CH_2O$— | Ph | —$CH_2CH_2OC_6H_{13}$-n |
| 884 | 12 | BiPh | —$CH_2O$— | Ph | —$CH(CH_3)C_8H_{17}$-n |
| 885 | 4 | BiPh | —COO— | Ph—COO—Ph | —$(CH_2)_3CH(CH_3)C_2H_5$ |
| 886 | 21 | BiPh | —COO— | Ph | —$CH(CH_3)C_7H_{15}$-n |
| 887 | 5 | BiPh | —$CH_2O$— | Ph—$OCH_2$—Ph | —$CH(CH_3)C_8H_{17}$-n |
| 888 | 5 | (F)BiPh | —$CH_2O$— | Tetra | —$CH(CH_3)C_4H_9$-n |
| 889 | 5 | BiPh | —COO— | Nap | —$CH_2CH_2OC_6H_{13}$-n |
| 890 | 6 | BiPh | —COO— | Tetra | —$CH(CH_3)C_4H_9$-n |
| 891 | 5 | BiPh | —$CH_2O$— | Nap | —$CH(CH_3)C_7H_{15}$-n |
| 892 | 4 | (F)BiPh | —COO— | Nap | —$CH(CH_3)C_6H_{13}$-n |
| 893 | 5 | BiPh | —$CH_2O$— | Ph | —$CH(CH_3)C_4H_9$-n |
| 894 | 6 | BiPh | —COO— | (F)Ph | —$CH_2CH(CH_3)C_2H_5$ |
| 895 | 12 | BiPh | —COO— | Ph | —$CH_2CH(CH_3)C_2H_5$ |
| 896 | 7 | BiPh | —COO— | Ph—OCO—Ph | —$CH(CH_3)C_6H_{13}$-n |
| 897 | 4 | BiPh | —COO— | Ph(F) | —$CH_2CH_2OC_6H_{13}$-n |
| 898 | 6 | BiPh | —COO— | Ph | —$CH(CH_3)OC_3H_7$-n |
| 899 | 6 | BiPh(F) | —COO— | Ph—COO—Ph | —$CH(CH_3)C_7H_{15}$-n |
| 900 | 3 | BiPh | —$CH_2O$— | Ph | —$CH(CH_3)C_8H_{17}$-n |
| 901 | 21 | BiPh | —COO— | Ph | —$OH(CH_3)C_8H_{17}$-n |
| 902 | 5 | (F)BiPh | —COO— | Ph | —$CH_2CH_2OC_6H_{13}$-n |
| 903 | 12 | BiPh | —$CH_2O$ | Tetra | —$CH(CH_3)C_7H_{15}$-n |
| 904 | 6 | BiPh | —COO— | Nap | —$CH_2CH(CH_3)C_2H_5$ |
| 905 | 6 | BiPh | —COO— | Tetra | —$CH(CH_3)C_6H_{13}$-n |
| 906 | 8 | BiPh | —COO— | Ph—COO—Ph | —$CH(CH_3)C_6H_{13}$-n |
| 907 | 9 | BiPh | —COO— | Ph | —$CH(CH_3)OC_3H_7$-n |
| 908 | 16 | BiPh | —COO— | BiPh | —$CH(CH_3)C_4H_9$-n |
| 909 | 4 | BiPh | —COO— | Ph—$OCH_2$—Ph | —$(CH_2)_3CH(CH_3)C_2H_5$ |
| 910 | 4 | BiPh | —$CH_2O$— | Ph | —$(CH_2)_3CH(CH_3)C_2H_5$ |
| 911 | 11 | BiPh | —$CH_2O$— | Ph(F)—Ph | —$CH_2CH(CH_3)C_2H_5$ |
| 912 | 17 | BiPh | —$CH_2O$— | Ph | —$CH(CH_3)C_{11}H_{23}$-n |
| 913 | 6 | BiPh | —$CH_2O$— | Ph | —$CH_2CH(CH_3)C_2H_5$ |
| 914 | 11 | BiPh | —COO— | Ph | —$CH(CH_3)C_8H_{17}$-n |
| 915 | 4 | (Cl)BiPh | —$CH_2O$— | BiPh | —$CH(CH_3)C_4H_9$-n |
| 916 | 14 | BiPh | —$CH_2O$— | Ph | —$CH_2CH(CH_3)C_2H_5$ |
| 917 | 8 | BiPh | —$CH_2O$— | Tetra | —$CH(CH_3)C_4H_9$-n |
| 918 | 4 | BiPh | —$CH_2O$— | Tetra | —$CH(CH_3)C_2H_5$ |
| 919 | 2 | BiPh | —COO— | Nap | —$(CH_2)_3CH(CH_3)C_2H_5$ |
| 920 | 2 | BiPh | —COO— | Ph—(F)Ph | —$CH_2CH(CH_3)C_2H_5$ |
| 921 | 15 | (F)BiPh | —COO— | Ph | —$CH(CH_3)C_6H_{13}$-n |
| 922 | 5 | BiPh | —$CH_2O$— | Ph | —$CH(CH_3)C_5H_{11}$-n |
| 923 | 5 | BiPh | —COO— | Ph | —$CH(CH_3)C_8H_{17}$-n |
| 924 | 5 | BiPh | —$CH_2O$— | Ph | —$CH(CH_3)C_8H_{17}$-n |
| 925 | 4 | BiPh | —$CH_2O$— | Ph | —$CH(CH_3)OC_4H_9$-n |
| 926 | 6 | BiPh | —COO— | (F)Ph | —$CH(CH_3)OC_4H_9$-n |
| 927 | 21 | BiPh | —COO— | (F)BiPh | —$CH(CH_3)C_8H_{17}$-n |
| 928 | 10 | BiPh | —COO— | Ph | —$CH(CH_3)C_6H_{13}$-n |
| 929 | 8 | BiPh | —COO— | Nap | —$CH(CH_3)C_6H_{13}$-n |
| 930 | 8 | BiPh | —COO— | Ph—$OCH_2$—Ph | —$CH(CH_3)C_6H_{13}$-n |
| 931 | 4 | BiPh | —COO— | Ph | —$CH_2CH(CH_3)C_2H_5$ |
| 932 | 8 | BiPh(F) | —COO— | Ph—$OCH_2$—Ph | —$CH(CH_3)C_6H_{13}$-n |
| 933 | 5 | BiPh | —$CH_2O$— | Ph—(F)Ph | —$CH_2CH(CH_3)C_2H_5$ |
| 934 | 5 | (Cl)BiPh | —COO— | Ph | —$CH(CH_3)C_8H_{17}$-n |
| 935 | 8 | BiPh | —COO— | (F)Ph | —$CH(CH_3)C_7H_{15}$-n |
| 936 | 4 | BiPh | —$CH_2O$— | Ph | —$CH(CH_3)C_5H_{11}$-n |
| 937 | 6 | BiPh | —$CH_2O$— | Ph—COO—Ph | —$CH(CH_3)C_8H_{17}$-n |
| 938 | 6 | BiPh | —$CH_2O$— | Ph | —$CH(CH_3)C_2H_5$ |
| 939 | 15 | BiPh | —COO— | Ph | —$CH_2CH(CH_3)C_2H_5$ |
| 940 | 8 | BiPh | —$CH_2O$— | Ph(F) | —$CH_2CH(CH_3)C_2H_5$ |

TABLE 6-continued

In Formula (1), A is 1,4'-biphenylene group; $Y_1$ is —O— group

| EX. C | m | A | Z1 | B | R1 |
|---|---|---|---|---|---|
| 941 | 10 | (Cl)BiPh | —CH$_2$O— | Ph—COO—Ph | —CH(CH$_3$)OC$_4$H$_9$-n |
| 942 | 6 | BiPh | —COO— | BiPh | —CH(CH$_3$)C$_2$H$_5$ |
| 943 | 21 | BiPh | —COO— | Ph | —CH(CH$_3$)OC$_6$H$_{13}$-n |
| 944 | 10 | BiPh | —CH$_2$O— | Ph | —CH(CH$_3$)C$_8$H$_{17}$-n |
| 945 | 6 | BiPh | —COO— | Ph | —CH(CH$_3$)C$_4$H$_9$-n |
| 946 | 6 | BiPh | —CH$_2$O— | Ph | —CH(CH$_3$)C$_6$H$_{13}$-n |
| 947 | 6 | (Cl)BiPh | —COO— | Ph—OCH$_2$—Ph | —CH$_2$CH(CH$_3$)C$_2$H$_5$ |
| 948 | 6 | BiPh | —COO— | Ph | —CH(CH$_3$)C$_6$H$_{13}$-n |
| 949 | 16 | BiPh | —CH$_2$O— | Ph | —CH$_2$CH$_2$OC$_6$H$_{13}$-n |
| 950 | 5 | BiPh | —CH$_2$O— | BiPh | —CH$_2$CH(CH$_3$)C$_2$H$_5$ |
| 951 | 7 | BiPh | —COO— | Ph(F)—Ph | —(CH$_2$)$_3$CH(CH$_3$)C$_2$H$_5$ |
| 952 | 5 | BiPh | —COO— | (F)BiPh | —CH(CH$_3$)OC$_3$H$_7$-n |
| 953 | 4 | BiPh | —COO— | Ph—(F)Ph | —CH(CH$_3$)C$_6$H$_{13}$-n |
| 954 | 6 | BiPh | —COO— | Ph | —CH(CH$_3$)C$_6$H$_{17}$-n |
| 955 | 10 | BiPh | —CH$_2$O— | Nap | —CH(CH$_3$)C$_7$H$_{15}$-n |
| 956 | 8 | BiPh | —CH$_2$O— | Ph | —CH(CH$_3$)C$_5$H$_{11}$-n |
| 957 | 8 | BiPh | —CH$_2$O— | BiPh | —CH$_2$CH$_2$OC$_6$H$_{13}$-n |
| 958 | 10 | BiPh | —COO— | Ph | —CH(CH$_3$)C$_8$H$_{17}$-n |
| 959 | 21 | BiPh | —CH$_2$O— | BiPh | —CH$_2$CH$_2$OC$_6$H$_{13}$-n |
| 960 | 6 | BiPh | —COO— | Ph—COO—Ph | —CH(CH$_3$)C$_6$H$_{13}$-n |
| 961 | 8 | BiPh | —CH$_2$O— | Tetra | —CH(CH$_3$)C$_6$H$_{13}$-n |
| 962 | 8 | BiPh | —CH$_2$O— | Ph | —CH(CH$_3$)OC$_6$H$_{13}$-n |
| 963 | 6 | BiPh(F) | —CH$_2$O— | Nap | —CH(CH$_3$)C$_6$H$_{13}$-n |
| 964 | 6 | BiPh | —COO— | BiPh | —CH(CH$_3$)C$_7$H$_{15}$-n |
| 965 | 6 | BiPh | —CH$_2$O— | Tetra | —CH$_2$CH$_2$OC$_6$H$_{13}$-n |
| 966 | 7 | BiPh | —CH$_2$O— | Ph | —CH(CH$_3$)C$_6$H$_{13}$-n |
| 967 | 8 | BiPh | —CH$_2$O— | Ph—OCH$_2$—Ph | —CH$_2$CH(CH$_3$)C$_2$H$_5$ |
| 968 | 6 | BiPh | —CH$_2$O— | BiPh | —CH(CH$_3$)C$_7$H$_{15}$-n |
| 969 | 10 | BiPh | —COO— | Ph | —CH(CH$_3$)C$_5$H$_{11}$-n |
| 970 | 6 | BiPh | —CH$_2$O— | Ph | —CH(CH$_3$)C$_6$H$_{13}$-n |

EX. C.: Exemplified Compounds

TABLE 7

In Formula (1) A is 2,6-naphthylene group; $Y_1$ is —COO— group

| EX. C | m | Z1 | B | R1 |
|---|---|---|---|---|
| 971 | 6 | —COO— | Nap | —CH(CH$_3$)C$_4$H$_9$-n |
| 972 | 8 | —COO— | Ph | —CH(CH$_3$)CH$_2$CH$_2$OC$_2$H$_5$ |
| 973 | 8 | —COO— | BiPh | —CH(CH$_3$)C$_6$H$_{13}$-n |
| 974 | 4 | —COO— | Ph—OCH$_2$—Ph | —CH(CF$_3$)(CH$_2$)$_5$OC$_2$H$_5$ |
| 975 | 4 | —CH$_2$O— | Ph(F) | —CH$_2$CH$_2$C$_4$F$_9$-n |
| 976 | 8 | —COO— | Nap | —CH$_2$CH$_2$OC$_4$H$_9$-n |
| 977 | 8 | —CH$_2$O— | Tetra | —CH(CF$_3$)CH$_2$CH$_2$OC$_2$H$_5$ |
| 978 | 12 | —CH$_2$O— | BiPh | —CH(CH$_3$)C$_6$H$_{13}$-n |
| 979 | 6 | —COO— | Ph—COO—Ph | —CH$_2$CH$_2$OC$_6$H$_{13}$-n |
| 980 | 5 | —COO— | Ph(F)—Ph | —CH(CH$_3$)C$_6$H$_{13}$-n |
| 981 | 8 | —CH$_2$O— | BiPh | —CH(CH$_3$)CH$_2$CH$_2$OC$_2$H$_5$ |
| 982 | 12 | —CH$_2$O— | Ph—OCO—Ph | —CH$_2$CH$_2$C$_4$F$_9$-n |
| 983 | 8 | —COO— | Ph—COO—Ph | —CH(CH$_3$)C$_6$H$_{13}$-n |
| 984 | 12 | —CH$_2$O— | Ph(F) | —CH(CF$_3$)CH$_2$CH$_2$OC$_2$H$_5$ |
| 985 | 8 | —CH$_2$O— | Ph—(F)Ph | —(CH$_2$)$_3$CH(CH$_3$)C$_2$H$_5$ |
| 986 | 6 | —CH$_2$O— | Ph(F) | —CH$_2$CH$_2$OC$_4$H$_9$-n |
| 987 | 4 | —CH$_2$O— | Nap | —CH(CH$_3$)C$_4$H$_9$-n |
| 988 | 5 | —CH$_2$O— | Ph—OCO—Ph | —CH(CH$_3$)C$_8$H$_{17}$-n |
| 989 | 8 | —COO— | Nap | —CH$_2$CH(CH$_3$)C$_2$H$_5$ |
| 990 | 8 | —COO— | Nap | —CH(CH$_3$)C$_6$H$_{13}$-n |
| 991 | 6 | —COO— | Ph | —CH$_2$CH$_2$C$_8$F$_{17}$-n |
| 992 | 8 | —CH$_2$O— | BiPh | —CH$_2$CH(CH$_3$)C$_2$H$_5$ |
| 993 | 11 | —COO— | Nap | —CH$_2$CH$_2$C$_4$F$_9$-n |
| 994 | 8 | —CH$_2$O— | (F)Ph | —CH$_2$CH$_2$C$_8$F$_{17}$-n |
| 995 | 11 | —COO— | BiPh | —CH(CF$_3$)C$_6$H$_{13}$-n |
| 996 | 8 | —COO— | Ph | —CH$_2$CH$_2$C$_4$F$_9$-n |
| 997 | 5 | —COO— | Ph | —CH(CH$_3$)CH$_2$CH$_2$OC$_2$H$_5$ |
| 998 | 6 | —COO— | Ph | —CH(CH$_3$)C$_6$H$_{13}$-n |
| 999 | 4 | —CH$_2$O— | Ph—CH$_2$O—Ph | —CH(CF$_3$)C$_2$H$_5$ |
| 1000 | 8 | —COO— | Ph(F)—Ph | —CH$_2$CH$_2$OC$_6$H$_{13}$-n |
| 1001 | 5 | —CH$_2$O— | Ph(F) | —CH(CF$_3$)(CH$_2$)$_3$OC$_2$H$_5$ |
| 1002 | 8 | —CH$_2$O— | (F)Ph | —CH(CH$_3$)CH$_2$OC$_4$H$_9$-n |
| 1003 | 10 | —COO— | BiPh | —CH(CH$_3$)CH$_2$CH$_2$OC$_2$H$_5$ |
| 1004 | 8 | —CH$_2$O— | Ph | —CH(CH$_3$)C$_6$H$_{13}$-n |
| 1005 | 14 | —CH$_2$O— | Nap | —CH(CF$_3$)C$_6$H$_{13}$-n |
| 1006 | 4 | —CH$_2$O— | Ph | —CH(CH$_3$)C$_4$H$_9$-n |
| 1007 | 4 | —COO— | Ph—COO—Ph | —CH(CF$_3$)(CH$_2$)$_3$OC$_2$H$_5$ |
| 1008 | 11 | —CH$_2$O— | Ph | —(CH$_2$)$_3$CH(CH$_3$)C$_2$H$_5$ |
| 1009 | 5 | —CH$_2$O— | (F)BiPh | —CH$_2$CH$_2$C$_8$F$_{17}$-n |
| 1010 | 11 | —CH$_2$O— | Nap | —CH$_2$CH$_2$C$_8$F$_{17}$-n |
| 1011 | 9 | —COO— | Nap | —CH(CH$_3$)CH$_2$CH$_2$OC$_2$H$_5$ |
| 1012 | 8 | —CH$_2$O— | Nap | —CH$_2$CH(CH$_3$)C$_2$H$_5$ |
| 1013 | 6 | —CH$_2$O— | Ph—COO—Ph | —CH(CF$_3$)C$_2$H$_5$ |
| 1014 | 4 | —COO— | Ph—CH$_2$O—Ph | —CH(CF$_3$)C$_2$H$_5$ |
| 1015 | 8 | —COO— | Ph—COO—Ph | —CH(CF$_3$)C$_2$H$_5$ |
| 1016 | 2 | —CH$_2$O— | BiPh | —CH(CH$_3$)C$_8$H$_{17}$-n |
| 1017 | 8 | —CH$_2$O— | Nap | —CH(CH$_3$)C$_6$H$_{13}$-n |
| 1018 | 6 | —COO— | Ph—COO—Ph | —(CH$_2$)$_3$CH(CH$_3$)C$_2$H$_5$ |
| 1019 | 8 | —CH$_2$O— | Ph—(F)—Ph | —CH(CF$_3$)C$_6$H$_{13}$-n |
| 1020 | 8 | —COO— | BiPh | —CH$_2$CH$_2$OC$_6$H$_{13}$-n |
| 1021 | 8 | —COO— | (F)BiPh | —CH(CF$_3$)CH$_2$CH$_2$OC$_2$H$_5$ |
| 1022 | 8 | —COO— | Nap | —CH$_2$CH$_2$C$_4$F$_9$-n |
| 1023 | 8 | —CH$_2$O— | (F)Ph | —CH$_2$CH$_2$OC$_6$H$_{13}$-n |
| 1024 | 10 | —COO— | Ph—OCH$_2$—Ph | —CH$_2$CH(CH$_3$)C$_2$H$_5$ |
| 1025 | 8 | —CH$_2$O— | Ph—(F)—Ph | —CH(CH$_3$)CH$_2$OC$_4$H$_9$-n |
| 1026 | 6 | —COO— | Ph(F) | —CH(CH$_3$)C$_6$H$_{13}$-n |
| 1027 | 9 | —COO— | Nap | —CH$_2$CH(CH$_3$)C$_2$H$_5$ |
| 1028 | 5 | —CH$_2$O— | Ph | —CH(CF$_3$)C$_2$H$_5$ |
| 1029 | 5 | —COO— | Nap | —CH(CH$_3$)CH$_2$OC$_4$H$_9$-n |
| 1030 | 8 | —COO— | (F)BiPh | —CH$_2$CH$_2$C$_8$F$_{17}$-n |
| 1031 | 5 | —COO— | Ph—OCH$_2$—Ph | —CH(CH$_3$)C$_8$H$_{17}$-n |
| 1032 | 5 | —CH$_2$O— | Tetra | —CH(CH$_3$)CH$_2$OC$_4$H$_9$-n |
| 1033 | 8 | —COO— | BiPh(F) | —CH(CH$_3$)C$_4$H$_9$-n |
| 1034 | 10 | —COO— | Ph—(F)Ph | —CH(CH$_3$)C$_6$H$_{13}$-n |

TABLE 7-continued

In Formula (1) A is 2,6-naphthylene group; $Y_1$ is —COO— group

| EX. C | m | Z1 | B | R1 |
|---|---|---|---|---|
| 1035 | 6 | —CH$_2$O— | Ph—CH$_2$O—Ph | —CH(CH$_3$)C$_6$H$_{13}$-n |
| 1036 | 10 | —CH$_2$O— | Ph(F)Ph | —(CH$_2$)$_3$CH(CH$_3$)C$_2$H$_5$ |
| 1037 | 10 | —COO— | Ph | —CH(CF$_3$)(CH$_2$)$_5$OC$_2$H$_5$ |
| 1038 | 10 | —CH$_2$O— | Ph—OCH$_2$—Ph | —CH(CH$_3$)C$_4$H$_9$-n |
| 1039 | 8 | —CH$_2$O— | Ph | —CH(CF$_3$)(CH$_2$)$_5$OC$_2$H$_5$ |
| 1040 | 8 | —COO— | Ph(F)—Ph | —CH(CH$_3$)C$_6$H$_{13}$-n |
| 1041 | 6 | —CH$_2$O— | Ph(Cl) | —CH(CH$_3$)CH$_2$OC$_4$H$_9$-n |
| 1042 | 8 | —CH$_2$O— | (F)BiPh | —(CH$_2$)$_3$CH(CH$_3$)C$_2$H$_5$ |
| 1043 | 5 | —CH$_2$O— | Ph | —CH(CH$_3$)CH$_2$CH$_2$OC$_2$H$_5$ |
| 1044 | 5 | —CH$_2$O— | Ph—COO—Ph | —CH(CH$_3$)C$_6$H$_{13}$-n |
| 1045 | 8 | —CH$_2$O— | Ph(F) | —CH(CF$_3$)(CH$_2$)$_5$OC$_2$H$_5$ |
| 1046 | 8 | —CH$_2$O— | Ph(F) | —CH(CF$_3$)C$_6$H$_{13}$-n |
| 1047 | 8 | —CH$_2$O— | BiPh | —CH(CH$_3$)C$_4$H$_9$-n |
| 1048 | 6 | —COO— | Ph | —CH(CH$_3$)C$_6$H$_{13}$-n |
| 1049 | 4 | —CH$_2$O— | Ph—CH$_2$O—Ph | —CH(CH$_3$)CH$_2$CH$_2$OC$_2$H$_5$ |
| 1050 | 10 | —CH$_2$O— | (F)BiPh | —CH$_2$CH(CH$_3$)C$_2$H$_5$ |
| 1051 | 6 | —CH$_2$O— | Ph—OCH$_2$—Ph | —CH$_2$CH(CH$_3$)C$_2$H$_5$ |
| 1052 | 8 | —COO— | Ph | —(CH$_2$)$_3$CH(CH$_3$)C$_2$H$_5$ |
| 1053 | 4 | —CH$_2$O— | Ph—COO—Ph | —CH(CF$_3$)C$_6$H$_{13}$-n |
| 1054 | 8 | —CH$_2$O— | Ph(Cl) | —CH(CH$_3$)C$_6$H$_{13}$-n |
| 1055 | 12 | —COO— | BiPh(F) | —CH(CH$_3$)C$_6$H$_{13}$-n |
| 1056 | 5 | —CH$_2$O— | Nap | —CH(CH$_3$)C$_6$H$_{13}$-n |
| 1057 | 8 | —COO— | Ph—OCO—Ph | —CH(CH$_3$)CH$_2$CH$_2$OC$_2$H$_5$ |
| 1058 | 4 | —CH$_2$O— | BiPh(F) | —CH(CH$_3$)CH$_2$CH$_2$OC$_2$H$_5$ |
| 1059 | 11 | —CH$_2$O— | Ph—OCH$_2$—Ph | —CH$_2$CH$_2$OC$_6$H$_{13}$-n |
| 1060 | 4 | —CH$_2$O— | Ph(F)—Ph | —CH(CH$_3$)C$_8$H$_{17}$-n |

EX. C.: Exemplified Compounds

TABLE 8

In Formula (1), A is 2,6-naphthylene group; $Y_1$ is —OCO— group

| EX. C | m | Z1 | B | R1 |
|---|---|---|---|---|
| 1061 | 4 | —COO— | (F)BiPh | —CH(CH$_3$)C$_8$H$_{17}$-n |
| 1062 | 8 | —COO— | Ph | —CH(CH$_3$)C$_6$H$_{13}$-n |
| 1063 | 8 | —COO— | Ph—COO—Ph | —CH(CH$_3$)OC$_2$H$_5$ |
| 1064 | 10 | —COO— | (F)BiPh | —(CH$_2$)$_3$CH(CH$_3$)C$_2$H$_5$ |
| 1065 | 8 | —CH$_2$O— | Ph(F) | —CH$_2$CH$_2$OC$_4$H$_9$-n |
| 1066 | 8 | —CH$_2$O— | Ph(Cl) | —CH$_2$CH(CH$_3$)C$_2$H$_5$ |
| 1067 | 8 | —COO— | Ph—CH$_2$O—Ph | —CH(CH$_3$)O$_8$H$_{17}$-n |
| 1068 | 4 | —COO— | BiPh(F) | —CH$_2$CH(CH$_3$)C$_2$H$_5$ |
| 1069 | 10 | —CH$_2$O— | Ph—COO—Ph | —CH$_2$CH$_2$OC$_6$H$_{13}$-n |
| 1070 | 6 | —CH$_2$O— | Ph—OCH$_2$—Ph | —CH(CH$_3$)C$_8$H$_{17}$-n |
| 1071 | 12 | —COO— | BiPh(F) | —CH(CH$_3$)C$_6$H$_{13}$-n |
| 1072 | 8 | —COO— | Ph(Cl) | —(CH$_2$)$_3$CH(CH$_3$)C$_2$H$_5$ |
| 1073 | 8 | —CH$_2$O— | Ph—OCO—Ph | —CH$_2$CH$_2$C$_4$F$_9$-n |
| 1074 | 8 | —CH$_2$O— | (F)BiPh | —CH(CH$_3$)CH$_2$OC$_2$H$_5$ |
| 1075 | 5 | —CH$_2$O— | Ph(F) | —CH(CH$_3$)C$_6$H$_{13}$-n |
| 1076 | 9 | —COO— | Ph | —(CH$_2$)$_3$CH(CH$_3$)C$_2$H$_5$ |
| 1077 | 8 | —CH$_2$O— | Ph—COO—Ph | —CH$_2$CH(CH$_3$)C$_2$H$_5$ |
| 1078 | 10 | —CH$_2$O— | Ph(F)—Ph | —(CH$_2$)$_3$CH(CH$_3$)C$_2$H$_5$ |
| 1079 | 10 | —CH$_2$O— | BiPh | —CH(CH$_3$)C$_6$H$_{13}$-n |
| 1080 | 8 | —CH$_2$O— | Ph—COO—Ph | —CH$_2$CH$_2$OC$_6$H$_{13}$-n |
| 1081 | 8 | —COO— | Ph—COO—Ph | —CH$_2$CH(CH$_3$)C$_2$H$_5$ |
| 1082 | 7 | —COO— | (F)BiPh | —CH(CH$_3$)CH$_2$C$_2$H$_5$ |
| 1083 | 8 | —CH$_2$O— | Ph—COO—Ph | —CH(CH$_3$)C$_8$H$_{17}$-n |
| 1084 | 7 | —CH$_2$O— | Ph | —CH(CH$_3$)OC$_4$H$_9$-n |
| 1085 | 7 | —COO— | Nap | —CH(CH$_3$)C$_8$H$_{17}$-n |
| 1086 | 8 | —CH$_2$O— | Ph(Cl) | —CH(CH$_3$)CH$_2$OC$_2$H$_5$ |
| 1087 | 14 | —CH$_2$O— | (F)Ph | —CH$_2$CH(CH$_3$)C$_2$H$_5$ |
| 1088 | 7 | —COO— | BiPh | —CH(CH$_3$)OC$_2$H$_5$ |
| 1089 | 4 | —CH$_2$O— | Ph—CH$_2$O—Ph | —CH(CH$_3$)C$_4$H$_9$-n |
| 1090 | 6 | —CH$_2$O— | Ph—OCO—Ph | —CH$_2$CH$_2$OC$_4$H$_9$-n |
| 1091 | 5 | —CH$_2$O— | Ph(C) | —CH$_2$CH$_2$OC$_4$H$_9$-n |
| 1092 | 8 | —CH$_2$O— | BiPh | —CH(CH$_3$)CH$_2$OC$_2$H$_5$ |
| 1093 | 14 | —CH$_2$O— | Ph | —CH$_2$CH$_2$CH(CH$_3$)C$_2$H$_5$ |
| 1094 | 8 | —COO— | Ph—COO—Ph | —CH(CH$_3$)C$_8$H$_{17}$-n |
| 1095 | 14 | —CH$_2$O— | Ph—(F)—Ph | —CH$_2$CH$_2$OC$_4$H$_9$-n |
| 1096 | 11 | —COO— | (F)Ph | —CH$_2$CH$_2$OC$_4$H$_9$-n |

TABLE 8-continued

In Formula (1), A is 2,6-naphthylene group; $Y_1$ is —OCO— group

| EX. C | m | Z1 | B | R1 |
|---|---|---|---|---|
| 1097 | 5 | —COO— | Nap | —CH$_2$CH$_2$OC$_6$H$_{13}$-n |
| 1098 | 8 | —CH$_2$O— | Ph(F) | —CH$_2$CH(CH$_3$)C$_2$H$_5$ |
| 1099 | 9 | —COO— | (F)BiPh | —CH$_2$CH$_2$OC$_4$H$_9$-n |
| 1100 | 6 | —COO— | Ph—CH$_2$O—Ph | —CH(CH$_3$)C$_8$H$_{17}$-n |
| 1101 | 8 | —COO— | Ph—CH$_2$O—Ph | —CH$_2$CH(CH$_3$)C$_2$H$_5$ |
| 1102 | 8 | —COO— | Ph(F) | —CH$_2$CH(CH$_3$)C$_2$H$_5$ |
| 1103 | 4 | —CH$_2$O— | Tetra | —CH$_2$CH$_2$C$_4$F$_9$-n |
| 1104 | 2 | —COO— | Ph—CH$_2$C—Ph | —CH$_2$CH$_2$OC$_6$H$_{13}$-n |
| 1105 | 8 | —CH$_2$O— | Tetra | —CH$_2$CH(CH$_3$)C$_2$H$_5$ |

EX. C.: Exemplified Compounds

TABLE 9

In Formula (1), A is 2,6-naphthylene group; $Y_1$ is —O— group

| EX. C | m | Z1 | B | R1 |
|---|---|---|---|---|
| 1106 | 8 | —CH$_2$O— | Ph—(F)—Ph | —CH$_2$CH(CH$_3$)C$_2$H$_5$ |
| 1107 | 8 | —CH$_2$O— | Ph—COO—Ph | —CH(CH$_3$)CH$_2$CH$_2$OC$_2$H$_5$ |
| 1108 | 14 | —CH$_2$O— | Ph—COO—Ph | —CH$_2$CH(CH$_3$)C$_2$H$_5$ |
| 1109 | 4 | —CH$_2$O— | Ph | —CH(CH$_3$)C$_2$H$_5$ |
| 1110 | 8 | —CH$_2$O— | Ph(F) | —CH(CH$_3$)C$_8$H$_{17}$-n |
| 1111 | 8 | —COO— | Ph—COO—Ph | —CH$_2$CH$_2$OC$_4$H$_9$-n |
| 1112 | 8 | —COO— | Ph | —CH$_2$CH(CH$_3$)C$_2$H$_5$ |
| 1113 | 8 | —COO— | Ph—(F)—Ph | —CH(CH$_3$)C$_8$H$_{17}$-n |
| 1114 | 8 | —COO— | Ph | —CH(CH$_3$)C$_6$H$_{13}$-n |
| 1115 | 11 | —COO— | Ph(F)—Ph | —CH$_2$CH(CH$_3$)C$_2$H$_5$ |
| 1116 | 7 | —COO— | Ph(F)—Ph | —CH(CH$_3$)C$_6$H$_{13}$-n |
| 1117 | 4 | —CH$_2$O— | BiPh | —CH(CH$_3$)C$_2$H$_5$ |
| 1118 | 4 | —COO— | Ph(F)—Ph | —CH(CH$_3$)C$_8$H$_{17}$-n |
| 1119 | 8 | —CH$_2$O— | (F)Ph | —CH(CH$_3$)CH$_2$OC$_2$H$_5$ |
| 1120 | 8 | —CH$_2$O— | Ph(F) | —CH(CH$_3$)C$_2$H$_5$ |
| 1121 | 6 | —CH$_2$O— | Ph—CH$_2$O—Ph | —CH(CH$_3$)C$_2$H$_5$ |
| 1122 | 5 | —CH$_2$O— | Nap | —CH$_2$CH(CH$_3$)C$_2$H$_5$ |
| 1123 | 8 | —COO— | Ph(F) | —CH(CH$_3$)C$_2$H$_5$ |
| 1124 | 14 | —COO— | Ph—COO—Ph | —CH(CH$_3$)C$_6$H$_{13}$-n |
| 1125 | 11 | —CH$_2$O— | Ph | —CH(CH$_3$)C$_2$H$_5$ |
| 1126 | 4 | —COO— | Ph(Cl) | —CH(CH$_3$)C$_8$H$_{17}$-n |
| 1127 | 12 | —CH$_2$O— | (F)BiPh | —CH$_2$CH$_2$OC$_4$H$_9$-n |
| 1128 | 4 | —CH$_2$O— | Ph(F)—Ph | —CH(CH$_3$)C$_6$H$_{13}$-n |
| 1129 | 8 | —CH$_2$O— | Nap | —CH(CH$_3$)C$_6$H$_{13}$-n |
| 1130 | 8 | —COO— | BiPh | —CH(CH$_3$)C$_6$H$_{13}$-n |
| 1131 | 4 | —COO— | Ph—OCO—Ph | —CH$_2$CH$_2$OC$_6$H$_{13}$-n |
| 1132 | 8 | —COO— | (F)BiPh | —CH(CH$_3$)C$_8$H$_{17}$-n |
| 1133 | 10 | —CH$_2$O— | Ph—OCH$_2$—Ph | —CH(CH$_3$)C$_6$H$_{13}$-n |
| 1134 | 4 | —COO— | Ph | —CH$_2$CH$_2$OC$_6$H$_{13}$-n |
| 1135 | 8 | —COO— | Ph—COO—Ph | —CH(CH$_3$)C$_6$H$_{13}$-n |
| 1136 | 10 | —CH$_2$O— | BiPh | —CH(CH$_3$)C$_4$H$_9$-n |
| 1137 | 8 | —CH$_2$O— | Ph(F) | —CH(CH$_3$)C$_2$H$_5$ |
| 1138 | 6 | —CH$_2$O— | Ph(F)—Ph | —CH(CH$_3$)CH$_2$OC$_4$H$_9$-n |
| 1139 | 7 | —CH$_2$O— | Ph—CH$_2$O—Ph | —CH(CH$_3$)C$_2$H$_5$ |
| 1140 | 4 | —COO— | BiPh | —CH(CH$_3$)C$_2$H$_5$ |
| 1141 | 4 | —CH$_2$O— | Nap | —CH(CH$_3$)C$_2$H$_5$ |
| 1142 | 10 | —COO— | Ph—(F)—Ph | —CH(CH$_3$)C$_2$H$_5$ |
| 1143 | 12 | —COO— | (F)Ph | —CH$_2$CH$_2$OC$_6$H$_{13}$-n |
| 1144 | 8 | —CH$_2$O— | Ph—COO—Ph | —CH(CH$_3$)C$_6$H$_{13}$-n |
| 1145 | 4 | —COO— | Ph | —CH(CH$_3$)C$_6$H$_{13}$-n |
| 1146 | 8 | —COO— | Ph(Cl) | —CH(CH$_3$)CH$_2$CH$_2$OC$_2$H$_5$ |
| 1147 | 6 | —CH$_2$O— | Ph—(F)—Ph | —CH(CH$_3$)C$_8$H$_{17}$-n |
| 1148 | 12 | —COO— | Ph—OCH$_2$—Ph | —CH(CH$_3$)C$_6$H$_{13}$-n |
| 1149 | 4 | —CH$_2$O— | Nap | —CH(CH$_3$)CH$_2$CH$_2$OC$_2$H$_5$ |
| 1150 | 8 | —CH$_2$O— | Ph(F)—Ph | —CH$_2$CH(CH$_3$)C$_2$H$_5$ |
| 1151 | 5 | —COO— | Ph—CH$_2$C—Ph | —CH$_2$CH$_2$OC$_6$H$_{13}$-n |
| 1152 | 10 | —COO— | BiPh | —CH(CH$_3$)CH$_2$OC$_2$H$_5$ |
| 1153 | 8 | —COO— | Ph—COO—Ph | —CH(CH$_3$)C$_6$H$_{13}$-n |
| 1154 | 4 | —COO— | Ph(F) | —CH(CH$_3$)C$_2$H$_5$ |
| 1155 | 6 | —CH$_2$O— | Ph(F)—Ph | —CH(CH$_3$)C$_6$H$_{13}$-n |
| 1156 | 5 | —COO— | Ph—COO—Ph | —CH(CH$_3$)C$_2$H$_5$ |
| 1157 | 12 | —COO— | Ph(F) | —CH(CH$_3$)C$_8$H$_{17}$-n |
| 1158 | 6 | —CH$_2$O— | BiPh | —CH(CH$_3$)C$_8$H$_{17}$-n |

TABLE 9-continued

In Formula (1), A is 2,6-naphthylene group; $Y_1$ is —O— group

| EX. C | m | Z1 | B | R1 |
|---|---|---|---|---|
| 1159 | 8 | —CH$_2$O— | (F)BiPh | —CH$_2$CH$_2$OC$_4$H$_9$-n |
| 1160 | 11 | —CH$_2$O— | Ph—OCH$_2$—Ph | —CH$_2$CH$_2$OC$_4$H$_9$-n |
| 1161 | 14 | —COO— | Ph—OCO—Ph | —(CH$_2$)$_3$CH(CH$_3$)C$_2$H$_5$ |
| 1162 | 12 | —CH$_2$O— | Ph—OCO—Ph | —CH(CH$_3$)C$_8$H$_{17}$-n |
| 1163 | 8 | —COO— | Ph | —CH(CH$_3$)CH$_2$OC$_2$H$_5$ |
| 1164 | 4 | —CH$_2$O— | Ph—OCO—Ph | —CH(CH$_3$)C$_6$H$_{13}$-n |
| 1165 | 10 | —COO— | Ph(F) | —CH(CH$_3$)CH$_2$OC$_4$H$_9$-n |
| 1166 | 8 | —COO— | Nap | —CH(CH$_3$)C$_8$H$_{17}$-n |
| 1167 | 9 | —COO— | Ph | —CH$_2$CH(CH$_3$)C$_2$H$_5$ |
| 1168 | 10 | —CH$_2$O— | Ph—OCH$_2$—Ph | —CH(CH$_3$)CH$_2$OC$_2$H$_5$ |
| 1169 | 10 | —COO— | (F)BiPh | —CH$_2$CH(CH$_3$)C$_2$H$_5$ |
| 1170 | 8 | —COO— | Nap | —CH(CH$_3$)C$_2$H$_5$ |
| 1171 | 5 | —CH$_2$O— | Nap | —CH(CH$_3$)CH$_2$CH$_2$OC$_2$H$_5$ |
| 1172 | 4 | —CH$_2$O— | Ph—CH$_2$O—Ph | —CH(CH$_3$)C$_2$H$_5$ |
| 1173 | 6 | —COO— | Ph | —CH(CH$_3$)C$_8$H$_{17}$-n |
| 1174 | 9 | —COO— | Ph—OCH$_2$—Ph | —CH(CH$_3$)CH$_2$OC$_4$H$_9$-n |
| 1175 | 6 | —COO— | (F)BiPh | —CH(CH$_3$)C$_2$H$_5$ |
| 1176 | 8 | —COO— | Ph | —CH$_2$CH$_2$OC$_4$H$_9$-n |
| 1177 | 8 | —CH$_2$O— | Nap | —CH(CH$_3$)CH$_2$OC$_4$H$_9$-n |
| 1178 | 8 | —COO— | BiPh | —CH(CH$_3$)C$_2$H$_5$ |
| 1179 | 4 | —CH$_2$O— | Nap | —CH(CH$_3$)C$_6$H$_{13}$-n |
| 1180 | 8 | —COO— | (F)BiPh | —CH(CH$_3$)C$_2$H$_5$ |
| 1181 | 8 | —CH$_2$O— | Ph(F)—Ph | —CH(CH$_3$)C$_4$H$_9$-n |
| 1182 | 8 | —CH$_2$O— | BiPh | —CH(CH$_3$)C$_2$H$_5$ |
| 1183 | 8 | —CH$_2$O— | BiPh | —CH(CH$_3$)CH$_2$OC$_2$H$_5$ |
| 1184 | 8 | —CH$_2$O— | Ph—OCO—Ph | —CH(CH$_3$)CH$_2$OC$_2$H$_5$ |
| 1185 | 5 | —COO— | BiPh | —CH(CH$_3$)C$_2$H$_5$ |
| 1186 | 4 | —CH$_2$O— | Nap | —CH(CH$_3$)CH$_2$OC$_2$H$_5$ |
| 1187 | 14 | —CH$_2$O— | (F)Ph | —CH(CH$_3$)C$_2$H$_5$ |
| 1188 | 6 | —CH$_2$O— | Ph(F)Ph | —CH(CH$_3$)C$_2$H$_5$ |
| 1189 | 8 | —COO— | Ph—(F)Ph | —CH(CH$_3$)C$_4$H$_9$-n |
| 1190 | 6 | —COO— | Ph | —CH(CH$_3$)C$_2$H$_5$ |
| 1191 | 4 | —CH$_2$O— | BiPh | —(CH$_2$)$_3$CH(CH$_3$)C$_2$H$_5$ |
| 1192 | 12 | —COO— | Ph | —CH(CH$_3$)CH$_2$CH$_2$OC$_2$H$_5$ |
| 1193 | 4 | —COO— | Ph—COO—Ph | —CH(CH$_3$)C$_2$H$_5$ |

EX. C.: Exemplified Compounds

TABLE 10

In Formula (1), A is 1,2,3,4,-tetrahydro-2,6-naphthylene group; $Y_1$ is —COO— group

| EX. C | m | Z1 | B | R1 |
|---|---|---|---|---|
| 1194 | 2 | —CH$_2$O— | Ph(F) | —CH$_2$CH(CH$_3$)C$_2$H$_5$ |
| 1195 | 6 | —COO— | Ph | —CH$_2$CH(CH$_3$)C$_2$H$_5$ |
| 1196 | 5 | —CH$_2$O— | (F)BiPh | —CH$_2$CH(CH$_3$)C$_2$H$_5$ |
| 1197 | 5 | —COO— | BiPh | —CH$_2$CH$_2$OC$_6$H$_{13}$-n |
| 1198 | 5 | —COO— | Ph(F) | —CH(CH$_3$)C$_6$H$_{13}$-n |
| 1199 | 6 | —COO— | Ph | —CH(CH$_3$)CH$_2$OC$_4$H$_9$-n |
| 1200 | 10 | —CH$_2$O— | (F)Ph | —CH(CH$_3$)C$_6$H$_{13}$-n |
| 1201 | 8 | —COO— | Ph(F) | —CH(CH$_3$)C$_2$H$_5$ |
| 1202 | 6 | —COO— | Nap | —CH(CF$_3$)(CH$_2$)$_5$OC$_2$H$_5$ |
| 1203 | 2 | —COO— | Tetra | —CH(CH$_3$)C$_8$H$_{17}$-n |
| 1204 | 6 | —CH$_2$O— | BiPh | —CH$_2$CH$_2$C$_8$F$_{17}$-n |
| 1205 | 8 | —CH$_2$O— | Ph(F) | —CH(CF$_3$)C$_6$H$_{13}$-n |
| 1206 | 10 | —CH$_2$O— | Ph(F) | —CH(CH$_3$)C$_2$H$_5$ |
| 1207 | 5 | —CH$_2$O— | Ph—CH$_2$O—Ph | —CH(CH$_3$)C$_8$H$_{17}$-n |
| 1208 | 10 | —COO— | Nap | —CH(CH$_3$)C$_2$H$_5$ |
| 1209 | 4 | —COO— | Nap | —CH(CH$_3$)CH$_2$OC$_4$H$_9$-n |
| 1210 | 6 | —CH$_2$O— | Ph | —CH(CF$_3$)CH$_2$CH$_2$OC$_2$H$_5$ |
| 1211 | 8 | —CH$_2$O— | Ph—OCO—Ph | —CH$_2$CH$_2$C$_4$F$_9$-n |
| 1212 | 11 | —CH$_2$O— | Ph(Cl) | —CH(CH$_3$)C$_2$H$_5$ |
| 1213 | 4 | —CH$_2$O— | Ph(F)Ph | —CH(CF$_3$)(CH$_2$)$_3$OC$_2$H$_5$ |
| 1214 | 4 | —COO— | Ph(Cl) | —CH(CF$_3$)(CH$_2$)$_5$OC$_2$H$_5$ |
| 1215 | 4 | —CH$_2$O— | Ph—CH$_2$O—Ph | —CH(CH$_3$)C$_6$H$_{13}$-n |
| 1216 | 6 | —CH$_2$O— | Ph(F) | —CH$_2$CH$_2$C$_4$F$_9$-n |
| 1217 | 6 | —COO— | BiPh | —CH(CH$_3$)CH$_2$OC$_4$H$_9$-n |
| 1218 | 6 | —COO— | BiPh | —CH$_2$CH$_2$OC$_6$H$_{13}$-n |
| 1219 | 6 | —CH$_2$O— | Ph—(F)—Ph | —CH(CH$_3$)CH$_2$OC$_4$H$_9$-n |

TABLE 10-continued

In Formula (1), A is 1,2,3,4,-tetrahydro-2,6-naphthylene group; $Y_1$ is —COO— group

| EX. C | m | Z1 | B | R1 |
|---|---|---|---|---|
| 1220 | 5 | —CH$_2$O— | Ph—CH$_2$O—Ph | —CH(CH$_3$)C$_6$H$_{13}$-n |
| 1221 | 4 | —CH$_2$O— | Ph | —CH(CF$_3$)(CH$_2$)$_3$OC$_2$H$_5$ |
| 1222 | 4 | —COO— | Nap | —CH(CF$_3$)CH$_2$CH$_2$OC$_2$H$_5$ |
| 1223 | 8 | —CH$_2$O— | Ph(F) | —CH(CF$_3$)CH$_2$OC$_2$H$_5$ |
| 1224 | 8 | —COO— | Ph | —CH(CF$_3$)(CH$_2$)$_5$OC$_2$H$_5$ |
| 1225 | 8 | —COO— | Ph—(F)—Ph | —CH$_2$CH$_2$OC$_6$H$_{13}$-n |
| 1226 | 6 | —COO— | (F)BiPh | —CH$_2$CH$_2$OC$_6$H$_{13}$-n |
| 1227 | 10 | —COO— | BiPh | —CH(CH$_3$)C$_6$H$_{13}$-n |
| 1228 | 5 | —CH$_2$O— | Ph—COO—Ph | —CH(CH$_3$)C$_6$H$_{13}$-n |
| 1229 | 8 | —COO— | Ph | —CH(CF$_3$)(CH$_2$)$_3$OC$_2$H$_5$ |
| 1230 | 4 | —COO— | Ph—COO—Ph | —CH(CF$_3$)(CH$_2$)$_5$OC$_2$H$_5$ |
| 1231 | 8 | —COO— | Ph—COO—Ph | —CH$_2$CH$_2$OC$_6$H$_{13}$-n |
| 1232 | 5 | —CH$_2$O— | Ph(Cl) | —CH(CF$_3$)(CH$_2$)$_3$OC$_2$H$_5$ |
| 1233 | 8 | —COO— | Ph | —CH(CF$_3$)CH$_2$CH$_2$OC$_2$H$_5$ |
| 1234 | 8 | —COO— | Ph—CH$_2$O—Ph | —CH(CF$_3$)(CH$_2$)$_3$OC$_2$H$_5$ |
| 1235 | 2 | —COO— | Ph(F)—Ph | —CH(CF$_3$)(CH$_2$)$_3$OC$_2$H$_5$ |
| 1236 | 6 | —CH$_2$O— | Tetra | —CH$_2$CH(CH$_3$)C$_2$H$_5$ |
| 1237 | 8 | —COO— | (F)Ph | —CH(CF$_3$)C$_2$H$_5$ |
| 1238 | 8 | —COO— | Ph | —CH(CF$_3$)(CH$_2$)$_5$OC$_2$H$_5$ |
| 1239 | 8 | —COO— | Ph | —CH$_2$CH(CH$_3$)C$_2$H$_5$ |
| 1240 | 4 | —CH$_2$O— | BiPh | —CH(CH$_3$)CH$_2$CH$_2$OC$_2$H$_5$ |
| 1241 | 8 | —CH$_2$O— | BiPh | —CH$_2$CH$_2$OC$_6$H$_{13}$-n |
| 1242 | 5 | —CH$_2$O— | BiPh | —(CH$_2$)$_3$CH(CH$_3$)C$_2$H$_5$ |
| 1243 | 6 | —COO— | BiPh | —CH(CF$_3$)(CH$_2$)$_3$OC$_2$H$_5$ |
| 1244 | 6 | —CH$_2$O— | (F)BiPh | —CH(CH$_3$)C$_8$H$_{17}$-n |
| 1245 | 10 | —CH$_2$O— | Nap | —CH$_2$CH$_2$OC$_4$H$_9$-n |
| 1246 | 10 | —CH$_2$O— | BiPh | —CH(CH$_3$)C$_2$H$_5$ |
| 1247 | 4 | —CH$_2$O— | Ph(F)—Ph | —CH(CH$_3$)C$_6$H$_{13}$-n |
| 1248 | 8 | —COO— | Ph—OCO—Ph | —CH$_2$CH$_2$OC$_6$H$_{13}$-n |
| 1249 | 10 | —COO— | Ph | —CH(CF$_3$)(CH$_2$)$_5$OC$_2$H$_5$ |
| 1250 | 8 | —COO— | Ph(F)Ph | —CH(CF$_3$)CH$_2$CH$_2$OC$_2$H$_5$ |
| 1251 | 11 | —COO— | BiPh | —CH$_2$CH(CH$_3$)C$_2$H$_5$ |
| 1252 | 4 | —COO— | BiPh | —CH(CH$_3$)C$_2$H$_5$ |
| 1253 | 8 | —CH$_2$O— | Ph—COO—Ph | —CH(CH$_3$)C$_6$H$_{13}$-n |
| 1254 | 8 | —CH$_2$O— | BiPh(F) | —CH(CH$_3$)C$_8$H$_{17}$-n |
| 1255 | 6 | —CH$_2$O— | Ph—CH$_2$O—Ph | —CH$_2$CH(CH$_3$)C$_2$H$_5$ |
| 1256 | 10 | —CH$_2$O— | Ph | —CH(CH$_3$)C$_4$H$_9$-n |
| 1257 | 8 | —CH$_2$O— | BiPh | —CH(CF$_3$)(CH$_2$)$_5$OC$_2$H$_5$ |
| 1258 | 4 | —COO— | Ph | —CH(CF$_3$)(CH$_2$)$_5$OC$_2$H$_5$ |
| 1259 | 4 | —CH$_2$O— | BiPh | —CH$_2$CH$_2$OC$_4$H$_9$-n |
| 1260 | 8 | —COO— | BiPh | —CH(CH$_3$)C$_2$H$_5$ |
| 1261 | 5 | —CH$_2$O— | BiPh | —CH(CF$_3$)C$_2$H$_5$ |
| 1262 | 8 | —COO— | Ph—OCH$_2$—Ph | —CH$_2$CH(CH$_3$)C$_2$H$_5$ |
| 1263 | 8 | —CH$_2$O— | Ph—OCO—Ph | —CH$_2$CH$_2$OC$_4$H$_9$-n |
| 1264 | 8 | —COO— | Ph(F) | —(CH$_2$)$_3$CH(CH$_3$)C$_2$H$_5$ |
| 1265 | 8 | —COO— | Ph | —CH(CH$_3$)C$_6$H$_{13}$-n |
| 1266 | 12 | —COO— | Ph(F) | —CH(CF$_3$)CH$_2$CH$_2$OC$_2$H$_5$ |
| 1267 | 6 | —COO— | Ph—COO—Ph | —CH(CH$_3$)CH$_2$OC$_4$H$_9$-n |
| 1268 | 8 | —CH$_2$O— | Ph(Cl) | —CH(CH$_3$)C$_6$H$_{13}$-n |
| 1269 | 4 | —COO— | Ph | —CH(CF$_3$)C$_6$H$_{13}$-n |
| 1270 | 4 | —COO— | Ph—COO—Ph | —CH$_2$CH$_2$OC$_4$H$_9$-n |
| 1271 | 9 | —COO— | Ph(F)—Ph | —CH(CH$_3$)C$_6$H$_{13}$-n |
| 1272 | 12 | —CH$_2$O— | BiPh(F) | —CH(CH$_3$)CH$_2$OC$_4$H$_9$-n |
| 1273 | 12 | —CH$_2$O— | BiPh | —CH(CF$_3$)C$_2$H$_5$ |
| 1274 | 8 | —COO— | Ph(F)—Ph | —CH(CH$_3$)C$_6$H$_{13}$-n |
| 1275 | 10 | —CH$_2$O— | BiPh(F) | —CH$_2$CH(CH$_3$)C$_2$H$_5$ |
| 1276 | 5 | —COO— | BiPh(F) | —CH(CH$_3$)C$_8$H$_{17}$-n |
| 1277 | 9 | —CH$_2$O— | Ph | —CH$_2$CH$_2$OC$_6$H$_{13}$-n |
| 1278 | 5 | —COO— | Ph—(F)—Ph | —CH$_2$CH$_2$OC$_4$H$_9$-n |
| 1279 | 4 | —CH$_2$O— | Ph(F)—Ph | —CH(CH$_3$)C$_2$H$_5$ |
| 1280 | 8 | —CH$_2$O— | Ph | —CH$_2$CH$_2$C$_4$F$_9$-n |
| 1281 | 11 | —CH$_2$O— | BiPh | —CH$_2$CH$_2$OC$_6$H$_{13}$-n |
| 1282 | 6 | —COO— | Ph—OCO—Ph | —CH$_2$CH$_2$C$_4$F$_9$-n |
| 1283 | 6 | —CH$_2$O— | Ph(Cl) | —CH(CF$_3$)C$_2$H$_5$ |
| 1284 | 11 | —CH$_2$O— | Nap | —CH$_2$CH$_2$C$_8$F$_{17}$-n |
| 1285 | 8 | —CH$_2$O— | Ph—CH$_2$O—Ph | —CH(CF$_3$)CH$_2$CH$_2$OC$_2$H$_5$ |
| 1286 | 6 | —CH$_2$O— | Ph | —CH$_2$CH(CH$_3$)C$_2$H$_5$ |
| 1287 | 8 | —CH$_2$O— | Ph—OCH$_2$—Ph | —CH(CF$_3$)C$_2$H$_5$ |

EX. C.: Exemplified Compounds

TABLE 11

In Formula (1), A is 1,2,3,4,-tetrahydro-2,6-naphthylene group;
Y$_1$ is —OCO— group

| EX. C | m | Z1 | B | R1 |
|---|---|---|---|---|
| 1288 | 12 | —COO— | BiPh | —CH$_2$CH(CH$_3$)C$_2$H$_5$ |
| 1289 | 6 | —CH$_2$O— | Ph—COO—Ph | —CH(CH$_3$)C$_6$H$_{13}$-n |
| 1290 | 5 | —COO— | BiPh | —CH(CH$_3$)CH$_2$CH$_2$OC$_2$H$_5$ |
| 1291 | 8 | —COO— | (F)Ph | —CH$_2$CH(CH$_3$)C$_2$H$_5$ |
| 1292 | 2 | —CH$_2$O— | Ph | —CH(CH$_3$)C$_8$H$_{17}$-n |
| 1293 | 9 | —CH$_2$O— | BiPh | —CH$_2$CH(CH$_3$)C$_2$H$_5$ |
| 1294 | 7 | —CH$_2$O— | BiPh(F) | —CH(CH$_3$)C$_6$H$_{13}$-n |
| 1295 | 8 | —COO— | Ph | —CH(CH$_3$)C$_4$H$_9$-n |
| 1296 | 8 | —COO— | Nap | —CH(CH$_3$)C$_6$H$_{13}$-n |
| 1297 | 5 | —COO— | Ph(F) | —CH(CH$_3$)C$_4$H$_9$-n |
| 1298 | 6 | —CH$_2$O— | Ph(Cl) | —CH$_2$CH$_2$OC$_6$H$_{13}$-n |
| 1299 | 5 | —CH$_2$O— | Ph—OCO—Ph | —CH(CH$_3$)CH$_2$O$_{C4}$H$_9$-n |
| 1300 | 11 | —COO— | Nap | —CH(CH$_3$)C$_8$H$_{17}$-n |
| 1301 | 4 | —COO— | BiPh | —CH$_2$CH$_2$OC$_6$H$_{13}$-n |
| 1302 | 4 | —CH$_2$O— | Nap | —CH$_2$CH(CH$_3$)C$_2$H$_5$ |
| 1303 | 4 | —CH$_2$O— | (F)Ph | —CH(CH$_3$)C$_8$H$_{17}$-n |
| 1304 | 5 | —COO— | Ph—COO—Ph | —CH(CH$_3$)C$_8$H$_{17}$-n |
| 1305 | 6 | —COO— | BiPh | —CH(CH$_3$)CH$_2$OC$_4$H$_9$-n |
| 1306 | 8 | —COO— | BiPh | —CH(CH$_3$)C$_8$H$_{17}$-n |
| 1307 | 2 | —COO— | (F)BiPh | —CH$_2$CH(CH$_3$)C$_2$H$_5$ |
| 1308 | 6 | —COO— | BiPh | —CH$_2$CH(CH$_3$)C$_2$H$_5$ |
| 1309 | 2 | —COO— | Ph(Cl) | —CH$_2$CH$_2$OC$_4$H$_9$-n |
| 1310 | 4 | —COO— | (F)BiPh | —CH$_2$CH$_2$OC$_4$H$_9$-n |
| 1311 | 12 | —COO— | Ph—OCO—Ph | —CH(CH$_3$)C$_8$H$_{17}$-n |
| 1312 | 11 | —CH$_2$O— | BiPh | —CH(CH$_3$)C$_6$H$_{13}$-n |
| 1313 | 11 | —COO— | Ph | —CH$_2$CH(CH$_3$)C$_2$H$_5$ |
| 1314 | 11 | —COO— | BiPh | —CH$_2$CH(CH$_3$)C$_2$H$_5$ |
| 1315 | 4 | —CH$_2$O— | Ph—OCO—Ph | —(CH$_2$)$_3$CH(CH$_3$)C$_2$H$_5$ |
| 1316 | 4 | —CH$_2$O— | BiPh | —CH(CH$_3$)CH$_2$CH$_2$OC$_2$H$_5$ |
| 1317 | 4 | —COO— | Ph(Cl) | —CH(CH$_3$)CH$_2$OC$_4$H$_9$-n |
| 1318 | 14 | —COO— | Ph(F) | —CH(CH$_3$)C$_6$H$_{13}$-n |
| 1319 | 8 | —COO— | Ph—OCO—Ph | —CH(CH$_3$)C$_8$H$_{17}$-n |
| 1320 | 8 | —CH$_2$O— | BiPh | —(CH$_2$)$_3$CH(CH$_3$)C$_2$H$_5$ |
| 1321 | 5 | —CH$_2$O— | Nap | —CH(CH$_3$)C$_8$H$_{17}$-n |
| 1322 | 4 | —COO— | BiPh | —CH(CH$_3$)C$_6$H$_{13}$-n |
| 1323 | 6 | —CH$_2$O— | BiPh(F) | —CH$_2$CH(CH$_3$)C$_2$H$_5$ |
| 1324 | 8 | —COO— | Nap | —CH(CH$_3$)CH$_2$CH$_2$OC$_2$H$_5$ |
| 1325 | 4 | —COO— | Nap | —CH(CH$_3$)C$_6$H$_{13}$-n |
| 1326 | 6 | —CH$_2$O— | BiPh | —CH$_2$CH(CH$_3$)C$_2$H$_5$ |
| 1327 | 4 | —COO— | Ph | —CH(CH$_3$)C$_4$H$_9$-n |
| 1328 | 4 | —COO— | Ph(F) | —CH$_2$CH(CH$_3$)C$_2$H$_5$ |
| 1329 | 6 | —COO— | BiPh | —CH(CH$_3$)C$_8$H$_{17}$-n |
| 1330 | 8 | —COO— | Nap | —(CH$_2$)$_3$CH(CH$_3$)C$_2$H$_5$ |
| 1331 | 9 | —CH$_2$O— | Nap | —CH(CH$_3$)CH$_2$CH$_2$OC$_2$H$_5$ |
| 1332 | 9 | —COO— | BiPh | —CH$_2$CH(CH$_3$)C$_2$H$_5$ |

EX. C.: Exemplified Compounds

TABLE 12

In Formula (1), A is 1,2,3,4-tetrahydro-2,6-naphthylene group;
Y$_1$ is —O— group

| EX. C | m | Z1 | B | R1 |
|---|---|---|---|---|
| 1333 | 5 | —COO— | (F)BiPh | —CH(CH$_3$)CH$_2$OC$_2$H$_5$ |
| 1334 | 7 | —COO— | Ph | —CH$_2$CH(CH$_3$)C$_2$H$_5$ |
| 1335 | 10 | —COO— | BiPh | —CH(CH$_3$)C$_6$H$_{13}$-n |
| 1336 | 10 | —CH$_2$O— | BiPh | —CH(CH$_3$)C$_6$H$_{13}$-n |
| 1337 | 8 | —CH$_2$O— | Ph—OCO—Ph | —CH(CH$_3$)C$_4$H$_9$-n |
| 1338 | 8 | —CH$_2$O— | BiPh | —CH$_2$CH(CH$_3$)C$_2$H$_5$ |
| 1339 | 8 | —CH$_2$O— | Ph—COO—Ph | —CH(CH$_3$)C$_8$H$_{17}$-n |
| 1340 | 11 | —CH$_2$O— | Ph—COO—Ph | —CH(CH$_3$)C$_6$H$_{13}$-n |
| 1341 | 6 | —CH$_2$O— | Nap | —CH$_2$CH(CH$_3$)C$_2$H$_5$ |
| 1342 | 5 | —CH$_2$O— | Nap | —CH(CH$_3$)C$_6$H$_{13}$-n |
| 1343 | 2 | —COO— | Ph | —CH$_2$CH(CH$_3$)C$_2$H$_5$ |
| 1344 | 10 | —COO— | BiPh | —CH(CH$_3$)CH$_2$CH$_2$OC$_2$H$_5$ |
| 1345 | 6 | —COO— | BiPh | —CH(CH$_3$)C$_4$H$_9$-n |
| 1346 | 10 | —CH$_2$O— | Ph(F) | —CH$_2$CH$_2$OC$_4$H$_9$-n |
| 1347 | 4 | —CH$_2$O— | Nap | —CH(CH$_3$)CH$_2$CH$_2$OC$_2$H$_5$ |

TABLE 12-continued

In Formula (1), A is 1,2,3,4-tetrahydro-2,6-naphthylene group;
Y$_1$ is —O— group

| EX. C | m | Z1 | B | R1 |
|---|---|---|---|---|
| 1348 | 8 | —CH$_2$O— | Nap | —CH(CH$_3$)CH$_2$CH$_2$OC$_2$H$_5$ |
| 1349 | 8 | —COO— | BiPh | —CH(CH$_3$)CH$_2$OC$_2$H$_5$ |
| 1350 | 6 | —COO— | BiPh | —CH$_2$CH(CH$_3$)C$_2$H$_5$ |
| 1351 | 6 | —COO— | BiPh | —CH(CH$_3$)C$_6$H$_{13}$-n |
| 1352 | 6 | —CH$_2$O— | BiPh(F) | —CH(CH$_3$)CH$_2$CH$_2$OC$_2$H$_5$ |
| 1353 | 4 | —CH$_2$O— | Nap | —CH$_2$CH(CH$_3$)C$_2$H$_5$ |
| 1354 | 4 | —CH$_2$O— | Ph | —CH(CH$_3$)C$_8$H$_{17}$-n |
| 1355 | 8 | —CH$_2$O— | Ph(Cl) | —CH$_2$CH(CH$_3$)C$_2$H$_5$ |
| 1356 | 4 | —COO— | Ph(F) | —CH(CH$_3$)CH$_2$CH$_2$OC$_2$H$_5$ |
| 1357 | 8 | —COO— | BiPh | —CH(CH$_3$)C$_8$H$_{17}$-n |
| 1358 | 11 | —CH$_2$O— | BiPh | —CH(CH$_3$)C$_8$H$_{17}$-n |
| 1359 | 6 | —CH$_2$O— | Nap | —CH(CH$_3$)C$_8$H$_{17}$-n |
| 1360 | 10 | —CH$_2$O— | Nap | —CH$_2$CH(CH$_3$)C$_2$H$_5$ |
| 1361 | 6 | —CH$_2$O— | Ph(F) | —CH$_2$CH(CH$_3$)C$_2$H$_5$ |
| 1362 | 8 | —CH$_2$O— | Nap | —CH(CH$_3$)C$_6$H$_{13}$-n |
| 1363 | 14 | —CH$_2$O— | BiPh | —CH$_2$CH$_2$OC$_6$H$_{13}$-n |
| 1364 | 14 | —COO— | BiPh | —CH$_2$CH(CH$_3$)C$_2$H$_5$ |
| 1365 | 8 | —CH$_2$O— | (F)BiPh | —CH$_2$CH$_2$OC$_4$H$_9$-n |
| 1366 | 9 | —COO— | BiPh | —CH(CH$_3$)CH$_2$O$_{C4}$H$_9$-n |
| 1367 | 8 | —COO— | Ph(F) | —CH$_2$CH$_2$(CH$_3$)C$_2$H$_5$ |
| 1368 | 8 | —CH$_2$O— | (F)Ph | —CH$_2$CH(CH$_3$)C$_2$H$_5$ |
| 1369 | 8 | —COO— | Ph | —CH(CH$_3$)C$_6$H$_{13}$-n |
| 1370 | 4 | —COO— | BiPh | —CH$_2$CH$_2$OC$_6$H$_{13}$-n |
| 1371 | 8 | —CH$_2$O— | Ph(F) | —CH$_2$CH(CH$_3$)C$_2$H$_5$ |
| 1372 | 6 | —COO— | Ph | —CH$_2$CH(CH$_3$)C$_2$H$_5$ |
| 1373 | 8 | —COO— | BiPh(F) | —(CH$_3$)C$_6$H$_{13}$-n |
| 1374 | 4 | —CH$_2$O— | BiPh | —CH(CH$_3$)C$_8$H$_{17}$-n |
| 1375 | 10 | —CH$_2$O— | BiPh | —CH(CH$_3$)CH$_2$CH$_2$OC$_2$H$_5$ |
| 1376 | 6 | —COO— | BiPh(F) | —CH$_2$CH$_2$OC$_6$H$_{13}$-n |
| 1377 | 8 | —COO— | Ph(F) | —CH(CH$_3$)CH$_2$CH$_2$OC$_2$H$_5$ |

EX. C.: Exemplified Compounds

A production process of the acetylene compound represented by Formula (1) of the present invention shall be described below.

The acetylene compound represented by Formula (1) of the present invention can be produced through, for example, the following steps.

—When Z$_1$ is a —COO— group—

The acetylene compound represented by Formula (1) can be produced by esterifying a carboxylic acid represented by Formula (4) with a compound represented by Formula (5). The esterification reaction of the carboxylic acid represented by Formula (4) with the compound represented by Formula (5) can be carried out, for example, by 1) a method in which the carboxylic acid represented by Formula (4) is converted to a carboxylic acid halide with a halogenating agent (for example, thionyl chloride and oxalyl chloride), and then the carboxylic acid halide is reacted with the compound represented by Formula (5) in the presence of a base (for example, triethylamine and pyridine) and 2) a method in which the carboxylic acid represented by Formula (4) is reacted with the compound represented by Formula (5) in the presence of a dehydration-condensing agent such as N,N'-dicyclohexyl carbodiimide (hereinafter abbreviated as DCC) and a catalyst (for example, 4-N,N-dimethylaminopyridine and 4-pyrrolidinopyridine):

n-C$_m$H$_{2m+1}$—C≡C—A—COOH  (4)
  +
HO—B—Y$_1$—R$_1$   (5)

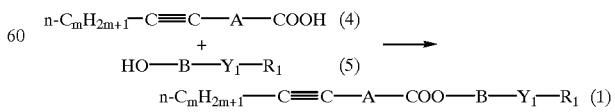

n-C$_m$H$_{2m+1}$—C≡C—A—COO—B—Y$_1$—R$_1$  (1)

—When Z$_1$ is a —CH$_2$O— group—

The acetylene compound represented by Formula (1) can be produced by etherifying a compound represented by Formula (6) (wherein $Z_2$ represents an eliminating group such as a —OH group, a halogen atom and a p-toluenesulfonyloxy group) with the compound represented by Formula (5). The etherification reaction of the compound represented by Formula (6) with the compound represented by Formula (5) can be carried out, for example, by 1) a method in which the compound represented by Formula (6) in which $Z_2$ is a halogen atom or a p-toluenesulfonyloxy group is reacted with the compound represented by Formula (5) in the presence of a base (for example, potassium carbonate, sodium carbonate, potassium hydrogencarbonate, sodium hydrogencarbonate, sodium hydroxide, potassium hydroxide and sodium hydride) in a solvent (for example, N,N-dimethylformamide, N,N-dimethylacetamide and alcohols) at room temperature or a temperature higher than room temperature and 2) a method in which the compound represented by Formula (6) is reacted with the compound represented by Formula (5) in the presence of a dehydration-condensing agent such as diethylazodicarboxylic acid (hereinafter abbreviated as DEAD) and triphenylphosphine:

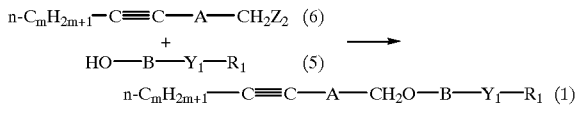

The carboxylic acid represented by Formula (4) can be produced according to the following production process.

That is, a carboxylic ester represented by Formula (7) (wherein $R_2$ represents a lower alkyl group such as methyl and ethyl, and $X_5$ represents a halogen atom such as chlorine, bromine and iodine, or a trifluoromethanesulfonyloxy group) is reacted with an alkyne represented by Formula (8) in the presence of a base (for example, triethylamine and diisopropylamine), a palladium catalyst such as dichloro bis(triphenylphosphine)palladium(II) and a copper halide such as copper iodide to obtain a carboxylic ester represented by Formula (9). Then, the carboxylic ester represented by Formula (9) is hydrolyzed in the presence of a base (for example, sodium hydroxide and potassium hydroxide), whereby the carboxylic acid represented by Formula (4) can be produced:

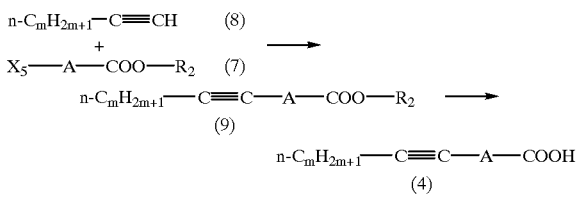

Further, the compound represented by Formula (6) can be produced according to, for example, a production process shown below.

That is, The compound represented by Formula (6) in which $Z_2$ is a —OH group can be produced by reducing the carboxylic ester represented by Formula (9) or the carboxylic acid represented by Formula (4) with a reducing agent such as lithium aluminum hydride in a solvent (for example, tetrahydrofuran and diethyl ether):

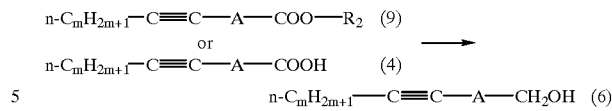

The compound represented by Formula (6) in which $Z_2$ is a halogen atom can be produced by 1) a method in which the compound represented by Formula (6) in which $Z_2$ is a OH group is reacted with a hydrogen halide (for example, hydrogen chloride and hydrogen bromide) in the presence of DEAD and triphenylphosphine and 2) a method in which the compound represented by Formula (6) in which $Z_2$ is OH is reacted with a halogenating agent (for example, hydrogen bromide, thionyl chloride and phosphorus tribromide). Further, the compound represented by Formula (6) in which $Z_2$ is a p-toluenesulfonyloxy group can be produced by reacting the compound represented by Formula (6) in which $Z_2$ is OH with p-toluenesulfonyl chloride in the presence of a base (for example, triethylamine, sodium hydride and sodium carbonate).

The compound represented by Formula (5) can be produced by a method in which a compound represented by Formula (10) (wherein $Z_3$ represents a protecting group such as a benzyl group and a tetrahydropyranyl group) is subjected to deblocking by a conventional method:

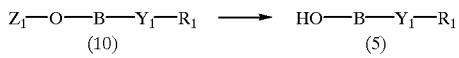

The acetylene compound of the present invention includes compounds exhibiting intrinsically a liquid crystallinity and compounds exhibiting intrinsically no liquid crystallinity. Further, the compounds exhibiting a liquid crystallinity include compounds exhibiting a tilted smectic phase (for example, a ferroelectric phase [for example, a chiral smectic C phase (hereinafter abbreviated as a $S_c^*$ phase)], a smectic C phase (hereinafter abbreviated as a $S_c$ phase), an anti-ferroelectric phase (for example, a chiral smectic $C_A$ phase (hereinafter abbreviated as a $Sc_A$ phase)] and a ferrielectric phase [for example, a chiral smectic $C_\alpha$ phase]} and compounds exhibiting a liquid crystallinity but exhibiting no tilted smectic phase. These compounds each can effectively be used for the component of the liquid crystal composition.

Next, the liquid crystal composition of the present invention shall be explained. In general, a liquid crystal composition comprises two or more components, but the liquid crystal composition of the present invention contains at least one acetylene compound of the present invention as an essential component.

The acetylene compound of the present invention used for the liquid crystal composition of the present invention includes acetylene compounds exhibiting no liquid crystallinity, acetylene compounds exhibiting a tilted smectic phase and acetylene compounds exhibiting a liquid crystallinity but exhibiting no tilted smectic phase.

The liquid crystal composition of the present invention includes preferably liquid crystal compositions exhibiting chiral smectic C, $C_A$, F, G, H and I phases or a ferrielectric phase, and liquid crystal compositions exhibiting an Sc* phase, an $Sc_A^*$ phase or a ferrielectric phase are more preferred.

A liquid crystal composition exhibiting an Sc* phase is a ferroelectric liquid crystal composition, and a liquid crystal composition exhibiting an $Sc_A^*$ phase is an anti-ferroelectric liquid crystal composition. The liquid crystal composition of the present invention may be either a ferroelectric liquid crystal composition or an anti-ferroelectric liquid crystal composition. Further, it may be a thresholdless anti-ferroelectric liquid crystal (TLAFLC) composition.

The liquid crystal composition of the present invention is a composition prepared by combining plural compounds selected from the acetylene compounds of the present invention, optically active liquid crystal compounds other than the acetylene compound of the present invention, optically inactive liquid crystal compounds other than the acetylene compound of the present invention and optically active compounds other than the acetylene compound of the present invention, and it contains at least one acetylene compound of the present invention.

The optically active liquid crystal compounds other than the acetylene compound of the present invention shall not specifically be restricted and include, for example, optically active phenyl benzoate type liquid crystal compounds, optically active biphenyl benzoate type liquid crystal compounds, optically active naphthalene type liquid crystal compounds, optically active phenylnaphthalene type liquid crystal compounds, optically active tolan type liquid crystal compounds, optically active phenylpyrimidine type liquid crystal compounds, optically active naphthylpyrimidine type liquid crystal compounds and optically active tetralin type liquid crystal compounds.

The optically inactive liquid crystal compounds other than the acetylene compound of the present invention shall not specifically be restricted and include, for example, optically inactive phenyl benzoate type liquid crystal compounds, optically inactive biphenyl benzoate type liquid crystal compounds, optically inactive naphthalene type liquid crystal compounds, optically inactive phenylnaphthalene type liquid crystal compounds, optically inactive tolan type liquid crystal compounds, optically inactive phenylpyrimidine type liquid crystal compounds, optically inactive naphthylpyrimidine type liquid crystal compounds and optically inactive tetralin type liquid crystal compounds.

An optically active compound means a compound which does not exhibit a liquid crystallinity in itself but has the ability to reveal a tilted chiral smectic phase by mixing with a liquid crystal compound or liquid crystal composition exhibiting a tilted smectic phase. The optically active compounds other than the acetylene compound of the present invention shall not specifically be restricted and include, for example, optically active phenyl benzoate type non-liquid crystal compounds, optically active biphenyl benzoate type non-liquid crystal compounds, optically active naphthalene type non-liquid crystal compounds, optically active phenylnaphthalene type non-liquid crystal compounds, optically active tolan type non-liquid crystal compounds, optically active phenylpyrimidine type non-liquid crystal compounds, optically active naphthylpyrimidine type non-liquid crystal compounds and optically active tetralin type non-liquid crystal compounds.

Further, the liquid crystal composition of the present invention may contain, in addition to the essential components described above, compounds exhibiting no liquid crystallinity other than the acetylene compound of the present invention (for example, dichroic dyes such as anthraquinone type dyes, azo type dyes, conductivity-providing agents and life-improving agents). The content of the acetylene compounds of the present invention in the liquid crystal composition of the present invention shall not specifically be restricted, and the liquid crystal composition of the present invention may be a liquid crystal composition comprising only the acetylene compounds of the present invention. The content of the acetylene compounds of the present invention in the liquid crystal composition of the present invention are usually 1 to 100% by weight, preferably 3 to 90% by weight and more preferably 5 to 80% by weight.

The liquid crystal composition containing at least one acetylene compound of the present invention is excellent in terms of a high-speed response, a threshold characteristic, a temperature range in a liquid crystal area and an alignment characteristic as compared with liquid crystal compositions which have so far been known.

Next, the liquid crystal element of the present invention shall be explained.

The liquid crystal element of the present invention comprises the liquid crystal composition of the present invention which is disposed between a pair of electrode substrates. FIG. 1 is a cross-sectional schematic drawing showing one example of the liquid crystal element having a chiral smectic phase for explaining the structure of a liquid crystal element making use of a ferroelectricity or an anti-ferroelectricity.

The liquid crystal element comprises a liquid crystal layer 1 exhibiting a chiral smectic phase which is disposed between a pair of substrates 2 each provided thereon with a transparent electrode 3 and an insulating alignment-controlling layer 4, wherein the layer thickness of the liquid crystal layer is controlled by a spacer 5, and a power source 7 is connected to a pair of the transparent electrodes 3 via lead wires 6 so that voltage can be applied to the transparent electrodes 3. Further, a pair of the substrates 2 are interposed between a pair of polarizing plates 8 disposed in a cross-nicol state, and a light source 9 is disposed on the outside of one of them.

Materials for the substrate 2 include glass such as soda lime glass and boron-silicate glass and transparent polymers such as polycarbonate, polyether sulfone and polyacrylate.

The transparent electrode 3 provided on two sheets of the substrates 2 includes, for example, a transparent electrode comprising a thin film of $In_2O_3$, $SnO_2$ or ITO (indium tin oxide).

The insulating alignment-controlling layer 4, which is prepared by rubbing a thin film of a polymer such as polyimide and the like with a flocked cloth of nylon, acetate, rayon or the like, is intended for aligning liquid crystal. The materials for the insulating alignment-controlling layer 4 include, for example, inorganic materials such as silicon nitride, hydrogen-containing silicon nitride, silicon carbide, hydrogen-containing silicon carbide, silicon oxide, boron nitride, hydrogen-boron nitride containing, cerium oxide, aluminum oxide, zirconium oxide, titanium oxide and magnesium fluoride, and organic materials such as polyvinyl alcohol, polyimide, polyamideimide, polyesterimide, polyetherimide, polyetherketone, polyetheretherketone, polyethersulfone, polyparaxylene, polyester, polycarbonate, polyvinylacetal, polyvinyl chloride, polyvinyl acetate, polyamide, polystyrene, cellulose resins, melamine resins, urea resins, and acrylic resins. The insulating alignment-controlling layer may be either an insulating alignment-controlling layer of a dual layer structure in which an organic insulating layer is formed on an inorganic insulating layer, or an insulating alignment-controlling layer comprising only an inorganic insulating layer or an organic insulating layer.

When the insulating alignment-controlling layer comprises an inorganic insulating layer, it can be formed by vapor deposition. When it comprises an organic insulating layer, it can be formed by coating a solution of an organic insulating layer material or a precursor thereof by spinner coating, dip coating, screen printing, spray coating, or roll coating, removing the solvent under a prescribed condition (for example, heating) and then baking, if necessary, the resulting film. When the organic insulating layer is formed, the substrate provided with the transparent electrode is subjected to surface treatment, if necessary, using a silane coupling agent such as β-(3,4-epoxycyclohexyl)ethyltrimethoxysilane,
γ-glycidyloxypropyltrimethoxysilane,
γ-glycidyloxypropylmethyldiethoxysilane,
γ-glycidyloxypropyltriethioxysilane,
γ-methacryloxypropylmethyldimethoxysilane,
γ-methacryloxypropyltrimethoxysilane,
γ-methacryloxypropyltriethoxysilane, N-β-(aminoethyl)-γ-aminopropylmethyldimethoxysilane,
N-β-(aminoethyl)-γ-aminopropyltrimethoxysilane,
N-β-(aminoethyl)-γ-aminopropyltriethoxysilane,
γ-aminopropyltrimethoxysilane, and
γ-aminopropyltriethoxysilane, and then an organic insulating layer material or a precursor thereof may be coated. The insulating alignment-controlling layer 4 has usually a layer thickness of 10 angstroms to 1 μm, preferably 10 to 3000 angstroms, and more preferably 10 to 2000 angstroms.

Two sheets of the substrates 2 are maintained at an optional space with the spacers 5. The substrates can be maintained at an optional space by interposing, for example, silica beads or alumina beads each having a prescribed diameter used as the spacers between the substrates 2 and by sealing the circumference of two sheets of the substrates 2 with a sealant (for example, epoxy base adhesives). Further, polymer films and glass fibers may be used as the spacers. Liquid crystal exhibiting a chiral smectic phase is charged between two sheets of the substrates. The liquid crystal layer 1 is set usually to a thickness of 0.5 to 20 μm, preferably 1 to 5 μm and more preferably 1 to 3 μm.

The transparent electrodes 3 are connected to the external power source 7 via lead wires 6.

Further, a pair of the polarizing plates 8 are disposed on the outsides of the substrates 2, wherein the respective polarizing axes are controlled, for example, in a cross-nicol state. An example shown in FIG. 1 is a transmitting type and has a light source 9.

The liquid crystal element using the liquid crystal composition of the present invention is applicable not only as an element of a transmitting type shown in FIG. 1 but also as an element of a reflecting type.

A display system of the liquid crystal element using the liquid crystal composition of the present invention shall not specifically be restricted, and there can be used, for example, display systems of (a) a helical distortion type, (b) an SSFLC (surface stabilized ferroelectric liquid crystal) type, (c) a TSM (transient scattering mode) type, (d) a G-H (guest-host) type and (e) a field sequential color type.

A driving method of the liquid crystal element using the liquid crystal composition of the present invention may be either a passive driving type such as a segment type and a simple matrix type or an active driving type such as a TFT (thin film transistor) type and an MIM (metal-insulator-metal) type.

Further, the acetylene compound of the present invention and the liquid crystal composition comprising the above compound can be applied to fields other than a liquid crystal element for display for example, ① non-linear photofunction elements, ② electronics materials such as a capacitor material, ③ electronics elements for limiters, memories, amplifiers and modulators, ④ sensing elements of voltage for heat, light, pressure and mechanical distortion, and sensors therefor ⑤ power generating elements such as a thermoelectric-generating element, ⑥ space light-modulation element, and ⑦ photoconductive materials.

EXAMPLES

The present invention shall be explained in further detail with reference to examples, but the present invention shall not be restricted to the following examples.

Symbols I, N, Ch, $S_A$, $S_C^*$, $S_C$, $S_{CA}^*$, Ferri, $S_X$ and C shown in the respective examples and tables mean the following:

I: isotropic liquid

N: nematic phase

Ch: cholesteric phase (chiral nematic phase)

$S_A$: smectic A phase $S_C^*$: chiral smectic C phase $S_C$: smectic C phase $S_{CA}^*$: chiral smectic CA phase Ferri: ferrielectric phase (non-identified)

$S_X$: non-identified smectic phase

C: crystal phase

The phase transition temperatures shown in the respective production examples and examples were determined by means of a polarizing microscope equipped with a temperature controlling device or a differential scanning calorimeter (DSC).

Production Example 1

Production of 4-(1'-n-octynyl)benzoic acid

Added to 50 g of triethylamine were 22.9 g of ethyl 4-bromobenzoate, 11.0 g of 1-n-octyne, 0.5 g of triphenylphosphine, 0.1 g of dichlorobis(triphenylphosphine)palladium (II) and 0.1 g of copper iodide, and the mixture was heated at 40° C. for one hour and subsequently at 80° C. for 2 hours under nitrogen flow while stirring. Then, triethylamine was distilled off from the reaction mixture to obtain a residue. The residue thus obtained was dissolved in toluene, and the toluene solution was washed with diluted hydrochloric acid and saturated brine. Toluene was distilled off from the toluene solution under reduced pressure to obtain ethyl 4-(1'-n-octynyl)benzoate in the form of a brown oily substance. Next, a mixture comprising 25 g of resulting ethyl 4-(1'-n-octynyl)benzoate, 11.6 g of sodium hydroxide, 50 g of ethanol and 30 g of water was heated at 60° C. for 5 hours while stirring. Then, the reaction mixture was cooled down to room temperature, and was added conc. hydrochloric acid until it was turned to acid, followed by filtering off a deposited solid. The solid thus obtained was dissolved in ethyl acetate, and the ethyl acetate solution was washed with saturated brine. The organic phase was separated from the aqueous phase, and then ethyl acetate was distilled off from the solution under reduced pressure. The resultant residue was recrystallized from hexane to obtain 18.5 g of 4-(1'-n-octynyl)benzoic acid in the form of a colorless crystal.

Melting point: 127 to 129° C.

Production Example 2

Production of 4-(1'-n-decynyl)benzoic acid

The same operation as described in Production Example 1 was repeated to obtain 19.2 g of 4-(1'-n-decynyl)benzoic acid in the form of a colorless crystal, except that 13.8 g of 1-n-decyne was substituted for 11.0 g of 1-n-octyne. This compound has a melting point of 112 to 113° C. and exhibits a nematic phase in a range of 106 to 102° C. at a cooling-down step.

Production Example 3

Production of 4-(1'-n-heptynyl)benzoic acid

The same operation as described in Production Example 1 was repeated to obtain 17.9 g of 4-(1'-n-heptynyl)benzoic acid in the form of a colorless crystal, except that 9.6 g of 1-n-heptyne was substituted for 11.0 g of 1-n-octyne.

Melting point: 144 to 145° C.

Production Example 4

Production of 4-(1'-n-octynyl)benzyl alcohol

Added to 125 g of tetrahydrofuran was 1.69 g of lithium aluminum hydride to prepare a suspension of lithium aluminum hydride. A solution prepared by dissolving 9.06 g of ethyl 4-(1'-n-octynyl)benzoate in 50 g of tetrahydrofuran was added dropwise to the suspension in one hour. Thereafter, the reaction mixture was heated for 3 hours while refluxing and then cooled down to room temperature, followed by slowly adding dropwise 20 g of water while cooling with ice. Further, ½ N hydrochloric acid was added thereto to turn the reaction mixture to acid. Ethyl acetate was added to the reaction mixture, and the mixture was washed with water. Then, ethyl acetate was distilled off under reduced pressure, whereby 7.8 g of 4-(1'-n-octynyl)benzyl alcohol was obtained in the form of a brown oily substance.

Production Example 5

Production of 4-(4'-(1"-n-octynyl)phenyl)benzoic acid

①: A mixture comprising 23.6 g of 1,4-dibromobenzene, 11 g of 1-n-octyne, 0.1 g of triphenylphosphine, 0.05 g of dichloro bis(triphenylphosphine)palladium (II), 0.05 g of copper iodide and 80 g of triethylamine was stirred at room temperature for one hour under nitrogen flow and then further stirred at 40° C. for 30 minutes and at 60° C. for 2 hours. After the reaction mixture was cooled down to room temperature, a resulting salt of triethylamine was filtered off, and then triethylamine was distilled off from the filtrate. Toluene was added to the residue to obtain a toluene solution, and this solution was neutralized with ½ N hydrochloric acid and washed with water. Toluene was distilled off from the toluene solution under reduced pressure, and the residue was distilled under reduced pressure, whereby 18.1 g of 4-(1'-n-octynyl)bromobenzene was obtained in the form of a colorless oily substance.

Boiling point: 145 to 148° C./5 mm Hg.

②: Added to 8 g of tetrahydrofuran was 0.95 g of magnesium turnings, and a mixture comprising 10.5 g of 4-(1'-n-octynyl)bromobenzene and 47 g of tetrahydrofuran was added dropwise thereto at a dropping rate of such an extent that mild reflux was maintained. After finishing adding dropwise, the reaction mixture was further heated for 2 hours while refluxing and then cooled down to room temperature. The solution was added dropwise to a solution comprising 6.5 g of trimethyl borate and 20 g of tetrahydrofuran which was cooled at −70° C., and the mixture was stirred at the same temperature for one hour and at room temperature for one hour. Then, hydrochloric acid was added to the reaction mixture to turn it to acid, and ethyl acetate was added thereto. After washing the ethyl acetate solution with water, ethyl acetate was distilled off from the solution under reduced pressure, and the residue was recrystallized from hexane, whereby 6.38 g of 4-(1'-n-octynyl)phenyl borate was obtained in the form of a colorless crystal.

Melting point: 122 to 123° C.

③: A mixture comprising 3.45 g of 4-(1'-n-octynyl)phenyl borate, 3.43 g of ethyl 4-bromobenzoate, 3.18 g of sodium carbonate, 0.174 g of tetrakis(triphenylphosphine) palladium (0), 20 g of toluene and 20 g of water was heated at 70° C. for 3 hours under nitrogen flow while stirring and then cooled down to room temperature. The toluene phase was separated and neutralized with ½ N hydrochloric acid, followed by washing with water. Toluene was distilled off from the toluene phase under reduced pressure, and the residue was purified by means of silica gel column chromatography. The resultant solid was recrystallized from ethanol, whereby 4.51 g of ethyl 4-(4'-(1"-n-octynyl)phenyl) benzoate was obtained in the form of a colorless crystal.

④: A mixture comprising 3.0 g of ethyl 4-(4'-(1"-n-octynyl) phenyl)benzoate, 2.5 g of sodium hydroxide, 20 g of ethanol and 10 g of water was heated at 60° C. for 4 hours while stirring. Thereafter, conc. hydrochloric acid was added to the reaction mixture to turn it to acid, and then ethyl acetate was added thereto. The ethyl acetate solution was washed with water, and ethyl acetate was distilled off under reduced pressure. Then, the residue was recrystallized from toluene, whereby 2.7 g of 4-(4'-(1"-n-octynyl)phenyl)benzoic acid was obtained in the form of a colorless crystal.

The phase transition temperature (° C.) of this compound is shown below:

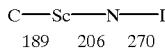

Production Example 6

Production of 4-(3'-fluoro-4'-(1"-n-octynyl)phenyl) benzoic acid

①: A mixture comprising 21.1 g of 4-iodo-3-fluorobromobenzene, 9.7 g of 1-n-octyne, 0.25 g of triphenylphosphine, 0.07 g of dichloro bis(triphenyl phosphine)palladium (II), 0.07 g of copper iodide and 60 g of triethylamine was stirred at room temperature for one hour under nitrogen flow and then further stirred at 40° C. for 30 minutes and at 60° C. for 2 hours. After the reaction mixture was cooled down to room temperature, a resulting salt of triethylamine was filtered off, and then triethylamine was distilled off from the filtrate. Toluene was added to the residue to obtain a toluene solution, and the solution was neutralized with ½ N hydrochloric acid and washed with water. Toluene was distilled off from the toluene solution under reduced pressure, and the residue was distilled under reduced pressure, whereby 17.8 g of 4-(1'-n-octynyl)-3-fluorobromobenzene was obtained in the form of a colorless oily substance.

Boiling point: 151 to 154° C./5 mm Hg.

②: Added to 7 g of tetrahydrofuran was 0.78 g of magnesium turnings, and a mixture comprising 10.0 g of 4-(1'-n-octynyl)-3-fluorobromobenzene and 38 g of tetrahydrofuran was added dropwise thereto at a dropping rate of such an extent that mild reflux was maintained. After finishing adding dropwise, the reaction mixture was further heated for 2 hours while refluxing and then cooled down to room temperature. The solution was added dropwise to a solution comprising 5.25 g of trimethyl borate and 20 g of tetrahydrofuran which was cooled at −70° C., and the mixture was stirred at the same temperature for one hour and at room temperature for one hour. Then, hydrochloric acid was added to the reaction mixture to turn it to acid, and ethyl acetate was added thereto. After washing the ethyl acetate solution with water, ethyl acetate was distilled off from the solution under reduced pressure, and the residue was recrystallized from hexane, whereby 7.8 g of 4-( 1'-n-octynyl)-3-fluorophenyl borate was obtained in the form of a colorless crystal.

③: A mixture comprising 5 g of 4-(1'-n-octynyl)-3-fluorophenyl borate, 4.15 g of ethyl 4-bromobenzoate, 3.82 g of sodium carbonate, 0.209 g of tetrakis(triphenylphosphine)palladium (0), 20 g of toluene and 20 g of water was heated at 70° C. for 3 hours under nitrogen flow while stirring and then cooled down to room temperature. The toluene phase was separated and neutralized with ½ N hydrochloric acid, followed by washing with water. Toluene was distilled off from the toluene phase under reduced pressure, and the residue was purified by means of silica gel column chromatography. The resultant solid was recrystallized from ethanol, whereby 6.3 g of ethyl 4-(4'-(1"-n-octynyl)-3'-fluorophenyl)benzoate was obtained in the form of a colorless crystal.

④: A mixture comprising 6.0 g of ethyl 4-(4'-(1"-n-octynyl)-3'-fluorophenyl)benzoate, 5.0 g of sodium hydroxide, 20 g of ethanol and 10 g of water was heated at 60° C. for 4 hours while stirring. Thereafter, conc. hydrochloric acid was added to the reaction mixture to turn it to acid, and then ethyl acetate was added thereto. The ethyl acetate solution was washed with water, and ethyl acetate was distilled off under reduced pressure. Then, the resultant residue was recrystallized from toluene, whereby 5.6 g of 4-(4'-(1"-n-octynyl)-3'-fluorophenyl)benzoic acid was obtained in the form of a colorless crystal.

The phase transition temperature (° C.) of this compound is shown below:

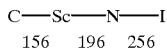

Production Example 7

Production of 4-(3'-fluoro-4'-(1"-n-decynyl)phenyl) benzoic acid

①: A mixture comprising 7.1 g of ethyl 4-(3'-fluoro-4'-hydroxyphenyl)benzoate and 13 g of pyridine was cooled to 0° C., and then 8.2 g of trifluoromethanesulfonic anhydride was added dropwise in one hour. Thereafter, the mixture was stirred at room temperature for 12 hours, and toluene was added after excess pyridine was distilled off from the reaction mixture under reduced pressure. The toluene solution was neutralized with ½ N hydrochloric acid and washed with water, and toluene was distilled off from the toluene solution under reduced pressure. The resultant residue was purified by means of silica gel column chromatography, whereby 8.0 g of ethyl 4-(3'-fluoro-4'-trifluoromethanesulfonyloxyphenyl)benzoate was obtained.

②: A mixture comprising 2.74 g of ethyl 4-(3'-fluoro-4'-trifluoromethanesulfonyloxyphenyl)benzoate, 0.97 g of 1-n-decyne, 35 mg of triphenylphosphine, 30 mg of dichloro bis(triphenylphosphine)palladium (II), 7 mg of copper iodide and 8 g of triethylamine was stirred at room temperature for one hour, at 40° C. for one hour and at 60° C. for 3 hours under nitrogen flow. After the reaction mixture was cooled down to room temperature, triethylamine was distilled off under reduced pressure, and toluene was added to the residue. The toluene solution was neutralized with ½ N hydrochloric acid and washed with water. Toluene was distilled off from the toluene solution under reduced pressure. The resultant residue was purified by means of silica gel column chromatography, whereby 2.02 g of ethyl 4-(3'-fluoro-4'-(1"-n-decynyl)phenyl)benzoate was obtained.

③: A mixture comprising 2.0 g of ethyl 4-(3'-fluoro-4'-(1"-n-decynyl)phenyl)benzoate, 3.0 g of sodium hydroxide, 10 g of ethanol and 5 g of water was heated at 60° C. for 6 hours while stirring. Thereafter, the reaction mixture was cooled down to room temperature, and conc. hydrochloric acid was added thereto to turn it to acid. Then, ethyl acetate was added thereto, and the solution was washed with water. Ethyl acetate was distilled off from the ethyl acetate solution under reduced pressure, and then the resultant residue was recrystallized from hexane, whereby 1.6 g of 4-(3'-fluoro-4'-(1"-n-decynyl)phenyl)benzoic acid was obtained in the form of a colorless crystal.

The phase transition temperature (° C.) of this compound is shown below:

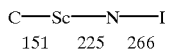

Production Example 8

Production of 4-(4'-(1"-n-octynyl)phenyl)benzyl alcohol

Added to 20 g of tetrahydrofuran was 0.3 g of lithium aluminum hydride to prepare a suspension of lithium aluminum hydride. A mixture comprising 2.0 g of ethyl 4-(4'-(1"-n-octynyl)phenyl)benzoate and 10 g of tetrahydrofuran was added dropwise to the suspension in one hour. After finishing adding dropwise, the reaction mixture was heated at 60° C. for 3 hours while stirring. Then, the reaction mixture was cooled down to room temperature, and 20 g of water was adding dropwise while cooling with ice. Further, ½ N hydrochloric acid was added thereto to turn the reaction mixture to acid, and ethyl acetate was added thereto. The ethyl acetate solution was washed with water, and then ethyl acetate was distilled off from the solution under reduced pressure. The resulting residue was recrystallized from hexane, whereby 1.8 g of 4-(4'-(1"-n-octynyl)phenyl)benzyl alcohol was obtained in the form of a colorless crystal.

Melting point: 113 to 114° C.

Production Example 9

Production of 6-(1'-n-decynyl)naphthalene-2-carboxylic acid

①: Added dropwise to a mixture comprising 5.4 g of ethyl 6-hydroxynaphthalene-2-carboxylate and 25 g of pyridine was 7.5 g of trifluoromethanesulfonic anhydride while cooling with ice. The reaction mixture was stirred at room temperature for 12 hours, and then excess pyridine was distilled off under reduced pressure. Toluene was added to the residue, and ½ N hydrochloric acid were added to the toluene solution to neutralize, followed by washing it with water. The toluene phase was separated, and then toluene was distilled off under reduced pressure. The resultant residue was purified by means of silica gel column chromatography, whereby 6.3 g of ethyl 6-trifluoromethanesulfonyloxynaphthalene-2-carboxylate was obtained in the form of a colorless crystal.

②: A mixture comprising 5.22 g of ethyl 6-trifluoromethanesulfonyloxynaphthalene-2-carboxylate, 3.11 g of 1-n-decyne, 45 mg of triphenylphosphine, 40 mg of dichloro bis(triphenylphosphine)palladium (II), 17 mg of copper iodide and 15 g of triethylamine was stirred at room temperature for one hour, at 40° C. for 2 hours and at 60° C. for 4 hours under nitrogen flow. Then, the reaction mixture was cooled down to room temperature, and excess triethylamine was distilled off under reduced pressure. Toluene was added to the residue, and ½ N hydrochloric acid was added to the toluene solution to neutralize, followed by washing it with water. Toluene was distilled off under reduced pressure, and the resultant residue was purified by means of silica gel column chromatography, whereby 5.2 g of ethyl 6-(1'-n-decynyl)naphthalene-2-carboxylate was obtained.

③: A mixture comprising 2.47 g of ethyl 6-(1'-n-decynyl) naphthalene-2-carboxylate, 2.06 g of sodium hydroxide, 10 g of ethanol and 5 g of water was heated at 60° C. for 6 hours while stirring. Then, conc. hydrochloric acid was added to the reaction mixture to turn it to acid, and ethyl acetate was added thereto, followed by washing the ethyl acetate solution with water. Ethyl acetate was distilled off from the ethyl acetate solution under reduced pressure, and then the resultant residue was recrystallized from hexane, whereby 2.0 g of 6-(1'-n-decynyl)naphthalene-2-carboxylic acid was obtained in the form of a colorless crystal.

Melting point: 171 to 172° C.

Production Example 10

Production of 6-(1'-n-decynyl)naphthalene-2-methanol

Added to 20 g of tetrahydrofuran was 0.4 g of lithium aluminum hydride to prepare a suspension of lithium aluminum hydride. A mixture comprising 2.7 g of ethyl 6-(1'-n-decynyl)naphthalene-2-carbonbenzoate and 10 g of tetrahydrofuran was added dropwise to the suspension in one hour. After finishing adding dropwise, the reaction mixture was heated at 60° C. for 3 hours while stirring. Then, the reaction mixture was cooled down to room temperature, and 20 g of water was added dropwise while cooling with ice. Further, ½ N hydrochloric acid was added thereto to turn the reaction mixture to acid, and ethyl acetate was added thereto. The ethyl acetate solution was washed with water, and then ethyl acetate was distilled off from the solution under reduced pressure. The resulting residue was recrystallized from hexane, whereby 2.4 g of 6-(1'-n-decynyl)naphthalene-2-methanol was obtained in the form of a colorless crystal.

Melting point: 68 to 69° C.

Production Example 11

Production of 6-(1'-n-decynyl)-1,2,3,4-tetrahydronaphthalene-2-carboxylic acid

①: Added dropwise to a mixture comprising 5.5 g of ethyl 6-hydroxy-1,2,3,4-tetrahydronaphthalene-2-carboxylate and 25 g of pyridine was 7.5 g of trifluoromethanesulfonic anhydride while cooling with ice. The reaction mixture was stirred at room temperature for 12 hours, and then excess pyridine was distilled off under reduced pressure. Toluene was added to the residue, and ½ N hydrochloric acid were added to the toluene solution to neutralize, followed by washing it with water. The toluene phase was separated, and then toluene was distilled off under reduced pressure. The resultant residue was purified by means of silica gel column chromatography, whereby 5.1 g of ethyl 6-trifluoromethanesulfonyloxy-1,2,3,4-tetrahydronaphthalene-2-carboxylate was obtained in the form of a colorless oily substance.

②: A mixture comprising 4.72 g of ethyl 6-trifluoromethanesulfonyloxy-1,2,3,4-tetrahydronaphthalene-2-carboxylate, 2.7 g of 1-n-decyne, 40 mg of triphenylphosphine, 30 mg of dichloro bis (triphenylphosphine)palladium (II), 15 mg of copper iodide and 13 g of triethylamine was stirred at room temperature for one hour, at 40° C. for 2 hours and at 60° C. for 4 hours under nitrogen flow. Then, the reaction mixture was cooled down to room temperature, and excess triethylamine was distilled off under reduced pressure. Toluene was added to the residue, and ½ N hydrochloric acid was added to the toluene solution to neutralize, followed by washing it with water. Toluene was distilled off under reduced pressure, and the resultant residue was purified by means of silica gel column chromatography, whereby 5.3 g of ethyl 6-(1'-n-decynyl)-1,2,3,4-tetrahydronaphthalene-2-carboxylate was obtained.

③: A mixture comprising 2.04 g of ethyl 6-(1'-n-decynyl)-1,2,3,4-tetrahydronaphthalene-2-carboxylate, 1.7 g of sodium hydroxide, 10 g of ethanol and 5 g of water was heated at 60° C. for 6 hours while stirring. Then, conc. hydrochloric acid was added to the reaction mixture to turn it to acid, and ethyl acetate was added thereto, followed by washing the ethyl acetate solution with water. Ethyl acetate was distilled off from the ethyl acetate solution under reduced pressure, and then the resultant residue was recrystallized from hexane, whereby 1.5 g of 6-(1'-n-decynyl)-1,2,3,4-tetrahydronaphthalene-2-carboxylic acid was obtained in the form of a colorless crystal.

Melting point: 124 to 135° C.

Production Example 12

Production of 6-(1'-n-decynyl)-1,2,3,4-tetrahydronaphthalene-2-methanol

Added to 20 g of tetrahydrofuran was 0.5 g of lithium aluminum hydride to prepare a suspension of lithium aluminum hydride. A mixture comprising 2.35 g of ethyl 6-(1'-n-decynyl)-1,2,3,4-tetrahydronaphthalene-2-carbonbenzoate and 10 g of tetrahydrofuran was added dropwise to this suspension in one hour. After finishing adding dropwise, the reaction mixture was heated at 60° C. for 3 hours while stirring. Then, the reaction mixture was cooled down to room temperature, and 20 g of water was added dropwise while cooling it with ice. Further, ½ N hydrochloric acid was added thereto to turn the reaction mixture to acid, and ethyl acetate was added thereto. The ethyl acetate solution was washed with water, followed by distilling off ethyl acetate from the solution under reduced pressure. The resulting residue was recrystallized from hexane, whereby 1.6 g of 6-(1'-n-decynyl)-1,2,3,4-tetrahydronaphthalene-2-methanol was obtained in the form of a colorless crystal.

Melting point: 148 to 150° C.

Production Example 13

Production of 4-(1'-n-decynyl)-3-fluorobenzoic acid

①: A mixture comprising 21.1 g of 4-iodo-3-fluorobromobenzene, 10.2 g of 1-n-decyne, 0.25 g of triphenylphosphine, 0.07 g of dichloro bis (triphenylphosphine)palladium (II), 0.07 g of copper iodide and 60 g of triethylamine was stirred at room temperature for one hour under nitrogen flow and then further stirred at 40° C. for 30 minutes and at 60° C. for 2 hours. After the reaction mixture was cooled down to room temperature, a resulting salt of triethylamine was filtered off, and then triethylamine was distilled off from the filtrate. Toluene was added to the residue to obtain a toluene solution, and this solution was neutralized with ½ N hydrochloric acid and washed with water. Toluene was distilled off from the toluene solution under reduced pressure, and the resultant residue was distilled under reduced pressure, whereby 19.2 g of 4-(1'-n-decynyl)-3-fluorobromobenzene was obtained in the form of a colorless oily substance.

Boiling point: 163 to 165° C./5 mm Hg

②: Added to 3 g of tetrahydrofuran was 0.135 g of magnesium turnings, and a mixture comprising 4.7 g of 4-(1'-n-decynyl)-3-fluorobromobenzene and 18 g of tetrahydrofuran was added dropwise thereto at a dropping rate of such an extent that mild reflux was maintained. After finishing adding dropwise, the reaction mixture was further heated for 2 hours while refluxing and then cooled down to room temperature. Then, 2 g of dry ice was added to the reaction mixture at three times by dividing into three portions, and the solution was further stirred at room temperature for one hour. Thereafter, conc. hydrochloric acid was added to the reaction mixture to turn it to acid, and ethyl acetate was added thereto. After washing the ethyl acetate solution with water, ethyl acetate was distilled off from the solution under reduced pressure, and the resultant residue was recrystallized from hexane, whereby 2.0 g of 4-(1'-n-decynyl)-3-fluorobenzoic acid was obtained in the form of a colorless crystal.

Melting point: 131 to 132° C.

Example 1

Production of Exemplified Compound 31

A mixture comprising 326 mg of (R)-4-(4'-hydroxyphenyl)benzoic acid 1"-methylheptyl ester, 258 mg of 4-(1'-n-decynyl)benzoic acid, 206 mg of DCC and 5 g of dichloromethane was stirred at room temperature for 30 minutes. Then, a catalytic amount of 4-N,N-dimethylaminopyridine was added to the mixture, and then the mixture was stirred at room temperature for 5 hours. Insoluble substances were filtered off from the reaction mixture, followed by distilling off dichloromethane from the filtrate, and the resultant residue was purified by means of silica gel column chromatography. The solid thus obtained was recrystallized twice from an ethanol/ethyl acetate mixed solvent (10:1 vol/vol), whereby 487 mg of Exemplified Compound 31 was obtained in the form of a colorless crystal. The phase transition temperature of this compound is shown in Table 13. In Table 13, the mark [·] shows that the liquid crystal phase concerned is present, and the mark [−] shows that the liquid crystal phase concerned is not present. The unit of numerals in Table 13 is ° C., and numerals shown in parentheses show the phase transition temperatures at the cooling-down step.

Example 2

Production of Exemplified Compound 45

The same operation as described in Example 1 was repeated to obtain 465 mg of Exemplified Compound 45 in the form of a colorless crystal, except that 314 mg of 4-(4'-hydroxyphenyl)benzoic acid 2"-n-butyloxyethyl ester was substituted for 326 mg of (R)-4-(4'-hydroxyphenyl) benzoic acid 1"-methylheptyl ester. The phase transition temperature of this compound is shown in Table 13.

Example 3

Production of Exemplified Compound 51

A mixture comprising 250 mg of (R)-4-hydroxybenzoic acid 1'-methylheptyl ester, 258 mg of 4-(1'-n-decynyl) benzoic acid, 206 mg of DCC and 5 g of dichloromethane was stirred at room temperature for 30 minutes. Then, a catalytic amount of 4-N,N-dimethylaminopyridine was added to the mixture, and then the mixture was stirred at room temperature for 5 hours. Insoluble substances were filtered off from the reaction mixture, followed by distilling off dichloromethane from the filtrate, and the resultant residue was purified twice by means of silica gel column chromatography, whereby 296 mg of Exemplified Compound 51 was obtained in the form of a colorless oily substance. The phase transition temperature of this compound is shown in Table 13.

Example 4

Production of Exemplified Compound 54

The same operation as described in Example 3 was repeated to obtain 341 mg of Exemplified Compound 54 in the form of a colorless oily substance, except that 230 mg of 4-(1'-n-octynyl)benzoic acid was substituted for 258 mg of 4-(1'-n-decynyl)benzoic acid. The phase transition temperature of this compound is shown in Table 13.

Example 5

Production of Exemplified Compound 56

The same operation as described in Example 1 was repeated to obtain 443 mg of Exemplified Compound 56 in the form of a colorless crystal, except that 300 mg of (R)-6-hydroxynaphthalene-2-carboxylic acid 1'-methylheptyl ester and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 6

Production of Exemplified Compound 59

The same operation as described in Example 1 was repeated to obtain 440 mg of Exemplified Compound 59 in the form of a colorless crystal, except that 352 mg of 6-hydroxynaphthalene-2-carboxylic acid 1',1',3'-trihydro-n-perfluorobutyl ester and 230 mg of 4-(1'-n-octynyl) benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 7

Production of Exemplified Compound 68

The same operation as described in Example 1 was repeated to obtain 193 mg of Exemplified Compound 68 in the form of a colorless crystal, except that 208 mg of (S)-4-hydroxybenzoic acid 2'-methylbutyl ester and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 8

Production of Exemplified Compound 76

①: A mixture comprising 2.28 g of 4-benzyloxybenzoic acid, 2.08 g of (S)-4-hydroxybenzoic acid 2'-methylbutyl ester, 2.06 g of DCC and 20 g of dichloromethane was stirred at room temperature for 30 minutes. Then, a catalytic amount of 4-N,N-dimethylaminopyridine was added to this mixture, and the mixture was further stirred at room temperature for 12 hours. After finishing the reaction, deposited insoluble substances were filtered off, followed by distilling off dichloromethane from the filtrate. The resultant residue was purified by means of silica gel column chromatography, whereby 4.05 g of (S)-4-(4'-benzyloxyphenylcarbonyloxy)benzoic acid 2"-methylbutyl ester was obtained.

②: A mixture comprising 4.0 g of (S)-4-(4'-benzyloxyphenylcarbonyloxy)benzoic acid 2"-methylbutyl ester, 0.4 g of palladium/carbon and 20 g of ethyl acetate was stirred for 6 hours under hydrogen atmosphere. Then, palladium/carbon was filtered off, followed by distilling off ethyl acetate from the filtrate. The resultant residue was purified from toluene, whereby 2.79 g of (S)-4-(4'-hydroxyphenylcarbonyloxy)benzoic acid 2"-methylbutyl ester was obtained in the form of a colorless crystal.

③: A mixture comprising 328 mg of (S)-4-(4'-hydroxyphenylcarbonyloxy)benzoic acid 2"-methylbutyl ester, 216 mg of 4-(1'-n-heptynyl)benzoic acid, 206 mg of DCC and 5 g of dichloromethane was stirred at room temperature for 30 minutes. Then, a catalytic amount of 4-N,N-dimethylaminopyridine was added to the mixture, and the mixture was stirred at room temperature for 5 hours. Insoluble substances were filtered off from the reaction mixture, followed by distilling off dichloromethane from the filtrate, and the resultant residue was purified by means of silica gel column chromatography. The solid thus obtained was recrystallized twice from an ethanol/ethyl acetate mixed solvent (10:1 vol/vol), whereby 426 mg of Exemplified Compound 76 was obtained in the form of a colorless crystal. The phase transition temperature of this compound is shown in Table 13.

Example 9

Production of Exemplified Compound 87

The same operation as described in ① and ② of Example 8 was repeated to obtain 2.45 g of (R)-4-(4'-hydroxyphenylcarbonyloxy)benzoic acid 1"-methylheptyl ester in the form of a colorless crystal, except that in ① of Example 8, 2.50 g of (R)-4-hydroxybenzoic acid 1'-methylheptyl ester was substituted for 2.08 g of (S)-4-hydroxybenzoic acid-2'-methylbutyl ester.

A mixture comprising 370 mg of resultant (R)-4-(4'-hydroxyphenylcarbonyloxy)benzoic acid 1"-methylheptyl ester, 230 mg of 4-(1'-n-octynyl)benzoic acid, 206 mg of DCC and 5 g of dichloromethane was stirred at room temperature for 30 minutes. Then, a catalytic amount of 4-N,N-dimethylaminopyridine was added to the mixture, and then the mixture was stirred at room temperature for 5 hours. Insoluble substances were filtered off from the reaction mixture, followed by distilling off dichloromethane from the filtrate, and the resultant residue was purified by means of silica gel column chromatography. The solid thus obtained was recrystallized twice from an ethanol/ethyl acetate mixed solvent (10:1 vol/vo/), whereby 426 mg of Exemplified Compound 87 was obtained in the form of a colorless crystal. The phase transition temperature of this compound is shown in Table 13.

This compound was injected into a glass-made test cell of 2 µm thick with an ITO electrode and an alignment layer of polyimide (CRD 8616: manufactured by Sumitomo Bakelite Co., Ltd.) subjected to rubbing treatment to measure a driving characteristic in applying an electric field. The measurement was carried out at 65° C. lower by 5° C. than 70° C. which is an Sc* phase transition point of this compound, wherein the applied voltage was ±20 V. The measurement results are shown below:

Response time: 38 µsecond Tilt angle: 12.5°

Comparison with Comparative Examples 6 and 7 described later shows that the acetylene compound of the present invention has a high upper limit temperature (Sc* phase transition temperature) as compared with that of the compound prepared in Comparative Example 7 and that it has a high-speed response (low viscosity) as compared with that of the compound prepared in Comparative Example 6.

Example 10

Production of Exemplified Compound 93

The same operation as described in Example 1 was repeated to obtain 517 mg of Exemplified Compound 93 in the form of a colorless crystal, except that 276 mg of 4-(1'-n-decynyl)-3-fluorobenzoic acid was substituted for 258 mg of 4-(1'-n-decynyl)benzoic acid. The phase transition temperature of this compound is shown in Table 13.

Example 11

Production of Exemplified Compound 107

The same operation as described in Example 1 was repeated to obtain 410 mg of Exemplified Compound 107 in the form of a colorless crystal, except that 230 mg of 4-(1'-n-octynyl)benzoic acid was substituted for 258 mg of 4-(1'-n-decynyl)benzoic acid. The phase transition temperature of this compound is shown in Table 13.

This compound was injected into a glass-made test cell of 2 µm thick with an ITO electrode and an alignment layer of polyimide (CRD 8616: manufactured by Sumitomo Bakelite Co., Ltd.) subjected to rubbing treatment to measure a driving characteristic in applying an electric field. The measurement was carried out at 76° C. lower by 2° C. than 78° C. which is an Sc* phase transition point of this compound, wherein the applied voltage was ±20 V. The measurement results are shown below:

Response time: 43 µsecond Tilt angle: 12.5°

Comparison with Comparative Examples 4 and 5 described later shows that the acetylene compound of the present invention has a high upper limit temperature (Sc* phase transition temperature) as compared with that of the compound prepared in Comparative Example 5 and that it has a high-speed response (low viscosity) as compared with that of the compound prepared in Comparative Example 4.

Example 12

Production of Exemplified Compound 111

The same operation as described in Example 1 was repeated to obtain 461 mg of Exemplified Compound 111 in the form of a colorless crystal, except that 284 mg of (S)-4-(4'-hydroxyphenyl)benzoic acid 2"-methylbutyl ester and 276 mg of 4-(1'-n-decynyl)-3-fluorobenzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 13

Production of Exemplified Compound 122

A mixture comprising 326 mg of (R)-4-(4'-hydroxyphenyl)benzoic acid 1"-methylheptyl ester, 216 mg of 4-(1'-n-octynyl)benzyl alcohol, 288 mg of triphenylphosphine and 5 g of tetrahydrofuran was stirred at room temperature for 10 minutes. Then, 478.5 mg of a 40% toluene solution of DEAD was added to the mixture, and the mixture was stirred at room temperature for 3 hours. After finishing the reaction, tetrahydrofuran was distilled off under reduced pressure, and the resultant residue was purified by means of silica gel column chromatography. The solid thus obtained was recrystallized twice from an ethanol/ethyl acetate mixed solvent (10:1 vol/vol), whereby 372 mg of Exemplified Compound 122 was obtained in the form of a colorless crystal. The phase transition temperature of this compound is shown in Table 13.

Example 14

Production of Exemplified Compound 126

①: A solvent comprising 1.1 g of triethylamine and 5 g of toluene was added dropwise to a mixture comprising 2.47 g of 4-benzyloxybenzoic chloride (this compound was prepared from 4-benzyloxybenzoic acid and oxalyl chloride), 2.64 g of 2-n-perfluorobutylethanol and 10 g of toluene in 30 minutes. After finishing the adding dropwise, the mixture was stirred at room temperature for 6 hours. Deposited salts were filtered off, and the filtrate was neutralized with ½ N hydrochloric acid and washed with water. Then, toluene was distilled off under reduced pressure, and the resultant residue was recrystallized from methanol, whereby 3.3 g of 4-benzyloxybenzoic acid 2'-n-perfluorobutylethyl ester was obtained in the form of a colorless crystal.

②: A mixture comprising 3.0 g of 4-benzyloxybenzoic acid 2'-n-perfluorobutylethyl ester, 0.3 g of palladium/carbon and 20 g of ethyl acetate was stirred for 6 hours under hydrogen atmosphere. Then, palladium/carbon was filtered off, and ethyl acetate was distilled off from the filtrate. The resultant residue was recrystallized from toluene, whereby 2.0 g of 4-hydroxybenzoic acid-2'-perfluorobutylethyl ester was obtained in the form of a colorless crystal.

③: A mixture comprising 384 mg of 4-hydroxybenzoic acid 2'-perfluorobutylethyl ester, 230 mg of 4-(1'-n-octynyl) benzoic acid, 206 mg of DCC and 5 g of dichloromethane was stirred at room temperature for 30 minutes. Then, a catalytic amount of 4-N,N-dimethylaminopyridine was added to the mixture, and then the mixture was stirred at room temperature for 5 hours. Insoluble substances were filtered off from the reaction mixture, followed by distilling off dichloromethane, and the resultant residue was purified by means of silica gel column chromatography. The solid thus obtained was recrystallized twice from an ethanol/ethyl acetate mixed solvent (10:1 vol/vol), whereby 453 mg of Exemplified Compound 126 was obtained in the form of a colorless crystal. The phase transition temperature of this compound is shown in Table 13.

Example 15

Production of Exemplified Compound 131

The same operation as described in Example 13 was repeated to obtain 309 mg of Exemplified Compound 131 in the form of a colorless crystal, except that 300 mg of (R)-6-hydroxynaphthalene-2-carboxylic acid 1'-methylheptyl ester was substituted for 326 mg of (R)-4-(4'-hydroxyphenyl)benzoic acid 1"-methylheptyl ester. The phase transition temperature of this compound is shown in Table 13.

Example 16

Production of Exemplified Compound 144

The same operation as described in Example 1 was repeated to obtain 363 mg of Exemplified Compound 144 in the form of a colorless crystal, except that 284 mg of (S)-4-(4'-hydroxyphenyl)benzoic acid 2"-methylbutyl ester and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl) benzoic acid, respectively. The phase transition temperature of this compound is shown in Table 13.

Example 17

Production of Exemplified Compound 148

The same operations as described in ① and ② of Example 14 was repeated to obtain 3.3 g of 4-hydroxybenzoic acid 2'-n-perfluorooctylethyl ester, except that in ① of Example 14, 4.64 g of 2-n-perfluorooctylethanol was substituted for 2.64 g of 2-n-perfluorobutylethanol.

A mixture comprising 584 mg of the resultant 4-hydroxybenzoic acid 2'-n-perfluorooctylethyl ester, 216 mg of 4-(1'-n-octynyl)benzyl alcohol, 288 mg of triphenylphosphine and 5 g of tetrahydrofuran was stirred at room temperature for 10 minutes. Then, 478.5 mg of a 40% toluene solution of DEAD was added to the mixture, and the mixture was stirred at room temperature for 3 hours. After finishing the reaction, tetrahydrofuran was distilled off under reduced pressure, and the resultant residue was purified by means of silica gel column chromatography. The solid thus obtained was recrystallized twice from an ethanol/ethyl acetate mixed solvent (10:1 vol/vol), whereby 508 mg of Exemplified Compound 148 was obtained in the form of a colorless crystal. The phase transition temperature of this compound is shown in Table 13.

Example 18

Production of Exemplified Compound 174

①: A mixture comprising 3.02 g of 4-(1'-n-octynyl)benzyl alcohol, 2.32 g of ethyl 4-hydroxybenzoate, 4.03 g of triphenylphosphine and 20 g of tetrahydrofuran was stirred at room temperature for 10 minutes. Then, 6.70 g of a 40% toluene solution of DEAD was added dropwise to the mixture in one hour while cooling it with ice, and the mixture was further stirred at room temperature for 12 hours. After finishing the reaction, tetrahydrofuran was distilled off under reduced pressure, and the resultant residue was purified by means of silica gel column chromatography. The solid thus obtained was recrystallized from methanol, whereby 4.9 g of ethyl 4-[4'-(1"-n-octynyl)benzyloxy] benzoate was obtained in the form of a colorless crystal.

②: Added to 35 g of tetrahydrofuran was 0.5 g of lithium aluminum hydride to prepare a suspension of lithium aluminum hydride. A mixture comprising 3.6 g of ethyl 4-[4'-(1"-n-octynyl)benzyloxy]benzoate and 10 g of tetrahydrofuran was added dropwise to the suspension in one hour. After finishing adding dropwise, the reaction mixture was heated at 60° C. for 3 hours while stirring. Then, the reaction mixture was cooled down to room temperature, and 20 g of water was adding dropwise while cooling it with ice. Further, ½ N hydrochloric acid was added thereto to turn the reaction mixture to acid, and ethyl acetate was added thereto. The ethyl acetate solution was washed with water, and then ethyl acetate was distilled off from the solution under reduced pressure. The resulting residue was recrystallized from hexane, whereby 2.7 g of 4-[4'-(1"-n-octynyl) benzyloxy]benzyl alcohol was obtained in the form of a colorless crystal.

Melting point: 82 to 83° C.

③: A mixture comprising 335 mg of (R)-4-hydroxy-2-fluorobenzoic acid 1'-trifluoromethyl-6'-ethyloxyhexyl ester, 322 mg of 4-[4'-(1"-n-octynyl)benzyloxy]benzyl alcohol, 288 mg of triphenylphosphine and 5 g of tetrahydrofuran was stirred at room temperature for 10 minutes. Then, 478.5 mg of a 40% toluene solution of DEAD was added to the mixture, and the mixture was stirred at room temperature for 3 hours. After finishing the reaction, tetrahydrofuran was distilled off under reduced pressure, and the resultant residue was purified by means of silica gel column chromatography. The solid thus obtained was recrystallized twice from an ethanol/ethyl acetate mixed solvent (10:1 vol/vol), whereby 377 mg of Exemplified Compound 174 was obtained in the form of a colorless crystal. The phase transition temperature of this compound is shown in Table 13.

Example 19

Production of Exemplified Compound 183

The same operation as described in Example 13 was repeated to obtain 343 mg of Exemplified Compound 183 in the form of a colorless crystal, except that 208 mg of (S)-4-hydroxybenzoic acid 2'-methylbutyl ester and 322 mg of 4-[4'-(1"-n-octynyl)benzyloxy]benzyl alcohol were substituted for 326 mg of (R)-4-(4'-hydroxyphenyl)benzoic acid 1"-methylheptyl ester and 216 mg of 4-(1'-n-octynyl)benzyl alcohol, respectively. The phase transition temperature of this compound is shown in Table 13.

Example 20

Production of Exemplified Compound 190

The same operation as described in Example 13 was repeated to obtain 403 mg of Exemplified Compound 190 in the form of a colorless crystal, except that 370 mg of (R)-4-(4'-hydroxyphenylcarbonyloxy)benzoic acid 1"-methylheptyl ester was substituted for 326 mg of (R)-4-(4'-hydroxyphenyl)benzoic acid 1"-methylheptyl ester. The phase transition temperature of this compound is shown in Table 13.

Example 21

Production of Exemplified Compound 196

The same operation as described in Example 13 was repeated to obtain 396 mg of Exemplified Compound 196 in the form of a colorless crystal, except that 384 mg of 4-hydroxybenzoic acid 2'-n-perfluorobutylethyl ester was substituted for 326 mg of (R)-4-(4'-hydroxyphenyl)benzoic acid 1"-methylheptyl ester. The phase transition temperature of this compound is shown in Table 13.

Example 22

Production of Exemplified Compound 217

The same operation as described in Example 1 was repeated to obtain 388 mg of Exemplified Compound 217 in the form of a colorless crystal, except that 298 mg of 4-(4'-hydroxyphenyl)-1-n-hexylcarbonyloxybenzene and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 23

Production of Exemplified Compound 231

①: A solvent comprising 1.1 g of triethylamine and 5 g of toluene was added dropwise to a mixture comprising 2.28 g of benzyl 4-hydroxybenzoate, 2.33 g of n-tridecanoic chloride and 15 g of toluene in 30 minutes while cooling it with ice. After finishing adding dropwise, the mixture was stirred at room temperature for 3 hours. After finishing the reaction, deposited salts were filtered off, and the filtrate was neutralized with ½ N hydrochloric acid and washed with water. Then, toluene was distilled off under reduced pressure, and the resultant residue was recrystallized from ethanol, whereby 3.52 g of benzyl 4-n-dodecylcarbonyloxybenzoate was obtained in the form of a colorless crystal.

②: A mixture comprising 3.5 g of benzyl 4-n-dodecylcarbonyloxybenzoate, 0.4 g of palladium/carbon and 20 g of ethyl acetate was stirred for 6 hours under hydrogen atmosphere. Then, palladium/carbon was filtered off, and ethyl acetate was distilled off from the filtrate. The resultant residue was recrystallized from toluene, whereby 2.40 g of 4-n-dodecylcarbonyloxybenzoic acid was obtained in the form of a colorless crystal.

③: A mixture comprising 2.14 g of 4-n-dodecylcarbonyloxybenzoic acid, 1.40 g of 4-benzyloxyphenol, 1.44 g of DCC and 20 g of dichloromethane was stirred at room temperature for 30 minutes. Then, a catalytic amount of 4-N,N-dimethylaminopyridine was added to the mixture, and the mixture was further stirred at room temperature for 12 hours. After finishing the reaction, insoluble substances were filtered off, and dichloromethane was distilled off from the filtrate under reduced pressure. The resultant residue was purified by means of silica gel column chromatography, whereby 3.3 g of 4-(4'-n-dodecylcarbonyloxyphenylcarbonyloxy)-1-benzyloxybenzene was obtained in the form of a colorless crystal.

④: A mixture comprising 3.3 g of 4-(4'-n-dodecylcarbonyloxyphenylcarbonyloxy)-1-benzyloxybenzene, 0.3 g of palladium/carbon and 20 g of ethyl acetate was stirred for 6 hours under hydrogen atmosphere. Then, palladium/carbon was filtered off, followed by distilling off ethyl acetate from the filtrate. The resultant residue was recrystallized from toluene, whereby 2.5 g of 4-(4'-n-dodecylcarbonyloxyphenylcarbonyloxy)phenol was obtained in the form of a colorless crystal.

A mixture comprising 426 mg of 4-(4'-n-dodecylcarbonyloxyphenylcarbonyloxy)phenol, 216 mg of 4-(1'-n-heptynyl)benzoic acid, 206 mg of DCC and 5 g of dichloromethane was stirred at room temperature for 30 minutes. Then, a catalytic amount of 4-N,N-dimethylaminopyridine was added to the mixture, and the mixture was further stirred at room temperature for 3 hours. After finishing the reaction, insoluble substances were filtered off, followed by distilling off dichloromethane from the filtrate. The resultant residue was purified by means of silica gel column chromatography and then recrystallized twice from an ethanol/ethyl acetate mixed solvent (10:1 vol/vol), whereby 499 mg of Exemplified Compound 231 was obtained in the form of a colorless crystal. The phase transition temperature of this compound is shown in Table 13.

Example 24

Production of Exemplified Compound 287

①: A mixture comprising 2.00 g of 4-benzyloxyphenol, 1.86 g of (S)-1-methylnonylcarboxylic acid, 2.06 g of DCC and 20 g of dichloromethane was stirred at room temperature for 30 minutes. Then, a catalytic amount of 4-N,N-dimethylaminopyridine was added to the mixture, and the mixture was further stirred at room temperature for 12 hours. After finishing the reaction, insoluble substances were filtered off, followed by distilling off dichloromethane from the filtrate. The resultant residue was purified by means of silica gel column chromatography, whereby 3.2 g of (S)-4-(1'-methylnonylcarbonyloxy)-1-benzyloxybenzene was obtained.

②: A mixture comprising 3.0 g of (S)-4-(1'-methylnonylcarbonyloxy)-1-benzyloxybenzene, 0.3 g of palladium/carbon and 20 g of ethyl acetate was stirred for 6 hours under hydrogen atmosphere. Then, palladium/carbon was filtered off, followed by distilling off ethyl acetate from the filtrate, whereby 2.0 g of (S)-4-(1'-methylnonylcarbonyloxy)phenol was obtained in the form of a colorless oily substance.

③: A mixture comprising 1.66 g of (S)-4-(1'-methylnonylcarbonyloxy)phenol, 1.37 g of 4-benzyloxybenzoic acid, 1.24 g of DCC and 10 g of dichloromethane was stirred at room temperature for 30 minutes. Then, a catalytic amount of 4-N,N-dimethylaminopyridine was added to the mixture, and the mixture was further stirred at room temperature for 12 hours. After finishing the reaction, insoluble substances were filtered off, followed by distilling off dichloromethane from the filtrate under reduced pressure. The resultant residue was purified by means of silica gel column chromatography, whereby 2.0 g of (S)-4-[4'-(1"-methylnonylcarbonyloxy)phenyloxycarbonyl]-1-benzyloxybenzene was obtained in the form of a colorless crystal.

④: A mixture comprising 2.0 g of (S)-4-[4'-(1"-methylnonylcarbonyloxy)phenyloxycarbonyl]-1-benzyloxybenzene, 0.2 g of palladium/carbon and 10 g of ethyl acetate was stirred for 6 hours under hydrogen atmosphere. Then, palladium/carbon was filtered off, followed by distilling off ethyl acetate from the filtrate. The resultant residue was recrystallized from hexane, whereby 1.4 g of (S)-4-[4'-(1"-methylnonylcarbonyloxy)phenyloxycarbonyl]phenol was obtained in the form of a colorless crystal.

⑤: A mixture comprising 398 mg of (S)-4-[4'-(1"-methylnonylcarbonyloxy)phenyloxycarbonyl]phenol, 230 mg of 4-(1'-n-octynyl)benzoic acid, 206 mg of DCC and 5 g of dichloromethane was stirred at room temperature for 30 minutes. Then, a catalytic amount of 4-N,N-dimethylaminopyridine was added to the mixture, and the mixture was further stirred at room temperature for 3 hours. After finishing the reaction, insoluble substances were filtered off, followed by distilling off dichloromethane from the filtrate under reduced pressure. The resultant residue was purified by means of silica gel column chromatography and then recrystallized twice from an ethanol/ethyl acetate mixed solvent (10:1 vol/vol), whereby 464 mg of Exemplified Compound 287 was obtained in the form of a colorless crystal. The phase transition temperature of this compound is shown in Table 13.

Example 25

Production of Exemplified Compound 300

①: A mixture comprising 2.8 g of 4-(4'-benzyloxyphenyl)phenol, 1.2 g of (S)-2-methylbutylcarboxylic acid, 3.09 g of DCC and 15 g of dichloromethane was stirred at room temperature for 30 minutes. Then, a catalytic amount of 4-N,N-dimethylaminopyridine was added to the mixture, and the mixture was further stirred at room temperature for 12 hours. After finishing the reaction, insoluble substances were filtered off, followed by distilling off dichloromethane from the filtrate. The resultant residue was purified by means of silica gel column chromatography, whereby 3.5 g of (S)-4-[4'-(2"-methylbutylcarbonyloxy)phenyl]-1-benzyloxybenzene was obtained in the form of a colorless crystal.

②: A mixture comprising 3.5 g of (S)-4-[4'-(2'-methylbutylcarbonyloxy)phenyl]-1-benzyloxybenzene, 0.4 g of palladium/carbon and 20 g of ethyl acetate was stirred for 6 hours under hydrogen atmosphere. Then, palladium/carbon was filtered off, followed by distilling off ethyl acetate from the filtrate. The resultant residue was recrystallized from hexane, whereby 1.6 g of (S)-4-[4'-(2"-methylbutylcarbonyloxy)phenyl]phenol was obtained in the form of a colorless crystal.

③: A mixture comprising 284 mg of (S)-4-[4'-(2"-methylbutylcarbonyloxy)phenyl]phenol, 258 mg of 4-(1'-n-decynyl)benzoic acid, 206 mg of DCC and 5 g of dichloromethane was stirred at room temperature for 30 minutes. Then, a catalytic amount of 4-N,N-dimethylaminopyridine was added to the mixture, and the mixture was further stirred at room temperature for 3 hours. After finishing the reaction, insoluble substances were filtered off, followed by distilling off dichloromethane from the filtrate under reduced pressure. The resultant residue was purified by means of silica gel column chromatography and then recrystallized twice from an ethanol/ethyl acetate mixed solvent (10:1 vol/vol), whereby 383 mg of Exemplified Compound 300 was obtained in the form of a colorless crystal. The phase transition temperature of this compound is shown in Table 13.

Example 26

Production of Exemplified Compound 382

The same operation as described in Example 1 was repeated to obtain 423 mg of Exemplified Compound 382 in the form of a colorless crystal, except that 298 mg of (S)-4-[4'-(1"-methylheptyloxy)phenyl]phenol and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

This compound was injected into a glass-made test cell of 2 μm thick with an ITO electrode and an alignment layer of polyimide (CRD 8616: manufactured by Sumitomo Bakelite Co., Ltd.) subjected to rubbing treatment to measure a driving characteristic in applying an electric field. The measurement was carried out at 64° C. lower by 10° C. than 74° C. which is an Sc* phase transition point of this compound, wherein the applied voltage was ±20 V. The measurement results are shown below:

Response time: 18 μseconds Tilt angle: 38°

Spontaneous polarization: 76 nC/cm$^2$

Comparison with Comparative Example 2 described later shows that the acetylene compound of the present invention has a high upper limit temperature (Sc* phase transition temperature). Comparison with the compounds prepared in Comparative Examples 1 and 3 shows that the acetylene compound of the present invention has a high-speed response (low viscosity). Further, comparison with the compounds prepared in Comparative Examples 1, 2 and 3 shows that the acetylene compound of the present invention has a broad tilt angle and a high spontaneous polarization.

Example 27

Production of Exemplified Compound 387

The same operation as described in Example 1 was repeated to obtain 389 mg of Exemplified Compound 387 in the form of a colorless crystal, except that 332 mg of 4-[4'-(2"-n-hexyloxyethyloxy)-3'-fluorophenyl]phenol was substituted for 326 mg of (R)-4-(4'-hydroxyphenyl)benzoic acid 1"-methylheptyl ester. The phase transition temperature of this compound is shown in Table 13.

Example 28

Production of Exemplified Compound 390

The same operation as described in Example 1 was repeated to obtain 393 mg of Exemplified Compound 390 in the form of a colorless crystal, except that 332 mg of 4-[4'-(2"-n-hexyloxyethyloxy)-3'-fluorophenyl]phenol and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 29

Production of Exemplified Compound 426

The same operation as described in Example 1 was repeated to obtain 343 mg of Exemplified Compound 426 in the form of a colorless crystal, except that 286 mg of 4-[4'-(2"-n-butyloxyethyloxy)phenyl]phenol and 230 mg of 4-(1'-n-octynyl)benzoic acid were substituted for 326 mg of (R)-4-(4'-hydroxyphenyl)benzoic acid 1'-methylheptyl ester and 258 mg of 4-(1'-n-decynyl)benzoic acid, respectively. The phase transition temperature of this compound is shown in Table 13.

Example 30

Production of Exemplified Compound 433

The same operation as described in Example 1 was repeated to obtain 321 mg of Exemplified Compound 433 in the form of a colorless crystal, except that 314 mg of 4-[4'-(2"-n-hexyloxyethyloxy)phenyl]phenol and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 31

Production of Exemplified Compound 434

The same operation as described in Example 1 was repeated to obtain 422 mg of Exemplified Compound 434 in the form of a colorless crystal, except that 316 mg of (S)-4-[4'-(1"-methylheptyloxy)-3'-fluorophenyl]phenol was substituted for 326 mg of (R)-4-(4'-hydroxyphenyl)benzoic acid 1"-methylheptyl ester. The phase transition temperature of this compound is shown in Table 13.

Example 32

Production of Exemplified Compound 440

The same operation as described in Example 1 was repeated to obtain 380 mg of Exemplified Compound 440 in the form of a colorless crystal, except that 316 mg of (S)-4-[4'-(1"-methylheptyloxy)-3'-fluorophenyl]phenol and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 33

Production of Exemplified Compound 452

The same operation as described in Example 1 was repeated to obtain 317 mg of Exemplified Compound 452 in the form of a colorless crystal, except that 298 mg of (S)-4-[4'-(1"-methylheptyloxy)phenyl]phenol was substituted for 326 mg of (R)-4-(4'-hydroxyphenyl)benzoic acid 1"-methylheptyl ester. The phase transition temperature of this compound is shown in Table 13.

Example 34

Production of Exemplified Compound 457

The same operation as described in Example 1 was repeated to obtain 378 mg of Exemplified Compound 457 in the form of a colorless crystal, except that 314 mg of 4-[4'-(2"-n-hexyloxyethyloxy)phenyl]phenol was substituted for 326 mg of (R)-4-(4'-hydroxyphenyl)benzoic acid 1"-methylheptyl ester. The phase transition temperature of this compound is shown in Table 13.

Example 35

Production of Exemplified Compound 468

The same operation as described in Example 1 was repeated to obtain 409 mg of Exemplified Compound 468 in the form of a colorless crystal, except that 316 mg of (S)-4-[4'-(1"-methylheptyloxy)phenyl]-2-fluorophenol and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 36

Production of Exemplified Compound 474

The same operation as described in Example 1 was repeated to obtain 178 mg of Exemplified Compound 474 in the form of a colorless crystal, except that 180 mg of (S)-4-(2'-methylbutyloxy)phenol and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 37

Production of Exemplified Compound 483

The same operation as described in Example 1 was repeated to obtain 224 mg of Exemplified Compound 483 in the form of a colorless crystal, except that 208 mg of (S)-4-(4'-methylhexyloxy)phenol was substituted for 326 mg of (R)-4-(4'-hydroxyphenyl)benzoic acid 1"-methylheptyl ester. The phase transition temperature of this compound is shown in Table 13.

Example 38

Production of Exemplified Compound 491

The same operation as described in Example 1 was repeated to obtain 399 mg of Exemplified Compound 491 in the form of a colorless crystal, except that 300 mg of (S)-4-[4'-(2"-methylbutyloxy)phenyloxycarbonyl]phenol and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 39 production of Exemplified Compound 501

The same operation as described in Example 13 was repeated to obtain 286 mg of Exemplified Compound 501 in the form of a colorless crystal, except that 256 mg of (S)-4-[4'-(2"-methylbutyloxy)phenyl]phenol was substituted for 326 mg of (R)-4-(4'-hydroxyphenyl)benzoic acid 1"-methylheptyl ester. The phase transition temperature of this compound is shown in Table 13.

Example 40

Production of Exemplified Compound 506

The same operation as described in Example 13 was repeated to obtain 360 mg of Exemplified Compound 506 in the form of a colorless crystal, except that 298 mg of (S)-4-[4'-(1"-methylheptyloxy)phenyl]phenol was substituted for 326 mg of (R)-4-(4'-hydroxyphenyl)benzoic acid 1"-methylheptyl ester. The phase transition temperature of this compound is shown in Table 13.

Example 41

Production of Exemplified Compound 521

①: A mixture comprising 1.25 g of (S)-4-(1'-methylheptyloxy)benzoic acid, 1.0 g of 4-benzyloxyphenol, 1.03 g of DCC and 10 g of dichloromethane was stirred at room temperature for 30 minutes. Then, a catalytic amount of 4-N,N-dimethylaminopyridine was added to the mixture, and the mixture was further stirred at room temperature for 12 hours. After finishing the reaction, insoluble substances were filtered off, followed by distilling off dichloromethane from the filtrate under reduced pressure. The resultant residue was purified by means of silica gel column chromatography, whereby 2.21 g of (S)-4-[4'-(1"-methylheptyloxy)phenylcarbonyloxy)-1-benzyloxybenzene was obtained.

②: A mixture comprising 2.2 g of (S)-4-[4'-(1"-methylheptyloxy)phenylcarbonyloxy)-1-benzyloxybenzene, 0.2 g of palladium/carbon and 10 g of ethyl acetate was stirred for 6 hours under hydrogen atmosphere. Then, palladium/carbon was filtered off, followed by distilling off ethyl acetate from the filtrate. The resultant residue was recrystallized from hexane, whereby 1.1 g of (S)-4-[4'-(1"-methylheptyloxy)phenylcarbonyloxy)phenol was obtained in the form of a colorless crystal.

③: A mixture comprising 342 mg of (S)-4-[4'-(1"-methylheptyloxy)phenylcarbonyloxy]phenol, 322 mg of 4-(1'-n-octynyl)benzyl alcohol, 288 mg of triphenylphosphine and 5 g of tetrahydrofuran was stirred at room temperature for 10 minutes. Then, 478.5 mg of a 40% toluene solution of DEAD was added to the mixture, and the mixture was stirred at room temperature for 3 hours. After finishing the reaction, tetrahydrofuran was distilled off under reduced pressure, and the resultant residue was purified by means of silica gel column chromatography. The solid thus obtained was recrystallized twice from an ethanol/ethyl acetate mixed solvent (10:1 vol/vol), whereby 383 mg of Exemplified Compound 521 was obtained in the form of a colorless crystal. The phase transition temperature of this compound is shown in Table 13.

Example 42

Production of Exemplified Compound 526

The same operation as described in Example 1 was repeated to obtain 346 mg of Exemplified Compound 526 in the form of a colorless crystal, except that 256 mg of (S)-4-[4'-(2"-methylbutyloxy)phenyl]phenol and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 43

Production of Exemplified Compound 530

The same operation as described in Example 1 was repeated to obtain 421 mg of Exemplified Compound 530 in the form of a colorless crystal, except that 342 mg of (S)-4-[4'-(1"-methylheptyloxy)phenylcarbonyloxy]phenol and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl) benzoic acid, respectively. The phase transition temperature of this compound is shown in Table 13.

Example 44

Production of Exemplified Compound 531

The same operation as described in Example 1 was repeated to obtain 409 mg of Exemplified Compound 531 in the form of a colorless crystal, except that 326 mg of (racemic)-4-[4'-(1"-methylnonyloxy)phenyl]phenol and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl) benzoic acid, respectively. The phase transition temperature of this compound is shown in Table 13.

Example 45

Production of Exemplified Compound 536

The same operation as described in Example 13 was repeated to obtain 249 mg of Exemplified Compound 536 in the form of a colorless crystal, except that 180 mg of (S)-4-(2'-methylbutyloxy)phenol was substituted for 326 mg of (R)-4-(4'-hydroxyphenyl)benzoic acid 1"-methylheptyl ester. The phase transition temperature of this compound is shown in Table 13.

Example 46

Production of Exemplified Compound 554

The same operation as described in Example 13 was repeated to obtain 312 mg of Exemplified Compound 554 in the form of a colorless crystal, except that 230 mg of (S)-6-(2'-methylbutyloxy)-2-naphthnaphthol was substituted for 326 mg of (R)-4-(4'-hydroxyphenyl)benzoic acid 1"-methylheptyl ester. The phase transition temperature of this compound is shown in Table 13.

Example 47

Production of Exemplified Compound 563

The same operation as described in Example 1 was repeated to obtain 345 mg of Exemplified Compound 563 in the form of a colorless crystal, except that 230 mg of (S)-6-(2'-methylbutyloxy)-2-naphthol and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 48

Production of Exemplified Compound 570

The same operation as described in Example 13 was repeated to obtain 394 mg of Exemplified Compound 570 in the form of a colorless crystal, except that 342 mg of (S)-4-(4'-(1"-methylheptyloxy)phenyloxycarbonyl]phenol was substituted for 326 mg of (R)-4-(4'-hydroxyphenyl) benzoic acid 1"-methylheptyl ester. The phase transition temperature of this compound is shown in Table 13.

Example 49

Production of Exemplified Compound 576

The same operation as described in Example 13 was repeated to obtain 368 mg of Exemplified Compound 576 in the form of a colorless crystal, except that 222 mg of (S)-4-(1'-methylheptyloxy)phenol and 322 mg of 4-[4'-(1"-n-octynyl)benzyloxy]benzyl alcohol were substituted for 326 mg of (R)-4-(4'-hydroxyphenyl)benzoic acid 1"-methylheptyl ester and 216 mg of 4-(1'-n-octynyl)benzyl alcohol, respectively. The phase transition temperature of this compound is shown in Table 13.

Example 50

Production of Exemplified Compound 601

The same operation as described in Example 1 was repeated to obtain 513 mg of Exemplified Compound 601 in the form of a colorless crystal, except that 300 mg of (R)-6-hydroxynaphthalene-2-carboxylic acid-1'-methylheptyl ester and 352 mg of 4-[4'-(1"-n-decynyl)-3'-fluorophenyl]benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 51

Production of Exemplified Compound 606

The same operation as described in Example 1 was repeated to obtain 459 mg of Exemplified Compound 606 in the form of a colorless crystal, except that 286 mg of (S)-6-hydroxynaphthalene-2-carboxylic acid 4'-methylhexyl ester and 352 mg of 4-[4'-(1"-n-decynyl)-3'-fluorophenyl]benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 52

Production of Exemplified Compound 616

The same operation as described in Example 1 was repeated to obtain 409 mg of Exemplified Compound 616 in the form of a colorless crystal, except that 230 mg of (S)-6-(2'-methylbutyloxy)-2-naphthol and 230 mg of 4-(1'-n-octynyl)benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 53

Production of Exemplified Compound 626

The same operation as described in Example 1 was repeated to obtain 457 mg of Exemplified Compound 626 in the form of a colorless crystal, except that 250 mg of (R)-4-hydroxybenzoic acid 1'-methylheptyl ester and 306 mg of 4-[4'-(1"-n-octynyl)phenyl]benzoic acid were substituted for 326 mg of (R)-4-(4'-hydroxyphenyl)benzoic acid 1"-methylheptyl ester and 258 mg of 4-(1'-n-decynyl) benzoic acid, respectively. The phase transition temperature of this compound is shown in Table 13.

Example 53

Production of Exemplified Compound 626

The same operation as described in Example 1 was repeated to obtain 457 mg of Exemplified Compound 626 in the form of a colorless crystal, except that 258 mg of (S)-6-hydroxynaphthalene-2-carboxylic acid 2'-methylbutyl ester and 324 mg of 4-[4'-(1"-n-octynyl)-3'-fluorophenyl]] benzoic acid were substituted for 326 mg of (R)-4-(4'-hydroxyphenyl)benzoic acid 1"-n-methylheptyl ester and 258 mg of 4-(1'-n-decynyl)benzoic acid, respectively. The phase transition temperature of this compound is shown in Table 13.

Example 54

Production of Exemplified Compound 628

The same operation as described in Example 1 was repeated to obtain 496 mg of Exemplified Compound 628 in the form of a colorless crystal, except that 250 mg of (R)-4-hydroxybenzoic acid 1'-methylheptyl ester and 352 mg of 4-[4'-(1"-n-decynyl)-3'-fluorophenyl]benzoic acid were substituted for 326 mg of (R)-4-( 4'-hydroxyphenyl) benzoic acid 1"-methylheptyl ester and 258 mg of 4-(1'-n-decynyl)benzoic acid, respectively. The phase transition temperature of this compound is shown in Table 13.

Example 55

Production of Exemplified Compound 635

The same operation as described in Example 1 was repeated to obtain 329 mg of Exemplified Compound 635 in the form of a colorless crystal, except that 357 mg of (R)-6-hydroxy-1,2,3,4-tetrahydronaphthalene-2-carboxylic acid 1'-(trifluoromethyl)heptyl ester and 352 mg of 4-[4'-(3'-decynyl)-3'-fluorophenyl]benzoic acid were substituted for 326 mg of (R)-4-(4'-hydroxyphenyl)benzoic acid 1"-methylheptyl ester and 258 mg of 4-(1'-n-decynyl) benzoic acid, respectively. The phase transition temperature of this compound is shown in Table 13.

Example 56

Production of Exemplified Compound 639

The same operation as described in Example 1 was repeated to obtain 465 mg of Exemplified Compound 639 in the form of a colorless crystal, except that 298 mg of (R)-6-hydroxynaphthalene-2-carboxylic acid-1'-(trifluoromethyl)propyl ester and 324 mg of 4-[4'-(1"-n-octynyl)-3'-fluorophenyl]benzoic acid were substituted for 326 mg of (R)-4-(4'-hydroxyphenyl)benzoic acid methylheptyl ester and 258 mg of 4-(1'-n-decynyl)benzoic acid, respectively. The phase transition temperature of this compound is shown in Table 13.

Example 57

Production of Exemplified Compound 647

The same operation as described in Example 13 was repeated to obtain 367 mg of Exemplified Compound 647 in the form of a colorless crystal, except that 250 mg of (R)-4-hydroxybenzoic acid 1'-methylheptyl ester and 292 mg of 4-[4'-(1"-n-octynyl)phenyl]benzyl alcohol were substituted for 326 mg of (R)-4-(4'-hydroxyphenyl)benzoic acid 1"-methylheptyl ester and 216 mg of 4-(1'-n-octynyl)benzyl alcohol, respectively. The phase transition temperature of this compound is shown in Table 13.

Example 58

Production of Exemplified Compound 668

The same operation as described in Example 1 was repeated to obtain 323 mg of Exemplified Compound 668 in the form of a colorless crystal, except that 300 mg of (R)-6-hydroxynaphthalene-2-carboxylic acid 1'-methylheptyl ester and 306 mg of 4-[4'-(1"-n-octynyl)phenyl]benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 59

Production of Exemplified Compound 673

The same operation as described in Example 13 was repeated to obtain 374 mg of Exemplified Compound 673 in the form of a colorless crystal, except that 340 mg of (R)-6-hydroxynaphthalene-2-carboxylic acid 1'-(trifluoromethyl)hexyl ester and 292 mg of 4-[4'-(1"-n-octynyl)phenyl]benzyl alcohol were substituted for 326 mg of (R)-4-(4'-hydroxyphenyl)benzoic acid 1"-methylheptyl ester and 216 mg of 4-(1'-n-octynyl)benzyl alcohol, respectively. The phase transition temperature of this compound is shown in Table 13.

Example 60

Production of Exemplified Compound 759

The same. operation as described in Example 13 was repeated to obtain 359 mg of Exemplified Compound 759 in the form of a colorless crystal, except that 335 mg of (R)-4-hydroxy-2-fluorobenzoic acid-1'-(trifluoromethyl)-6'-ethyloxyhexyl ester and 292 mg of 4-[4'-(1"-n-octynyl)phenyl]benzyl alcohol were substituted for 326 mg of (R)-4-(4'-hydroxyphenyl)benzoic acid 1"-methylheptyl ester and 216 mg of 4-(1'-n-octynyl)benzyl alcohol, respectively. The phase transition temperature of this compound is shown in Table 13.

Example 61

Production of Exemplified Compound 788

The same operation as described in Example 13 was repeated to obtain 362 mg of Exemplified Compound 788 in the form of a colorless crystal, except that 345 mg of (R)-6-hydroxy-1,2,3,4-tetrahydronaphthalene-2-carboxylic acid 1'-(trifluoromethyl)-3'-ethyloxypropyl ester and 292 mg of 4-[4'-(1-n-octynyl)phenyl]benzyl alcohol were substituted for 326 mg of (R)-4-(4'-hydroxyphenyl)benzoic acid 1"-methylheptyl ester and 216 mg of 4-(1'-n-octynyl)benzyl alcohol, respectively. The phase transition temperature of this compound is shown in Table 13.

Example 62

Production of Exemplified Compound 801

The same operation as described in Example 1 was repeated to obtain 411 mg of Exemplified Compound 801 in the form of a colorless crystal, except that 250 mg of (S)-4-(1'-methylnonylcarbonyloxy)phenol and 324 mg of 4-[4'-(1"-n-octynyl)-3'-fluorophenyl]benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 63

Production of Exemplified Compound 904

The same operation as described in Example 1 was repeated to obtain 352 mg of Exemplified Compound 904 in the form of a colorless crystal, except that 230 mg of (S)-6-(2'-methylbutyloxy)-2-naphthol and 306 mg of 4-[4'-(1"-n-octynyl)phenyl]benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 64

Production of Exemplified Compound 913

The same operation as described in Example 13 was repeated to obtain 263 mg of Exemplified Compound 913 in the form of a colorless crystal, except that 180 mg of (S)-4-(2'-methylbutyloxy)phenol and 292 mg of 4-[4'-(1"-n-octynyl)phenyl]benzyl alcohol were substituted for 326 mg of (R)-4-(4'-hydroxyphenyl)benzoic acid 1"-methylheptyl ester and 216 mg of 4-(1'-n-octynyl)benzyl alcohol, respectively. The phase transition temperature of this compound is shown in Table 13.

Example 65

Production of Exemplified Compound 948

The same operation as described in Example 1 was repeated to obtain 342 mg of Exemplified Compound 948 in the form of a colorless crystal, except that 222 mg of (S)-4-(1'-methylheptyloxy)phenol and 306 mg of 4-[4'-(1"-n-octynyl)phenyl]benzoic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 66

Production of Exemplified Compound 960

The same operation as described in Example 1 was repeated to obtain 473 mg of Exemplified Compound 960 in the form of a colorless crystal, except that 342 mg of (S)-4-[4'-(1-methylheptyloxy)phenyloxycarbonyl]phenol and 306 mg of 4-[4'-(1"-n-octynyl)phenyl]benzoic acid were substituted for 326 mg of (R)-4-(4'-hydroxyphenyl)benzoic acid 1-methylheptyl ester and 258 mg of 4-(1'-n-decynyl)benzoic acid, respectively. The phase transition temperature of this compound is shown in Table 13.

Example 67

Production of Exemplified Compound 973

The same operation as described in Example 1 was repeated to obtain 499 mg of Exemplified Compound 973 in the form of a colorless crystal, except that 308 mg of 6-(1'-n-decynyl)naphthalene-2-carboxylic acid was substituted for 258 mg of 4-(1'-n-decynyl)benzoic acid. The phase transition temperature of this compound is shown in Table 13.

Example 68

Production of Exemplified Compound 983

The same operation as described in Example 1 was repeated to obtain 429 mg of Exemplified Compound 983 in the form of a colorless crystal, except that 370 mg of (R)-4-(4'-hydroxyphenylcarbonyloxy)benzoic acid 1''-methylheptyl ester and 308 mg of 6-(1'-n-decynyl)naphthalene-2-carboxylic acid were substituted for 326 mg of (R)-4-(4'-hydroxyphenyl)benzoic acid 1''-methylheptyl ester and 258 mg of 4-(1'-n-decynyl)benzoic acid, respectively. The phase transition temperature of this compound is shown in Table 13.

Example 69

Production of Exemplified Compound 989

The same operation as described in Example 1 was repeated to obtain 422 mg of Exemplified Compound 989 in the form of a colorless crystal, except that 258 mg of (S)-6-hydroxynaphthalene-2-carboxylic acid 2'-methylbutyl ester and 308 mg of 6-(1'-n-decynyl)naphthalene-2-carboxylic acid were substituted for 326 mg of (R)-4-(4'-hydroxyphenyl)benzoic acid 1''-methylheptyl ester and 258 mg of 4-(1'-n-decynyl)benzoic acid, respectively. The phase transition temperature of this compound is shown in Table 13.

Example 70

Production of Exemplified Compound 992

The same operation as described in Example 13 was repeated to obtain 370 mg of Exemplified Compound 992 in the form of a colorless crystal, except that 284 mg of (S)-4-(4'-hydroxyphenyl)benzoic acid 2''-methylbutyl ester and 294 mg of 6-(1'-n-decynyl)naphthalene-2-methanol were substituted for 326 mg of (R)-4-(4'-hydroxyphenyl)benzoic acid 1''-methylheptyl ester and 216 mg of 4-(1'-n-octynyl)benzyl alcohol, respectively. The phase transition temperature of this compound is shown in Table 13.

Example 71

Production of Exemplified Compound 996

The same operation as described in Example 1 was repeated to obtain 357 mg of Exemplified Compound 996 in the form of a colorless crystal, except that 384 mg of 4-hydroxybenzoic acid 2'-n-perfluorobutylethyl ester and 308 mg of 6-(1'-n-decynyl)naphthalene-2-carboxylic acid were substituted for 326 mg of (R)-4-(4'-hydroxyphenyl)benzoic acid 1''-methylheptyl ester and 258 mg of 4-(1'-n-decynyl)benzoic acid, respectively. The phase transition temperature of this compound is shown in Table 13.

Example 72

Production of Exemplified Compound 1004

The same operation as described in Example 13 was repeated to obtain 268 mg of Exemplified Compound 1004 in the form of a colorless crystal, except that 250 mg of (R)-4-hydroxybenzoic acid 1'-methylheptyl ester and 294 mg of 6-(1'-n-decynyl)naphthalene-2-methanol were substituted for 326 mg of (R)-4-(4'-hydroxyphenyl)benzoic acid 1''-methylheptyl ester and 216 mg of 4-(1'-n-octynyl)benzyl alcohol, respectively. The phase transition temperature of this compound is shown in Table 13.

Example 73

Production of Exemplified Compound 1012

The same operation as described in Example 13 was repeated to obtain 352 mg of Exemplified Compound 1012 in the form of a colorless crystal, except that 258 mg of (S)-6-hydroxynaphthalene-2-carboxylic acid 2'-methylbutyl ester and 294 mg of 6-(1'-n-decynyl)naphthalene-2-methanol were substituted for 326 mg of (R)-4-(4'-hydroxyphenyl)benzoic acid 1''-methylheptyl ester and 216 mg of 4-(1'-n-octynyl)benzyl alcohol, respectively. The phase transition temperature of this compound is shown in Table 13.

Example 74

Production of Exemplified Compound 1045

The same operation as described in Example 13 was repeated to obtain 322 mg of Exemplified Compound 1045 in the form of a colorless crystal, except that 335 mg of (R)-4-hydroxy-2-fluorobenzoic acid 1'-(trifluoromethyl)-6'-ethyloxyhexyl ester and 294 mg of 6-(1'-n-decynyl)naphthalene-2-methanol were substituted for 326 mg of (R)-4-(4'-hydroxyphenyl)benzoic acid 1''-methylheptyl ester and 216 mg of 4-(1'-n-octynyl)benzyl alcohol, respectively. The phase transition temperature of this compound is shown in Table 13.

Example 75

Production of Exemplified Compound 1083

The same operation as described in Example 13 was repeated to obtain 404 mg of Exemplified Compound 1083 in the form of a colorless crystal, except that 398 mg of (S)-4-[4'-(1''-methylnonylcarbonyloxy) phenyloxycarbonyl]phenol and 294 mg of 6-(1'-n-decynyl)naphthalene-2-methanol were substituted for 326 mg of (R)-4-(4'-hydroxyphenyl)benzoic acid 1''-methylheptyl ester and 216 mg of 4-(1'-n-octynyl)benzyl alcohol, respectively. The phase transition temperature of this compound is shown in Table 13.

Example 76

Production of Exemplified Compound 1114

The same operation as described in Example 1 was repeated to obtain 254 mg of Exemplified Compound 1114 in the form of a colorless crystal, except that 222 mg of (S)-4-(1'-methylheptyloxy)phenol and 308 mg of 6-(1'-n-decynyl)naphthalene-2-carboxylic acid were substituted for 326 mg of (R)-4-(4'-hydroxyphenyl)benzoic acid 1''-methylheptyl ester and 258 mg of 4-(1'-n-decynyl)benzoic acid, respectively. The phase transition temperature of this compound is shown in Table 13.

Example 77

Production of Exemplified Compound 1130

The same operation as described in Example 1 was repeated to obtain 447 mg of Exemplified Compound 1130 in the form of a colorless crystal, except that 298 mg of (S)-4-[4'-(1"-methylheptyloxy)phenyl]phenol and 308 mg of 6-(1'-n-decynyl)naphthalene-2-carboxylic acid were substituted for 326 mg of (R)-4-(4'-hydroxyphenyl)benzoic acid 1"-methylheptyl ester and 258 mg of 4-(1'-n-decynyl) benzoic acid, respectively. The phase transition temperature of this compound is shown in Table 13.

Example 78

Production of Exemplified Compound 1135

The same operation as described in Example 1 was repeated to obtain 423 mg of Exemplified Compound 1135 in the form of a colorless crystal, except that 342 mg of (S)-4-[4'-(1"-methylheptyloxy)phenyloxycarbonyl]phenol and 308 mg of 6-(1'-n-decynyl)naphthalene-2-carboxylic acid were substituted for 326 mg of (R)-4-(4'-hydroxyphenyl)benzoic acid 1"-methylheptyl ester and 258 mg of 4-(1'-n-decynyl)benzoic acid, respectively. The phase transition temperature of this compound is shown in Table 13.

Example 79

Production of Exemplified Compound 1144

The same operation as described in Example 13 was repeated to obtain 389 mg of Exemplified Compound 1144 in the form of a colorless crystal, except that 342 mg of (S)-4-[4'-(1"-methylheptyloxy)phenyloxycarbonyl]phenol and 294 mg of $^6$-(1'-n-decynyl)naphthalene-2-methanol were substituted for 326 mg of (R)-4-(4'-hydroxyphenyl) benzoic acid 1"-methylheptyl ester and 216 mg of 4-(1'-n-octynyl)benzyl alcohol, respectively. The phase transition temperature of this compound is shown in Table 13.

Example 80

Production of Exemplified Compound 1153

The same operation as described in Example 13 was repeated to obtain 328 mg of Exemplified Compound 1153 in the form of a colorless crystal, except that 300 mg of (S)-4-[4'-(2"-methylbutyloxy)phenyloxycarbonyl]phenol and 294 mg of 6-(1'-n-decynyl)naphthalene-2-methanol were substituted for 326 mg of (R)-4-(4'-hydroxyphenyl) benzoic acid 1"-methylheptyl ester and 216 mg of 4-(1'-n-octynyl)benzyl alcohol, respectively. The phase transition temperature of this compound is shown in Table 13.

Example 81

Production of Exemplified Compound 1170

The same operation as described in Example 1 was repeated to obtain 340 mg of Exemplified Compound 1170 in the form of a colorless crystal, except that 230 mg of (S)-6-(2'-methylbutyloxy)-2-naphthol and 308 mg of 6-(1'-n-decynyl)naphthalene-2-carboxylic acid were substituted for 326 mg of (R)-4-(4'-hydroxyphenyl)benzoic acid 1'-methylheptyl ester and 258 mg of 4-(1'-n-decynyl) benzoic acid, respectively. The phase transition temperature of this compound is shown in Table 13.

Example 82

Production of Exemplified Compound 1260

A mixture comprising 284 mg of (S)-4-(4'-hydroxyphenyl)benzoic acid 2"-methylbutyl ester, 311 mg of 6-(1'-n-decynyl)-1,2,3,4-tetrahydronaphthalene-2-carboxylic acid, 206 mg of DCC and 5 g of dichloromethane was stirred at room temperature for 30 minutes. Then, a catalytic amount of 4-N,N-dimethylaminopyridine was added to the mixture, and then the mixture was further stirred at room temperature for 5 hours. Insoluble substances were filtered off from the reaction mixture, followed by distilling off dichloromethane from the filtrate, and the resultant residue was purified twice by means of silica gel column chromatography, whereby 595 mg of Exemplified Compound 1260 was obtained in the form of a colorless crystal. The phase transition temperature of this compound is shown in Table 13.

Example 83

Production of Exemplified Compound 1280

The same operation as described in Example 13 was repeated to obtain 385 mg of Exemplified Compound 1280 in the form of a colorless crystal, except that 384 mg of 4-hydroxybenzoic acid 2'-n-perfluorobutylethyl ester and 297 mg of 6-(1'-n-decynyl)-1,2,3,4-tetrahydronaphthalene-2-methanol were substituted for 326 mg of (R)-4-(4'-hydroxyphenyl)benzoic acid 1"-methylheptyl ester and 216 mg of 4-(1'-n-octynyl)benzyl alcohol, respectively. The phase transition temperature of this compound is shown in Table 13.

Example 84

Production of Exemplified Compound 1373

The same operation as described in Example 82 was repeated to obtain 365 mg of Exemplified Compound 1373 in the form of a colorless crystal, except that 316 mg of (S)-4-[4'-(1"-methylheptyloxy)-3'-fluorophenyl]phenol was substituted for 284 mg of (S)-4-(4'-hydroxyphenyl)benzoic acid 2"-methylbutyl ester. The phase transition temperature of this compound is shown in Table 13.

TABLE 13

| EX. | Structural Formula | Ph. Trans. Temp. (° C.) | | | | |
|---|---|---|---|---|---|---|
| | | C | S$_X$ / Sc* | Sc* | S$_A$ | Ch / I |

| EX. | Structural Formula | C | | Sc* | (Sc*) | S$_A$ | | I |
|---|---|---|---|---|---|---|---|---|
| 1 | n-C$_8$H$_{17}$—C≡C—⟨C$_6$H$_4$⟩—C(O)O—⟨C$_6$H$_4$⟩—⟨C$_6$H$_4$⟩—O—C(O)—CH(CH$_3$)—C$_6$H$_{13}$-n (R) | · | 74 | · | (62) | · | 79 | · |
| 2 | n-C$_8$H$_{17}$—C≡C—⟨C$_6$H$_4$⟩—C(O)O—⟨C$_6$H$_4$⟩—⟨C$_6$H$_4$⟩—O—CH$_2$CH$_2$OC$_4$H$_9$-n | · | 97 | · | 117 | · | 135 | · |
| 3 | n-C$_8$H$_{17}$—C≡C—⟨C$_6$H$_4$⟩—C(O)O—⟨C$_6$H$_4$⟩—O—CH(CH$_3$)—C$_6$H$_{13}$-n (R) | · | 8 | — | | — | | · |
| 4 | n-C$_6$H$_{13}$—C≡C—⟨C$_6$H$_4$⟩—C(O)O—⟨C$_6$H$_4$⟩—O—CH(CH$_3$)—C$_6$H$_{13}$-n (R) | · | 12 | — | | — | | · |
| 5 | n-C$_6$H$_{13}$—C≡C—⟨C$_6$H$_4$⟩—C(O)O—⟨naphthalene⟩—O—C(O)—CH(CH$_3$)—C$_6$H$_{13}$-n (R) | · | 49 | — | | · | (−5) | · |

TABLE 13-continued

| EX. | Structural Formula | C | $S_X$ | $S_{CA}^*$ | $S_C$ | $S_A$ | Ch | I |
|---|---|---|---|---|---|---|---|---|
| 6 | n-C$_6$H$_{13}$—C≡C—C$_6$H$_4$—C(O)O—C$_{10}$H$_6$—O—C(O)—CH$_2$CF$_2$CHFCF$_3$ | · | 90 | — | (66) | (78) | — | · |
| 7 | n-C$_6$H$_{13}$—C≡C—C$_6$H$_4$—C(O)O—C$_6$H$_4$—O—C(O)—CH$_2$—CH(CH$_3$)—C$_2$H$_5$ (S) | · | 11 | — | — | (−25) | — | · |
| 8 | n-C$_5$H$_{11}$—C≡C—C$_6$H$_4$—C(O)O—C$_6$H$_4$—C$_6$H$_4$—O—C(O)—CH$_2$—CH(CH$_3$)—C$_2$H$_5$ (S) | · | 85 | — | (82) | 144 | · 158 | · |
| 9 | n-C$_6$H$_{13}$—C≡C—C$_6$H$_4$—C(O)O—C$_6$H$_4$—C$_6$H$_4$—O—C(O)—CH(CH$_3$)—C$_6$H$_{13}$-n (R) | · | 61 | (48) | 70 | 102 | — | · |
| 10 | n-C$_8$H$_{17}$—C≡C—C$_6$H$_3$F—C(O)O—C$_6$H$_4$—C$_6$H$_4$—O—C(O)—CH(CH$_3$)—C$_6$H$_{13}$-n (R) | · | 79 | — | — | (56) | — | · |

Ph. Trans. Temp. (° C.)

TABLE 13-continued

| EX. | Structural Formula | C | | Sc* | | S_A | | Ch | | I |
|---|---|---|---|---|---|---|---|---|---|---|
| 11 | n-C6H13—C≡C—[Ph]—C(=O)O—[Ph]—[Ph]—O-C(=O)—CH(CH3)—C6H13-n (R) | · | 97 | — | — | · | (78) | — | — | · |
| 12 | n-C8H17—C≡C—[Ph(F)]—C(=O)O—[Ph]—[Ph]—O-C(=O)—CH2—CH(CH3)—C2H5 (S) | · | 93 | — | — | · | 102 | · | 119 | · 121 |
| 13 | n-C6H13—C≡C—[Ph]—CH2—O—[Ph]—[Ph]—O-C(=O)—CH(CH3)—C6H13-n (R) | · | 98 | · | (64) | · | (82) | · | (84) | · (90) |
| 14 | n-C6H13—C≡C—[Ph]—C(=O)O—[Ph]—O—CH2CH2-C4F9-n | · | 86 | — | — | · | (76) | — | 87 | — |
| 15 | n-C6H13—C≡C—[Ph]—CH2—O—[Naph]—O-C(=O)—CH(CH3)—C6H13-n (R) | · | 70 | — | — | — | — | — | — | · (33) |

| EX. | Structural Formula | Ph. Trans. Temp. (° C.) | | | | | | | | |
|---|---|---|---|---|---|---|---|---|---|---|
| | | C | | Sc* | | S_A | | Ch | | I |
| 16 | n-C6H13—C≡C—[Ph]—C(=O)O—[Ph]—[Ph]—O-C(=O)—CH2—CH(CH3)—C2H5 (S) | · | 114 | · | 115 | · | 137 | · | 144 | · |

TABLE 13-continued

| EX. | Structural Formula | Ph. Trans. Temp. (°C.) | | | | | |
|---|---|---|---|---|---|---|---|
| | | C | Sc | S_A | N | I |
| 17 | n-C₆H₁₃—C≡C—〈benzene〉—CH₂—O—〈benzene〉—O—C(=O)—〈benzene〉—C(=O)—O—CH₂CH₂C₈F₁₇-n | · 95 | — | — | — | · |
| 18 | n-C₆H₁₃—C≡C—〈benzene〉—CH₂—O—〈benzene〉—O—〈benzene(F)〉—C(=O)—O—CH(CF₃)—(CH₂)₅OC₂H₅ (R) | · 52 | — | — | — | · |
| 19 | n-C₆H₁₃—C≡C—〈benzene〉—CH₂—O—〈benzene〉—O—C(=O)—〈benzene〉—O—CH(CH₃)C₂H₅ (S) | · 90 | — | · 67 | — | · |
| 20 | n-C₆H₁₃—C≡C—〈benzene〉—CH₂—O—〈benzene〉—O—C(=O)—〈benzene〉—O—CH(CH₃)C₆H₁₃-n (R) | · 63 | (45) | · 69 | · (48) | · 79 — · |
| 21 | n-C₆H₁₃—C≡C—〈benzene〉—CH₂—O—〈benzene〉—O—C(=O)—〈benzene〉—O—CH₂CH₂C₄F₉-n | · 56 | | | | |

TABLE 13-continued

| EX. | Structural Formula | C | | Sc | | N | | I |
|---|---|---|---|---|---|---|---|---|
| 22 | n-C₆H₁₃—C≡C—C₆H₄—COO—C₆H₄—C₆H₄—OCO—C₆H₁₃-n | · | 103 | · | 116 | · | 162 | · | 192 | · |
| 23 | n-C₅H₁₁—C≡C—C₆H₄—COO—C₆H₄—OCO—C₆H₄—OCO—C₁₂H₂₅-n | · | 95 | · | 138 | — | | · | 174 | · |
| 24 | n-C₆H₁₃—C≡C—C₆H₄—COO—C₆H₄—OCO—C₆H₄—OCO—CH(CH₃)—C₈H₁₇-n (S) | · | 87 | · | 95 | — | | · | 110 | · |
| 25 | n-C₈H₁₇—C≡C—C₆H₄—COO—C₆H₄—C₆H₄—OCO—CH₂—CH(CH₃)—C₂H₅ (S) | · | 101 | · | 140 | — | | · | 168 | · |

| EX. | Structural Formula | Ph. Trans. Temp. (° C.) | | | | | | |
|---|---|---|---|---|---|---|---|---|
| | | C | | Sc | | N | | I |
| 26 | n-C₆H₁₃—C≡C—C₆H₄—COO—C₆H₄—C₆H₄—O—CH(CH₃)—C₆H₁₃-n (S) | · | 67 | · | 74 | · | 82 | · |

TABLE 13-continued

| EX. | Structural Formula | Ph. Trans. Temp. (° C.) | | | | | | |
|---|---|---|---|---|---|---|---|---|
| | | C | | Sc | | N | | I |
| 27 | n-C₈H₁₇—C≡C—C₆H₄—C(=O)O—C₆H₄—C₆H₃(F)—O—CH₂CH₂OC₆H₁₃-n | · | 75 | · | 105 | · | 111 | · |
| 28 | n-C₆H₁₃—C≡C—C₆H₄—C(=O)O—C₆H₄—C₆H₃(F)—O—CH₂CH₂OC₆H₁₃-n | · | 73 | · | 113 | · | 115 | · |
| 29 | n-C₆H₁₃—C≡C—C₆H₄—C(=O)O—C₆H₄—C₆H₄—O—CH₂CH₂OC₄H₉-n | · | 99 | · | 122 | · | 148 | · |
| 30 | n-C₆H₁₃—C≡C—C₆H₄—C(=O)O—C₆H₄—C₆H₄—O—CH₂CH₂OC₆H₁₃-n | · | 111 | · | 129 | · | 152 | · |
| 31 | n-C₈H₁₇—C≡C—C₆H₄—C(=O)O—C₆H₄—C₆H₃(F)—O—CH(CH₃)—C₆H₁₃-n (S) | · | 53 | · | 63 | · | 65 | · |
| 32 | n-C₆H₁₃—C≡C—C₆H₄—C(=O)O—C₆H₄—C₆H₃(F)—O—CH(CH₃)—C₆H₁₃-n (S) | · | 58 | · | 62 | · | 70 | · |

TABLE 13-continued

| EX. | Structural Formula | C | | Sc* | | S_A | | Ch | | I |
|---|---|---|---|---|---|---|---|---|---|---|
| 33 | n-C₈H₁₇—C≡C—⌬—C(=O)O—⌬—⌬—O—CH(CH₃)—C₆H₁₃-n (S) | · | 69 | — | | · | 77 | · | 84 | · |
| 34 | n-C₈H₁₇—C≡C—⌬—C(=O)O—⌬—⌬—O—CH₂CH₂OC₆H₁₃-n | · | 108 | — | | · | 132 | · | 139 | · |
| 35 | n-C₆H₁₃—C≡C—⌬—C(=O)O—⌬(F)—⌬—O—CH(CH₃)—C₆H₁₃-n (S) | · | 56 | — | | — | | (46) | | · |

Ph. Trans. Temp. (° C.)

| EX. | Structural Formula | C | | Sc* | | S_A | | Ch | | I |
|---|---|---|---|---|---|---|---|---|---|---|
| 36 | n-C₆H₁₃—C≡C—⌬—C(=O)O—⌬—O—CH₂—CH(CH₃)—C₂H₅ (S) | · | 47 | — | | — | | — | | · |
| 37 | n-C₈H₁₇—C≡C—⌬—C(=O)O—⌬—O—(CH₂)₃—CH(CH₃)—C₂H₅ (S) | · | 45 | — | | — | | — | | · |
| 38 | n-C₆H₁₃—C≡C—⌬—C(=O)O—⌬—C(=O)O—⌬—O—CH₂—CH(CH₃)—C₂H₅ (S) | · | 80 | · | 95 | — | | · | 149 | · |

TABLE 13-continued

| Ex. | Structural Formula | Ph. Trans. Temp. (° C.) | | | | |
|---|---|---|---|---|---|---|
| | | C | Sc | N | I | |
| 39 | n-C₆H₁₃—C≡C—⟨phenyl⟩—CH₂—O—⟨biphenyl⟩—O—CH₂—CH(CH₃)—C₂H₅ (S) | · 141 | · (138) | · 171 | · — | · |
| 40 | n-C₆H₁₃—C≡C—⟨phenyl⟩—CH₂—O—⟨biphenyl⟩—O—CH(CH₃)—C₆H₁₃-n (S) | · 86 | · 110 | — | — | · |
| 41 | n-C₆H₁₃—C≡C—⟨phenyl⟩—CH₂—O—⟨phenyl⟩—C(=O)—O—⟨phenyl⟩—O—CH(CH₃)—C₆H₁₃-n (S) | · 64 | · (53) | · (61) | · | · |
| 42 | n-C₆H₁₃—C≡C—⟨phenyl⟩—C(=O)—O—⟨biphenyl⟩—O—CH₂—CH(CH₃)—C₂H₅ (S) | · 102 | · 112 | · 150 | · | · |
| 43 | n-C₆H₁₃—C≡C—⟨phenyl⟩—C(=O)—O—⟨biphenyl⟩—O—CH(CH₃)—C₆H₁₃-n (S) | · 86 | · (80) | · 90 | · | · |
| 44 | n-C₆H₁₃—C≡C—⟨phenyl⟩—C(=O)—O—⟨biphenyl⟩—O—CH(CH₃)—C₈H₁₇-n (R:S = 50:50) | · 73 | · (68) | · 85 | · | · |

TABLE 13-continued

| EX. | Structural Formula | Ph. Trans. Temp. (°C.) | | | | | |
|---|---|---|---|---|---|---|---|
| | | C | S$_{CA}$* | Ferri | S$_{C}$* | S$_A$ | I |
| 45 | n-C$_6$H$_{13}$—C≡C—〈benzene〉—CH$_2$—O—〈benzene〉—O—CH$_2$—CH(CH$_3$)—C$_2$H$_5$ (S) | · 38 | — | — | — | — | · |
| 46 | n-C$_6$H$_{13}$—C≡C—〈benzene〉—CH$_2$—O—〈naphthalene〉—O—CH$_2$—CH(CH$_3$)—C$_2$H$_5$ (S) | · 50 | — | — | · 58 | · 69 | · |
| 47 | n-C$_6$H$_{13}$—C≡C—〈benzene〉—C(=O)—O—〈naphthalene〉—O—CH$_2$—CH(CH$_3$)—C$_2$H$_5$ (S) | · 61 | — | — | — | — | · |
| 48 | n-C$_6$H$_{13}$—C≡C—〈benzene〉—CH$_2$—O—〈benzene〉—O—C(=O)—〈benzene〉—O—CH(CH$_3$)—C$_6$H$_{13}$-n (S) | · 113 | — | — | — | — | · |
| 49 | n-C$_6$H$_{13}$—C≡C—〈benzene〉—CH$_2$—O—〈benzene〉—O—CH$_2$—〈benzene〉—O—CH(CH$_3$)—C$_6$H$_{13}$-n (S) | · 66 | — | — | · 68 | — | · |
| 50 | n-C$_8$H$_{17}$—C≡C—〈benzene-F〉—〈benzene〉—C(=O)—O—〈naphthalene〉—O—C(=O)—CH(CH$_3$)—C$_6$H$_{13}$-n (R) | · 107 | · (100) | · 117 | — | · 143 | · |

TABLE 13-continued
| EX. | Structural Formula | Ph. Trans. Temp. (° C.) | | | | | |
|---|---|---|---|---|---|---|---|
| | | C | S$_{CA}$* | Sc* | S$_A$ | I | |
| 51 | 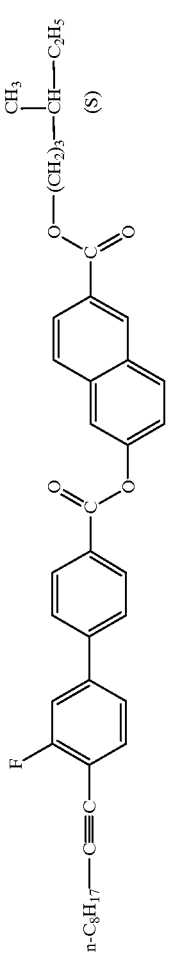 | · 60 · | — | · 142 · | 186 · | | |
| 52 | 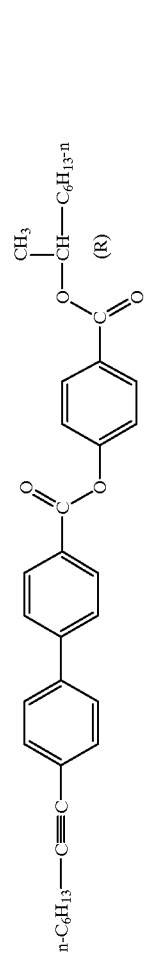 | · 64 · | 73 | · 95 · | 120 · | | |
| 53 | 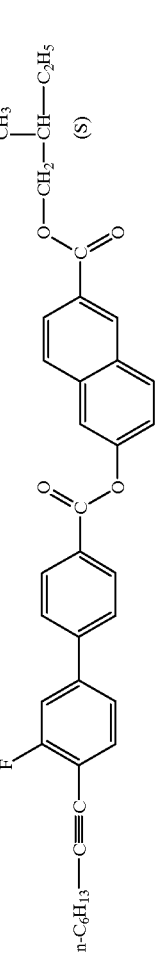 | · 76 · | — | · 105 · | 210 · | | |
| 54 | 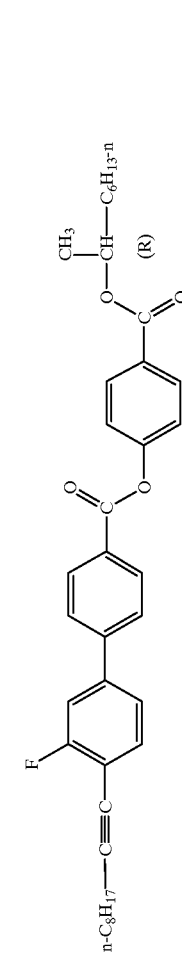 | · 37 · | 53 | · 63 · | 85 · | | |
| 55 | 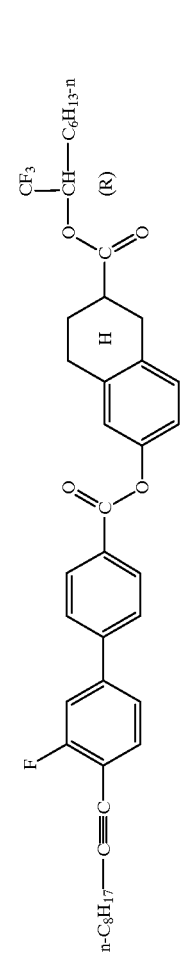 | · 69 · | — | · (62) · | 77 · | | |
| | | Ph. Trans. Temp. (° C.) | | | | | |

TABLE 13-continued

| EX. | Structural Formula | C | S$_{CA}$* | Ferri | Sc* | S$_A$ | I |
|---|---|---|---|---|---|---|---|
| 56 | n-C$_6$H$_{13}$—C≡C—[Ar-F]—[Ar]—O-CO—[Naphthyl]—O-CO—CH(CF$_3$)—C$_2$H$_5$ (R) | · 121 | · 129 | · 130 | · 136 | · 180 | · |
| 57 | n-C$_6$H$_{13}$—C≡C—[Ar]—[Ar]—CH$_2$-O—[Ar]—O-CO—CH(CH$_3$)—C$_6$H$_{13}$-n (R) | · 47 | · 64 | · 68 | · 75 | · 87 | · |
| 58 | n-C$_6$H$_{13}$—C≡C—[Ar]—[Ar]—O-CO—[Naphthyl]—O-CO—CH(CH$_3$)—C$_6$H$_{13}$-n (R) | · 95 | (86) | — | · 125 | · 167 | · |
| 59 | n-C$_6$H$_{13}$—C≡C—[Ar]—[Ar]—CH$_2$-O—[Naphthyl]—O-CO—CH(CF$_3$)—C$_5$H$_{11}$-n (R) | · 116 | — | — | · (110) | · 122 | · |
| 60 | n-C$_6$H$_{13}$—C≡C—[Ar]—[Ar]—CH$_2$-O—[Ar-F]—O-CO—CH(CF$_3$)—(CH$_2$)$_3$OC$_2$H$_5$ (R) | · 26 | — | — | — | — | |

| | Ph. Trans. Temp. (° C.) | | | | |
|---|---|---|---|---|---|
| EX. | Structural Formula | C | S$_{CA}$* | Sc* | S$_A$ | Ch | I |

TABLE 13-continued

| EX. | Structural Formula | C | S$_{CA}$* | Ferri | Sc* | S$_A$ | I |
|-----|-------|---|---|---|---|---|---|
| 61 | n-C$_6$H$_{13}$—C≡C—C$_6$H$_4$—C$_6$H$_4$—CH$_2$—O—(tetrahydronaphthyl-H)—C(=O)—O—CH(CF$_3$)—(CH$_2$)$_2$OC$_2$H$_5$ (R) | · 66 | · (55) | · 71 | · 90 | — | · |
| 62 | n-C$_6$H$_{13}$—C≡C—C$_6$H$_3$(F)—C$_6$H$_4$—O—C(=O)—CH(CH$_3$)—C$_8$H$_{17}$-n (S) | · 45 | — | · 103 | — | — | · |
| 63 | n-C$_6$H$_{13}$—C≡C—C$_6$H$_4$—C$_6$H$_4$—C(=O)—O—(naphthyl)—O—CH$_2$—CH(CH$_3$)—C$_2$H$_5$ (S) | · 129 | — | · 172 | · 200 | · 217 | · |
| 64 | n-C$_6$H$_{13}$—C≡C—C$_6$H$_4$—C$_6$H$_4$—CH$_2$—O—C$_6$H$_4$—O—CH$_2$—CH(CH$_3$)—C$_2$H$_5$ (S) | · 107 | — | · 108 | · 150 | — | · |
| 65 | n-C$_6$H$_{13}$—C≡C—C$_6$H$_4$—C$_6$H$_4$—C(=O)—O—C$_6$H$_4$—O—CH(CH$_3$)—C$_6$H$_{13}$-n (S) | · 74 | — | · 92 | · 117 | — | · |

Ph. Trans. Temp. (° C.)

TABLE 13-continued

| EX. | Structural Formula | C | Sc | S_A | I |
|---|---|---|---|---|---|
| 66 | n-C₆H₁₃—C≡C—[biphenyl]—C(O)O—[phenyl]—OC(O)—[phenyl]—O—CH(CH₃)—C₆H₁₃-n (S) | · 100 | — | · 108 | · 238 · |
| 67 | n-C₈H₁₇—C≡C—[naphthyl]—C(O)O—[biphenyl]—OC(O)—CH(CH₃)—C₆H₁₃-n (R) | · 118 | — | · (100) · 116 | · 144 · |
| 68 | n-C₈H₁₇—C≡C—[naphthyl]—C(O)O—[phenyl]—OC(O)—[phenyl]—OC(O)—CH(CH₃)—C₆H₁₃-n (R) | · 87 | · 94 | · 124 | · 159 · |
| 69 | n-C₈H₁₇—C≡C—[naphthyl]—C(O)O—[phenyl]—OC(O)—CH₂—CH(C₂H₅)—CH₃ (S) | · 100 | — | (79) | · 113 · |
| 70 | n-C₈H₁₇—C≡C—[naphthyl]—CH₂—O—[phenyl]—[phenyl]—OC(O)—CH₂—CH(C₂H₅)—CH₃ (S) | · 98 | — | (87) | · 174 · |

Ph. Trans. Temp. (° C.)

TABLE 13-continued

| EX. | Structural Formula | Ph. Trans. Temp. (° C.) | | | | |
|---|---|---|---|---|---|---|
| | | C | Sc* | S_A | Ch | I |
| 71 | n-C8H17—C≡C—[naphthalene]—O—CH2—[phenyl]—O—C(=O)—[phenyl]—O—CH2CH2C4F9-n | · | 125 | · (109) | · 133 | · |
| 72 | n-C8H17—C≡C—[naphthalene]—O—CH2—[phenyl]—O—C(=O)—CH(CH3)—C6H13-n (R) | · | 33 | — | · (−11) | · |
| 73 | n-C8H17—C≡C—[naphthalene]—O—CH2—[naphthalene]—C(=O)—O—CH2—CH(CH3)—C2H5 (S) | · | 84 | · (54) | · 95 | · |
| 74 | n-C8H17—C≡C—[naphthalene]—O—CH2—[phenyl(F)]—C(=O)—O—CH(CF3)—(CH2)5OC2H5 (R) | · | 43 | — | — | |
| 75 | n-C8H17—C≡C—[naphthalene]—O—CH2—[phenyl]—O—C(=O)—[phenyl]—O—C(=O)—CH(CH3)—C8H17-n (S) | · | 119 | · 148 | — | |

TABLE 13-continued

| | Structure | | | | | | | |
|---|---|---|---|---|---|---|---|---|
| 76 | n-C8H17—C≡C—[naphthalene]—C(O)O—[phenyl]—O—CH(CH3)—C6H13-n (S) | · | 40 | — | — | (11) | — | · |
| 77 | n-C8H17—C≡C—[naphthalene]—C(O)O—[phenyl]—[phenyl]—O—CH(CH3)—C6H13-n (S) | · | 93 | · | 116 | · | 141 | · |
| 78 | n-C8H17—C≡C—[naphthalene]—C(O)O—[phenyl]—C(O)O—[phenyl]—O—CH(CH3)—C6H13-n (S) | · | 98 | · | 118 | · | 143 | · |
| 79 | n-C8H17—C≡C—[naphthalene]—CH2O—[phenyl]—C(O)O—[phenyl]—O—CH(CH3)—C6H13-n (S) | · | 116 | · | 120 | · | 136 | · |
| 80 | n-C8H17—C≡C—[naphthalene]—CH2O—[phenyl]—C(O)O—[phenyl]—O—CH2—CH(CH3)(C2H5) (S) | · | 143 | · | (121) | · | 176 | · |

TABLE 13-continued

| EX. | Structural Formula | Ph. Trans. Temp. (° C.) | | | | |
|---|---|---|---|---|---|---|
| | | C | Sc | S$_A$ | Ch | I |
| 81 | n-C$_8$H$_{17}$—C≡C—[naphthalene]—C(=O)O—[naphthalene]—O—CH$_2$—CH(CH$_3$)—C$_2$H$_5$ (S) | · 83 | — | — | · 105 | · |
| 82 | n-C$_8$H$_{17}$—C≡C—[tetrahydronaphthalene-H]—C(=O)O—[phenyl]—[phenyl]—O—C(=O)—CH(CH$_3$)—C$_2$H$_5$ (S) | · 86 | · (74) | · 154 | — | · |
| 83 | n-C$_8$H$_{17}$—C≡C—[tetrahydronaphthalene-H]—CH$_2$—O—[phenyl]—C(=O)O—CH$_2$CH$_2$C$_4$F$_9$-n | · 66 | · (43) | · (52) | — | · |
| 84 | n-C$_8$H$_{17}$—C≡C—[tetrahydronaphthalene-H]—C(=O)O—[phenyl]—[phenyl(F)]—O—CH(CH$_3$)—C$_6$H$_{13}$-n (S) | · 64 | · (44) | · 105 | — | · |

EX.: Example
Ph. Trans. Temp.: Phase Transition Temperature

Comparative Example 1

A mixture comprising 236 mg of 4-n-heptyloxybenzoic acid, 298 mg of (S)-4-[4'-(1"-methylheptyloxy)phenyl] phenol, 206 mg of DCC and 5 g of dichloromethane was stirred at room temperature for 30 minutes. Then, a catalytic amount of 4-N,N-dimethylaminopyridine was added to the mixture, and the mixture was further stirred at room temperature for 6 hours. After finishing the reaction, insoluble substances contained in the mixture were filtered off, followed by distilling off dichloromethane from the filtrate under reduced pressure. The resultant residue was purified by means of silica gel column chromatography, and then the resultant solid was recrystallized twice from an ethanol/ethyl acetate mixed solvent (10:1 vol/vol), whereby 402 mg of the following compound was obtained in the form of a colorless crystal:

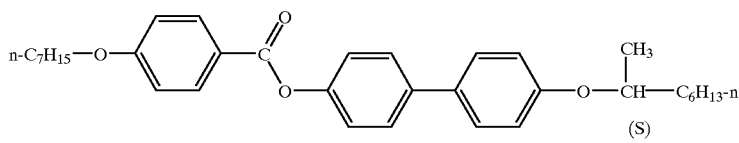

The phase transition temperature (° C.) of this compound is shown below:

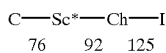
C—Sc*—Ch—I
76   92   125

This compound was injected into a glass-made test cell of 2 μm thick with an ITO electrode and an alignment layer of polyimide (CRD 8616: manufactured by Sumitomo Bakelite Co., Ltd.) subjected to rubbing treatment to measure a driving characteristic in applying an electric field. The measurement was carried out at 82° C. lower by 10° C. than 92° C. which is an Sc* phase transition point of this compound, wherein the applied voltage was ±20 V. The measurement results are shown below:

Response time: 33 μseconds Tilt angle: 33°

Spontaneous polarization: 54 nC/cm$^2$

Comparison with Example 26 shows that this compound has a high upper limit temperature (Sc* phase transition point) but is slow in response time and has a high viscosity. Further, it can be found that the values of the spontaneous polarization and the tilt angle are small as compared with those of the acetylene compounds of the present invention.

Comparative Example 2

The same operation as described in Comparative Example 1 was repeated to obtain 354 mg of the following compound in the form of a colorless crystal, except that 234 mg of 4-n-octylbenzoic acid was substituted for 236 mg of 4-n-heptyloxybenzoic acid:

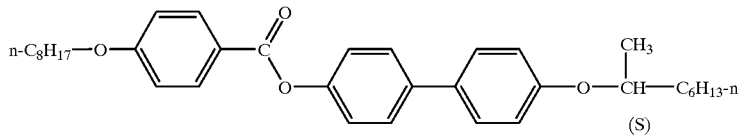

The phase transition temperature (° C.) of this compound is shown below:

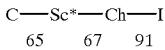
C—Sc*—Ch—I
65   67   91

This compound was injected into a glass-made test cell of 2 μm thick with an ITO electrode and an alignment layer of polyimide (CRD 8616: manufactured by Sumitomo Bakelite Co., Ltd.) subjected to rubbing treatment to measure a driving characteristic in applying an electric field. The measurement was carried out at 57° C. lower by 10° C. than 67° C. which is an Sc* phase transition point of this compound, wherein the applied voltage was ±20 V. The measurement results are shown below:

Response time: 24 μseconds Tilt angle: 35°

Spontaneous polarization: 46 nC/cm$_2$

Comparison with Example 26 shows that this compound has a low upper limit temperature (Sc* phase transition point) and that it has a small spontaneous polarization and tilt angle as compared with those of the acetylene compounds of the present invention. Further, comparison with Comparative Example 1 shows that this compound is fast in response time but low in upper limit temperature (Sc* phase transition point).

Comparative Example 3

The same operation as described in Comparative Example 1 was repeated to obtain 333 mg of the following compound in the form of a colorless crystal, except that 278 mg of 4-n-decyloxybenzoic acid was substituted for 236 mg of 4-n-heptyloxybenzoic acid:

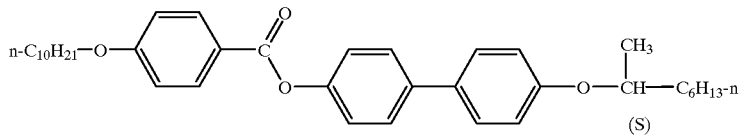

The phase transition temperature (° C.) of this compound is shown below:

C—Sc*—Ch—I
85   104  117

This compound was injected into a glass-made test cell of 2 μm thick with an ITO electrode and an alignment layer of polyimide (CRD 8616: manufactured by Sumitomo Bakelite Co., Ltd.) subjected to rubbing treatment to measure a driving characteristic in applying an electric field. The measurement was carried out at 94° C. lower by 10° C. than 104° C. which is an Sc* phase transition point of this compound, wherein the applied voltage was ±20 V. The measurement results are shown below:

Response time: 34 μseconds Tilt angle: 32°
Spontaneous polarization: 57 nC/cm$_2$ Comparison with Example 26 shows that this compound has a high upper limit temperature (Sc* phase transition point) but is slow in response time and has a high viscosity. Further, it can be found that the spontaneous polarization and the tilt angle are small as compared with those of the acetylene compounds of the present invention.

Comparative Example 4

The same operation as described in Comparative Example 1 was repeated to obtain 386 mg of the following compound in the form of a colorless crystal, except that 326 mg of (R)-4-(4'-hydroxyphenyl)benzoic acid 1"-methylheptyl ester was substituted for 298 mg of (S)-4-[4'-(1"-methylheptyloxy)phenyl]phenol:

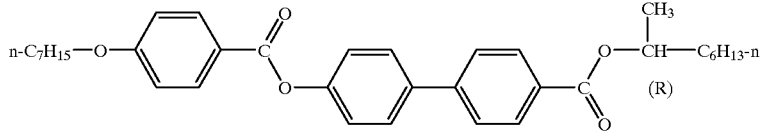

The phase transition temperature (° C.) of this compound is shown below, wherein a numeral in a parenthesis shows C—Sc*—S$_A$—I
98  (75)  127

This compound was injected into a glass-made test cell of 2 μm thick with an ITO electrode and an alignment layer of polyimide (CRD 8616: manufactured by Sumitomo Bakelite Co., Ltd.) subjected to rubbing treatment to measure a driving characteristic in applying an electric field. The measurement was carried out at 73° C. lower by 2° C. than 75° C. which is an Sc* phase transition point of this compound, wherein the applied voltage was ±20 V. The measurement results are shown below:

Response time: 61 μseconds Tilt angle: 12.5°

Comparison with Example 11 shows that this compound has a slow response time and a high viscosity.

Comparative Example 5

The same operation as described in Comparative Example 1 was repeated to obtain 358 mg of the following compound in the form of a colorless crystal, except that 326 mg of (R)-4-(4'-hydroxyphenyl)benzoic acid 1"-methylheptyl ester and 234 mg of 4-n-octylbenzoic acid were substituted for 298 mg of (S)-4-[4'-(1"-methylheptyloxy)phenyl]phenol and 236 mg of 4-n-heptyloxybenzoic acid:

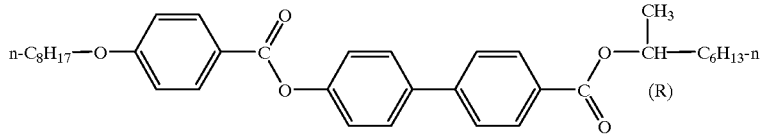

the phase transition temperature at a cooling-down step (This applies to the following Examples and Comparative Examples):

The phase transition temperature (° C.) of this compound is shown below:

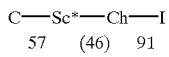

This compound was injected into a glass-made test cell of 2 μm thick with an ITO electrode and an alignment layer of polyimide (CRD 8616: manufactured by Sumitomo Bakelite Co., Ltd.) subjected to rubbing treatment to measure a driving characteristic in applying an electric field. The measurement was carried out at 44° C. lower by 2° C. than 46° C. which is an Sc* phase transition point of this compound, wherein the applied voltage was ±20 V. The measurement results are shown below:

Response time: 45 μseconds Tilt angle: 7°

Comparison with Example 11 shows that this compound has a low upper limit temperature (Sc* phase transition point). Further, it can be found that the tilt angle is small as compared with that of the acetylene compounds of the present invention.

Comparative Example 6

The same operation as described in Comparative Example 1 was repeated to obtain 389 mg of the following compound in the form of a colorless crystal, except that 370 mg of (R)-4-(4'-hydroxyphenylcarbonyloxy)benzoic acid 1"-methylheptyl ester was substituted for 298 mg of (S)-4-[4'-(1"-methylheptyloxy)phenyl]phenol:

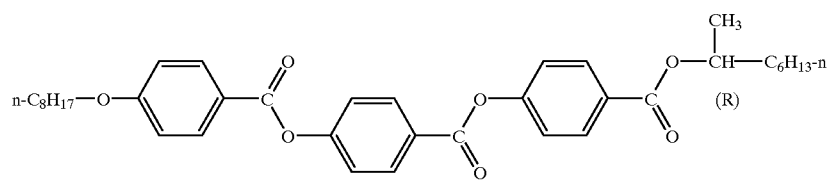

The phase transition temperature (° C.) of this compound is shown below:

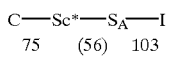

This compound was injected into a glass-made test cell of 2 μm thick with an ITO electrode and an alignment layer of polyimide (CRD 8616: manufactured by Sumitomo Bakelite Co., Ltd.) subjected to rubbing treatment to measure a driving characteristic in applying an electric field. The measurement was carried out at 68° C. lower by 5° C. than 73° C. which is an Sc* phase transition point of this compound, wherein the applied voltage was ±20 V. The measurement results are shown below:

Response time: 70 a seconds Tilt angle: 12°

Comparison with Example 9 shows that this compound has a slow response time and a high viscosity.

Comparative Example 7

The same operation as described in Comparative Example 1 was repeated to obtain 326 mg of the following compound in the form of a colorless crystal, except that 370 mg of (R)-4-(4'-hydroxyphenylcarbonyloxy)benzoic acid 1"-methylheptyl ester and 234 mg of 4-n-octylbenzoic acid were substituted for 298 mg of (S)-4-[4'-(1"-methylheptyloxy)phenyl]phenol and 236 mg of 4-n-heptyloxybenzoic acid:

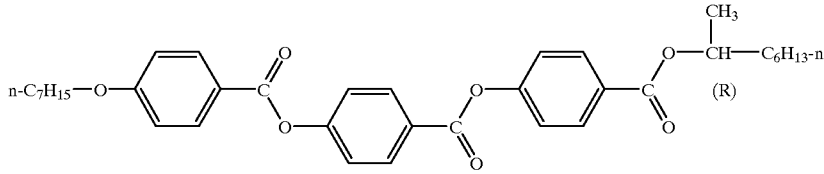

The phase transition temperature (° C.) of this compound is shown below:

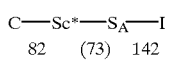

This compound was injected into a glass-made test cell of 2 μm thick with an ITO electrode and an alignment layer of polyimide (CRD 8616: manufactured by Sumitomo Bakelite Co., Ltd.) subjected to rubbing treatment to measure a driving characteristic in applying an electric field. The measurement was carried out at 51° C. lower by 5° C. than 56° C. which is an Sc* phase transition point of this compound, wherein the applied voltage was ±20 V. The measurement results are shown below:

Response time: 43 μseconds Tilt angle: 11°

Comparison with Example 9 shows that this compound has a low upper limit temperature (Sc* phase transition point) as compared with that of the acetylene compounds of the present invention.

Example 85

Preparation of Liquid Crystal Composition

A liquid crystal composition containing acetylene compounds of the present invention was prepared. That is, the following compound group was mixed in a proportion shown below and melt with heating at 100° C., whereby the liquid crystal composition (ferroelectric liquid crystal composition) was prepared:

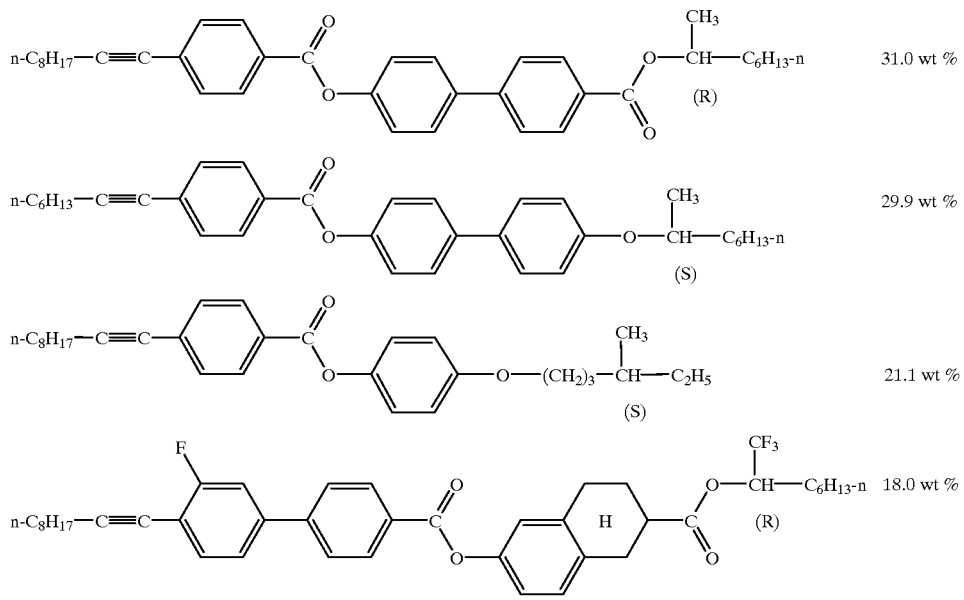

The phase transition temperature (° C.) of this liquid crystal composition is shown below:

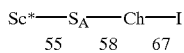

Example 86

Preparation of Liquid Crystal Element

An insulating alignment-controlling layer [polyimide (CRD 8616: manufactured by Sumitomo Bakelite Co., Ltd.)] was spin-coated on two sheets of glass plates of 1.1 mm thick provided thereon with an ITO film, and after forming the film, it was baked at 90° C. for 5 minutes and at 200° C. for 30 minutes. This alignment layer was subjected to rubbing treatment, and silica beads having an average particle diameter of 1.9 μm were scattered on one glass plate. Then, the glass plates were stuck together with a sealant so that the respective rubbing treatment axes were anti-parallel to each other to prepare a cell. This cell was heated to 100° C. and charged with the heated (100° C.) liquid crystal composition prepared in Example 85, followed by cooling down to room temperature at a rate of 3° C./minute, whereby a liquid crystal element was prepared. This liquid crystal element was interposed between two sheets of polarizing plates disposed in a cross-nicol state, and a rectangular wave of 10 Hz were applied at ±20 V to observe a distinct switching phenomenon. Further, observation under a polarizing microscope revealed a good and even alignment state. The optical response time at 30° C. was 48 μseconds, and the tilt angle determined from two quenching positions in switching in rectangular wave driving was 27.5°. The contrast was good. Further, this liquid crystal composition has a spontaneous polarization of 108 nC/cm$^2$ and a response time of 92 μseconds at ±10 V.

Example 87

Preparation of Liquid Crystal Composition

A liquid crystal composition containing acetylene compounds of the present invention was prepared. That is, the following compound group was mixed in a proportion shown below and melt with heating at 120° C., whereby the liquid crystal composition (ferroelectric liquid crystal composition) was prepared:

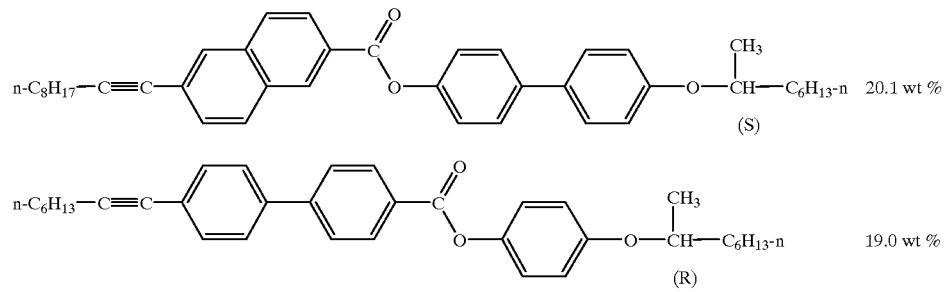

-continued

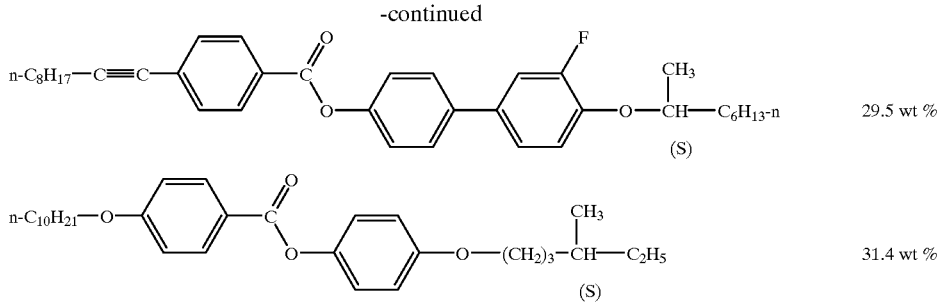

29.5 wt %

31.4 wt %

The phase transition temperature (° C.) of this liquid crystal composition is shown below:

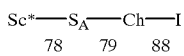

Example 88

Preparation of Liquid Crystal Element

The same operation as described in Example 86 was repeated to prepare a liquid crystal element, except that the liquid crystal composition prepared in Example 87 was substituted for the liquid crystal composition prepared in Example 85.

This liquid crystal element was interposed between two sheets of polarizing plates disposed in a cross-nicol state, and a rectangular wave of 10 Hz were applied at ±20 V to observe a distinct switching phenomenon. Further, observation under a polarizing microscope revealed a good and even alignment state. The optical response time at room temperature (30° C.) was 46 μseconds, and the tilt angle determined from two quenching positions in switching in rectangular wave driving was 31.0°. The contrast was good. Further, this liquid crystal composition has a spontaneous polarization of 65 nC/cm$^2$ and a response time of 68 μseconds at ±10 V.

Example 89

Preparation of Liquid Crystal Composition

A liquid crystal composition containing acetylene compounds of the present invention was prepared. That is, the following compound group was mixed in a proportion shown below and melt with heating at 120° C., whereby the liquid crystal composition (anti-ferroelectric liquid crystal composition) was prepared:

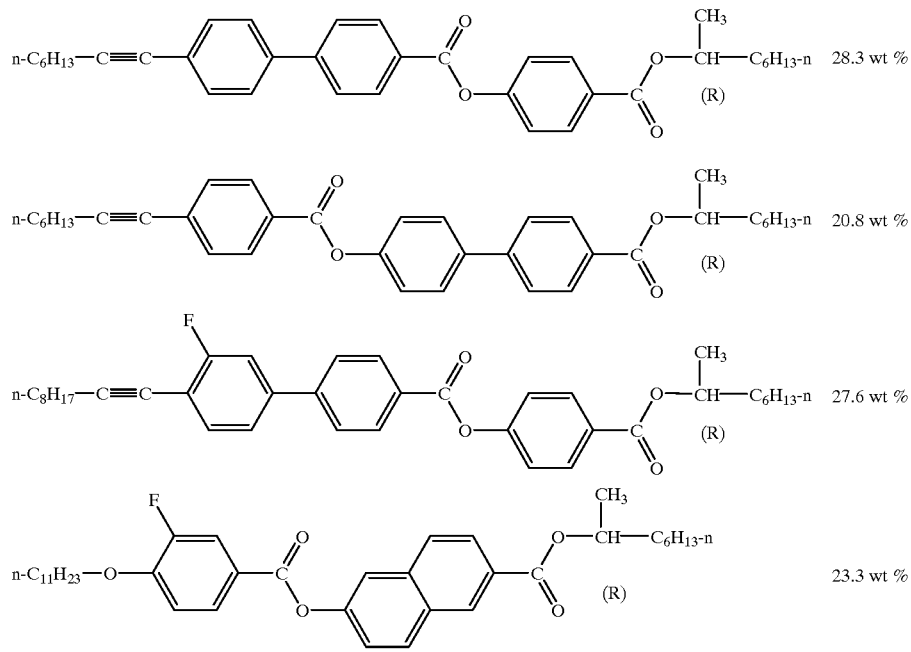

The phase transition temperature (° C.) of this liquid crystal composition is shown below:

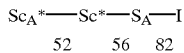
$Sc_A^*$ — $Sc^*$ — $S_A$ — I
52 56 82

Example 90

Preparation of Liquid Crystal Element

The same operation as described in Example 86 was repeated to prepare a liquid crystal element, except that the liquid crystal composition prepared in Example 89 was substituted for the liquid crystal composition prepared in Example 85.

This liquid crystal element was interposed between two sheets of polarizing plates disposed in a cross-nicol state, and a rectangular wave of 10 Hz were applied at ±20 V to observe a distinct switching phenomenon. Further, observation under a polarizing microscope revealed a good and even alignment state. The optical response time at 30° C. was 28 $\mu$seconds, and the tilt angle determined from two quenching positions in switching in rectangular wave driving was 22.5°. The contrast was good. Further, this liquid crystal composition has a spontaneous polarization of 107 $nC/cm^2$ and a response time of 62 $\mu$seconds in driving at ±10 V.

Example 91

Preparation of Liquid Crystal Composition

A liquid crystal composition containing acetylene compounds of the present invention was prepared. That is, the following compounds group was mixed in a proportion shown below and melt with heating at 120° C., whereby the liquid crystal composition (anti-ferroelectric liquid crystal composition) was prepared:

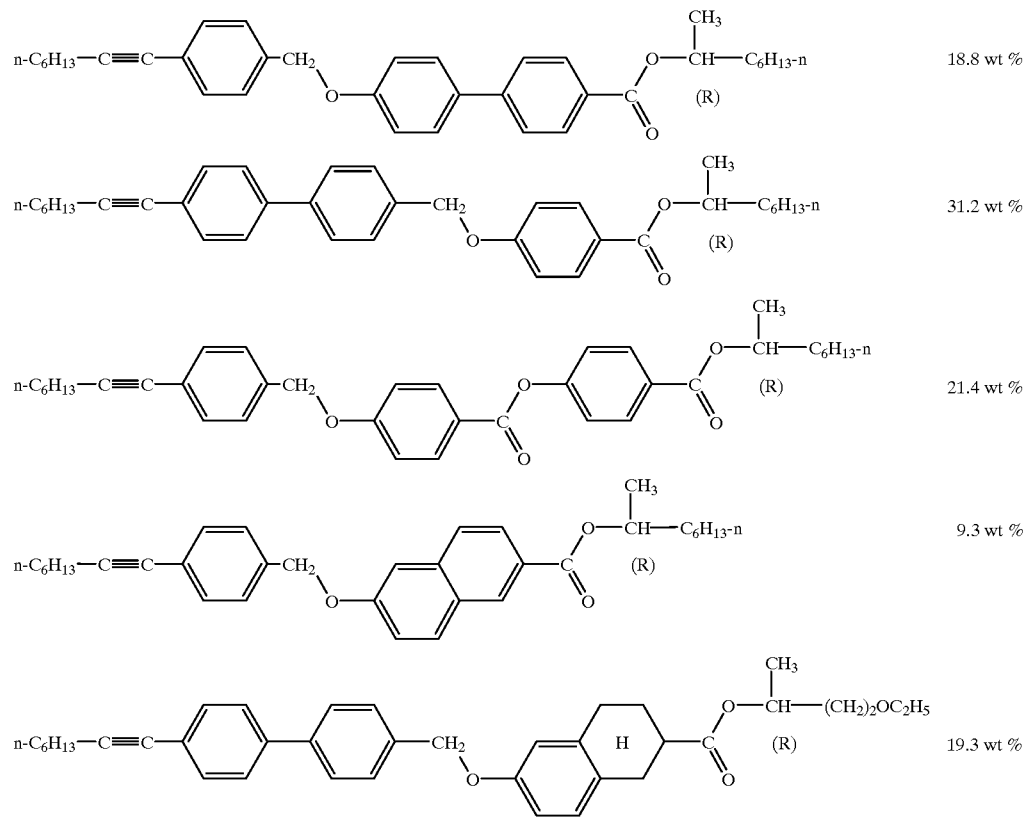

The phase transition temperature (° C.) of this liquid crystal composition is shown below:

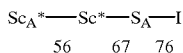
$Sc_A^*$ — $Sc^*$ — $S_A$ — I
56 67 76

Example 92

Preparation of Liquid Crystal Element

The same operation as described in Example 86 was repeated to prepare a liquid crystal element, except that the liquid crystal composition prepared in Example 91 was substituted for the liquid crystal composition prepared in Example 85.

This liquid crystal element was interposed between two sheets of polarizing plates disposed in a cross-nicol state, and a rectangular wave of 10 Hz were applied at 20 V to observe a distinct switching phenomenon. Further, observation under a polarizing microscope revealed a good and even alignment state. The optical response time at 30° C. was 89 μseconds, and the tilt angle determined from two quenching positions in switching in rectangular wave driving was 21.5°. The contrast was good. Further, this liquid crystal composition has a spontaneous polarization of 101 nC/cm² and a response time of 160 μseconds in driving at ±10 V.

Example 93

Preparation of Liquid Crystal Composition

A liquid crystal composition containing acetylene compounds of the present invention was prepared. That is, the following compound group was mixed in a proportion shown below and melt with heating at 120° C., whereby the liquid crystal composition (anti-ferroelectric liquid crystal composition) was prepared:

and a rectangular wave of 10 Hz were applied at ±20 V to observe a distinct switching phenomenon. Further, observation under a polarizing microscope revealed a good and even alignment state. The optical response time at 30° C. was 42 μsecond, and the tilt angle determined from two quenching positions in switching in rectangular wave driving was 22.0°. The contrast was good. Further, this liquid crystal composition has a spontaneous polarization of 96 nC/cm² and a response time of 82 μseconds in driving at ±10 V.

Example 95

Preparation of Liquid Crystal Composition

A liquid crystal composition containing an acetylene compound of the present invention was prepared. That is, the following compound group was mixed in a proportion shown below and melt with heating at 100° C., whereby the liquid crystal composition (ferroelectric liquid crystal composition) was prepared:

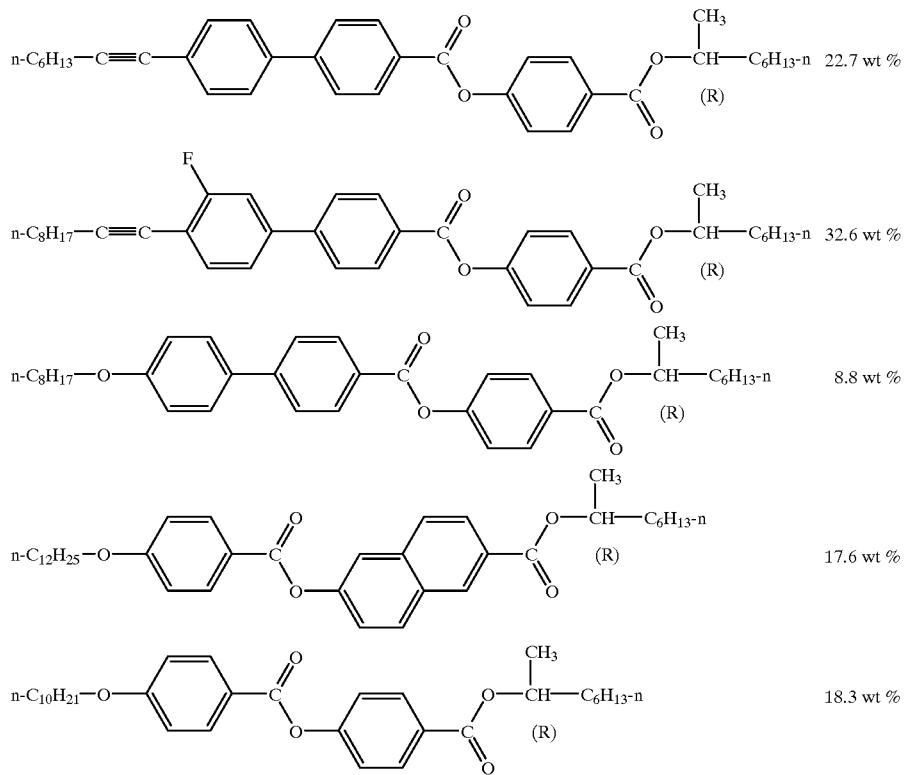

The phase transition temperature (° C.) of this liquid crystal composition is shown below:

Example 94

Preparation of Liquid Crystal Element

The same operation as described in Example 86 was repeated to prepare a liquid crystal element, except that the liquid crystal composition prepared in Example 93 was substituted for the liquid crystal composition prepared in Example 85.

This liquid crystal element was interposed between two sheets of polarizing plates disposed in a cross-nicol state,

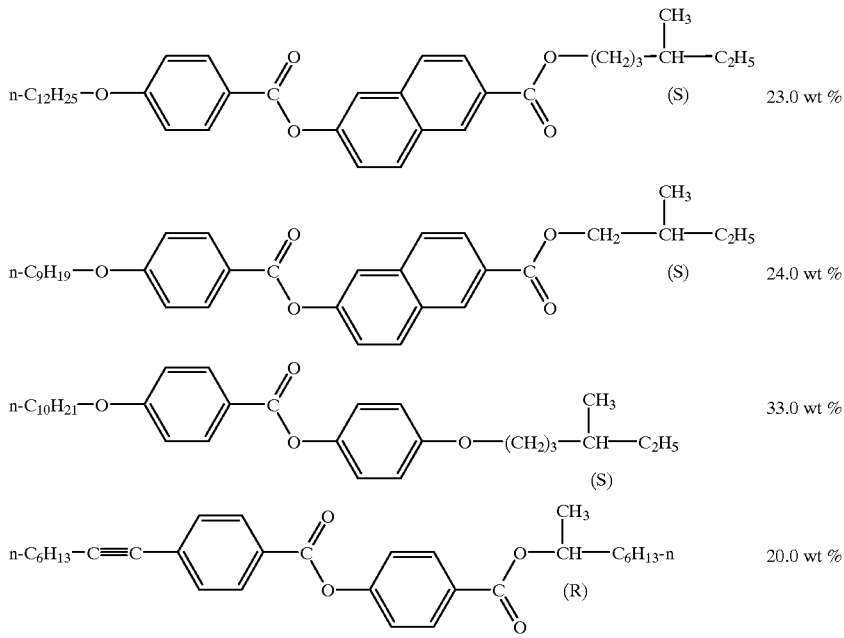

The phase transition temperature (° C.) of this liquid crystal composition is shown below:

Sc*—S$_A$—I
46    72

Example 96

Preparation of Liquid Crystal Element

The same operation as described in Example 86 was repeated to prepare a liquid crystal element, except that the liquid crystal composition prepared in Example 95 was substituted for the liquid crystal composition prepared in Example 85.

This liquid crystal element was interposed between two sheets of polarizing plates disposed in a cross-nicol state, and a rectangular wave of 10 Hz were applied at ±20 V to observe a distinct switching phenomenon. Further, observation under a polarizing microscope revealed a good and even alignment state. The optical response time at room temperature (25° C.) was 48 μseconds, and the tilt angle determined from two quenching positions in switching in rectangular wave driving was 15.0°. The contrast was good.

Comparative Example 8

Preparation of Liquid Crystal Composition

A liquid crystal composition containing no acetylene compound of the present invention was prepared for the sake of comparison with Example 95, and then a liquid crystal element was prepared.

That is, the following compound group was mixed in a proportion shown below and melt with heating at 100° C., whereby the liquid crystal composition (ferroelectric liquid crystal composition) was prepared:

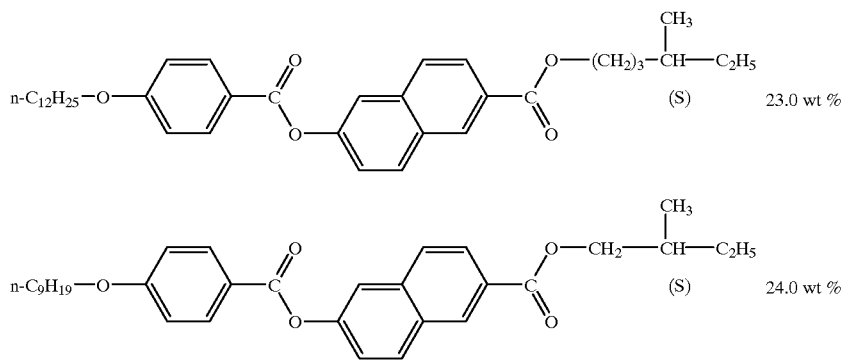

-continued

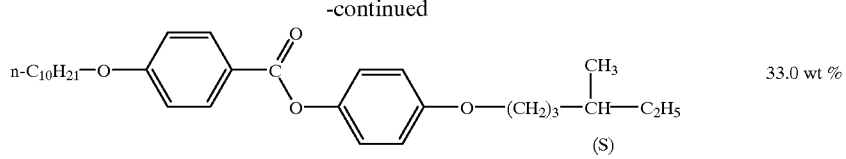
33.0 wt %

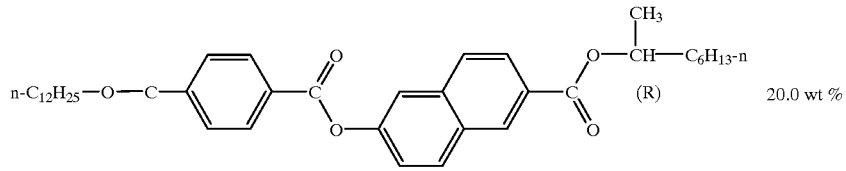
20.0 wt %

The phase transition temperature (° C.) of this liquid crystal composition is shown below:

Sc*——S$_A$——I
52    72

Next, a cell prepared according to the same operation as in Example 86 was heated to 100° C. and charged with the heated (100° C.) liquid crystal composition prepared above, followed by cooling down at a rate of 3° C./minute, whereby a liquid crystal element was prepared.

This liquid crystal element was interposed between polarizing plates disposed in a cross-nicol state, and a rectangular wave of 10 Hz were applied at ±20 V to observe a distinct switching phenomenon. The optical response time at room temperature (25° C.) was 141 μseconds, and the tilt angle determined from two quenching positions in switching in rectangular wave driving was 17.0°.

Example 97

Preparation of Liquid Crystal Composition

A liquid crystal composition containing an acetylene compound of the present invention was prepared. That is, the following compound group was mixed in a proportion shown below and melt with heating at 130° C., whereby the liquid crystal composition (ferroelectric liquid crystal composition) was prepared:

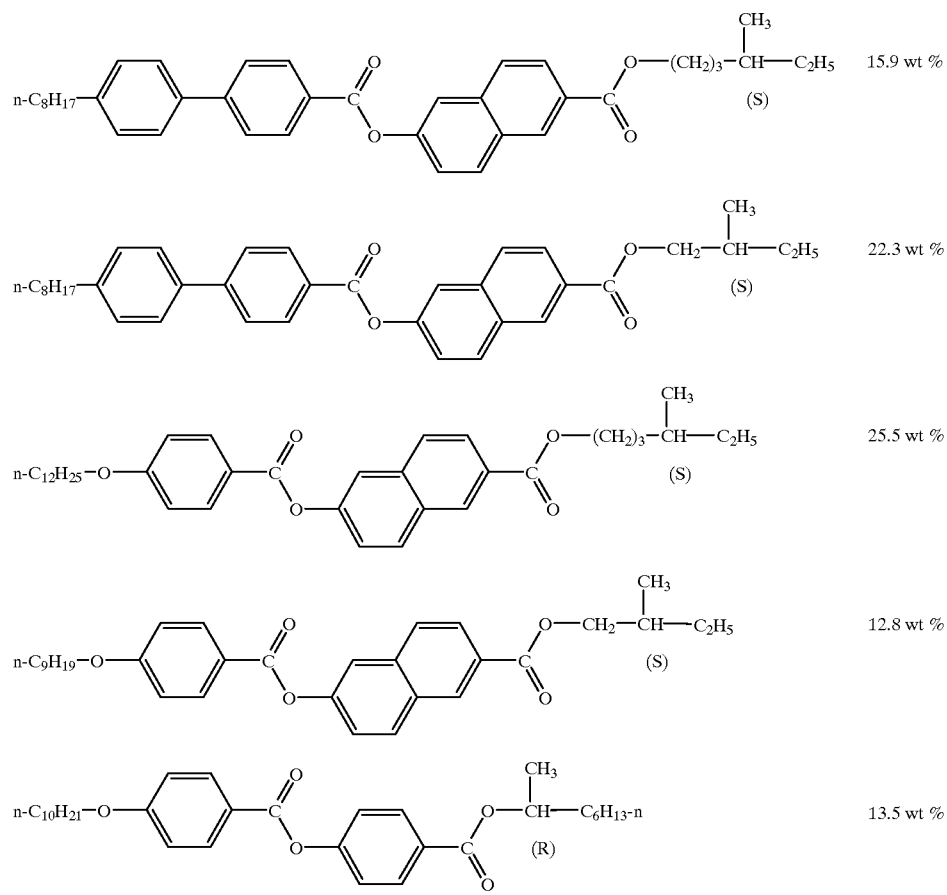

-continued

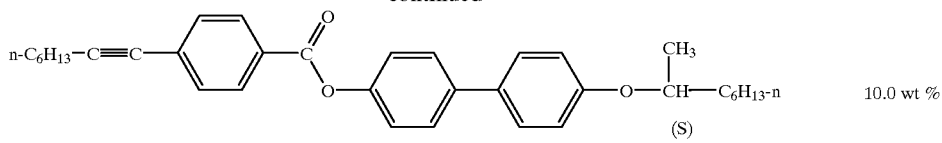

10.0 wt %

The phase transition temperature (° C.) of this liquid crystal composition is shown below:

Sc*──S$_A$──I
83    120

Example 98

Preparation of Liquid Crystal Element

The same operation as described in Example 86 was repeated to prepare a liquid crystal element, except that the liquid crystal composition prepared in Example 97 was substituted for the liquid crystal composition prepared in Example 85.

This liquid crystal element was interposed between two sheets of polarizing plates disposed in a cross-nicol state, and a rectangular wave of 10 Hz were applied at ±20 V to observe a distinct switching phenomenon. Further, observation under a polarizing microscope revealed a good and even alignment state. The optical response time at room temperature (25° C.) was 163 μseconds, and the tilt angle determined from two quenching positions in switching in rectangular wave driving was 19.5°. The contrast was good.

Comparative Example 9

Preparation of Liquid Crystal Composition

A liquid crystal composition containing no acetylene compound of the present invention was prepared for the sake of comparison with Example 97.

That is, the following compound group was mixed in a proportion shown below and melt with heating at 130° C., whereby the liquid crystal composition (ferroelectric liquid crystal composition) was prepared:

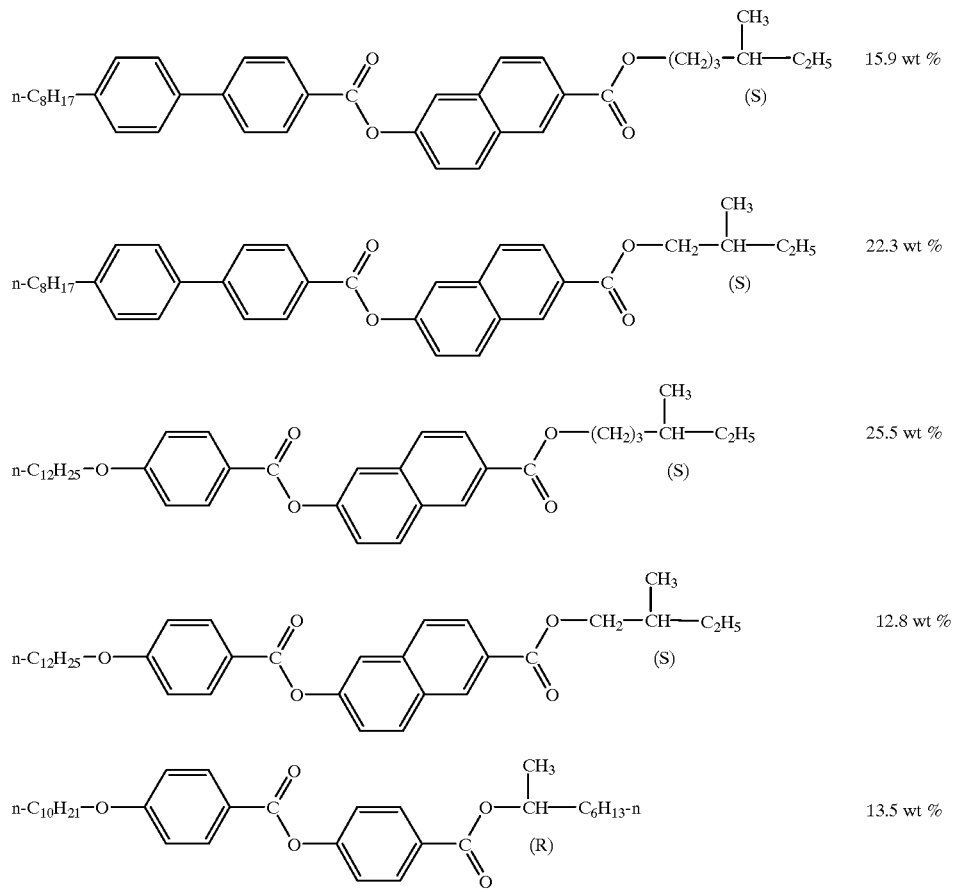

-continued

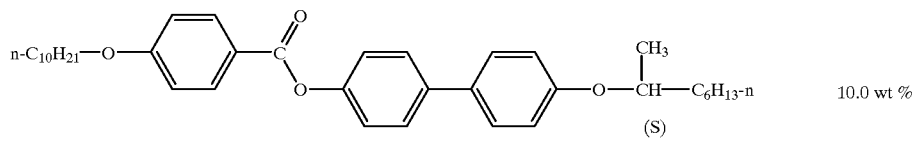

10.0 wt %

The phase transition temperature (° C.) of this liquid crystal composition is shown below:

Next, a cell prepared according to the same operation as in Example 86 was heated to 120° C. and charged with the heated (120° C.) liquid crystal composition prepared above, followed by cooling down at a rate of 3° C./minute, whereby a liquid crystal element was prepared.

This liquid crystal element was interposed between polarizing plates disposed in a cross-nicol state, and a rectangular wave of 10 Hz were applied at ±20 V to observe a distinct switching phenomenon. The optical response time at room temperature (25° C.) was 226 μseconds, and the tilt angle determined from two quenching positions in switching in rectangular wave driving was 19.5°.

Comparative Example 10

Preparation of Host Liquid Crystal

A liquid crystal composition containing no acetylene compound of the present invention was prepared.

That is, the following compound group was mixed in a proportion shown below and melt with heating at 100° C., whereby the liquid crystal composition (ferroelectric liquid crystal composition) was prepared:

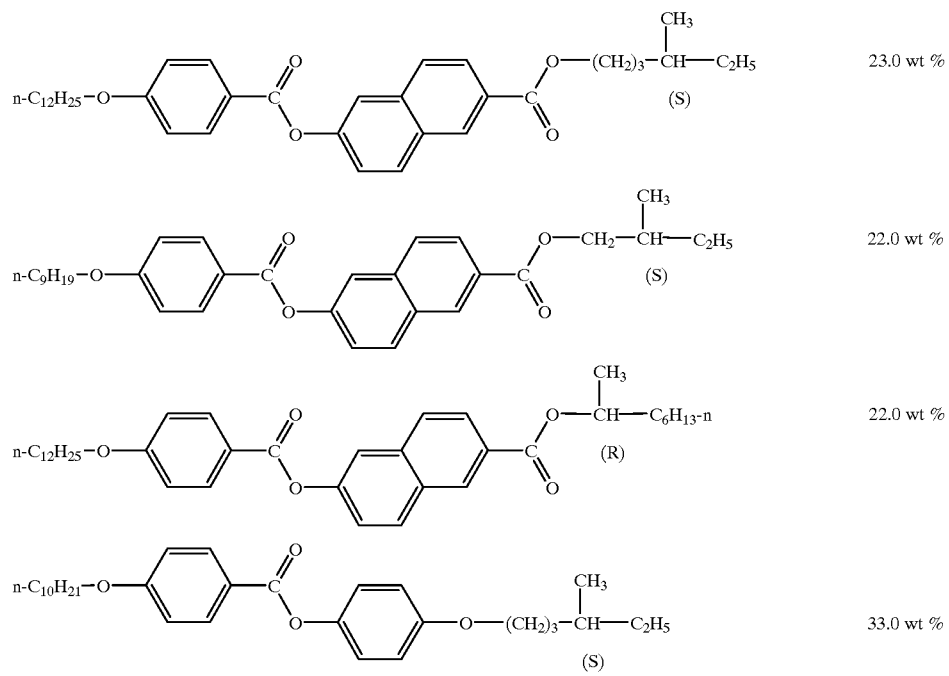

23.0 wt %

22.0 wt %

22.0 wt %

33.0 wt %

The phase transition temperature (° C.) of this liquid crystal composition is shown below:

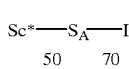

Next, a cell prepared according to the same operation as in Example 86 was heated to 100° C. and charged with the heated (100° C.) liquid crystal composition prepared above, followed by cooling down at a rate of 3° C./minute, whereby a liquid crystal element was prepared.

This liquid crystal element was interposed between polarizing plates disposed in a cross-nicol state, and a rectangular wave of 10 Hz were applied at ±20 V to observe a distinct switching phenomenon. The optical response time at room temperature (25° C.) was 118 μseconds, and the tilt angle determined from two quenching positions in switching in rectangular wave driving was 17.5°. This liquid crystal composition has a spontaneous polarization of 18 nC/cm$^2$.

Example 99

Preparation of Liquid Crystal Composition

Added to the liquid crystal composition prepared in Comparative Example 10 was 10% by weight of the acetylene compound of the present invention prepared in Example 26 to prepare a liquid crystal composition (ferroelectric liquid crystal composition).

The phase transition temperature (° C.) of this liquid crystal composition is shown below:

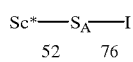

Example 100

Preparation of Liquid Crystal Element

The same operation as described in Example 86 was repeated to prepare a liquid crystal element, except that the liquid crystal composition prepared in Example 99 was substituted for the liquid crystal composition prepared in Example 85.

This liquid crystal element was interposed between two sheets of polarizing plates disposed in a cross-nicol state, and a rectangular wave of 10 Hz were applied at ±20 V to observe a distinct switching phenomenon. Further, observation under a polarizing microscope revealed a good and even alignment state. The optical response time at room temperature (25° C.) was 74 μseconds, and the tilt angle determined from two quenching positions in switching in rectangular wave driving was 17.5°. The contrast was good. This liquid crystal composition has a spontaneous polarization of 22 nC/cm$^2$. Comparison with Comparative Example 11 described later shows that the liquid crystal composition containing the acetylene compound of the present invention has a high upper limit temperature (Sc* phase transition point), a large tilt angle and a large spontaneous polarization. Further, Comparison with Comparative Example 12 shows that the liquid crystal composition containing the acetylene compound of the present invention has a fast response time (low viscosity).

Comparative Example 11

For the sake of comparison with Example 99, 10% by weight of the compound prepared in Comparative Example 2 was added to the liquid crystal composition prepared in Comparative Example 10 to prepare a liquid crystal composition, and then a liquid crystal element was prepared.

The phase transition temperature (° C.) of this liquid crystal composition is shown below:

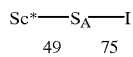

Next, a cell prepared according to the same operation as in Example 86 was heated to 100° C. and charged with the heated (100° C.) liquid crystal composition prepared above, followed by cooling down at a rate of 3° C./minute, whereby a liquid crystal element was prepared.

This liquid crystal element was interposed between polarizing plates disposed in a cross-nicol state, and a rectangular wave of 10 Hz were applied at ±20 V to observe a distinct switching phenomenon. The optical response time at room temperature (25° C.) was 74 seconds, and the tilt angle determined from two quenching positions in switching in rectangular wave driving was 15.5°. This liquid crystal composition has a spontaneous polarization of 18 nC/cm$^2$.

Comparative Example 12

For the sake of comparison with Example 99, 10% by weight of the compound prepared in Comparative Example 3 was added to the liquid crystal composition prepared in Comparative Example 10 to prepare a liquid crystal composition, and then a liquid crystal element was prepared.

The phase transition temperature (° C.) of this liquid crystal composition is shown below:

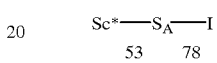

Next, a cell prepared according to the same operation as in Example 86 was heated to 100° C. and charged with the heated (100° C.) liquid crystal composition prepared above, followed by cooling down at a rate of 3° C./minute, whereby a liquid crystal element was prepared.

This liquid crystal element was interposed between polarizing plates disposed in a cross-nicol state, and a rectangular wave of 10 Hz were applied at ±20 V to observe a distinct switching phenomenon. The optical response time at room temperature (25° C.) was 120 μseconds, and the tilt angle determined from two quenching positions in switching in rectangular wave driving was 17.5°. This liquid crystal composition has a spontaneous polarization of 20 nC/cm$^2$.

Example 101

Preparation of Liquid Crystal Composition

Added to the liquid crystal composition prepared in Comparative Example 10 was 10% by weight of the acetylene compounds of the present invention prepared in Example 30 to prepare a liquid crystal composition (ferroelectric liquid crystal composition).

The phase transition temperature (° C.) of this liquid crystal composition is shown below:

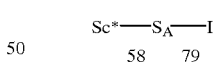

Example 102

Preparation of Liquid Crystal Element

The same operation as described in Example 86 was repeated to prepare a liquid crystal element, except that the liquid crystal composition prepared in Example 101 was substituted for the liquid crystal composition prepared in Example 85.

This liquid crystal element was interposed between two sheets of polarizing plates disposed in a cross-nicol state, and a rectangular wave of 10 Hz were applied at ±20 V to observe a distinct switching phenomenon. Further, observation under a polarizing microscope revealed a good and even alignment state. The optical response time at room temperature (25° C.) was 102 μseconds, and the tilt angle determined from two quenching positions in switching in rectangular wave driving was 19.0°. The contrast was good. This liquid crystal composition has a spontaneous polarization of 16 nC/cm². Comparison with Comparative Example 10 shows that the high upper limit temperature (Sc* phase transition point) can be elevated without increasing the viscosity (increasing the response time) by using the acetylene compound of the present invention as a constitutional component for the liquid crystal composition.

Example 103

Preparation of Liquid Crystal Composition

Added to the liquid crystal composition prepared in Comparative Example 10 was 10% by weight of an acetylene compound of the present invention prepared in Example 33 to prepare a liquid crystal composition (ferroelectric liquid crystal composition).

The phase transition temperature (° C.) of this liquid crystal composition is shown below:

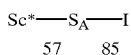

Example 104

Preparation of Liquid Crystal Element

The same operation as described in Example 86 was repeated to prepare a liquid crystal element, except that the liquid crystal composition prepared in Example 103 was substituted for the liquid crystal composition prepared in Example 85.

This liquid crystal element was interposed between two sheets of polarizing plates disposed in a cross-nicol state, and a rectangular wave of 10 Hz were applied at ±20 V to observe a distinct switching phenomenon. Further, observation under a polarizing microscope revealed a good and even alignment state. The optical response time at room temperature (25° C.) was 86 μsecond, and the tilt angle determined from two quenching positions in switching in rectangular wave driving was 19.0°. The contrast was good. This liquid crystal composition has a spontaneous polarization of 19 nC/cm².

Comparison of Examples 9, 11 and 26 with Comparative Examples 1, 2, 3, 4, 5, 6 and 7 shows that the acetylene compounds of the present invention have a high upper limit temperature (Sc* phase transition point) in a liquid crystal phase and an equal response speed as compared with those of the compounds to which terminal alkyl groups are bonded via single bonds. Further, it can be found that they have an equivalent upper limit temperature and a fast response speed as compared with those of the compounds to which terminal alkyl groups are bonded via —O— groups. Also, comparison of Example 96 with Comparative Example 8 shows that the use of the acetylene compound of the present invention can improve the response time of the liquid crystal compositions. Comparison of Example 98 with Comparative Example 9 shows that the acetylene compound of the present invention has the effect of raising the response time while maintaining the upper limit temperature of the liquid crystal composition. Further, comparison of Example 100 with Comparative Example 10 shows as well that the use of the acetylene compound of the present invention as a constitutional component for the liquid crystal composition makes it possible to elevate the upper limit temperature of the liquid crystal composition and improve the response time. It can be found as well from Example 100 and Comparative Examples 11 and 12 that the use of the acetylene compound of the present invention as a constitutional component for the liquid crystal composition makes it possible to maintain or elevate the upper limit temperature of the liquid crystal composition and improve the response time.

What is claimed is:

1. An acetylene compound represented by Formula (1):

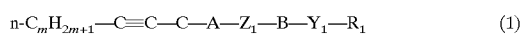

wherein m represents an integer of 2 to 24; $R_1$ represents a linear or branched alkyl group having 2 to 24 carbon atoms which may be substituted with a halogen atom, a linear or branched alkoxyalkyl group having 2 to 24 carbon atoms which may be substituted with a halogen atom, a linear or branched alkenyl group having 3 to 24 carbon atoms which may be substituted with a halogen atom, or a linear or branched alkenyloxyalkyl group having 4 to 24 carbon atoms which may be substituted with a halogen atom; $R_1$ may have an asymmetric carbon atom, and said asymmetric carbon atom may be optically active; A represents a group selected from:

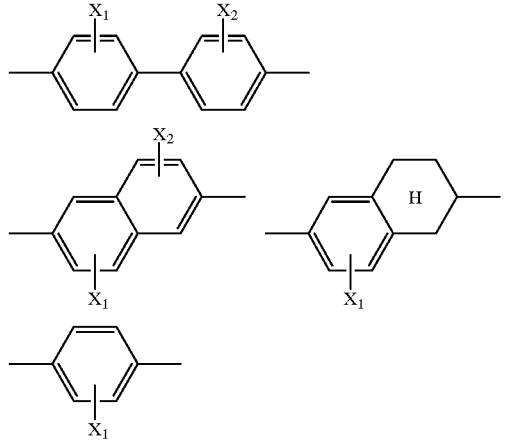

B represents a group selected from:

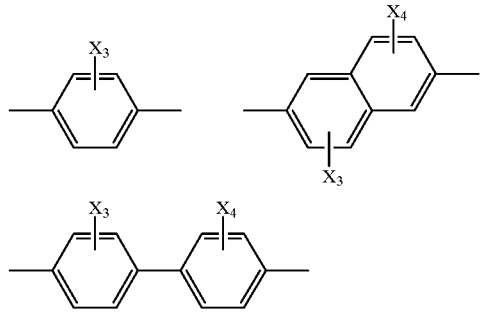

-continued

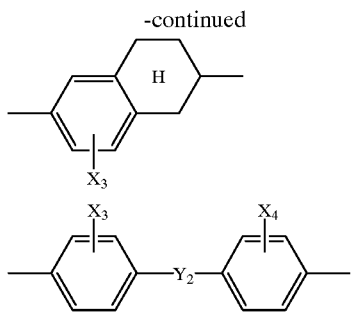

$X_1$, $X_2$, $X_3$ and $X_4$ each represent independently a hydrogen atom or a halogen atom; $Z_1$ represents a —COO— group or a —CH$_2$O— group; $Y_1$ represents a —O— group, a —COO— group or a —OCO— group; and $Y_2$ represents a —CH$_2$O— group, a —OCH$_2$ group, a —COO— group or a —OCO— group provided that when $Y_1$ represents a —O— group, $R_1$ is a group having an optically active asymmetric carbon.

2. The acetylene compound as described in claim 1, wherein $Y_1$ is a —COO— group or a —OCO— group.

3. The acetylene compound as described in claim 2, wherein $Z_1$ is a —COO— group.

4. The acetylene compound as described in claim 3, wherein A is:

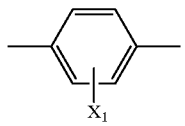

and B is:

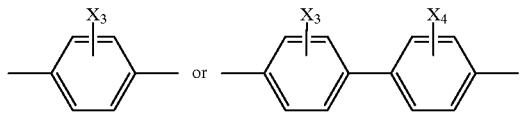

$X_1$, $X_3$ and $X_4$ each represent independently a hydrogen atom or a halogen atom.

5. The acetylene compound as described in claim 2, wherein $Z_1$ is a —CH$_2$O— group.

6. The acetylene compound as described in claim 1, wherein $Y_1$ is a —O— group.

7. The acetylene compound as described in claim 6, wherein $Z_1$ is a —COO— group.

8. The acetylene compound as described in claim 7, wherein A is:

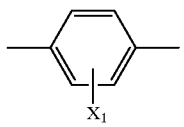

and B is:

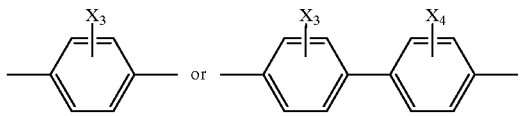

$X_1$, $X_3$ and $X_4$ each represent independently a hydrogen atom or a halogen atom.

9. The acetylene compound as described in claim 6, wherein $R_1$ is an optically active alkyl group.

10. The acetylene compound as described in claim 6, wherein B is represented by Formula (2):

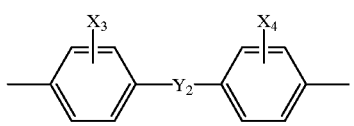

(2)

$X_3$ and $X_4$ each represent independently a hydrogen atom or a halogen atom, and $Y_2$ represents a —CH$_2$O— group, a —OCH$_2$— group, a —COO— group or a —OCO— group.

11. The acetylene compound as described in claim 6, wherein $Z_1$ is a —CH$_2$O— group.

12. A liquid crystal composition comprising at least one acetylene compound as described in claim 1.

13. A liquid crystal element comprising the liquid crystal composition as described in claim 12, which is disposed between a pair of electrode substrates.

* * * * *